AUTOMATIC COMMUNICATION SYSTEM

Filed May 21, 1959 61 Sheets-Sheet 1

INVENTOR.
THEODOR FRANKEL
MATTHEW P. TUBINIS
BY F. H. Henson
ATTORNEY

AUTOMATIC COMMUNICATION SYSTEM

Filed May 21, 1959 61 Sheets-Sheet 2

Nov. 26, 1963 T. FRANKEL ETAL 3,112,371

AUTOMATIC COMMUNICATION SYSTEM

Filed May 21, 1959 61 Sheets-Sheet 10

PHASE SPLITTER-APA

AUDIO AMPLIFIER-AUA

AUDIO AMPLIFIER-AUE

AUDIO AMPLIFIER-AUG

BLOCKING OSCILLATOR GATE-BOG

CONVERTER-CVB

EMITTER FOLLOWER-EFC

EMITTER FOLLOWER-EFD

INVERTER-INS

INVERTER-INU

INVERTER-INX

EQUALIZER-LAB

MONOSTABLE MULTIVIBRATOR-MAA

HIGH SPEED AMPLIFIER-PUH

HIGH SPEED AMPLIFIER-PUM

INTEGRATOR TRIGGER-STA

LOW PASS FILTER-FLN

CONTROL CONNECTOR-510

CALLING TIME STORE-520

AUTOMATIC COMMUNICATION SYSTEM

Filed May 21, 1959 61 Sheets-Sheet 31

LINE AND ROUTE SELECTOR-730

LINK CIRCUIT-810

LINK CIRCUIT-810

LINK CIRCUIT-810

Nov. 26, 1963 T. FRANKEL ETAL 3,112,371

AUTOMATIC COMMUNICATION SYSTEM

Filed May 21, 1959 61 Sheets-Sheet 49

Nov. 26, 1963 T. FRANKEL ETAL 3,112,371

AUTOMATIC COMMUNICATION SYSTEM

Filed May 21, 1959 61 Sheets-Sheet 55

ATTENDANT'S KEYBOARD CIRCUIT -1220

Nov. 26, 1963 T. FRANKEL ETAL 3,112,371

AUTOMATIC COMMUNICATION SYSTEM

Filed May 21, 1959 61 Sheets-Sheet 59

FIG.84

| SIGNAL | CODE | ACKNOWLEDGE CODE (WHEN REQ'D) |
|---|---|---|
| 1 | VW | VW |
| 2 | XW | XW |
| 3 | UY | UY |
| 4 | UV | UV |
| 5 | XY | XY |
| 6 | WY | WY |
| 7 | VX | VX |
| 8 | UW | UW |
| 9 | VY | VY |
| 0 | UX | UX |
| SEIZE | S | S & DIAL TONE |
| RELEASE | YZ | YZ |
| RECALL | WZ | — |
| RING TRIP | S | DIAL TONE |
| RING SIGNAL | RING TONE | S(from SUBSET) |
| ACKNOWLEDGE REQUEST | VZ | Z |
| END-OF-SELECTION | VZ | ABSENCE OF S |
| CANCEL | UZ | — |

FIG.85

| CONTROL TONE | FREQUENCY OF SIGNAL |
|---|---|
| S | 1700 CPS |
| U | 1900 CPS |
| V | 2100 CPS |
| W | 2300 CPS |
| X | 2500 CPS |
| Y | 2700 CPS |
| Z | 2900 CPS |
| DIAL TONE | 600 CPS (STEADY) |
| RING TONE | 600 CPS (ONE SEC. ON AND TWO SEC. OFF-MODULATED AT 20 CPS) |

| SERVICE | TIME SLOT | HIGHW'Y ONE | HIGHW'Y TWO | HIGHW'Y THREE | HIGHW'Y FOUR | HIGHW'Y FIVE | HIGHW'Y SIX | HIGHW'Y SEVEN | HIGHW'Y EIGHT | HIGHW'Y NINE | HIGHW'Y TEN |
|---|---|---|---|---|---|---|---|---|---|---|---|
| LOCAL LINE CIRCUITS | 1 | 111 | 112 | 113 | 114 | 115 | 116 | 117 | 118 | 119 | 110 |
| | 2 | 121 | 122 | 123 | 124 | 125 | 126 | 127 | 128 | 129 | 120 |
| | 3 | 131 | 132 | 133 | 134 | 135 | 136 | 137 | 138 | 139 | 130 |
| | 4 | 141 | 142 | 143 | 144 | 145 | 146 | 147 | 148 | 149 | 140 |
| | 5 | 151 | 152 | 153 | 154 | 155 | 156 | 157 | 158 | 159 | 150 |
| | 6 | 161 | 162 | 163 | 164 | 165 | 166 | 167 | 168 | 169 | 160 |
| | 7 | 171 | 172 | 173 | 174 | 175 | 176 | 177 | 178 | 179 | 170 |
| | 8 | 181 | 182 | 183 | 184 | 185 | 186 | 187 | 188 | 189 | 180 |
| | 9 | 191 | 192 | 193 | 194 | 195 | 196 | 197 | 198 | 199 | 190 |
| | 10 | 101 | 102 | 103 | 104 | 105 | 106 | 107 | 108 | 109 | 100 |
| | 11 | 211 | 212 | 213 | 214 | 215 | 216 | 217 | 218 | 219 | 210 |
| | 12 | 221 | 222 | 223 | 224 | 225 | 226 | 227 | 228 | 229 | 220 |
| | 13 | 231 | 232 | 233 | 234 | 235 | 236 | 237 | 238 | 239 | 230 |
| | 14 | 241 | 242 | 243 | 244 | 245 | 246 | 247 | 248 | 249 | 240 |
| | 15 | 251 | 252 | 253 | 254 | 255 | 256 | 257 | 258 | 259 | 250 |
| | 16 | 261 | 262 | 263 | 264 | 265 | 266 | 267 | 268 | 269 | 260 |
| | 17 | 271 | 272 | 273 | 274 | 275 | 276 | 277 | 278 | 279 | 270 |
| | 18 | 281 | 282 | 283 | 284 | 285 | 286 | 287 | 288 | 289 | 280 |
| | 19 | 291 | 292 | 293 | 294 | 295 | 296 | 297 | 298 | 299 | 290 |
| | 20 | 201 | 202 | 203 | 204 | 205 | 206 | 207 | 208 | 209 | 200 |
| TRUNKS | 21 | 1 | 2 | 3 | 4 | 5 | 6 | 7 | 8 | 9 | 10 |
| | 22 | 11 | 12 | 13 | 14 | 15 | 16 | 17 | 18 | 19 | 20 |
| | 23 | 21 | 22 | 23 | 24 | 25 | 26 | 27 | 28 | 29 | 30 |
| | 24 | 31 | 32 | 33 | 34 | 35 | 36 | 37 | 38 | 39 | 40 |
| | 25 | 41 | 42 | 43 | 44 | 45 | 46 | 47 | 48 | 49 | 50 |
| | 26 | 51 | 52 | 53 | 54 | 55 | 56 | 57 | 58 | 59 | 60 |
| | 27 | 61 | 62 | 63 | 64 | 65 | 66 | 67 | 68 | 69 | 70 |
| | 28 | 71 | 72 | 73 | 74 | 75 | 76 | 77 | 78 | 79 | 80 |
| BUSY AND SPARES | 29 | LINE BUSY | | | | | | | | | |
| | 30 | | | | | | | | | | |
| | 31 | TRK. BUSY | | | | | | | | | |
| | 32 | | | | | | | | | | |

FIG. 86

United States Patent Office 3,112,371
Patented Nov. 26, 1963

3,112,371

AUTOMATIC COMMUNICATION SYSTEM

Theodor Frankel, Rochester, and Matthew P. Tubinis, Penfield, N.Y., assignors to General Dynamics Corporation, Rochester, N.Y., a corporation of Delaware
Filed May 21, 1959, Ser. No. 814,928
11 Claims. (Cl. 179—18)

This invention relates to an automatic communication system and, more particularly, to an automatic telephone system including new and improved means for selecting a called circuit.

In electronic switching systems controlled, at least in part, by recurring signals individually representing lines or trunks, it is necessary to convert received digital data into the recurring signals representing the desired circuit. In addition, connections to be extended to local lines, outgoing trunks, and operator positions, for instance, require varying operations on the received digital data and the performance of different types of signal selecting operations. Thus, it would be desirable to provide a single digitally controlled means that is capable of performing all of the necessary selecting operations without requiring an excessive amount of circuitry.

Accordingly, one object of the present invention is to provide a new and improved automatic communication system.

Another object is to provide an automatic telephone system including new and improved means for performing different types of circuit selecting operations under the control of received digital data.

Another object is to provide an automatic telephone system in which called circuits occupy different time positions on different channels and in which means are provided for converting received digital data into signals representing the channel and the time position of the called circuit.

A further object is to provide an automatic telephone system in which called circuits occupy different time positions on different channels and in which means are provided for automatically searching for the channel and time position of an idle called circuit in a group thereof represented by the received digital data.

Another object is to provide an automatic telephone system including a called circuit selecting means that is conditioned for operation in different manners in accordance with the value of received digital data.

A further object is to provide new and improved means for storing and transferring digital data.

Many other objects and advantages of the present invention will become apparent from the following detailed description when considered in conjunction with the drawings, in which:

FIG. 1 is a block diagram of an automatic communication system embodying the present invention;

FIGS. 2–13 form a schematic block diagram of a local board included in the system shown in FIG. 1;

FIGS. 14A–43B are logic symbols and typical circuits of different circuit components used in the detailed logic diagrams illustrating the invention;

FIGS. 44–46 form a logic diagram of a seizure control unit forming a part of the local board;

FIGS. 47–53 form a logic diagram of one of a plurality of subscriber registers provided in the local board;

FIGS. 54–61 form a logic diagram of a routing control unit;

FIGS. 62–80 form a logic diagram of a link and a keyboard circuit;

FIGS. 81–83 form a logic diagram of a position time store used in a position register forming a part of the local board;

FIG. 84 is a table listing the code composition of certain digital and control signals used in the system;

FIG. 85 is a table listing the frequencies of various ones of the code and control signals used in the system;

FIG. 86 is a table illustrating the highway and time position assignments of the line and trunk circuits forming a part of the local board;

FIG. 92 is a block diagram illustrating the manner in which

GENERAL DESCRIPTION

Figures 1, 87:
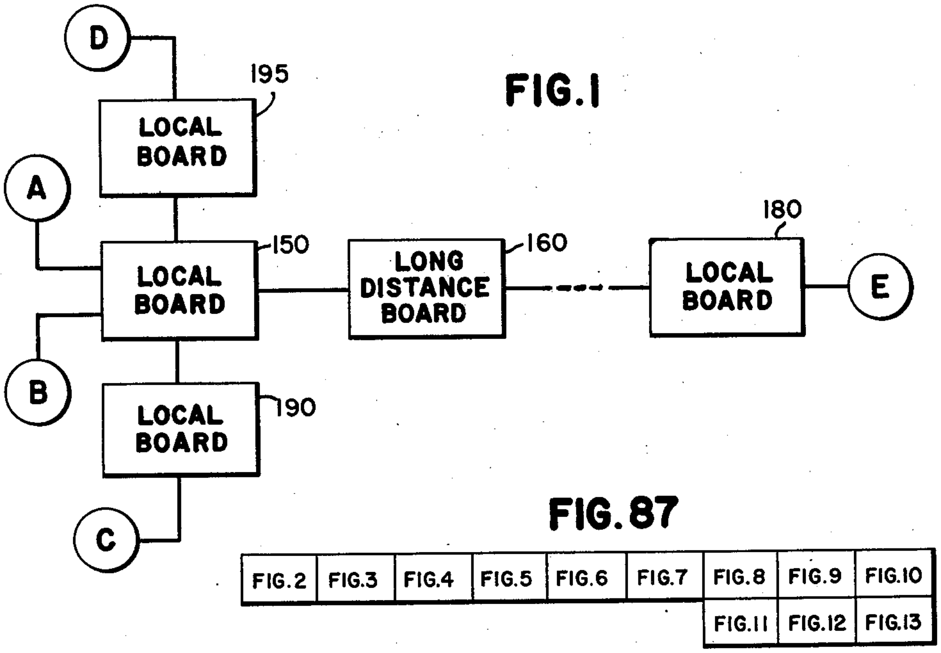
FIG. 87 is a block diagram illustrating the manner in which FIGS. 2–13 of the drawings are positioned adjacent each other to form a complete block diagram of the local board.
Figure 88:
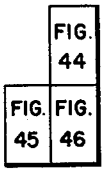
FIG. 88 is a block diagram illustrating the manner in which FIGS. 44–46 of the drawings are positioned adjacent each other to form a complete logic diagram of the seizure control unit.
Figure 89:
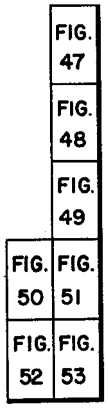
FIG. 89 is a block diagram illustrating the manner in which FIGS. 47–53 of the drawings are positioned adjacent each other to form a complete logic diagram of a subscriber register.
Figure 91:
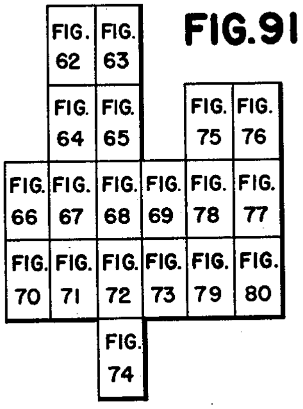
FIG. 91 is a block diagram illustrating the manner in which FIGS. 62–80 of the drawings are positioned adjacent each other to form a complete logic diagram of the link and keyboard circuits.
Figure 90:
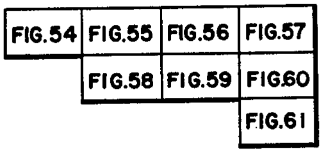
FIG. 90 is a block diagram illustrating the manner in which FIGS. 54–61 of the drawings are positioned adjacent each other to form a complete logic diagram of the routing control unit.
Figure 92:
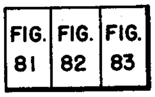
Figure 2:
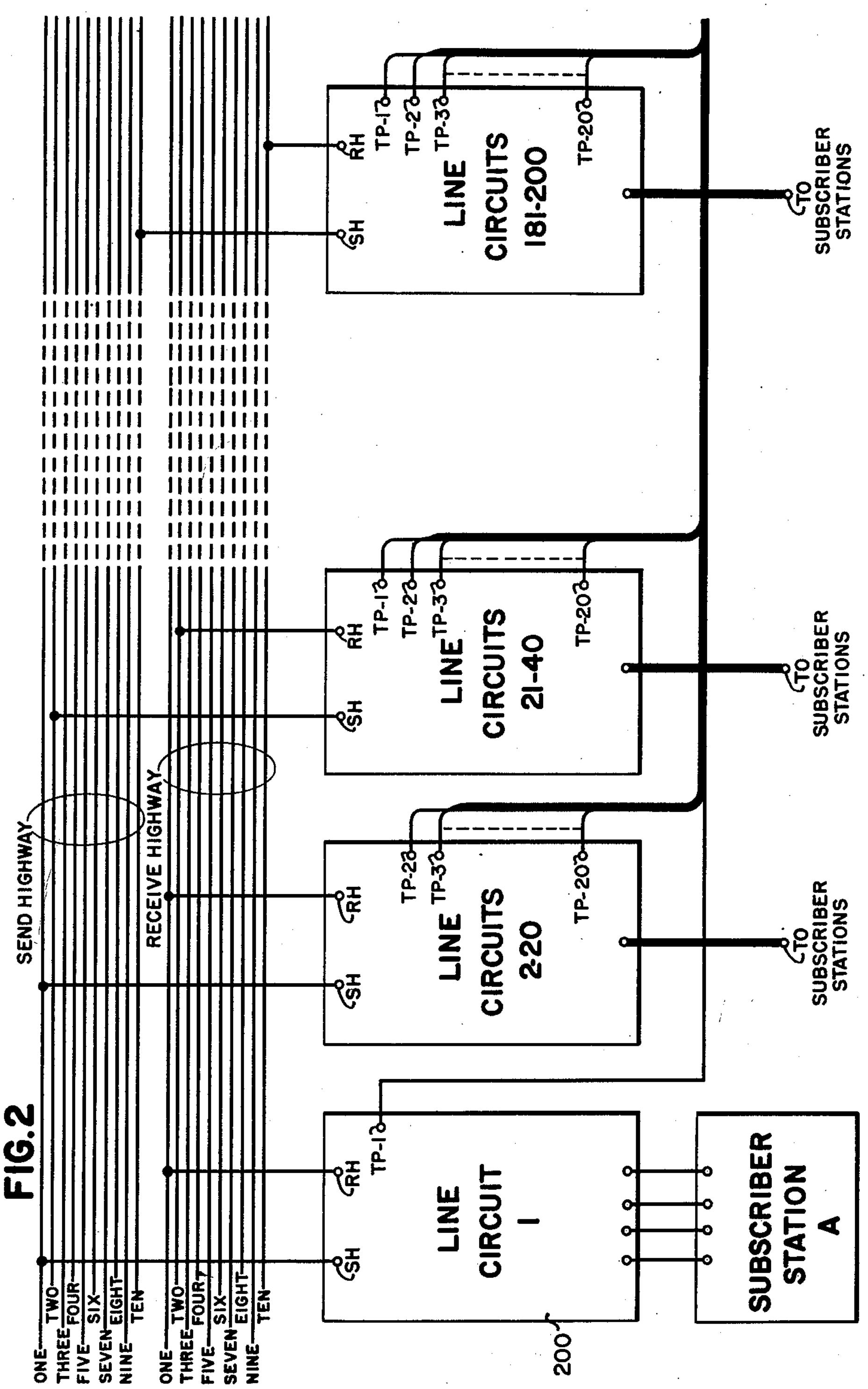
Figure 3:
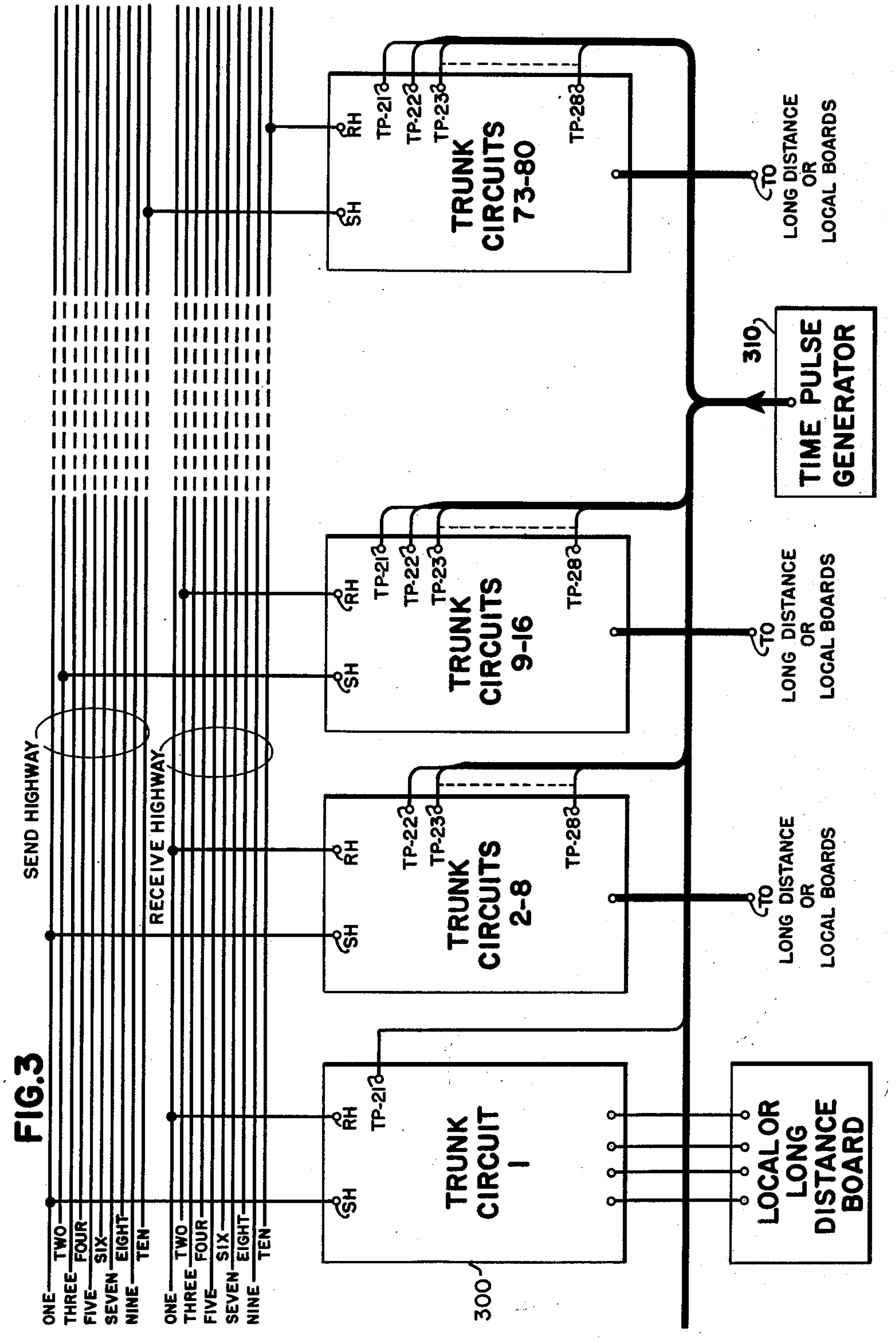
Figure 4:
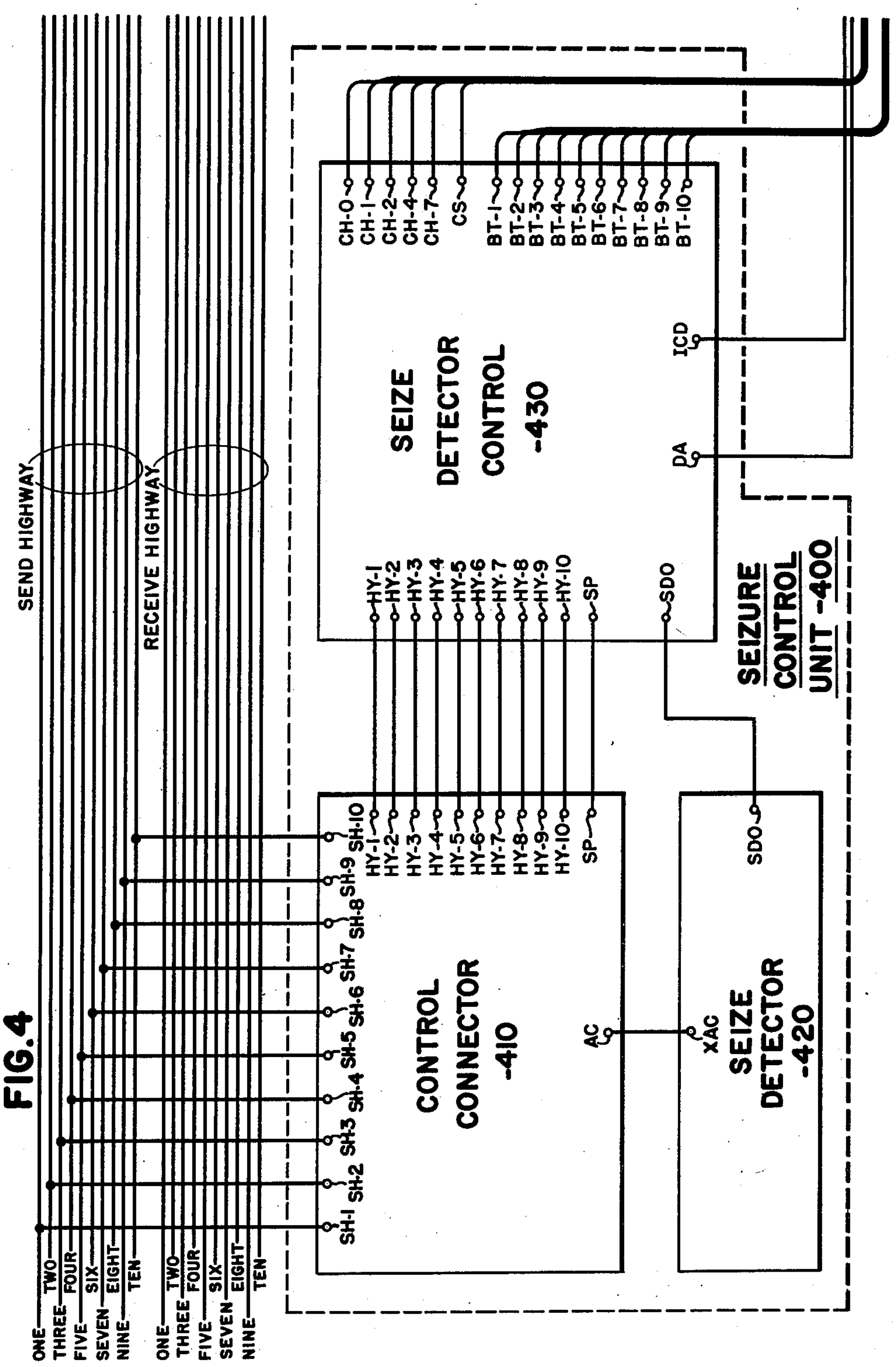
Figure 5:
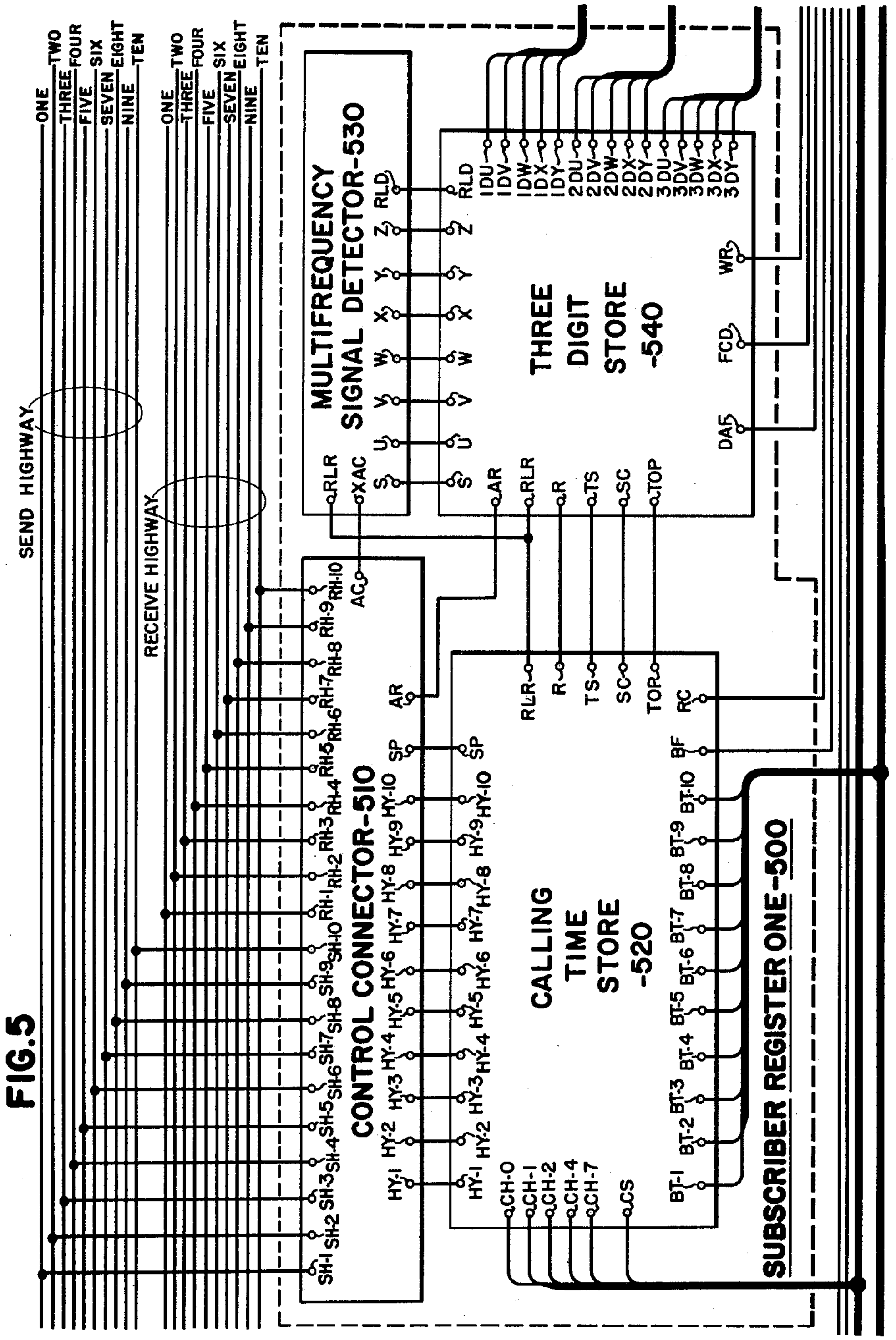
Figure 6:
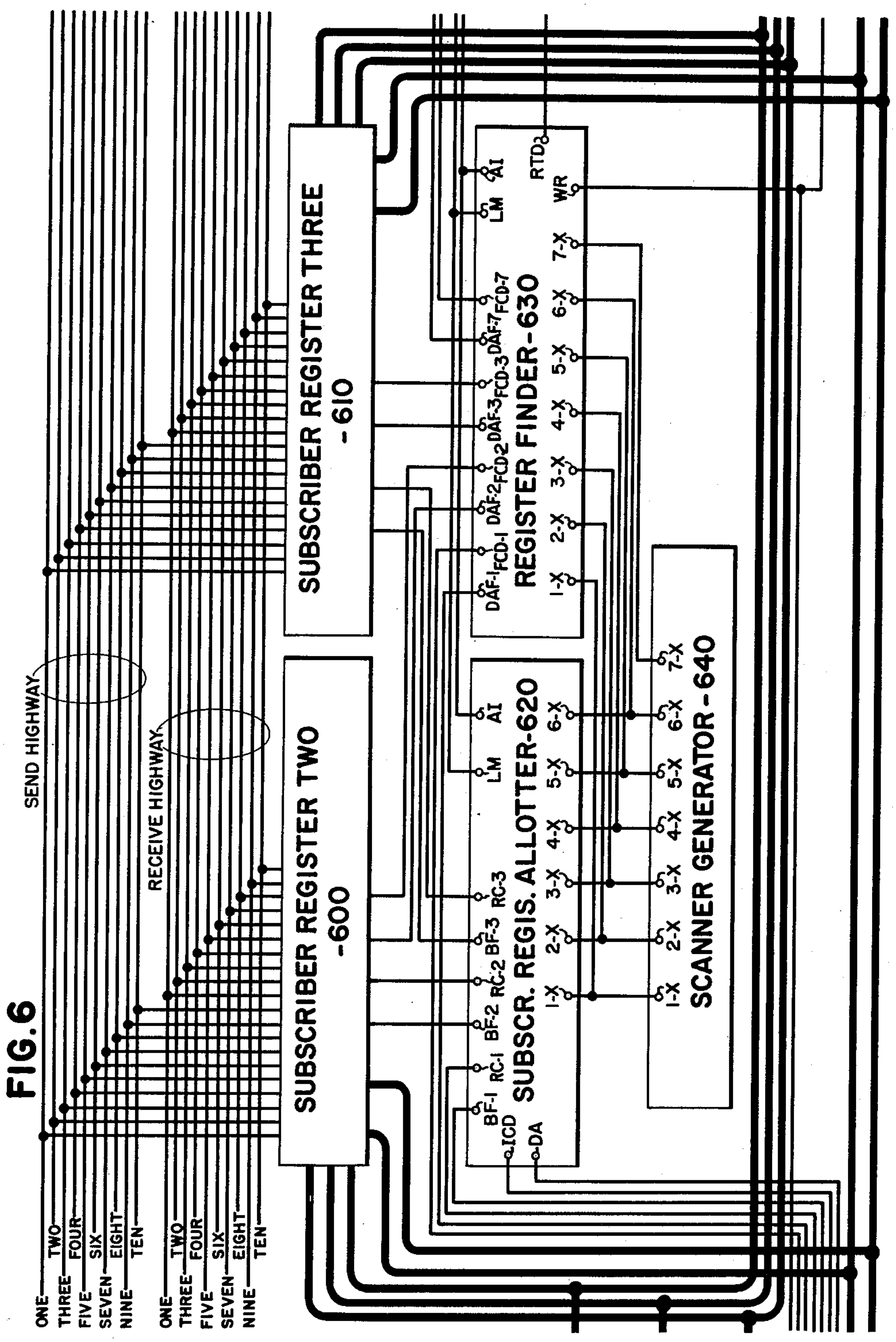
Figure 7:
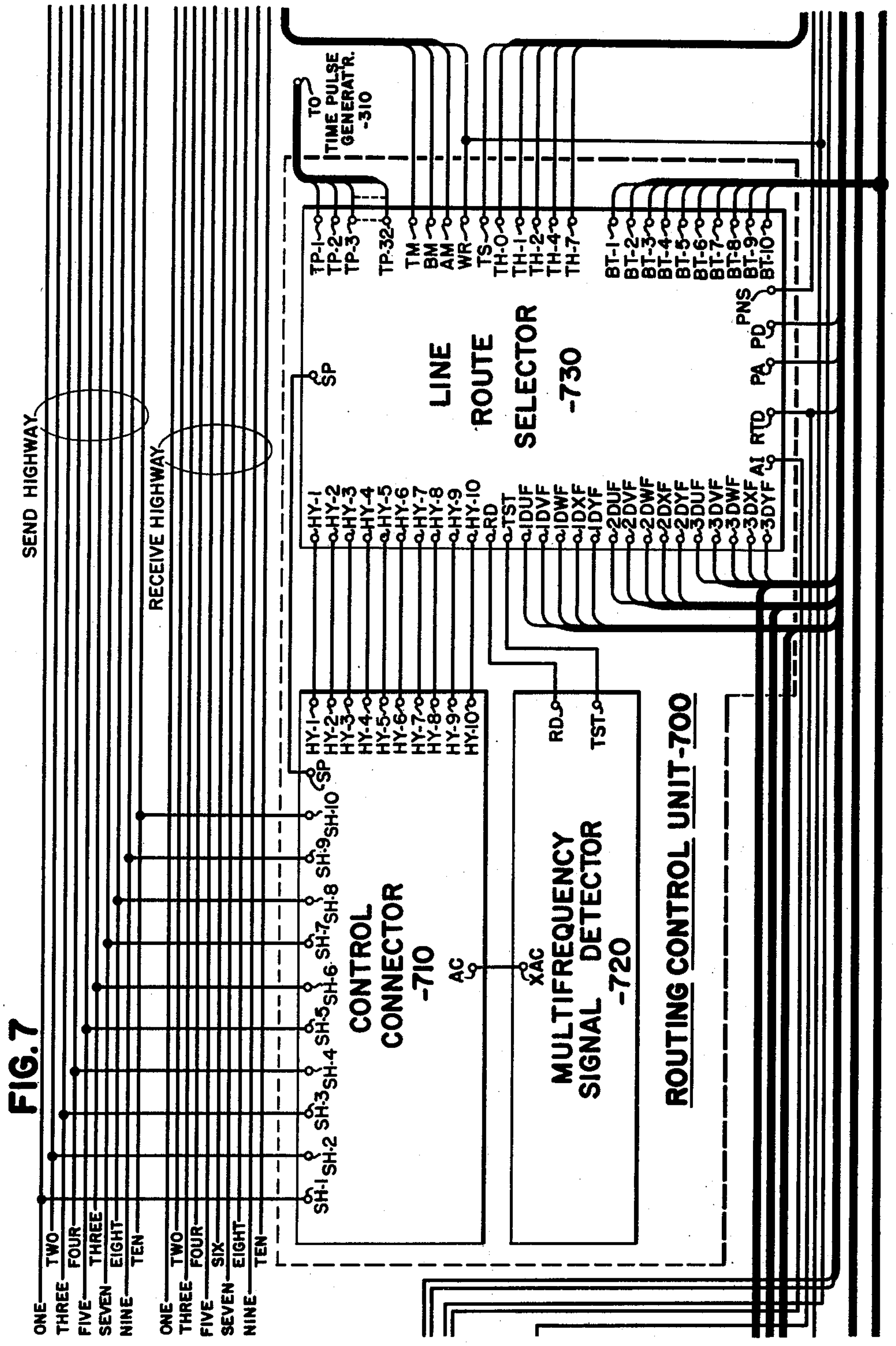
Figure 8:
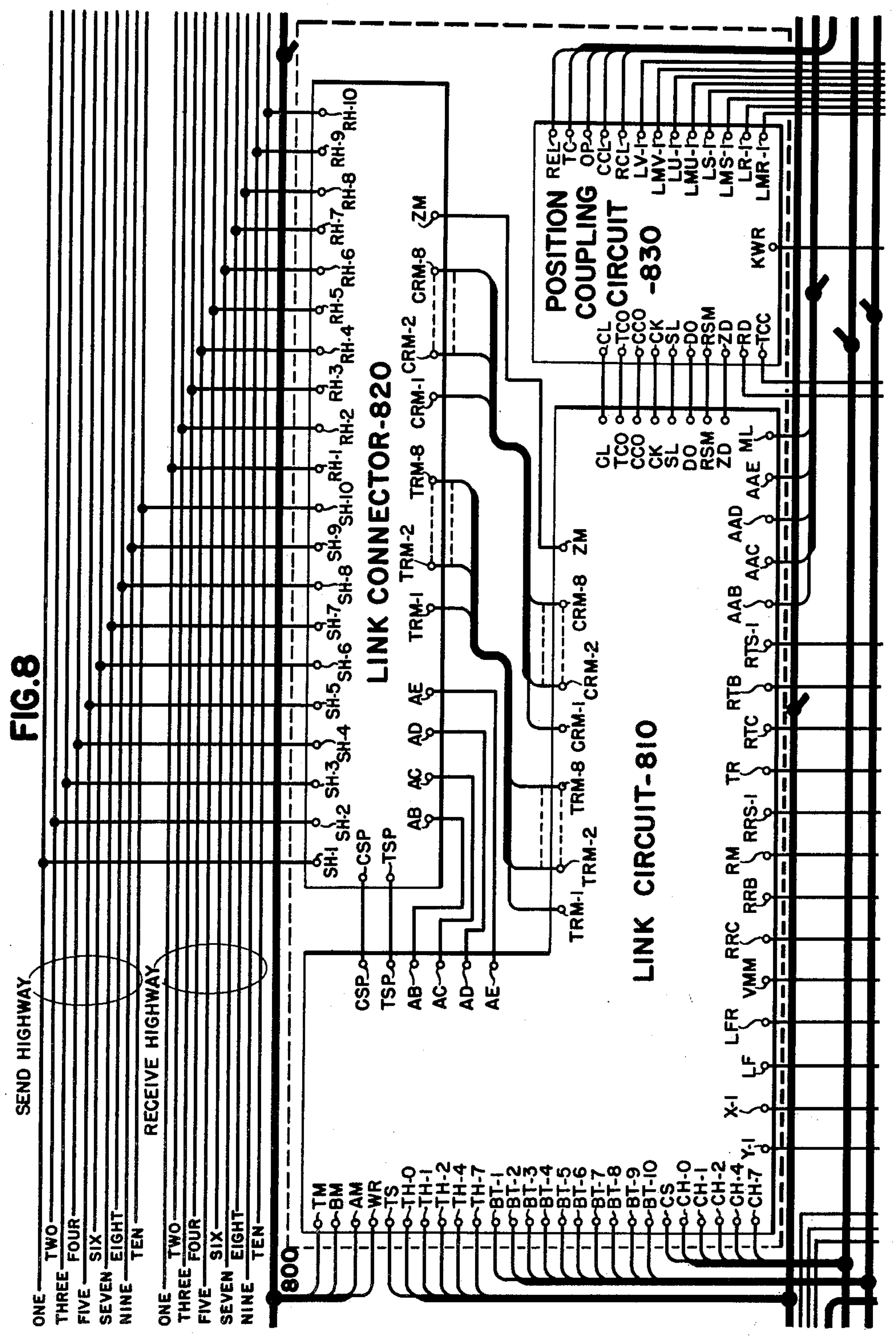
Figure 9:
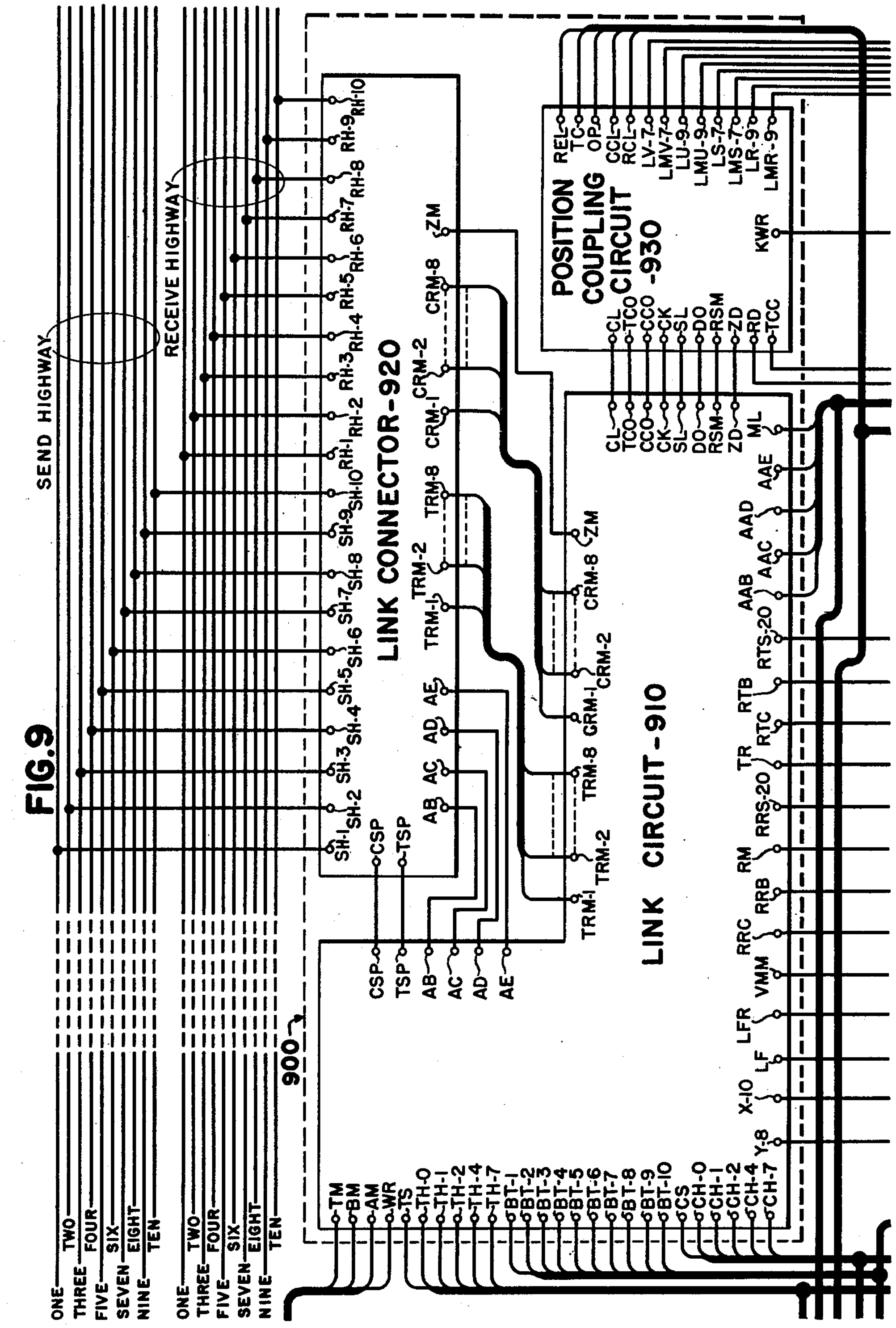
Figure 10:
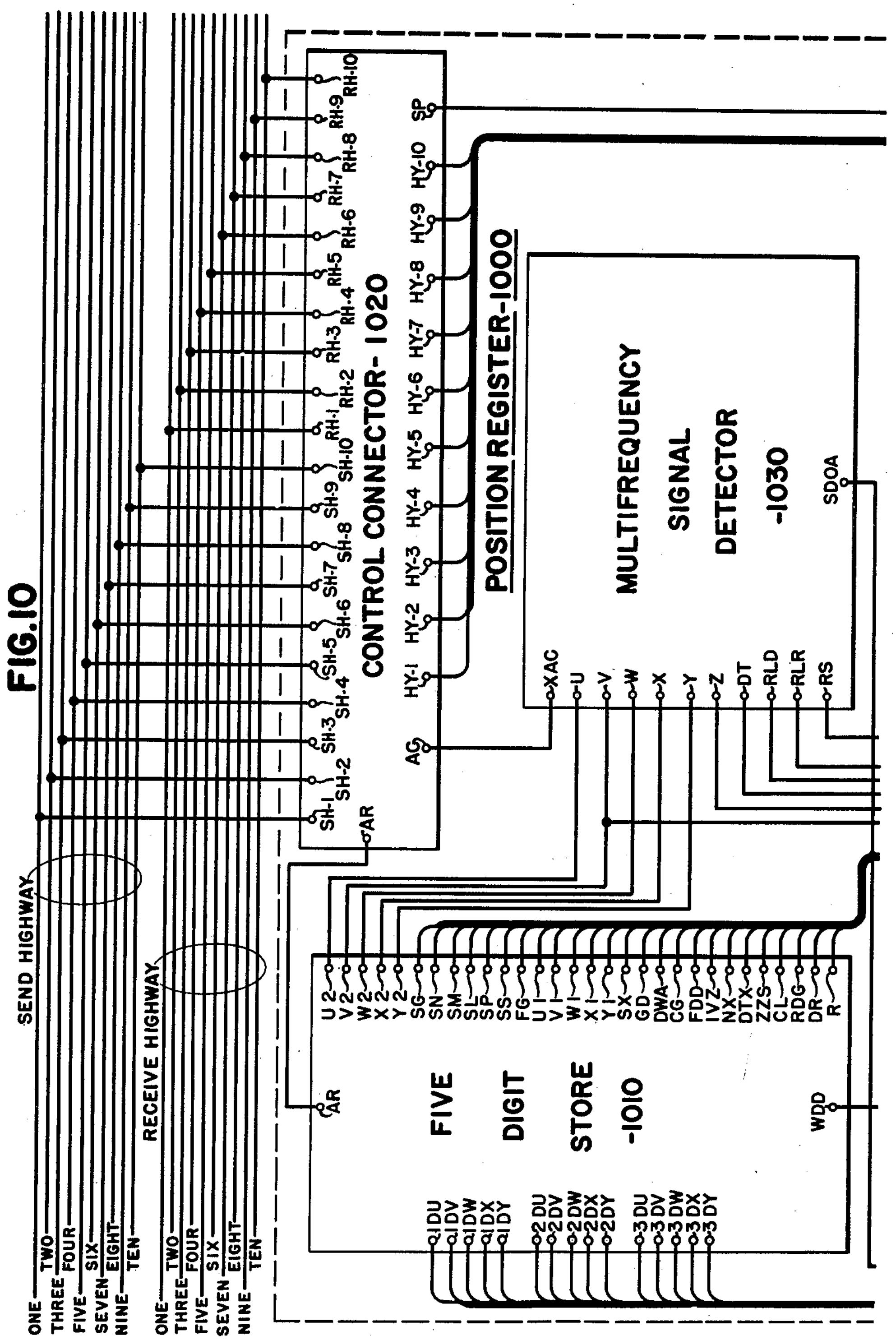

FIG. 1 of the drawings illustrates, in block diagram form, an automatic communication system embodying the present invention. This system includes a plurality of local boards or offices 150, 180, 190 and 195, and a plurality of long distance boards or switching centers 160. The present application illustrates the details of the local board 150, and the remaining local boards are similar to the one shown in detail in this application. The details of the long distance board or switching center 160 are disclosed in the contemporaneously filed application of Matthew P. Tubinis and James G. Pearce, Serial No. 814,923, now Patent No. 2,933,564. In general, the subscriber stations and local and long distance boards are connected by four wire circuits which comprise either physical wire or radio links, and all intelligence and control transmission in the system is accomplished by the use of voice frequency signals. The switching technique utilized is basically a common equipment control of individual line or trunk terminating units which are assigned distinctive multiplex or time positions on different common communication channels.

To extend a call between a pair of stations A and B served by the local board 150, the calling subscriber at the station A goes "off-hook" to supply a seize signal to the local board 150. When this board returns dial tone to the station A, the subscriber then dials the three digits necessary to complete a connection to the called station B. These three digits are stored and translated in the local board 150 and used to extend the connection to the called station B. Incident to extending this connection, a busy test is performed and ringing and ringback tones are selectively supplied to the stations A and B. When the connection is established, the common control equipment in the local board 150 is dropped out and made available for use in extending other connections while the established connection is maintained through an individual switching link.

When a call is to be extended from one of the stations A or B served by the local board 150 to a station, such as substation C or D served by one of the remote local boards 190 or 195, the calling station A, upon receipt of dial tone from the local board 150, dials a single routing digit. This routing digit is stored in the local board 150 and is used to control the performance of a trunk hunting operation in which an idle trunk extending to the selected one of the local boards 190 or 195 is performed. Following the seizure of an idle trunk, the connection is extended from the local board 150 to the local board 195, for instance, and seize tone is applied to the remote local board 195 to condition this board for operation. When this board is conditioned for operation, dial tone is again returned to the calling station A, and the subscriber then dials the three digits necessary to select the station D served by the board 195.

When a call is to be extended from a station A served by the local board 150 to another station, such as the station E served by the local board 180 and when this connection is to be extended through one or more long distance boards 160, the local board 150 is again seized by forwarding seize tone from the calling station A. The subscriber then dials a routing digit, and the local board 150 performs a trunk hunting operation to seize an outgoing trunk extending to a long distance board 160. When this connection is established and the seize tone is forwarded over the connection to condition the long distance board 160 for operation, this board returns dial tone to the calling station A to advise the subscriber that the remainder of the digits necessary to extend the connection to the called station E are to be dialed. These digits are then transmitted to and stored in an incoming register in the long distance board 160. This register controls the automatic extension of the remainder of the connection to the station E. When this connection has been completed and suitable busy tests have been performed, the register in the long distance board 160 drops out of the connection and the previously extended connection is maintained through the local boards 150 and 180 and individual switching links in all of the intervening long distance boards 160.

Because of the fact that the local boards 150, 190 and 195 are generally disposed in relatively close geographically, digit and control signal transmission between these boards is performed in a normal manner. However, in view of the fact that considerable physical distances may separate the long distance boards 160 from the local boards, information is transferred between these boards on an interlocked basis in which each control or digital signal transmitted from one board to another is acknowledged by the return of a signal from the signal receiving unit. This insures the accurate transmission of information.

FIGS. 2–13 of the drawings form a schematic block diagram of the local board 150 and illustrate the major components of this board together with the manner of interconnecting the various individual components thereof. The local board 150 includes ten common communication channels or highways, each of which comprises a send highway or path for receiving signals from a circuit termination and a receive highway or path from which a circuit termination receives signals. Each of the ten highways one to ten, inclusive, is divided into thirty-two time slots or time positions so that the local board has the ability to establish three hundred and twenty coexisting communication paths at any given time. The various line and trunk circuits in the local board 150 are assigned time positions or slots on the various highways in the manner illustrated in the table shown in FIG. 86 of the drawings. As shown therein, the local board 150 includes two hundred local line circuits occupying time slots one to twenty on highways one to ten and eighty trunks occupying time slots twenty-one to twenty-eight on highways one to ten. These trunk circuits are selectively extended to either the local boards 190 and 195 or the long distance boards 160. These assignments utilize two hundred and eighty of the available three hundred and twenty time positions. The remaining time positions are used for certain auxiliary services or are available as spares. As an example, time slot twenty-nine on highway one is connected to a source of line busy tone and time slot thirty-one on highway one is connected to a source of trunk busy tone.

To provide the multiplex or time division separations on the ten highways, the local board 150 includes a time slot or pulse generator 310 which is driven by a 400 kc. master pulse source. The pulse generator 310 provides pulses on thirty-two output conductors TP1–TP32 in turn so that a time position defining pulse is applied to each of these conductors at a 12.5 kc. rate. Each of the pulses appearing on one of the conductors TP1–TP32 is 1.25 microseconds in duration, and there is a guard time of 1.25 microseconds between pulses on successive conductors. Thus, each frame of pulses is 80 microseconds in duration. The generator 310 may be of any well known type, but preferably is the type shown and described in a copending application, Serial No. 585,184, filed May 16, 1956. This application is assigned to the same assignee as the present application. Further, in order to synchronize certain of the operations of the system, the terminals ICD and ICDR in various components of the local board 150 are supplied with pulses in synchronism with those used to drive the time pulse generator 310.

All of the circuit terminations in the local board 150 are continuously connected over operative alternating current signal transmitting paths to the ten common highways in proper time positions thereon under the control of the time pulse generator 310 so that signaling operations and the establishment of a connection involving one of these circuit terminations can be initiated merely by supplying signals from a circuit termination, such as a line or trunk circuit, to the common highway. As an example, it is assumed that the subscriber station A (FIG. 2) is connected to a line circuit 200 which is supplied with signals in the first time position at a terminal TP1 from the time pulse generator 310. The line circuit is also connected to the send and receive paths on highway one. Thus, time position one on highway one is individually assigned to subscriber station A so that during each cycle of operation of the time pulse generator 310, the subscriber station A is operatively connected through the line circuit 200 to highway one. At the same instant, various other lines and trunk circuits are connected to time position one on the remaining highways two to nine, inclusive. In a like manner, a trunk circuit 300, which is connected to one of the remote local boards or one of the long distance boards 160 is supplied with time pulses in the twenty-first time position at a terminal TP1. This trunk circuit is also connected to highway one. Accordingly, during each cycle of operation of the generator 310, the local or long distance board is connected to highway one through the trunk circuit 300. In a similar manner, circuits similar to the line circuit 200 and the trunk circuit 300 interconnect a line busy tone generator and a trunk busy tone generator to highway one in the twenty-ninth and thirty-first time positions, respectively.

Assuming that a call is to be extended which uses the local board 150, one of the circuit terminations, such as the line circuit 200 or the trunk circuit 300, supplies seize tone to the related highway in the time position individual to the calling circuit. If the seize signal, which comprises a 1700 c.p.s. tone, is received through a trunk circuit 300, this tone is supplied by the remote local or long distance board. If the seize tone originates in the local board 150 at one of the subscriber stations, this tone is supplied by the subset at the station. A subset suitable for use in the local board 150 is shown and described in detail in the copending application of William M. Woodhull and Marvin A. Stern, Serial No. 761,045, filed September 15, 1958, now Patent No. 3,066,195. Another suitable subset is described in a Conference Paper No.

CP–59–259 entitled "A New Field Telephone for Military Use in Four Wire Electronic Switching Systems," which is published by the American Institute of Electrical Engineers. Thus, when a calling condition is established, a seize tone is supplied on one of the ten highways in the time position individual to the calling line or trunk circuit.

To determine the presence of calling conditions on one of the circuits, the system includes a seizure control unit 400 comprising a control connector 410, a seize detector 420, and a seize detector control 430. The control connector 410 is operated under the control of the seize detector control 430 to establish a connection from each of the time positions on each of the highways in sequence to the seize detector 420. More specifically, the control 430 includes a slip counter which produces time pulses in each of the thirty-two time positions for forty successive frames. These time pulses are applied to a terminal SP of the connector 410. The control 430 also includes a highway counter that is operated one step in response to each cycle of operation of the slip counter. This highway counter provides marking potentials on a series of terminals HY1–HY10, representing the highways one to ten, inclusive. Thus, when the highway one, for instance, is marked and a time pulse appears at the terminal SP in the first time position, the control connector 410 is operated to connect the send path on highway one in the first time position to the input of the seize detector 420 over a path including a pair of terminals including AC and XAC.

If the call is being originated at station A, the seize tone applied to highway one in the first time position is extended through the control connector 410 to operate seize tone detecting means in the detector 420. The detection of the seize tone supplies a signal over a pair of terminals SDO to the seize detector control 430. This signal arrests the operation of the slip counter and the highway counter so that the control connector 410 remains connected to the first time position on highway one. With the operation of these components arrested, the seize detector control 430 effectively stores the designation of the calling circuit in the form of periodically returning pulses at a terminal CS in the time position of the circuit and in the form of marking on two out of five terminals CH0, CH1, CH2, CH4 and CH7 representing a binary coded designation of the highway.

The seize detector control 430 is also connected to ten busy conductors, which are common to the entire local board 150, over a plurality of terminals BT1–BT10. These terminals which represent the highways one to ten, respectively, are provided with pulses in the time positions of circuits thereon that are in a busy condition. The seize detector control 430 uses these pulses to determine the busy or idle condition of the circuit to which the highway and slip counter have been set. If the circuit is in a busy condition, as indicated by the signals supplied to the terminals BT1–BT10, the control connector 410 is not supplied with operating signals, and this connector can not operate to connect a busy circuit to the input of the seize detector 420. Thus, only circuits that are in an idle condition can be extended through the control connector 410 to the seize detector 420.

When the seizure control unit 400 detects the presence of a seize tone, a selected one of a plurality of subscriber registers is rendered effective to receive and store the calling circuit designations now registered in the seize detector control 430. More specifically, the local board 150 includes a plurality of subscriber registers, such as a subscriber register 500, a subscriber register 600, and a subscriber register 610. All of these subscriber registers are common to all of the highways in the local board and are selectively rendered effective to receive information from the seizure control unit 400 in sequence under the control of a subscriber register allotter 620 which is driven by a scanner generator 640. The generator 640, by selectively applying marking potentials to a series of terminals 1X–6X finds an idle one of the subscriber registers and holds this register in a preallotted condition awaiting a demand from the seize detector control 430. When seize tone is detected by the detector 420 in the unit 400 and forwards a signal to the seize detector control 430, a terminal ICD is supplied with a connect demand signal which is forwarded to a similarly designated terminal in the subscriber register allotter 620. This signal advises the allotter that the preallotted one of the subscriber registers is to be placed in operation.

Assuming that subscriber register one 500 is idle and in a preallotted condition, the subscriber register allotter 620, over the terminals BF1 and RC1 individual to the register 500, enables this register to receive the highway and time slot identifying the calling circuit. When the register 500 is enabled to receive this information, the subscriber register allotter 620 returns a demand answer over a terminal DA so that the seize detector control 430 transfers the time slot and the highway of the calling circuit to a calling time store 520 in the subscriber register 500. When this operation has been completed, the marking potentials are removed from the terminals ICD and DA, and the seizure control unit 400 is restored to a normal condition in which it is capable of searching for the presence of seize tone on another one of the communication paths. The seized register 500 also operates the subscriber register allotter 620 so that the next idle subscriber register is preallotted for use by the seizure control unit 400.

Each of the subscriber registers, such as the register 500, includes a control connector 510, the calling time store 520, a multifrequency signal detector 530, and a three digit store 540. When the slot and highway designation of the calling circuit is transferred from the seize detector control 430 to the calling time store 520 and stored therein, this circuit first operates to supply a pulse in the time position of the calling circuit to one of ten terminals BT1–BT10 representing the ten highways. These terminals are connected to the common highway busy conductors and serve to mark the calling circuit as busy in the local board 150. The calling time store 520 also supplies a pulse in the time position of the calling circuit to a terminal SP and a marking potential to one of ten terminals HY1–HY10, each representing the called highway. These signals are forwarded to the control connector 510 and operate this connector to establish a communication path between the send and receive paths of the calling highway in the time position assigned to the calling circuit and the input of the multifrequency signal detector 530.

This conditions the detector 530 to receive transmitted digits from the calling line or trunk circuit representing the connection which is to be extended. When this connection is completed, the three digit store 540 first performs a preliminary test to determine the validity of the seizure tone that resulted in the seizure of the register 500 by the seizure control unit 400. More specifically, the detector 530 examines the selected time position on the calling highway to determine whether a seize tone is present. If a seize tone is absent, it is presumed that the seizure of the register 500 is inadvertent and this component is released. However, if the seize tone is present, thus indicating a valid seizure, the three digit store 540 is conditioned to receive either one or three digits representing the call to be extended.

If the call is to be extended to a station, such as a station B, served by the local board 150, the three digit store receives three digits including an initial digit having a value of either "1" or "2." If the call is to be extended to an operator in the local board 150, the three digit store 540 receives the single digit "0." If the call is to be extended over an outgoing trunk from the local board 150 to either another local board or to one of the long distance boards 160, the three digit store receives a single routing digit having a value of "3"–"9." If these digit representing signals are received from a substation served by the local board 150, these digits, which are represented by plural frequency signals, are detected by the remote signal detector 530 and applied to the three digit store 540 in the form of marking potentials supplied to five terminals U, V, W, X and Y. Alternatively, if the plural frequency digit representing signals are received over an incoming trunk circuit, the multifrequency signal detector 530 first receives an interlock request signal, and each of the digits subsequently received from the controlling register over the incoming trunk are acknowledged by the return of a corresponding signal from the three digit store 540 through the control connector 510 to the incoming circuit.

When the necessary digital information has been stored in the three digit store 540, a connect command signal is supplied to a terminal FCD. This signal is forwarded to a like designated terminal in a register finder 630, which terminal is individual to the subscriber register 500. The register finder 630 is operated by the scanner generator 640 in synchronism with the subscriber register allotter 620 and operates to control the association of the plurality of subscriber registers with a common routing control unit 700. When the routing control unit 700 is available for use by the subscriber register 500, the register finder 630 applies a demand answer signal to a terminal DAF that is individual to this register. The receipt of this signal by the three digit store 540 operates this circuit so that marking potentials representing the digit or digits stored in the three digit store 540 are forwarded to a line route selector 730 in the routing control unit 700 over cables connected to a plurality of contacts 1DU–1DY, 2DU–2DY and 3DU–3DY. These signals are supplied in the form of a two out of five code. Thus, the digits stored in the three digit store 540 have now been transferred to and stored in the line route selector 730 in the routing control unit 700.

The routing control unit 700 includes a control connector 710 and a multifrequency signal detector 720, in addition to the line route selector 730. In general, the unit 700 converts the digital information supplied by the three digit store 540 in the subscriber register 500 into marking conditions representing the outgoing path to which the connection from the calling circuit is to be extended.

Assuming that the call is to be extended to a station served by the local board 150, the line route selector 730 receives marking signals on the terminals 1DUF–1DYF, 2DUF–2DYF and 3DUF–3DYF, representing the values of the three digits required to terminate the connection in the local board. In response to the storage of these three digits, the line selector 730 converts this digital information into information representing the highway and time slot of the called line circuit and then performs a primary busy test to determine the idle or busy conditions of this line by a comparison with signals applied to the selector 730 over the busy test terminals BT1–BT10. In the event that the primary busy test is satisfactorily completed, signals representing the selected highway and time slot are supplied to the control connector 710 over the terminals HY1–HY10 and SP to operate this connector to establish a connection between the send paths of the called highway and the input of the multifrequency signal detector 720.

A secondary busy test is now made to determine whether release or seize tones are present at the selected time slot on the called highway. If this secondary busy test is satisfactorily completed, the line route selector 730 reads out the highway and time slot of the called circuit to a link and also applies a signal to a terminal WR to enable the link and to cause the calling highway and time slot to be transferred from the calling time store 520 in the calling subscriber 500 to the same link. This information is read out from the line route selector 730 to a link by applying marking ground to two of five terminals TH0, TH1, TH2, TH4 and TH7 in accordance with the highway designation of the called highway and by applying a pulse in the proper time position to a terminal TS.

If this information is satisfactorily read into the link, the routing control unit 700 and the subscriber register 500 are restored to a normal condition. It should be noted that when digital information is transferred from the register 500 to the routing control unit 700, the line route selector 730 applies an inhibit signal to a terminal AI which is forwarded to the subscriber register allotter 620 and the register finder 630. This inhibits the operation of these components so that information other than that pertaining to the call being extended can not be applied to common calling and called highway and time slot conductors in the local board 150. This allotter inhibit condition is removed following the storage of the necessary information in a link.

If the information supplied to the line route selector 730 from the subscriber register 500 is a single routing digit, the selector 730 automatically performs a trunk hunting operation to locate an idle outgoing trunk in the trunk group represented by the stored digit. When an idle trunk is located by the performance of a primary busy test using the terminals BT1–BT10, the slot and highway designation of the trunk are marked on the terminals TS and TH0, TH1, TH2, TH4 and TH7 in the manner described above. The selector 730 also marks a terminal TM to indicate that the call is to be extended over a trunk. The control connector 710 is then operated to extend a connection between the called circuit and the multifrequency signal detector 720. A secondary busy test is now performed. If this test is satisfactorily completed, the calling and called line information is read out from the calling time store 520 in the register 500 and from the line route selector 730 to a link in the manner described above. Following the satisfactory transfer of this information to a link, the routing control unit 700 and the subscriber register 500 are released, and the inhibit condition is removed from the register allotter 620 and the register finder 630.

If the digit transferred from the three digit store 540 to the line route selector 730 is "0," indicating that the call is to be extended to an operator at a keyboard circuit 1220, the line route selector 730 marks a terminal AM and then transfers this marking condition together with the highway and slot designation of the calling circuit to a link. After the completion of this operation, the routing control unit 700 and the subscriber register 500 are released in the manner described above. In the event that a busy condition is established during the extension of a connection to an outgoing trunk or to a local subscriber, the line route selector 730 marks a terminal BM to advise the link that a busy condition has been encountered and also marks the terminals TS and TH0, TH1, TH2, TH4 and TH7 with signals representing the highway and slot to which either the line busy tone or the trunk busy tone generator is connected. Thus, when this information is transferred from the routing control unit to the link together with the calling circuit information derived from the calling time store 520, the link is operated to extend the connection from the calling subscriber to the source of busy tone.

Referring now more specifically to FIGS. 8, 9, 11 and 12 of the drawings, therein is shown a plurality of links 800 and 900, together with a link allotter 1100, a release, recall, and voice monitor multifrequency signal detector 1110, a ring trip detector 1120, a call finder 1200, a recall finder 1210, and the keyboard circuit 1220. With the exception of the circuits 1210 and 1220, these circuits operate under the control of the routing control unit 700 to establish a permanent connection between the calling and called circuits. The plurality of links 800 and 900 provided in the local board 150 are used as permanent switching units which remain in the connection between the two line or trunk circuits in the local board 150. The links are rendered effective in sequence by the link allotter 1100 which includes a pair of counting circuits having output terminals, Y1–Y8 and X1–X10. These terminals are connected to the links in different combinations so that, in any given setting of these two counters, only a single link is enabled. The link allotter 1100 operates so that an idle link is always associated with the routing control unit 700. Each of the links includes a link circuit 810, a link connector 820 and a position coupling circuit 830.

Assuming that the call is to be extended to a station served by the local board 150, the link circuit 810 is provided with the highway and time slots of the calling and called line circuits. When this information is stored, a signal is applied to a terminal LF which is forwarded to the link allotter 1100 so that the two counters therein are freed to step to the setting representing the next idle link, such as the link 900. When the link allotter 1100 operates in this manner, a signal is applied to a terminal LM which is forwarded to the register allotter 620 and the register finder 630 to release these components so that the routing control unit 700 and the subscriber register are released in the manner described above. The storage of the calling and called line circuit information in the link circuit 810 selectively supplies signals to a group of terminals TRM1–TRM8 and CRM1–CRM8 representing the terminating and calling highways. The link circuit 810 also supplies pulses to a pair of terminals TSP and CSP representing the calling and called time slots. These signals operate the link connector 820 so that the send and receive paths on the calling and called highways are connected to the link circuit 810 in the time positions assigned to the calling and called lines.

This connection is split in the link circuit 810 so that the calling and called stations are not placed in direct communication with each other. The link circuit 810 then applies ring tone to the called station and ring-back tone to the calling station. During the application of the ringing tone, the ring trip detector 1120 is sequentially connected to each of the called highways. When an answering signal is received from the called highway in the time position of the called station, the detector 1110 forwards a signal to the link circuit 810 advising this circuit that the called station has answered. At this time, the application of ringing and ring-back tones is terminated, and the calling and called stations are connected together.

In this connection, it will be noted that the connector 820 interconnects the calling and called highways in different time positions so that there is not a direct path for the transfer of intelligence between the calling and called circuits. However, the intelligence supplied at the calling and called lines is transmitted by the use of a resonant energy transfer. This transmission technique is described in detail in a Conference Paper CP–59–210, which is entitled "Transmission Aspects of an Electronic Switchboard Employing Time Division Multiplexing" and which is published by the American Institute of Electrical Engineers.

When the information supplied to the link 800 from the routing control unit 700 is the designation of an outgoing trunk, the marking signal applied to the terminal TM is used in the link circuit 810 to arrest the transmission of the ringing and ring-back tones inasmuch as the connection to the terminating station is not to be made in the local board 150. Accordingly, the link 800 forwards a seize tone to the remote board and is operated to cut-through the split link when an acknowledging seize signal is returned from the remote board. In the other respect, the link 800 operates in the same manner as during the extension of a call to a local station.

When a busy condition is detected in the routing control unit 700, the link 800 is supplied with a designation of the calling circuit and an arbitrary designation of a line circuit to which the trunk or line busy tone generators are connected. In addition, the link is provided with a marking signal on the terminal BM. The receipt of this signal, in conjunction with the calling highway and time slot information, operates the link circuit 810 and the link connector 820 to extend a connection between the proper busy tone generator and the calling circuit. In this manner, busy tone is returned to the subscriber to advise him that the extension can not be extended.

When the information transferred from the subscriber register 500 and the routing control unit 700 includes only the highway and slot designation of the calling circuit and a mark on the terminal AM to indicate that the call is for the keyboard circuit 1220, the link circuit 810 establishes a connection through the link connector 820 to the keyboard circuit 1220 over four terminals AAB, AAC, AAD and AAE. More specifically, when the AM mark is received by the link circuit 810, this circuit forwards a signal over a terminal DO to the associated position coupling circuit 830. The position coupling circuit 830 controls the operation of the call finder 1200 so that the link 800 is rendered effective for association with the keyboard circuit 1220.

When the position coupling circuit 830 receives a mark on the terminal DO, a terminal LU is marked to supply a signal for a first coordinate counting means in the call finder 1200. This counter operates until the counter is set in a first coordinate direction to the position corresponding to that of the coupling circuit 830. At this time, a signal is returned over the LMU to the circuit 830. This causes the circuit to supply a signal to a terminal LV individual to the position of the coupling circuit in the second scanning direction. This signal is forwarded to the call finder 1200 so that a second counting means therein operates to scan in a second coordinate direction until such time as call finder 1200 advances to a setting individual to the circuit 830. At this time a signal is returned from a terminal LMV to the position coupling circuit 830. The call finder 1200 is now in a setting individual to the link 800 so that only this link is enabled for connection to the keyboard circuit 1220.

An operator demand signal is established in the link 800 when this link is found by the unit 1200. This illuminates visible means in the keyboard circuit 1220 to advise the operator that a call is awaiting attention. The operator actuates a key so that a signal is applied to a terminal OP. This terminal is connected in multiple to all of the links. However, only the link 800 has been enabled for operation by the call finder 1200. Thus, the signal applied to the terminal OP enables the link 800 to supply signals to the keyboard circuit 1220 from the calling line. The operator then determines the called circuit that is required and keys the digital information identifying the called circuit into a position register 1000 (FIGS. 10 and 13) by applying signals to a group of terminals KDU–KDY, a signal being applied to the terminal KDE at the end of each digit. This information is stored in a five digit store 1010 in the position register 1000 under the control of a control B1300. The position register 1000, which also includes a control connector 1020, a multifrequency signal detector 1030, and a position time store 1310, now operates to control the extension of the connection.

If the information supplied to the five digit store 1010 indicates that the call controlled by the operator is to be extended to a local subscriber, the control B1300 operates the five digit store 1010 to transfer the three digits representing the local station over a group of terminals 1DU–1DY, 2DU–2DY and 3DU–3DY to the routing control unit 700, this circuit previously having been allocated to the position register 1000 under the control of the register finder 630. The control 1300 also marks the terminal PD to advise the unit 700 that the data originated in the register 1000. The line route selector 730, in response to the storage of this information, marks the terminals TS, TH0, TH1, TH2, TH4 and TH7 in accordance with the designation of the called local station and then applies a signal to a terminal RTD. The receipt of this signal by the control 1300 causes a signal to be applied to a terminal KWR so that the keyboard circuit 1220 enables the selected link 800 to store the terminating highway and time slot data. The storage of this data operates the link circuit 810 so that the connection is established to the local station. During a local call, a terminal WDD is marked by the store 1010 to prevent the called station data from being stored in the unit 1310.

If the information transferred to the routing control unit 700 represents a trunk, the line route selector 730 performs a trunk finding operation and the primary and secondary busy tests but does not transfer this information to the link 800. The control B1300 supplies a signal to the terminal PD so that the line route selector 730 rather than supplying a signal to the terminal WR supplies a signal to the terminal RTD. The receipt of the signal at the terminal RTD enables the position time store 1310 to store the highway and time slot of the trunk under the control of the line route selector 730. The position time store 1310 and the other circuits in the position register 1000 then operates through the control connector 1020 to extend a connection to the called remote station. When answering supervisory signals are received from this remote station, the position register 1000 applies a signal to the terminal KWR to transfer the highway and time slot of the outgoing trunk in the local board from the store 1310 to the terminating highway and time slot stores in the link 800. At this time, the keyboard circuit 1220 is operated to release the link and to enable the keyboard circuit to be used in controlling the extension of additional connections.

After a connection has been completed between two line and trunk circuits in the local board through the link connector 820, this established connection is continuously scanned for an absence of signals or for the presence of a release signal which indicates that the called or calling subscriber wishes to release the connection. The multifrequency signal detector 1110 is rendered effective to receive the signals from each of the established connections in sequence. When a release signal is received or when signals have not been provided over an established connection for a given period of time, an operating signal is supplied to the link circuit 810 from the detector 1110 so that the connection is released. Incident to this release, a release tone is forwarded to the called circuit and to the calling circuit to insure that all of the components involved in the connection are released.

The system also includes means whereby the calling or called subscriber can supply a recall signal to the extended connection from the subset to obtain the services of the closest operator. More specifically, the multifrequency signal detector 1110 continuously scans the various connections established through the group of links associated with this component. When a recall signal is detected on one of the links, the signal detector 1110 forwards an operating signal to the position coupling circuit 830 so that the recall finder 1210 operates under the control of signals supplied at the terminals LS, LMS, LR, and LMR, to associate the link 800 with the keyboard circuit 1220. The recall finder 1210 is substantially identical to the call finder 1200 and includes two counting circuits for scanning the plurality of links in two coordinate directions. When the recall finder 1210 arrives at a setting individual to the link 800, a signal is provided at the keyboard circuit 1220 to indicate the existence of the recall condition.

The operator then enters the connection and determines whether the calling or called party requires the extension of a connection to a different party. In response to determining this information, the attendant releases the extended connection to either the calling or called station and supplies the position register 1000 with the information designating the new called party. This information is then processed by the routing control unit 700 in the manner described above. However, one exception should be noted. It is possible for the connection from the original called subscriber to be transmitted to a new called subscriber. Thus, when the attendant releases the unwanted portion of the connection, the connection to the calling party is released and the calling highway and time slot stores in the link circuit 810 are cleared. The routing control unit 700 reads out the new called party information into the position time store 1310, and the connection is established by the position register 1000. The keyboard circuit 1220 includes means for then controlling the position time store 1310 to transfer the new called circuit designation to the calling highway and time stores in the link circuit 810. Thus, the link connector 820 maintains the connection between the original called subscriber and is operated under the control of the position time store 1310 to establish the connection to a new called subscriber.

LOGIC SYMBOLS AND TYPICAL CIRCUITS

The details of the telephone system that is shown in block form in FIGS. 1–13 are illustrated in FIGS. 44–83 by the use of logic diagrams in which the various circuit components are shown in logic schematic form. In the logic diagrams, each circuit component, such as an amplifier or a gate, is represented by a particular logic symbol. The logic symbol together with a typical circuit arrangement represented by each symbol are illustrated in FIGS. 14–43 of the drawings. Each of these figures includes both an illustration of the logic symbol and a typical circuit represented by the symbol. Although the illustrated representative circuits are conventional in design and well known in the art, a brief description of each of these circuits is set forth below.

*Phase Splitter APA*

Figure 14A:
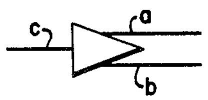
Figure 14B:
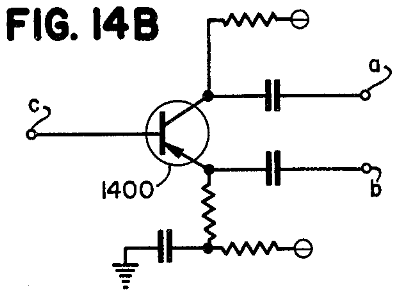

The logic symbol for a phase splitter APA is illustrated in FIG. 14A, and a typical circuit for this phase splitter is illustrated in FIG. 14B. This circuit includes a transistor 1400 having an input terminal "*c*" to which an alternating current signal is applied. The incoming signal is supplied by the transistor 1400 to an output terminal "*b*," and an identical signal which is shifted 180° in phase is supplied to an output terminal "*a*."

*Audio Amplifier AUA*

Figure 15A:
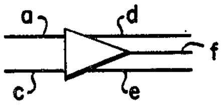
Figure 15B:
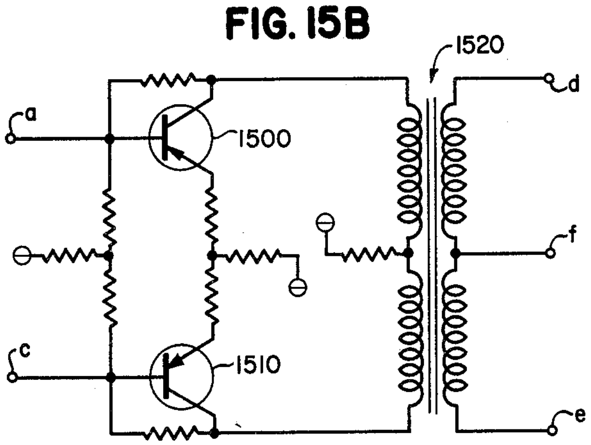

A logic symbol for an audio amplifier AUA is illustrated in FIG. 15A, and a typical circuit represented by this symbol is shown in FIG. 15B. The circuit illustrated in FIG. 15B comprises a balanced amplifier including a pair of transistors 1500 and 1510 that are biased for class "A" operation. The signal to be amplified is applied across a pair of input terminals "*a*" and "*c*" and the amplified signals which are derived from an output transformer 1520 appear across a pair of output terminals "*d*" and "*e*." A center tap terminal "*f*" is also provided on the output transformer 1520. The amplifier can be used as a single-ended amplifier by grounding the input terminal "*c*."

*Audio Amplifier AUE*

Figure 16A:
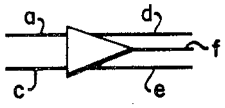
Figure 16B:
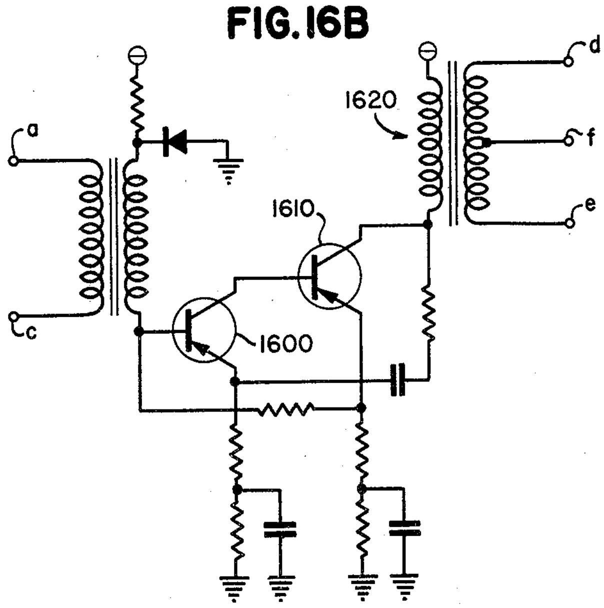

FIG. 16A of the drawings illustrates an audio amplifier AUE, and FIG. 16B illustrates a typical circuit represented by the symbol shown in FIG. 16A. The audio amplifier circuit AUE is an unbalanced two-stage amplifier including a pair of transistors 1600 and 1610 which are interconnected to provide both shunt and series negative feedback stabilization. The input signal is applied across a pair of input terminals "*a*" and "*c*," and an output signal is derived from a pair of terminals "*d*" and "*e*" connected to an output transformer 1620. The transformer 1620 is also provided with a center tap terminal "*f*."

*Audio Amplifier AUG*

Figure 17A:
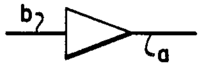
Figure 17B:
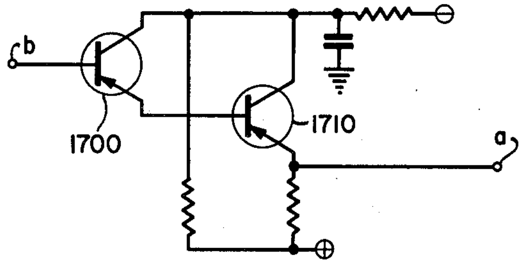

The logic symbol for an audio amplifier AUG is shown in FIG. 17A, and a typical circuit represented by this symbol is shown in FIG. 17B. The audio amplifier AUG includes a paid of transistors 1700 and 1710 which form two emitter followers connected in cascade. An input signal is supplied to an input terminal "*b*," and an output signal is supplied to an output terminal "*a*."

*Blocking Oscillator Gate BOG*

Figure 18A:
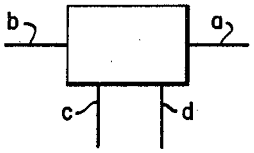
Figure 18B:
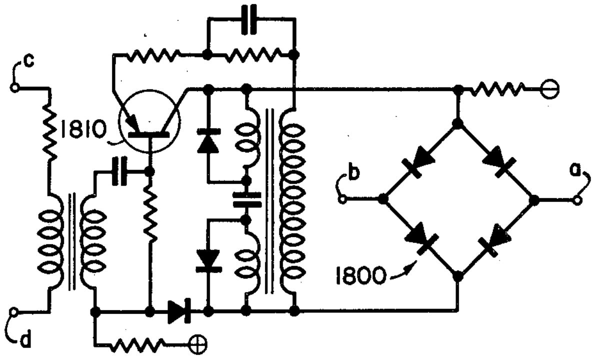

The logic symbol for a blocking oscillator gate BOG is shown in FIG. 18A, and a typical circuit represented by this symbol is shown in FIG. 18B. The blocking oscillator gate BOG comprises a diode bridge 1800 in which the individual diodes of the bridge are normally biased in a reverse direction so as to present a very high impedance between a pair of output terminals "*b*" and "*a*." This effectively prevents the transfer of energy between these two terminals. When a transistor 1810 is triggered into conduction by the application of an input pulse to a pair of terminals "*c*" and "*d*," the diodes in the bridge circuit 1800 are biased in the forward direction to prevent a very low impedance between the output terminals "*a*" and "*b*." Thus, energy can be transferred between these terminals only when the blocking oscillator transistor 1810 is conductive. The time constant of the blocking oscillator circuit is such that the transistor 1810 is conductive to bias the diodes in the bridge circuit 1800 in a forward direction for a period of 1.25 microseconds regardless of the duration of the input pulse.

*Converter CVB*

Figure 19A:
Figure 19B:
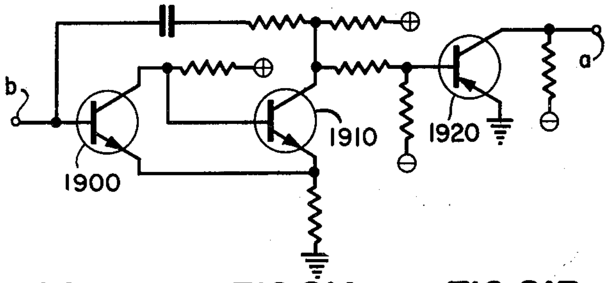

FIG. 19A of the drawings shows the logic symbol for a converter CVB, and a typical circuit represented by this symbol is shown in FIG. 19B. In general, the converter CVB comprises a trigger circuit including a pair of transistors 1900 and 1910 followed by an inverter amplifier consisting of a transistor 1920. The transistors 1900 and 1910 form an emitter coupled trigger circuit in which the transistor 1910 is normally conductive and the transistor 1900 is normally nonconductive. When an alternating current signal is supplied to an input terminal "*d*," the positive-going signal drives the base of the transistor 1900 positive with respect to its emitter which is held in a positive potential by the conduction through the transistor 1910. This renders the transistor 1900 conductive so that the transistor 1910 is rendered nonconductive and the emitter potentials of both of the transistors 1900 and 1910 drop to ground. During each negative half cycle of the signal applied to the input terminal "*b*," the trigger circuit including the transistors 1900 and 1910 is returned to its normal or "OFF" condition. Thus, the alternating current signal supplied to the input terminal "*b*" appears as a series of positive-going pulses at the collector electrode of the transistor 1910. These positive-going pulses are inverted in the transistor 1920 and appear as negative-going pulses at an output terminal "*a*." Thus, the converter CVB converts supplied alternating current signals into output pulses shifting between ground potential and a negative potential.

*Emitter Follower EFC*

Figure 20A:
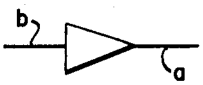
Figure 20B:
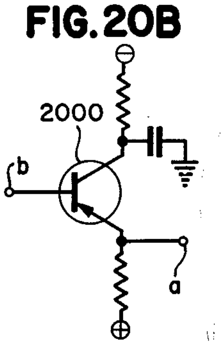

The logic symbol for an emitter follower EFC is shown in FIG. 20A, and a typical circuit represented by this symbol is shown in FIG. 20B. The emitter follower EFC comprises a transistor 2000 having its base electrode connected to an input terminal "*b*" and its emitter electrode connected to an output terminal "*a*."

*Emitter Follower EFD*

Figure 21A:
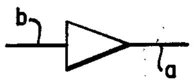
Figure 21B:
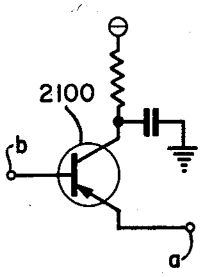

The logic symbol for an emitter follower EFD is shown in FIG. 21A, and a typical circuit represented by this symbol is shown in FIG. 21B. The emitter follower circuit EFD includes a transistor 2100 having an input terminal "*b*" connected to its base electrode and an output terminal "*a*" connected to the emitter electrode.

*Emitter Follower EFE*

Figure 22A:
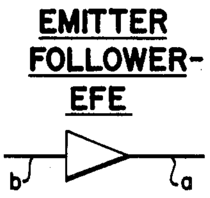
Figure 22B:
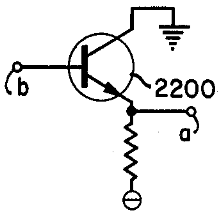

FIG. 22A illustrates the logic symbol for an emitter follower EFE, and FIG. 22B illustrates a typical circuit represented by this symbol. The emitter follower EFE includes a transistor 2200 having its base electrode connected to an input terminal "*b*" and an output terminal "*a*" connected to its emitter electrode.

*Emitter Follower EFJ*

Figure 23A:
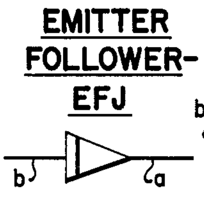
Figure 23B:
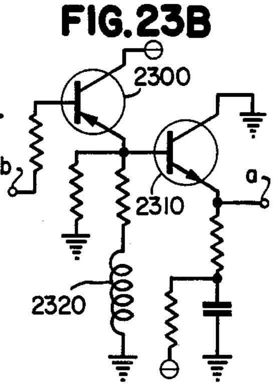

The logic symbol for an emitter follower EFJ is shown in FIG. 23A, and a typical circuit represented by this symbol is shown in FIG. 23B. The emitter follower EFJ is designed for operation at high speeds, as indicated by the vertical line within the triangle of the logic symbol, and includes a pair of transistors 2300 and 2310. In the normal condition of the circuit, the transistor 2310 is in a conductive condition so that an output terminal "*a*" is connected to ground through the conductive transistor 2310. When a negative-going signal is applied to an input terminal "*b*," the transistor 2300 is placed in conduction so that its emitter drops to a negative potential to interrupt conduction through the transistor 2310. When conduction through the transistor 2310 is arrested, the potential at the output terminal "*a*" drops to a negative potential. An inductance element 2320 connected in the emitter circuit of the transistor 2300 is provided for quickly bringing the transistor 2300 out of current saturation at the termination of the signal applied to the input terminal "*b*."

*Flip-Flip FIA*

Figure 24A:
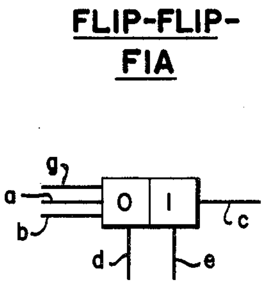
Figure 24B:
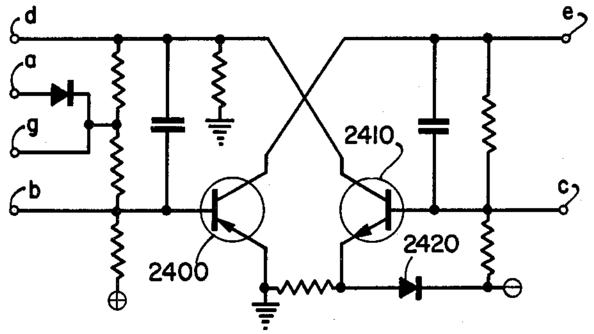

The logic symbol for a flip-flip FIA is shown in FIG. 24A, and FIG. 24B illustrates a typical circuit represented by this logic symbol. In the normal or reset condition of the flip-flip FIA, a pair of transistors 2400 and 2410 are nonconductive so that ground potential appears at a terminal "*d*" and negative potential appears at a terminal "*e*." The potentials applied to the terminals "*d*" and "*e*" in the normal condition of the flip-flip circuit FIA are illustrated in the logic symbol by the connection of the terminal "*d*" to the half of the flip-flip symbol marked "0" and by the connection of the terminal "*e*" to the half of the flip-flip symbol marked "1." The circuit FIA is triggered to a set condition in which both of the transistors 2400 and 2410 are conductive by the application of a negative pulse to an input terminal "*b*" or of a positive pulse to an input terminal "*c*." This circuit can also be operated to a set condition by applying ground to the terminal "*e*." In the operated or set condition, the terminal "*e*" is connected to ground through the conductive transistor 2400, and the terminal "*d*" is connected to a negative potential through the conductive transistor 2410 and a diode 2420. The flip-flip circuit FIA is returned to a normal or reset condition in which the transistors 2400 and 2410 are in a nonconductive state by the application of a positive pulse or ground to either of a pair of terminals "*a*" and "*g*."

The diode 2420, which is of the silicon type, is connected between the emitter electrode of the transistor 2410 and a source of negative potential in order to insure the reverse biasing of the base-emitter junction of the transistor 2410 when the flip-flip FIA is in its reset or normal condition. The voltage drop across a silicon diode is approximately .6 volt for all values of forward current exceeding a certain minimum value. Thus, the emitter of the transistor 2410 is biased .6 volt positive with respect to its base whenever the transistor 2400 is in a nonconductive condition.

*Flip-Flop FOA*

Figure 25A:
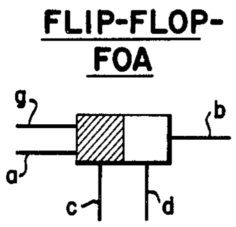
Figure 25B:
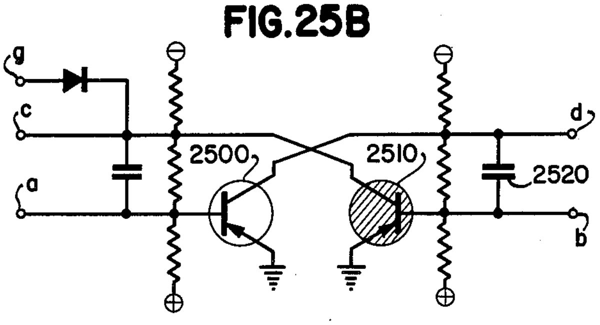

FIG. 25A illustrates the logic symbol for a flip-flop FOA, and a typical circuit represented by this symbol is illustrated in FIG. 25B. The flip-flop FOA includes a pair of transistors 2500 and 2510. In the normal or reset condition of the flip-flop, a transistor 2510 is in a conductive condition and a transistor 2500 is nonconductive. In this condition, ground is normally applied to an output terminal "c" and negative potential is applied to an output terminal "d." This potential condition is illustrated in the logic symbol by the connection of the output terminal "c" to the shaded portion of the block and by the connection of the output terminal "d" to the unshaded portion of the block. The flip-flop circuit FOA is triggered to its operated condition in which the transistor 2500 is conductive and the transistor 2510 is nonconductive by the application of either a negative pulse to an input terminal "a" or of a positive pulse to an input terminal "b." In this operated or set condition, the potential supplied to the output terminals "c" and "d" is reversed from the normal or reset condition. The flip-flop circuit FOA is restored to its reset condition by the application of a positive pulse to a terminal "g" or of ground to the terminal "a." In some applications of the circuit FOA, the terminal "d" is used as both an input and an output. If, for instance, a positive-going pulse is applied to the terminal "d," this pulse is coupled through a capacitor 2520 to render the transistor 2510 nonconductive and to render the transistor 2500 conductive. When the transistor 2500 becomes conductive, the terminal "d" rises to ground potential to provide an output signal at the same terminal at which the input signal is received.

*Flip-Flop FOB*

Figure 26A:
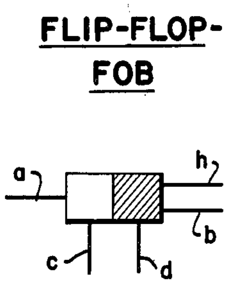
Figure 26B:
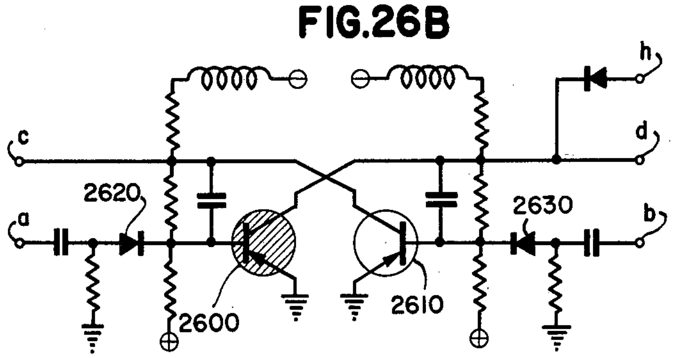

The logic symbol for a flip-flop FOB is shown in FIG. 26A, and a typical circuit represented by this symbol is illustrated in FIG. 26B. The flip-flop FOB is a high speed circuit that is normally used as a binary counting stage by strapping a pair of input terminals "a" and "b" together so that a positive-going pulse can be applied to these two terminals to operate the flip-flop to alternate states of conductive conditions. Assuming that a transistor 2600 is in a conductive condition and that a transistor 2610 is nonconductive, the cathode terminal of an input diode 2630 is biased positively with respect to its anode while the cathode terminal of an input diode 2620 is biased negative with respect to its anode. Thus, when a positive-going pulse is applied to the input terminals "a" and "b," this pulse is coupled through the diode 2620 to render the transistor 2600 nonconductive and to render the transistor 2610 conductive. Accordingly, when the next positive pulse is applied to the input terminals "a" and "b," this pulse is forwarded through the diode 2630 to render the transistor 2610 nonconductive and to render the transistor 2600 conductive. As the transistors 2600 and 2610 are shifted between alternate conductive and nonconductive conditions, a pair of output terminals "c" and "d" are shifted between ground and negative potential. The flip-flop FOB is operated to a normal or reset condition by the application of a positive pulse to a terminal "h" which renders the transistor 2610 nonconductive and thus renders the transistor 2600 conductive. This normal condition of the flip-flop FOB is illustrated in the logic symbol shown in FIG. 26A by shading the portion of the logic symbol to which the terminal "d" is connected to indicate the normal application of ground to the terminal "d" through the conductive transistor 2600. The application of a negative potential to the output terminal "c" in the normal condition of the flip-flop FOB is represented by the unshaded portion of the symbol to which this terminal is connected.

*Gate GGA*

Figure 27A:
Figure 27B:
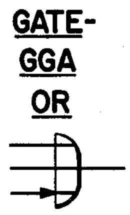
Figure 27C:
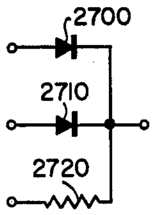

The logic symbols for the gate GGA are illustrated in FIGS. 27A and 27B and a typical circuit represented by these symbols is shown in FIG. 27C. As illustrated, the gate GGA includes a plurality of diodes 2700 and 2710, the cathodes of which are connected together and to a common output terminal. The anodes of the diodes 2700 and 2710 provide individual diode inputs to the gate circuit. A resistor 2720 connected to the output terminal provides a resistive input for the gate circuit. The gate GGA can be used as either an "AND" gate for negative signals or as an "OR" gate for positive signals. That is, with the resistor 2720 connected to a negative potential, the output of the gate will drop to a negative potential only when all of the input terminals are also returned to a negative potential. The output terminal will also rise to ground potential when any one or more of the input terminals is returned to ground potential. In the logic diagrams, the logic symbol for the gate GGA, as well as the logic symbols for the gates described below, is shaded when the output terminal is at ground in the normal condition of the circuit and is not shaded when the output terminal is normally at a negative potential. In the logic symbol shown in FIG. 27A, the "AND" gate is indicated by lines from the input terminals which do not extend through the rounded rectangular block. Conversely, in the logic symbol for the "OR" gate shown in FIG. 27B, the lines from the input terminals extend through the rounded rectangular block. The resistive input for the "OR" gate and the "AND" gate is indicated by the application of an arrow head to the input line.

*Gate GJD*

Figure 28A:
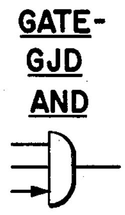
Figure 28B:
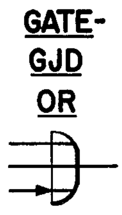
Figure 28C:
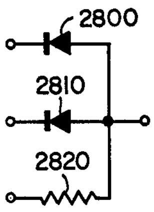

The logic symbols for a gate GJD are shown in FIGS. 28A and 28B, and a typical circuit represented by these symbols is illustrated in FIG. 28C. The gate GJD includes a plurality of diodes, such as a pair of diodes 2800 and 2810, whose anodes are connected together to provide an output terminal. The cathodes of the diodes 2800 and 2810 provide individual inputs for the gate GJD. A resistor 2820 connected to the common output terminal provides a resistance input for the gate. The gate GJD can be used as an "AND" gate for positive signals or an "OR" gate for negative signals. Thus, when the resistor 2820 is returned to ground, the output of the gate will rise to ground potential only when the anodes of all of the diodes are returned to ground potential and will drop to a negative potential when the anode of any one or more of the diodes is returned to a negative potential.

*Gate GJF*

Figure 29A:
Figure 29B:
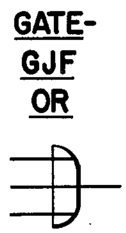
Figure 29C:
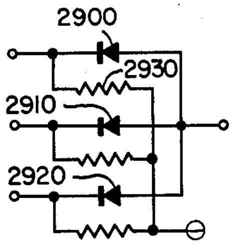

The logic symbols for a gate GJF are shown in FIGS. 29A and 29B, and a typical circuit represented by these symbols is illustrated in FIG. 29C. The gate circuit GJF includes a plurality of diodes 2900, 2910 and 2930 which are poled the same as the diodes in the gate GJD so that the gate GJF operates as an "AND" gate for positive signals (FIG. 29A) or as an "OR" gate for negative signals (FIG. 29B). The diodes 2900, 2910 and 2920 are normally forward biased by a negative potential supplied to the cathodes thereof by a plurality of resistors 2930.

*Audio Gate GVB*

Figure 30A:
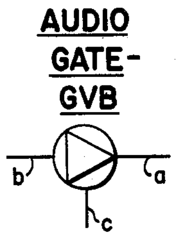
Figure 30B:
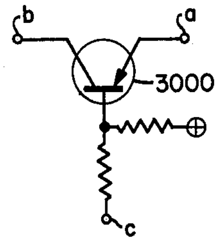

The logic symbol for an audio gate GVB is illustrated in FIG. 30A, and a typical circuit represented by this logic symbol is shown in FIG. 30B. The gate circuit GVB is normally used for gating the output of an alternating current signal generator to a load circuit. Thus, in the circuit shown in FIG. 53, for instance, an input terminal "b" is returned to ground potential through a signal source, and an output terminal "a" of the gate GVB is returned to ground potential through a load circuit, such as an amplifier AUE. Thus, when ground or a positive potential is applied to a control terminal "c," the base electrode of a bilateral switching transistor 3000 is maintained positive with respect to both of the electrodes illustrated as an emitter and a collector, and the transistor 3000 remains nonconductive. However, when a negative potential is applied to the control terminal "c," both of the junctions of the transistor 3000 are biased in the forward direction in the absence of input signals, and the transistor 3000 is rendered fully conductive to effectively interconnect the terminals "b" and "a."

*Inverter Amplifier INA*

Figure 31A:
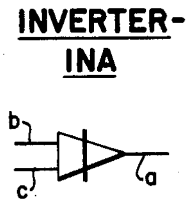
Figure 31B:
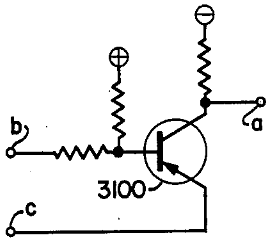

The logic symbol for an inverter INA is shown in FIG. 31A of the drawings, and a typical circuit represented by this logic symbol is shown in FIG. 31B. The inverter INA comprises a transistor 3100 having its emitter electrode connected to an input terminal "*c*" and its base electrode connected to an input terminal "*b*." The base is normally biased in a positive direction to maintain the transistor 3100 in a nonconductive condition. Thus, an output terminal "*a*" is normally supplied with a negative potential. The inverter INA can be used as an "AND" gate or as a gated amplifier since a negative signal must be applied to the input terminal "*b*" and a positive or ground signal applied to the input terminal "*c*" in order to bias the transistor 3100 for conduction. When the terminal "*c*" is permanently returned to ground in the circuit drawings, this terminal is eliminated from the logic symbol. Further, in the detailed circuits shown in subsequent figures of the drawings, the logic symbol for the inverter INA is shown in the form illustrated in FIG. 31A when the transistor 3100 is in a nonconductive state. Alternatively, if the transistor 3100 is normally in a conductive state so that its output is at ground, the logic symbol for the inverter INA is shaded. This same convention of shading the logic symbol for a ground output is used with the inverters described below.

*Inverter Amplifier INC*

Figure 32A:
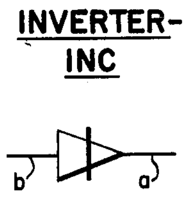
Figure 32B:
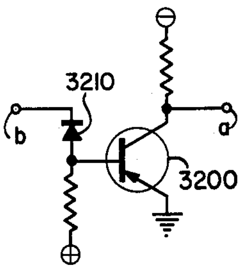

The logic symbol for an inverter INC is illustrated in FIG. 32A, and a typical circuit represented by this symbol is shown in FIG. 32B. The inverter INC includes a transistor 3200 which is connected in the same manner as the transistor 3100 in the inverter INA with the exception that the emitter is permanently returned to ground potential and a diode 3210 rather than a resistor is connected in series between an input terminal "*b*" and the base electrode of the transistor 3200 for the purpose for providing a low base input impedance.

*Inverter Amplifier IND*

Figure 33A:
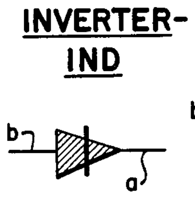
Figure 33B:
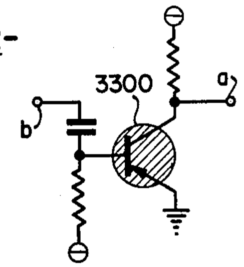

The logic symbol for an inverter IND is illustrated in FIG. 33A, and a typical circuit represented by this logic symbol is shown in FIG. 33B. The inverter IND includes a transistor 3300 having a grounded emitter and a base electrode that is normally returned to a negative potential so that the transistor 3300 is normally in a conductive state to maintain an output terminal "*a*" at ground potential. The transistor 3300 is triggered to a nonconductive condition for a short period by either the leading edge of a positive-going signal or the trailing edge of a negative-going signal that is applied to an input terminal "*b*." Since the transistor 3300 normally supplies a ground output signal, the logic symbol shown in FIG. 33A is shaded.

*High Speed Inverter Amplifier ING*

Figure 34A:
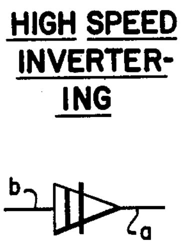
Figure 34B:
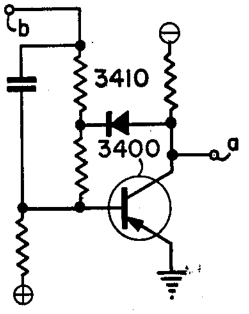

The logic symbol for a high speed inverter ING is shown in FIG. 34A, and a typical circuit represented by this symbol is illustrated in FIG. 34B. The amplifier ING provides high speed operation by virtue of the fact that the base circuit of a transistor 3400 is clamped to its collector circuit by a back-clamping diode 3410. This back-clamping arrangement prevents the transistor 3400 from going into saturation and thus, the recovery time of this transistor is extremely short.

*Inverter Amplifier INS*

Figure 35A:
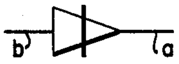
Figure 35B:
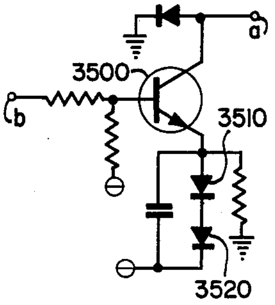

A logic symbol for an inverter amplifier INS is shown in FIG. 35A, and a typical circuit represented by this logic symbol is shown in FIG. 35B. A transistor 3500 forming this circuit is normally biased into a nonconductive state because its emitter is held approximately 1.2 volts positive with respect to its base electrode because of the voltage drop across a pair of silicon diodes 3510 and 3520 in the emitter circuit. These diodes each have a voltage drop of approximately .6 volt for all values of forward current above a minimum value and provide a very low dynamic impedance when the transistor 3500 is rendered conductive. When a more positive signal is applied to an input terminal "*b*," the transistor 3500 is placed in conduction to connect an output terminal "*a*" to the negative potential.

*Inverter Amplifier INU*

Figure 36A:
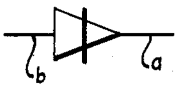
Figure 36B:
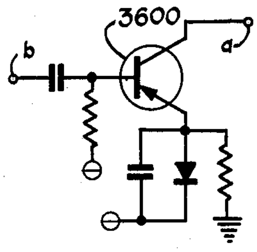

The logic symbol for the inverter INU is illustrated in FIG. 36A, and a typical circuit represented by this symbol is illustrated in FIG. 36B. The inverter INU includes a transistor 3600 which is normally maintained in a nonconductive state. When a positive-going signal is applied to an input terminal "*b*," the transistor 3600 is placed in conduction to drop the potential at an output terminal "*a*" to a negative value.

*Inverter Amplifier INX*

Figure 37A:
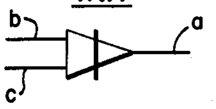
Figure 37B:
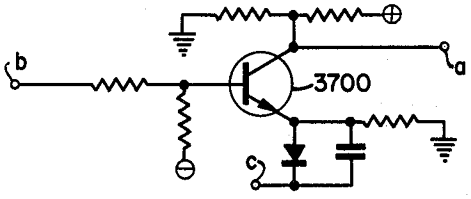

The logic symbol for an inverter INX is shown in FIG. 37A, and a typical circuit represented by this symbol is shown in FIG. 37B. The inverter INX includes a normally nonconductive transistor 3700 so that a somewhat positive potential is normally supplied to an output terminal "*a*." When a positive-going signal is applied to an input terminal "*b*" and a terminal "*c*" is connected to ground or a somewhat negative potential, the transistor 3700 is placed in conduction so that the potential at the output terminal "*a*" drops to a more negative value.

*Equalizer LAB*

Figure 38A:
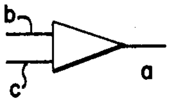
Figure 38B:
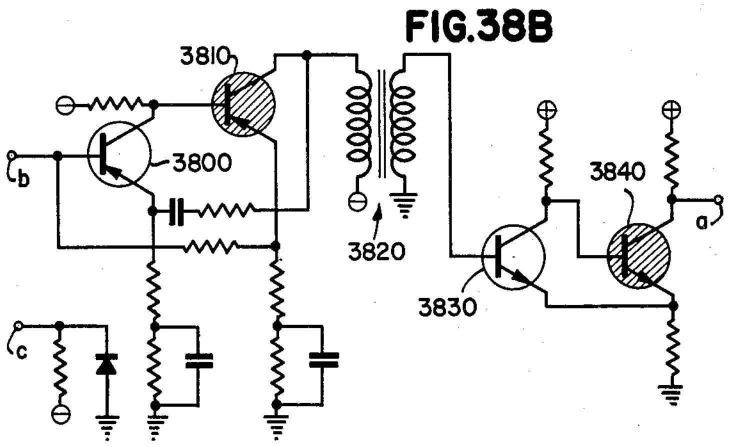

The logic symbol for an equalizer LAB is illustrated in FIG. 38A, and a typical circuit represented by this symbol is shown in FIG. 38B. The equalizer LAB includes an amplifier including a pair of transistors 3800 and 3810, which amplifier is identical to the audio amplifier AUE described above. The transistors 3800 and 3810 amplify signals supplied across a pair of input terminals "*b*" and "*c*" to provide amplified signals of substantially constant magnitude. These signals are coupled through a transformer 3820 to a pair of transistors 3830 and 3840 which form an emitter coupled trigger circuit identical to the trigger circuit described above in conjunction with the converter CVE. This trigger circuit is triggered "on" during each positive half cycle of the wave form applied by the transformer 3820 and thus, serves to provide a series of positive-going signals to an output terminal "*a*."

*Monostable Multivibrator MAA*

Figure 39A:
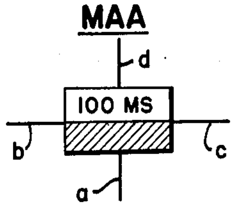
Figure 39B:
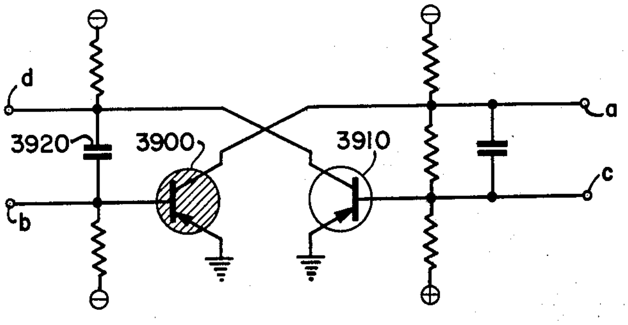

FIG. 39A of the drawings illustrates the logic symbol for a monostable multivibrator MAA, and FIG. 39B of the drawings illustrates a typical circuit represented by this logic symbol. In the normal condition of the circuit MAA, a transistor 3910 is in a nonconductive condition and a transistor 3900 is in a conductive condition so that ground potential is applied to an output terminal "*a*" and negative potential is applied to an output terminal "*d*." When a positive pulse is applied to either of a pair of terminals "*b*" or "*d*" or a negative pulse is applied to either of a pair of terminals "*c*" or "*a*," the monostable multivibrator MAA is triggered into its unstable condition in which the transistor 3900 is nonconductive and the transistor 3910 is conductive. When the positive potential across a coupling condenser 3920 dissipates to a point at which the base electrode of the transistor 3900 again becomes negative with respect to its grounded emitter, the circuit MAA returns to its normal or stable condition. Thus, the output terminal "*a*" is provided with a negative-going pulse of a variable duration dependent upon the time constants of the components used in the circuit MAA. The output terminal "*d*" ins provided with a positive-going pulse of the same variable duration. The upper portion of the block forming the logic symbol (FIG. 39A) is marked with a legend indicating the duration of the pulses supplied to the output terminals "*a*" and "*d*."

*High Speed Amplifier PUH*

Figure 40A:
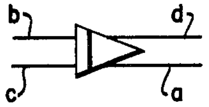
Figure 40B:
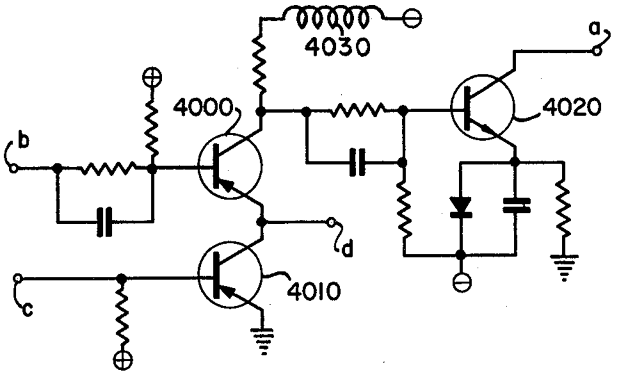

The logic symbol for a high speed amplifier PUH is shown in FIG. 40A, and a typical circuit represented by this logic symbol is shown in FIG. 40B. The amplifier PUH is a high speed, gated pulse amplifier which functions to amplify a negative-going signal applied to a terminal "*b*" only when a negative-going pulse is simultaneously applied to an input terminal "*c*." When a negative pulse is applied to the terminal "*c*," a transistor 4010 is placed in conduction so that the emitter of a transistor 4000 is connected to ground. If a negative-going pulse is concurrently applied to the input terminal "*b*," the transistor 4000 is placed in conduction so that an output transistor 4020 supplies a negative-going pulse to an output terminal "*a*." The collector electrode of the transistor 4010 is also provided with an output terminal "*d*" which supplies positive-going pulses conforming to the negative-going pulses applied to the input terminal "*c*." An inductance element 4030 is connected in the collector circuit of the transistor 4000 for the purpose of quickly bringing the transistors 4000 and 4010 out of current saturation at the termination of the negative pulses supplied to the input termianls "*b*" and "*c*."

*High Speed Amplifier PUM*

Figure 41A:
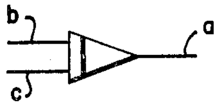
Figure 41B:
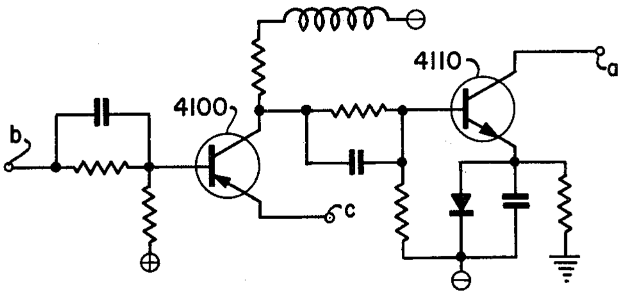

The logic symbol for a high speed amplifier PUM is shown in FIG. 41A, and a typical circuit represented by this symbol is shown in FIG. 41B. The amplifier PUM, which includes a pair of transistors 4100 and 4110, is identical to the amplifier PUH, described above, with the exception that the amplifier PUM does not include a gating transistor like the transistor 4010 in this latter circuit. Accordingly, an input terminal "*c*" in the amplifier PUM must be connected to ground through external circuits. Therefore, negative-going signals applied to an input terminal "*b*" appear as negative-going signals at an output terminal "*a*."

*Integrator Trigger STA*

Figure 42A:
Figure 42B:
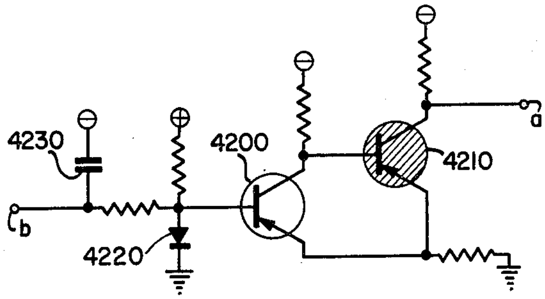

FIG. 42A of the drawings illustrates the logic symbol for an intergrator trigger STA, and FIG. 42B shows a typical circuit represented by this symbol. In the normal condition of the integrator trigger STA, a transistor 4210 is in a conductive condition so that an output terminal "*a*" is connected to ground. A negative biasing potential developed across the common emitter resistor for the transistor 4210 and a transistor 4200 biases the emitter electrode of the transistor 4200 negative with respect to its base electrode which is held at ground potential by a forward biased diode 4220. When a negative signal is supplied to an input terminal "*b*," an integrating capacitor 4230 begins to charge in a negative direction. After a suitable time delay, such as 100 milliseconds, the integrating condenser 4230 has been charged in a negative direction to a value sufficient to bias the diode 4220 in a reverse direction and to decrease the potential applied to the base electrode of the transistor 4200 below the potential of its emitter electrode. The transistor 4200 is placed in conduction to terminate the conduction through the transistor 4210. At this time, the potential at the output terminal "*a*" drops to a negative value and remains at this value until such time as the negative input signal is removed from the input terminal "*b*" and the integrating condenser 4230 charges in a positive direction to a potential at which the diode 4220 is again forward biased to hold the base electrode of the transistor 4200 at ground. At this time, the conduction through the transistor 4200 is terminated and the transistor 4210 is placed in a conductive condition to return the output terminal "*a*" to ground.

*Low Pass Filter FLN*

Figure 43A:
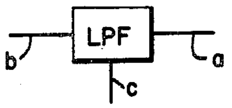
Figure 43B:
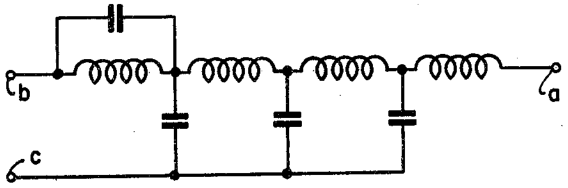

The logic symbol for a low pass filter FLN is shown in FIG. 43A, and a typical circuit represented by this symbol is shown in FIG. 43B. The filter FLN includes a pair of input terminals "*b*" and "*c*" and an output terminal "*a*."

SEIZURE CONTROL UNIT 400

As set forth above, the seizure control unit 400 is continuously operative to scan each of the thirty-two distinct time positions on the ten separate highways for the presence of a seize signal which indicates the existence of a calling condition on a line or trunk. In response to the receipt of a 1700 c.p.s. seize signal by a seize detector 420 included in the control unit 400, the seize detector control 430 transfers of the identity of the calling time position and highway to one of the subscriber registers 500, 600 or 610.

In general, the seize detector control 430 includes a slip counter which supplies a given time position pulse to the associated control connector 410 for forty consecutive time frames and then supplies a pulse representing the next succeeding time position to the control connector. This operation continues until all of the time positions on a particular highway have been scanned, and the circuit 430 then initiates the sequential scanning of each of the time positions on the next highway. In this manner, each of the time positions on each of the highways is scanned for the presence of a seize signal. The output of the control connector 410 is connected to the seize detector 420 which responds to the presence of the seize tone. When the seize tone is applied to the seize detector through the control connector 410, the scanning operation of the seize detector control circuit 430 is arrested until such time as the identity of the calling time position and highway has been transferred to one of the subscriber registers 500, 600 or 610. Following the completion of the transfer of the calling time position and highway information, the seize detector control circuit 430 is released to continue the scanning operation.

Figure 44:
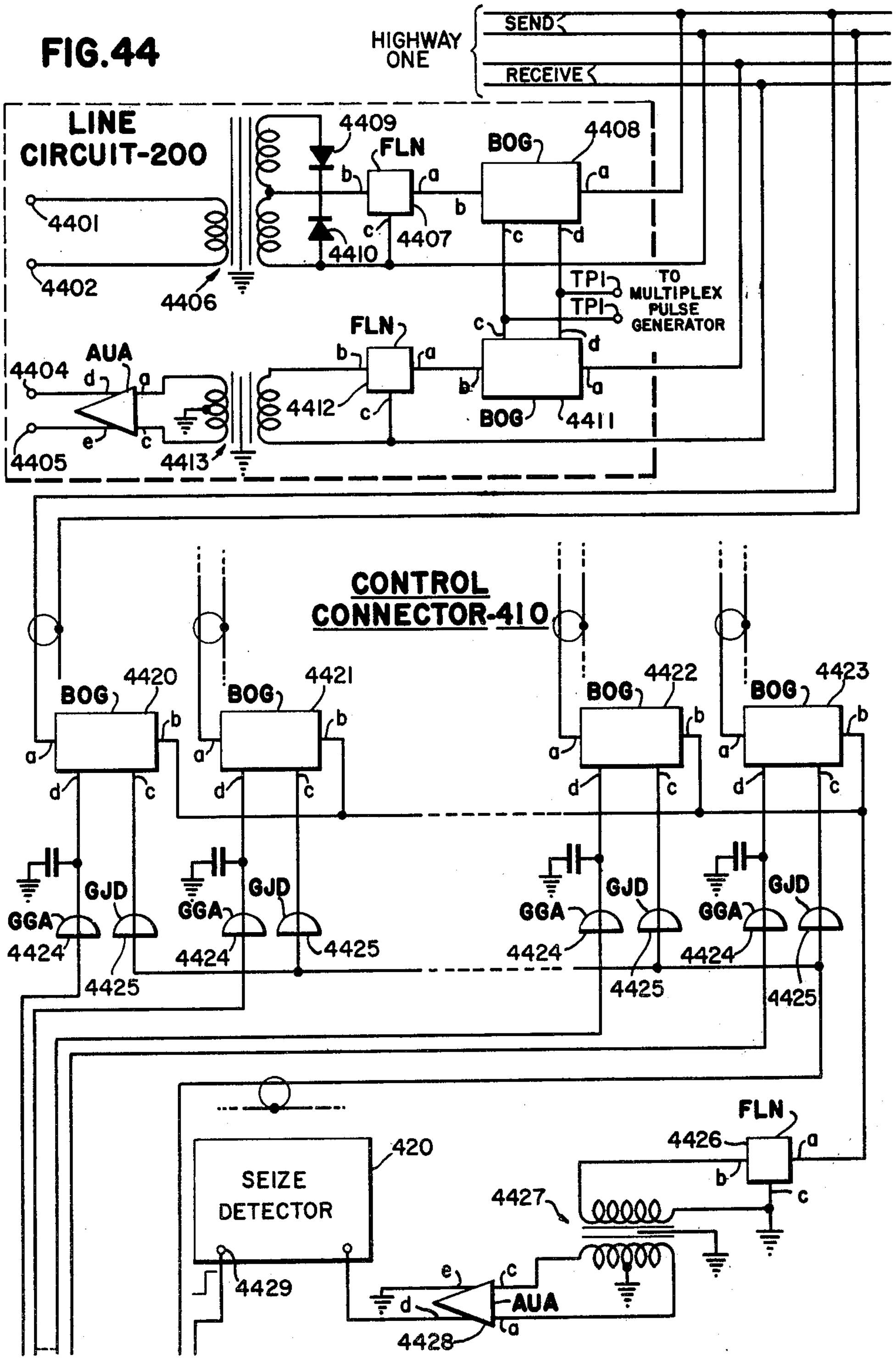

Referring now more particularly to FIG. 44, therein is illustrated the line circuit 200 which is connected to the substation A. The circuit 200 is identical to the other line circuits and trunk circuits in the local board 150. Each of these line or trunk circuits is connected to a particular one of the ten highways in the local board 150 and is assigned an individual one of the thirty-two time positions on the highway. The line circuit 200 includes a pair of terminals 4401 and 4402 connected to control and voice frequency transmitting means at the substation A and a pair of terminals 4404 and 4405 connected to signal reproducing means at the substation A. The transmitted signals applied across the terminals 4401 and 4402 are coupled through a transformer 4406 and through a low pass filter 4407 to a blocking oscillator gate 4408 that is individual to the send path of the line circuit 200.

A pair of Zener diodes 4409 and 4410 are oppositely connected across the secondary of the transformer 4406 to limit the maximum voltage swing of the signals received from the substation A. The output of the blocking oscillator gate 4408 is connected, for instance, to the send path of highway one.

The line circuit 200 also includes a second blocking oscillator gate 4411 which is connected, for instance, to the receive path of highway one. The output of the blocking oscillator gate 4411 is connected through a low pass filter 4412 to the primary winding of a coupling transformer 4413. A secondary winding of the transformer 4413 is connected to the input of an audio amplifier 4414, the output of which is connected to the terminals 4404 and 4405. Thus, the line circuit 200 includes a pair of blocking oscillator gates 4408 and 4411 which connect the subscriber station A to highway one.

In order to provide means for connecting the subscriber station A to highway one in only a single one of the thirty-two individual time positions thereon, the control terminals "*c*" and "*d*" of the blocking oscillator gate 4408 and 4411 are connected to the multiplex pulse generator to receive operating signals in the time position individual to the subscriber station A. Assuming that the line circuit 200 is assigned the first time position on a highway one, the terminals "c" and "d" of the gates 4408 and 4411 are connected to the terminals TP1 of the multiplex pulse generator which receive operating signals in the first time position. Thus, the gate 4408 is opened to permit the transmission of signals to highway one in only the first time position, and the gate 4411 is operated to couple signals from highway one to substation A in only the first time position. The low pass filters 4407 and 4412 and the gates 4408 and 4411 operate to provide a resonant transfer of energy during the interval in which these gates are open. In addition, the highways are preferably connected to a highway clamp circuit of the type described in detail in the Tubinis et al. application in order to reduce cross talk between adjacent communication channels. The highway clamp circuit operates to discharge stray capacitance on the highway transmission network during the guard interval between adjacent time positions.

When the subscriber at the station A goes "off-hook," a seize signal comprising a 1700 c.p.s. tone is applied across the terminals 4401 and 4402 and is coupled through the transformer 4406 and the low pass filter 4407 to the input of the blocking oscillator gate 4408. When an operating signal is applied across the terminals "c" and "d" of the gate 4408, this seize signal is applied to the send path of highway one and is subsequently detected by the seize detector 420 to indicate the presence of a calling condition at the substation A. The seize signal is applied to one of the highways in a similar manner from one of the trunk circuits.

Figure 45:
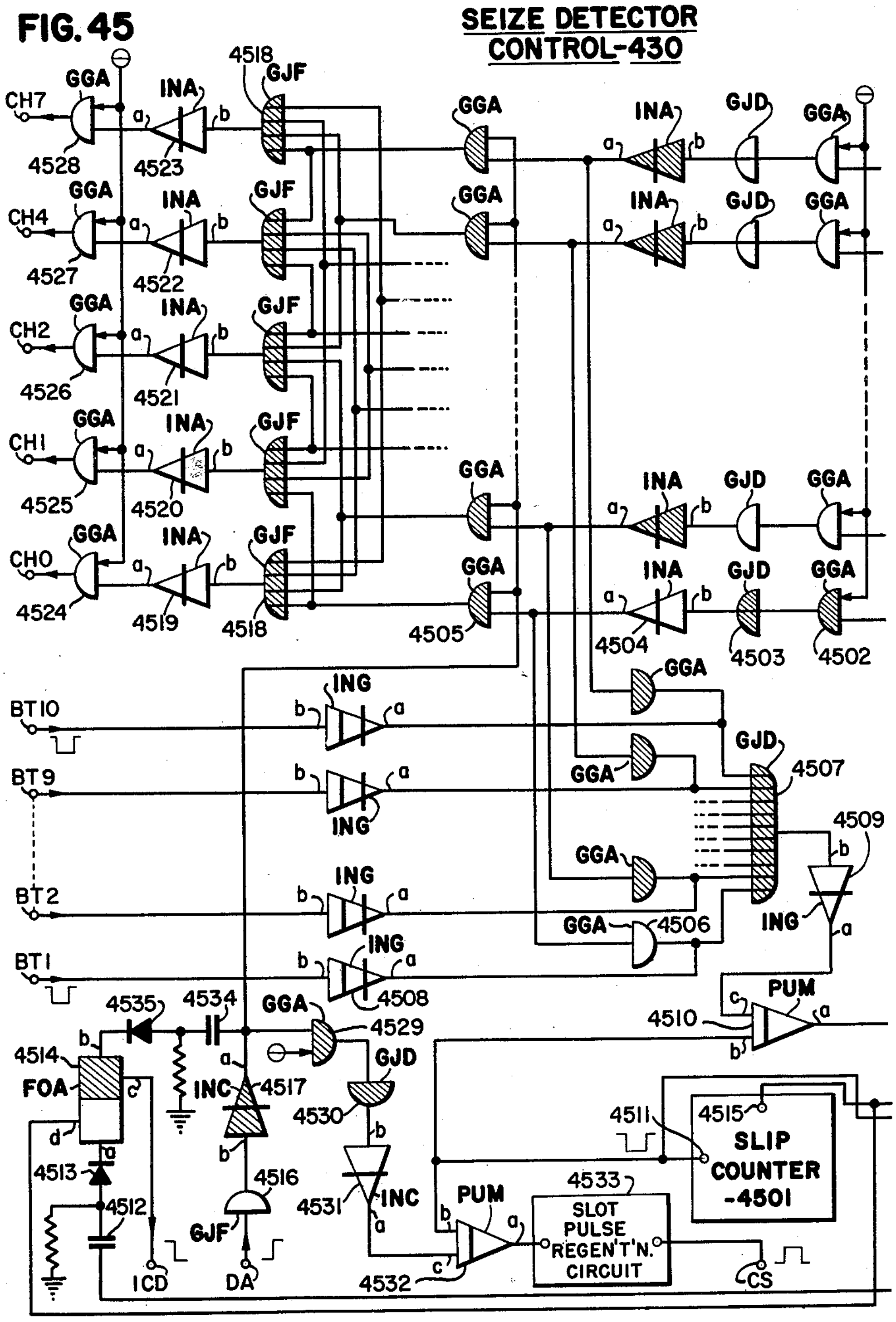
Figure 46:
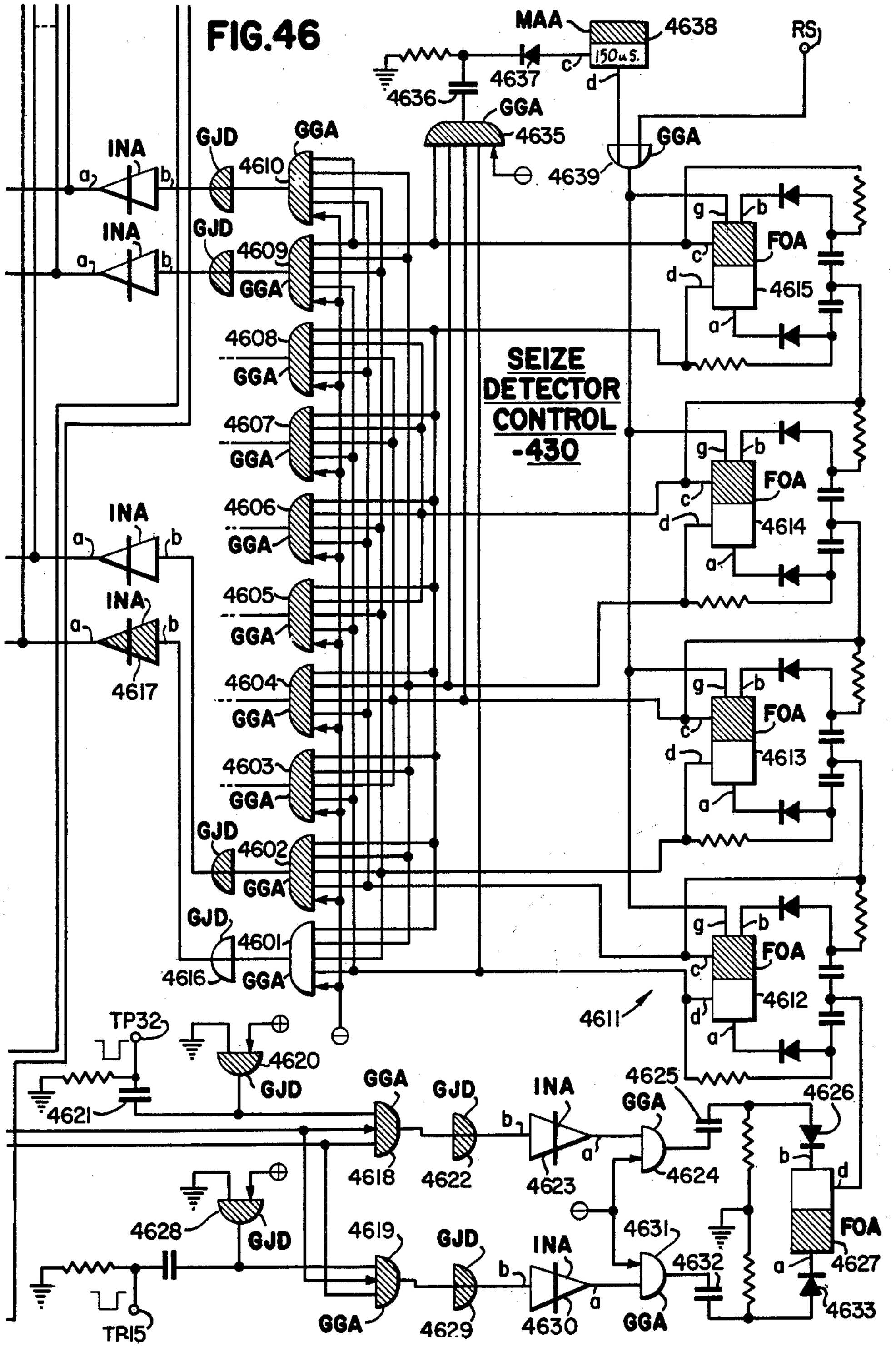
Figure 47:
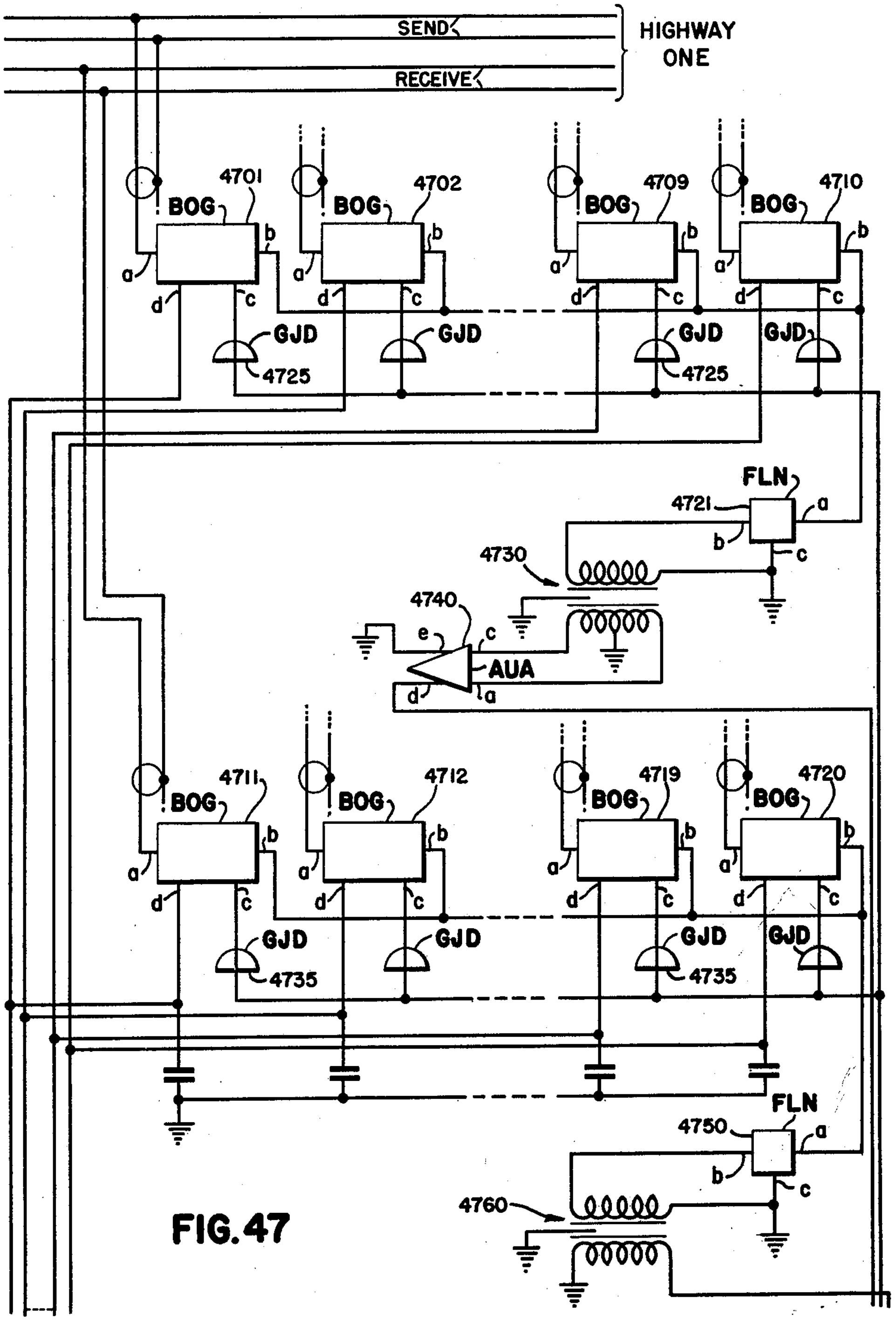
Figure 48:
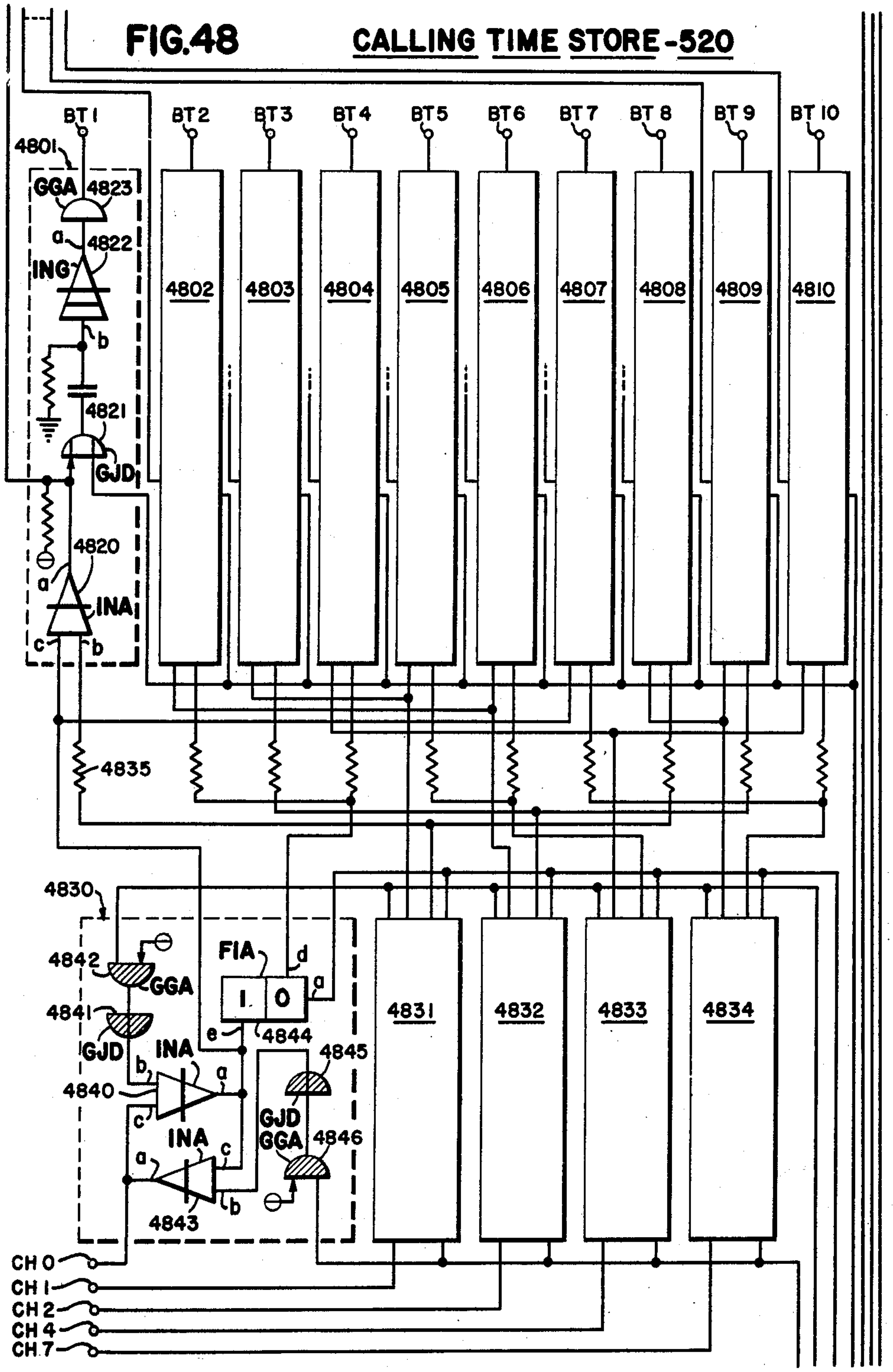
Figure 49:
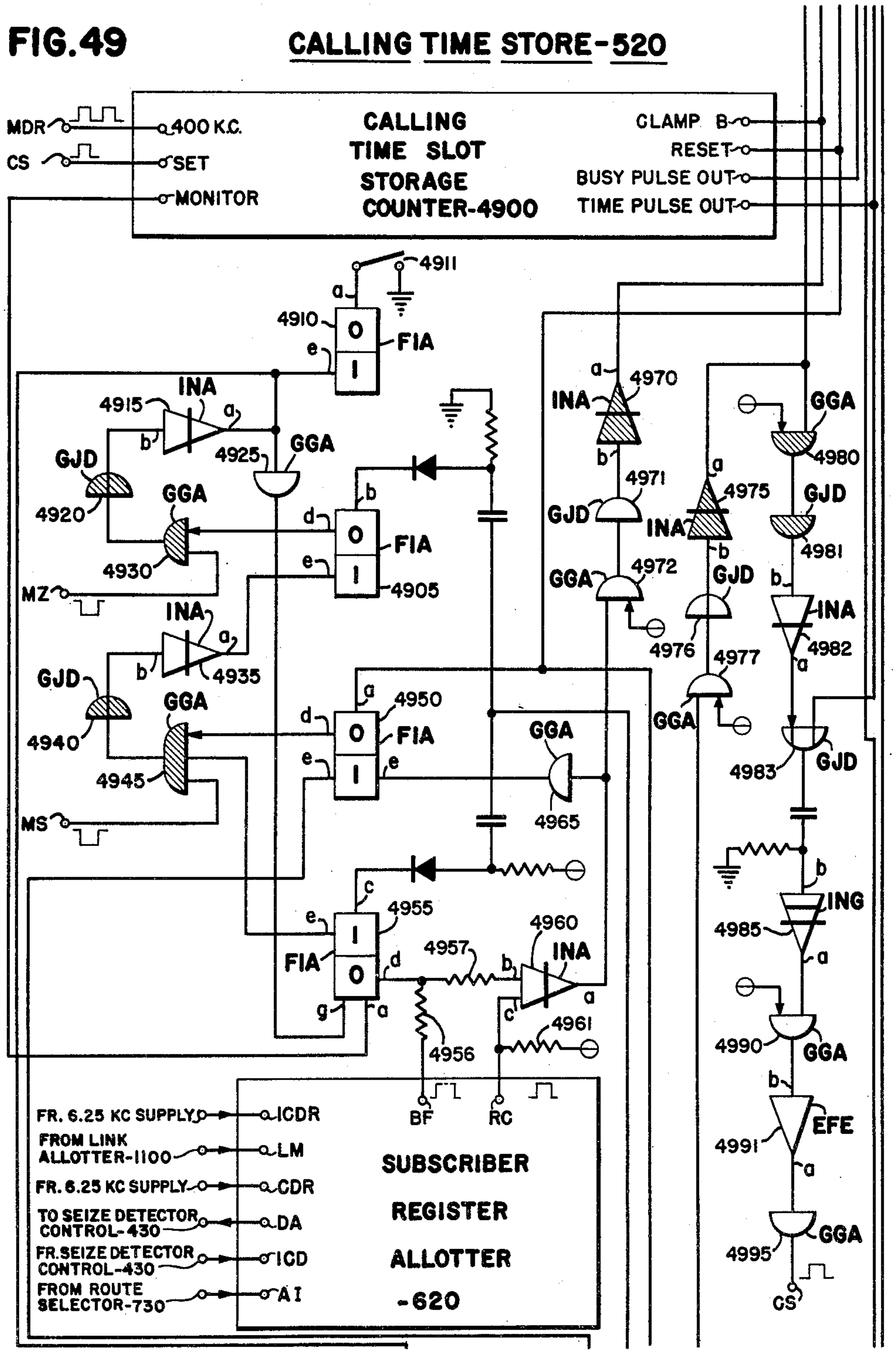
Figure 50:
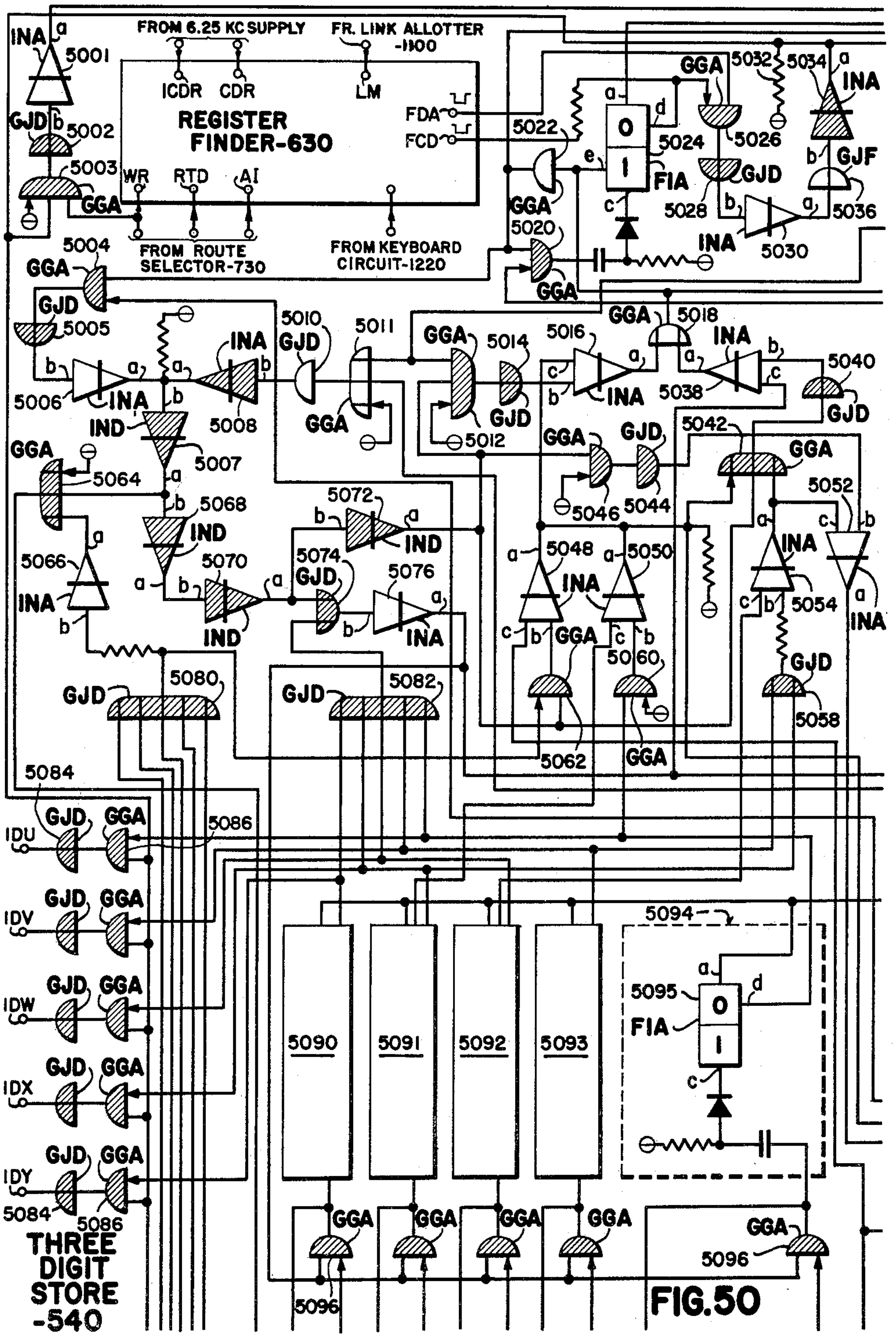
Figure 51:
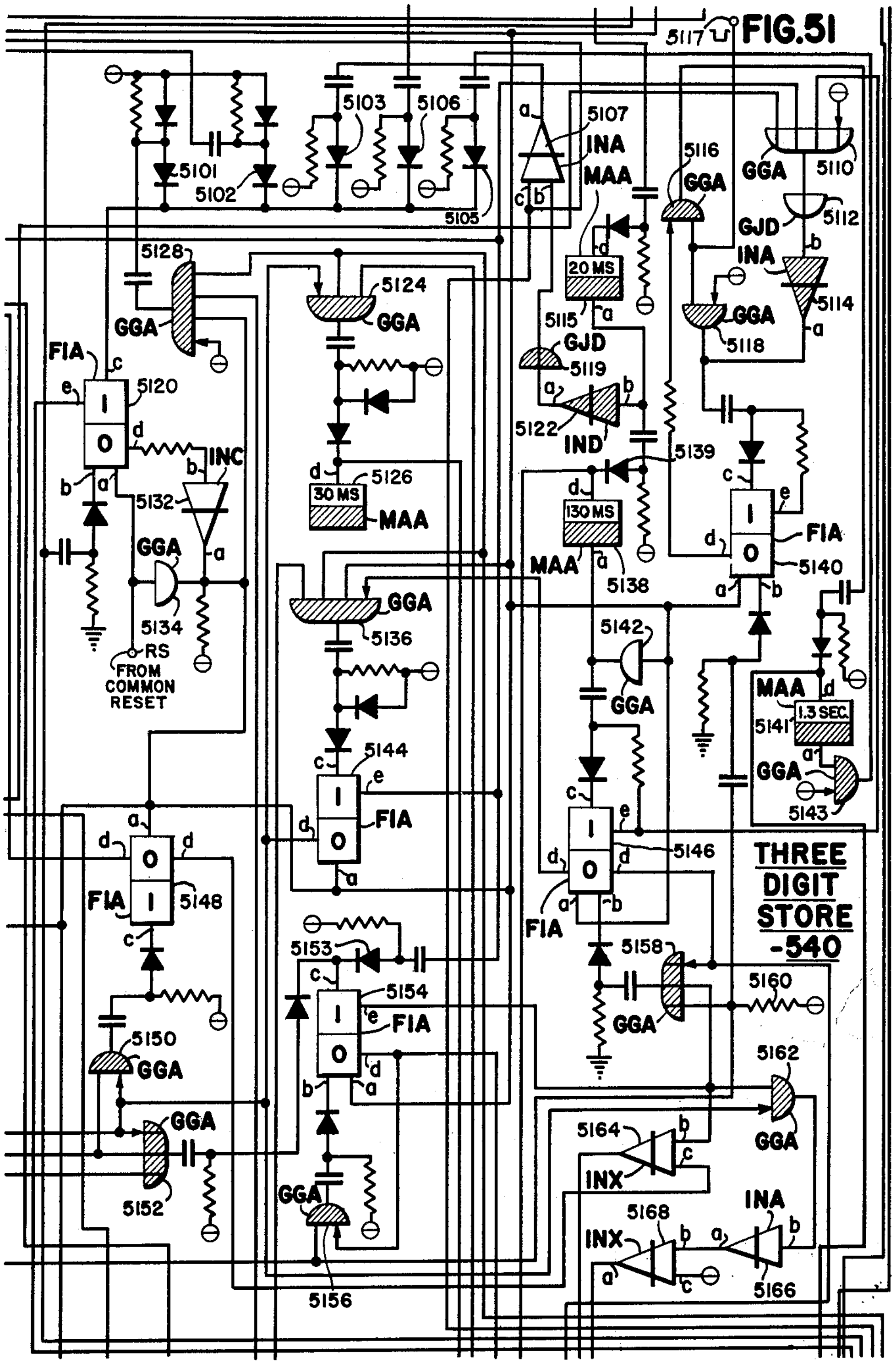
Figure 52:
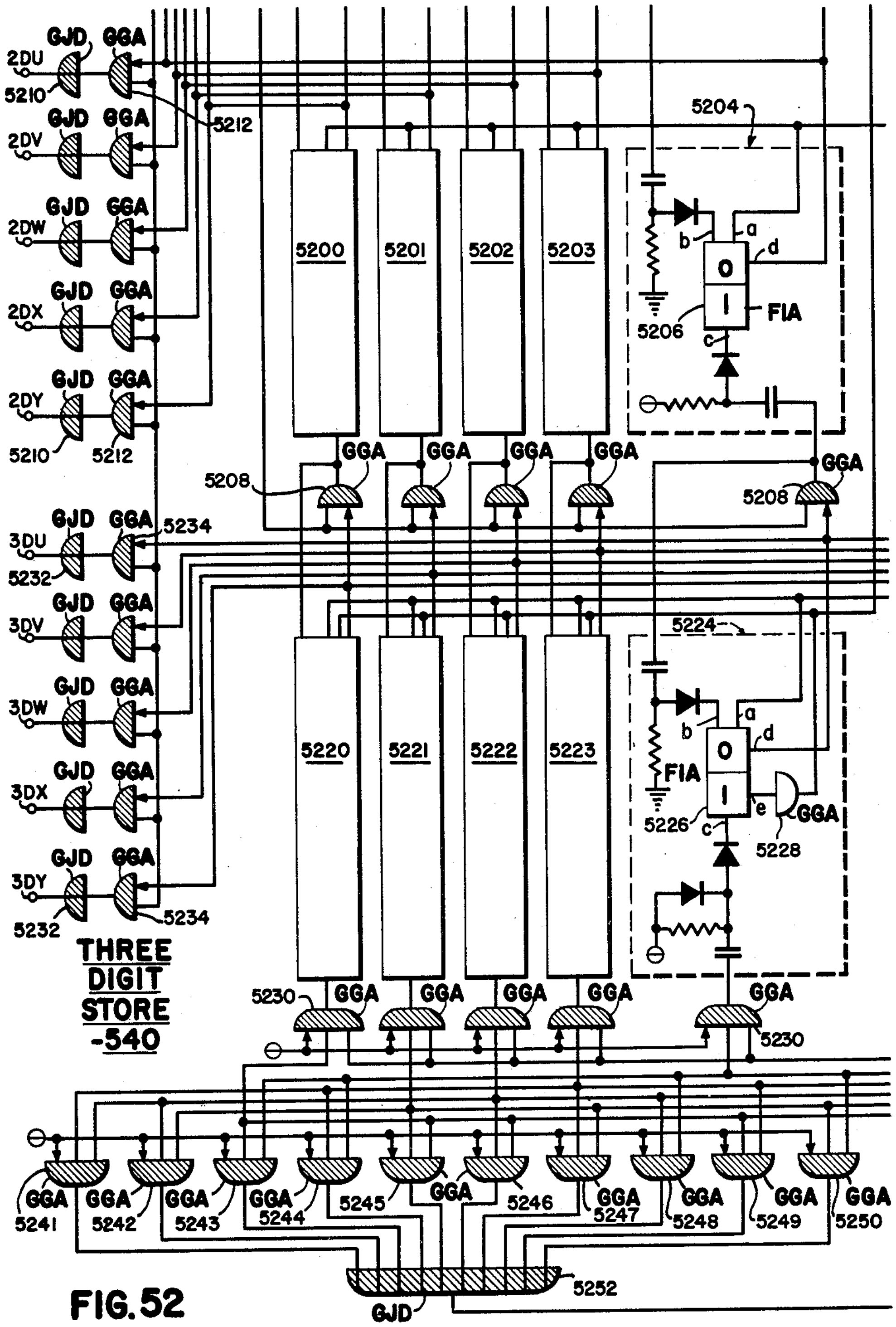

As set forth above, the seize detector control circuit 430 progressively operates the control connector 410 to connect the seize detector 420 in sequence to the line and trunk circuits on each of the highways so that, when a seize tone is detected, the time position and highway of the calling circuit is determined and transferred to one of the subscriber registers. To this end, the seize detector control circuit 430 (FIGS. 45 and 46) includes both a slip counter 4501 for successively supplying pulses in each of the thirty-two time positions and a plurality of "AND" gates 4601–4610 for enabling the control connector 410 to scan each of the ten highways in sequence. The gates 4601–4610 are enabled in sequence by a highway counter 4611 that includes four flip-flops 4612–4615 which are operated step-by-step to different patterns of conductive conditions representing the ten highways in synchronism with the operation of the slip counter 4501. The "c" and "d" output terminals of the flip-flops 4612–4615 are connected to the inputs of the "AND" gates 4601–4610 so that only one of these gates is enabled in any given setting of the highway counter 4611. In FIG. 46 of the drawings, the gate 4601 corresponding to highway one is enabled and the remaining gates 4602–4610 are not enabled. When one of these gates, such as the gate 4601, is enabled, the output thereof drops to a negative potential which is coupled through a gate 4616 to the input of one of ten identical translating channels. The translating channel controlled by the highway one enabling gate 4601 includes an inverter 4617, an "AND" gate 4502, an "OR" gate 4503, and an inverter 4504. The selective energization of one of these translating channels conditions the control connector 410 for scanning the time positions on a single one of the ten highways, conditions the seize detector control circuit 430 for performing a busy test on the time positions on this highway, and conditions the seize detector control circuit 430 to supply the identity of the calling highway to one of the subscriber registers.

More specifically, when one of the gates such as the gate 4601 drops to a negative potential under the control of the highway counter 4611, this negative potential is effective through a gate 4616 to place the inverter 4617 in conduction. When the inverter 4617 is placed in conduction, the control connector 410 is conditioned to connect only the line and trunk circuits on highway one to the input of the seize detector 420. More specifically, the control connector 410 (FIG. 44) includes ten blocking oscillator gate circuits, such as the gate circuits 4420, 4421, 4422 and 4423 which are connected to highways one, two, nine and ten, respectively. The "d" terminal of the blocking oscillator gate 4420 is connected to the "a" terminal of the inverter 4617 in the highway one channel through a gate 4424. Thus, when the inverter 4617 is placed in conduction, the "d" terminal of the gate 4420 rises to ground potential so as to condition this gate. Since only one of the ten highway translating channels in the seize detector control circuit 430 can be energized at a given time, only one of the blocking oscillator gates in the control connector 410 can be conditioned for operation.

In addition, when the inverter 4617 is placed in conduction so that the "a" terminal rises to ground potential, the output of the "AND" gate 4502 rises to ground potential which is effective through the "OR" gate 4503 to terminate conduction in the inverter 4504. Thus, the "a" terminal of this inverter drops to a negative potential which is supplied to one of the inputs of an "AND" gate 4505. The "AND" gate 4505 is one of ten such gates, each of which is individual to one of the highway translating channels in the seize detector control circuit 430. These "AND" gates, which are conditioned but not opened by this application of a negative potential, are used to provide two out of five binary markings representing the designations of the highway on which the scanning operation is being performed.

The negative output of the inverter 4504 is also forwarded to the input of an "AND" gate 4506 to initiate a busy test. The "AND" gate 4506 is one of ten similar gates, each of which is individual to one of the highway translating channels. The output of each of the "AND" gates similar to the gate 4506 is connected to one of the inputs of an "OR" gate 4507. Each of these inputs to the "AND" gate 4507 is also connected to the output terminal "a" of one of ten inverters similar to an inverter 4508. The input terminal "b" of each of these inverters is connected to a selected one of ten terminals BT1–BT10. Each of these terminals is provided with negative-going pulses in each of the time positions on a given highway that is in a busy condition. As an example, the terminal BT1 is provided with a negative-going pulse in each of the thirty-two time positions on highway one that is in a busy condition. Each time that a busy pulse is received from the terminal BT1 the inverter 4508 is placed in conduction so that the "a" terminal thereof rises to ground potential. Similarly, when busy pulses are received by the remaining inverters 4508 representing the other nine highways, these inverters are placed in conduction so that the output terminals "a" thereof rise to ground potential. However, this elevation to ground potential is not effective on the inputs to the gate 4507 representing the other nine highways inasmuch as the associated "AND" gates 4506 clamp these inputs at ground. Since the highway one gate 4506 has removed the ground clamp from the related input to the gate 4507, an inverter 4509 is placed in conduction except during the time positions in which a busy pulse is supplied from the terminal BT1.

When the inverter 4509 becomes conductive, the "c" terminal of a high speed amplifier 4510 is placed at ground potential to condition this amplifier for operation. Since busy pulses at the terminal BT1 in busy time positions on the scanned highway prevent conduction of the inverter 4509, the high speed amplifier 4510 is disabled during the busy time position. In this manner, the seize detector control circuit 430 conditions the control connector 410 for scanning the time positions on a given one of the ten highways, prepares circuits for marking the identity of the scanned highway, and prepares circuits for performing a busy test on the time positions on this given highway.

The slip counter 4501 provides successive negative-going pulses in each of the thirty-two time positions, and these pulses are used to control the operation of the control connector 410 so that all of the time positions on the selected highway are scanned in sequence and are used by the seize detector control circuit 430 to control the storage of the time position of a calling line or trunk if the busy test is satisfactorily completed. The circuitry of the slip counter is described in detail in the Tubinis et al. application and, in general, provides negative-going pulses in identical time positions for forty successive time frames and then provides forty successive pulses in the next succeeding time position or slot.

Assuming that the slip counter 4501 is in a setting in which successive pulses in the first time position are provided at a terminal 4511, these pulses are supplied to the "b" input terminal of the high speed amplifier 4510. If the first time position on the highway one is in a busy condition, the "c" terminal of the amplifier 4510 is at a negative potential and the negative-going slot pulse applied to the terminal "b" of this amplifier is ineffective. However, if the first time position on highway one is idle, the "c" terminal of the amplifier 4510 is held at ground potential by the conductive inverter 4509 and the negative-going slot pulses in the first time position provided by the slip counter 4501 drive the amplifier 4510 into conduction so that an output terminal "a" thereof drops to a negative potential. This terminal is connected in common to all of the "c" terminals of the blocking oscillator gates 4420–4423 in the control connector 410 through a plurality of "AND" gates 4425. Thus, all of the "c" terminals of the gates 4420–4423 are dropped to a negative potential in the first time slot. However, the "d" terminal of only the gate 4420 assigned to highway one is held at a ground potential by the conductive inverter 4617. Accordingly, only the gate 4420 individual to highway one is rendered conductive to connect the send path of highway one to a low pass filter 4426 in the first time position.

As set forth above, the line circuit 200 is assumed to be in a calling condition in which a 1700 c.p.s. seize tone is applied to the gate 4408. This signal is forwarded from the line circuit 200 over the send path of highway one and through the gate 4420 and the low pass filter 4426 to the primary winding of a coupling transformer 4427. The secondary winding of the transformer 4427 is connected to the input of an audio amplifier 4428, and the amplified output of this component is supplied to the input of the seize detector 420. The seize detector 420 is similar to the multifrequency detector shown and described in detail in the copending application of Edward R. Schmidt, Serial No. 814,845, filed May 21, 1959. As set forth therein, a frequency responsive channel in the detector 420 responds to the presence of an input signal of a selected frequency to provide either a pulse output or a marking potential output. The seize detector 420, in response to the receipt of the seize tone, shifts an output terminal 4429 from a negative potential to a more positive potential. This positive-going signal is coupled through a capacitor 4512 and a diode 4513 to the "a" terminal of a flip-flop 4514. The application of a positive signal to the "a" terminal of the flip-flop 4514 operates this circuit to its set condition in which the "c" terminal supplies a negative potential and the "d" terminal supplies ground potential. This operation of the flip-flop 4514 provides an indication to the seize detector control circuit 430 that a seize tone has been received from the circuit connected to the selected highway in the time position represented by the slot pulses currently provided by the slip counter 4501.

When the "d" lead of the flip-flop 4514 rises to ground potential, this ground is applied to a terminal 4515 in the slip counter 4501 so that further operation of this counter is inhibited to insure that the slot pulse provided at the terminal 4511 remains in the time position of the circuit from which the seize tone was received. When the terminal "c" of the flip-flop 4514 drops to a negative potential, a negative signal is applied to a subscriber register demand terminal ICD. This negative signal operates the register finder 630 and the register allotter 620 to allot an idle subscriber register 300, 600 or 610 for use in extending the call from the calling line circuit 200. The subscriber register includes means for storing the number of the calling highway and the time position of the calling circuit on the highway.

When an idle subscriber register, such as the subscriber register one 500, has been allotted for use in controlling the extension of the call, a demand answer signal in the form of ground potential is applied to a terminal DA. This ground potential is forwarded through a gate 4516 to the "b" terminal of an inverter 4517 so that this inverter is rendered nonconductive. This drops its output to a negative potential which is forwarded to one of the inputs of each of the ten "AND" gates similar to the gate 4505. However, since the other input of only one of these gates is also at a negative potential in accordance with the highway that is being scanned, the output of only the gate 4505 representing highway one drops to a negative potential at this time. The outputs of the ten gates 4505 are individually connected to a selected two of five "AND" gates 4518 in accordance with the binary code of the digit identifying the number of the scanned highway. The outputs of the "AND" gate 4518 are connected to five inverters 4519–4523, and the outputs of these inverters are connected to one of the inputs of five "AND" gates 4524–4528. Since the output of only the lowermost "AND" gate 4505 representing highway one drops to a negative potential, the lowermost two "OR" gates 4518 fire the two inverters 4519 and 4520.

When the inverters 4519 and 4520 conduct, the output terminals "a" thereof rise to ground potential so that the outputs of the "AND" gates 4524 and 4525 rise to ground potential. This positive-going signal is connected to two terminals CH0 and CH1 to provide a binary coded representation of the highway one from which a seize tone has been received. The outputs of "AND" gates 4526, 4527 and 4528 are connected to output terminals designated CH2, CH4 and CH7, respectively. Thus, when highway ten, for instance, is being scanned so that the uppermost gate 4505 shown in FIG. 45 is opened, the inverters 4522 and 4523 are rendered conductive to apply ground potential to the terminals CH4 and CH7 representing the binary coded representation of highway ten. In a like manner, selected pairs of the inverters 4519–4523 are rendered conductive when the demand answer signal is received by the inverter 4517 to supply ground to two of the five terminals CH0, CH1, CH2, CH4, and CH7 to provide a coded representation of the value of the digit identifying the highway from which a seize tone has been received.

The receipt of the demand answer signal by the inverter 4517 also actuates the seize detector control circuit 430 to provide an output signal in the time position of the line or trunk circuit on the selected highway from which the seize signal was received. More specifically, when the output terminal "a" of the inverter 4517 drops to a negative potential, this negative potential is forwarded through a pair of gates 4529 and 4530 to the input of an inverter 4531. This places the inverter 4531 in conduction so that the "c" terminal of a high speed amplifier 4532 is connected to ground. The "b" terminal of the amplifier 4532 is connected to the output terminal 4511 of the slip counter 4501. As set forth above, when the flip-flop 4514 shifts to its set condition representing the receipt of a seize tone by the seize detector 420, the terminal 4515 of the slip counter is provided with an inhibiting signal. Thus, the slot pulse supplied to the output terminal 4511 represents the time position of the line or trunk circuit from which the seize signal was received. Thus, the "$b$" terminal of the amplifier 4532 receives a negative-going slot pulse in the time position corresponding to that of the calling line or trunk circuit. This negative-going signal renders the amplifier 4532 conductive so that a positive-going signal in the time position of the calling circuit is applied to a slot pulse regeneration circuit 4533. This circuit is of the type described in detail in the Tubinis et al. application and supplies a positive-going slot pulse to a terminal CS. In general, the slot pulse regeneration circuit 4533 converts the positive-going pulse of 1.25 microseconds from the high speed amplifier 4532 into a positive-going pulse of 15 microseconds' duration which is applied to the terminal CS.

When the number of the highway and the time position of the calling line thereof have been stored in the subscriber register, this register applies a negative-going pulse to the highway one busy test terminal BT1. As described above, this places the inverter 4508 in conduction in the first time position so that ground is applied through the "OR" gate 4507 to the input of the inverter 4509 in the first time position. This renders the inverter 4509 momentarily nonconductive in the time position of the calling circuit so that the high speed amplifier 4510 cannot supply operating signals to the highway one blocking oscillator gate 4420 in the control connector 410. This opens the connection between the line circuit 200 and the seize detector 420 so that the potential at its output terminal 4429 again drops to a negative value. Thus, in direct response to the storage of the calling highway and calling line time position in the subscriber register circuit, the busy test circuit in the seize detector control circuit 430 opens the connection between the seize detector 420 and the calling circuit.

When the calling highway number represented by the application of ground to two of the terminals CH0, CH1, CH2, CH4 and CH7 and the time position of the calling circuit on this highway, as represented by the time position of the pulse applied to the terminal CS have been stored in the subscriber register 500, for instance, the potential applied to the terminal DA again drops to a negative value and the inverter 4517 is rendered nonconductive so that its output terminal "$a$" rises to ground potential. This closes the gates 4505 so that the inverters 4519 and 4520 are restored to a nonconductive condition. Similarly, the output of the gate 4529 now rises to ground potential so that the inverter 4531 is placed in a nonconductive state. This drops the "$c$" terminal of the amplifier 4532 to a negative potential so that the slot pulse regeneration circuit 4533 is rendered ineffective to supply signals to the slot pulse output terminal CS representing the time position of the calling circuit.

As the output of the inverter 4517 rises to ground potential, a positive-going pulse is coupled through a capacitor 4534 and a diode 4535 to the "$b$" terminal of the flip-flop 4514. This resets the flip-flop to its normal condition in which the terminal "$c$" is connected to ground and the terminal "$d$" is connected to a negative potential. When the terminal "$c$" rises to ground potential, the incoming register demand signal is removed from the terminal ICD, and the removal of ground from the terminal "$d$" removes the inhibit signal from the terminal 4515 of the slip counter 4501 so that this counter now continues its normal operation during which slot pulses representing different time positions are applied to the output terminal 4511. Thus, the seize detector control circuit 430 continues to scan the remaining time positions on highway one for the presence of a calling condition.

When the inhibit signal is removed from the terminal 4515 of the slip counter 4501, the slot pulse applied to the terminal 4511 progresses through the remainder of the time positions during which the control connector 410 sequentially connects the input of the seize detector 420 to the line and trunk circuits assigned these time positions to search for the presence of a seize tone. At the completion of the scanning of the thirty-first time position on highway one, the forty successive slot pulses provided at the output terminal 4511 of the slip counter 4501 representing the thirty-second time position are forwarded to one of the inputs of an "AND" gate 4618. These pulses in the thirty-second slot are used to advance the highway counter 4611 to a setting representing the next highway to be scanned. The resistive input of the gate 4618 is connected to negative potential at the terminal "$d$" of the flip-flop 4514. The remaining input to the gate 4618 is normally clamped at ground potential by a gate 4620. However, when the multiplex generator provides a negative-going pulse in the thirty-second time position at a terminal TP32, this pulse is coupled through a capacitor 4621 to the remaining input of the gate 4618 so that the output thereof falls to a negative potential and is effective through a gate 4622 to momentarily place an inverter 4623 in conduction. This raises the output potential of an "AND" gate 4624 to ground so that a positive-going pulse is coupled through a capacitor 4625 and a diode 4626 to the "$b$" terminal of a flip-flop 4627 which drives the highway counter 4611. This positive pulse shifts the flip-flop 4627 to its alternate stable conductive condition to which its "$d$" terminal is connected to ground. This transistion from negative to ground potential provides a positive-going pulse which is applied to the first flip-flop 4612 in the highway counter 4611, thereby to advance this counter a single step. Since, as assumed above, this counter is standing in a condition to which the highway one gate 4601 is enabled, the operating pulse supplied from the flip-flop 4627 advances the highway counter 4611 to a condition in which the gate 4602 is enabled and the gates 4601 and 4603–4610 are clamped at ground. This initiates the performance of scanning and busy test operations on the thirty-two time positions on highway two and also serves to condition the seize detector control circuit 430 for storing the highway two identity and the time position of the calling circuit in a subscriber register in response to the receipt of a seize tone by the seize detector 420.

As described above, the flip-flop 4627 is operated by the coincidence of the first of the forty successive slip pulses in the thirty-second time position provided by the slip counter 4501 and by the corresponding multiplex pulse from the terminal TP32. The inverter 4623 is momentarily rendered conductive thirty-nine additional times each time that the multiplex pulse from the terminal TP32 coincides with the slot pulse in the thirty-second time position from a slip counter 4501. However, since the flip-flop 4627 has been set to its alternate conductive condition by the first of these pairs of pulses, the thirty-nine slot pulses from the slip counter 4501 produce no useful result.

In order to restore the drive flip-flop 4627 to its normal or reset condition so that this flip-flop can be operated to advance the highway counter 4611 to a setting representing highway three at the conclusion of the scanning operation on highway two, a reset gate 4619 is provided. One input of the gate 4619 is connected to the terminal 4511 and another input is normally clamped to ground by an "AND" gate 4628. When the slip counter 4501 advances to the fifteenth time position, for instance, a negative pulse is supplied from the terminal 4511 to one of the inputs of the gate 4619 and the negative-going multiplex pulse in the fifteenth time position is applied to a terminal TP15. The output of the reset gate 4619 drops to a negative potential which is effective through a gate 4629 to momentarily place an inverter 4630 in conduction so that the output of an "AND" gate 4631 rises to ground. This positive-going pulse is forwarded through a capacitor 4632 and a diode 4633 to the "$a$" terminal of the flip-flop 4627. This resets this flip-flop to its normal condition in which the "$d$" terminal is connected to a negative potential. The transition from ground to negative potential at the terminal "*d*" does not affect the setting of the highway counter 4611 inasmuch as this counting circuit is responsive to only positive-going pulses. Thus, the gate circuits 4618 and 4619, the slip counter 4501, and the pulses supplied at the terminals TP15 and TP32 provide means for advancing the setting of the highway counter 4611 in response to the each complete cycle of operation of the slip counter 4501 so that all of the lines and trunks in the local board 150 are continuously scanned for seize signals.

To provide means for resetting the highway counter 4611 to a setting representing highway one, an additional reset control including an "AND" gate 4635 is provided. The gate 4635 provides a negative output when the highway counter 4611 is advanced to the setting following the highway ten setting. This negative signal is supplied through a capacitor 4636 and a diode 4637 to the "*c*" terminal of a monostable multivibrator 4638. This signal operates the unit 4638 to its unstable state for a short period so that ground is supplied through an "OR" gate 4639 to the "*g*" terminals of the flip-flops 4612–4615. This ground resets these flip-flops to the conductive pattern illustrated in FIG. 46 in which the highway one gate 4601 is enabled. The highway counter 4611 can also be manually reset to the highway one setting by applying ground to a terminal RS (FIG. 46).

SUBSCRIBER REGISTER ONE 500

Figure 53:
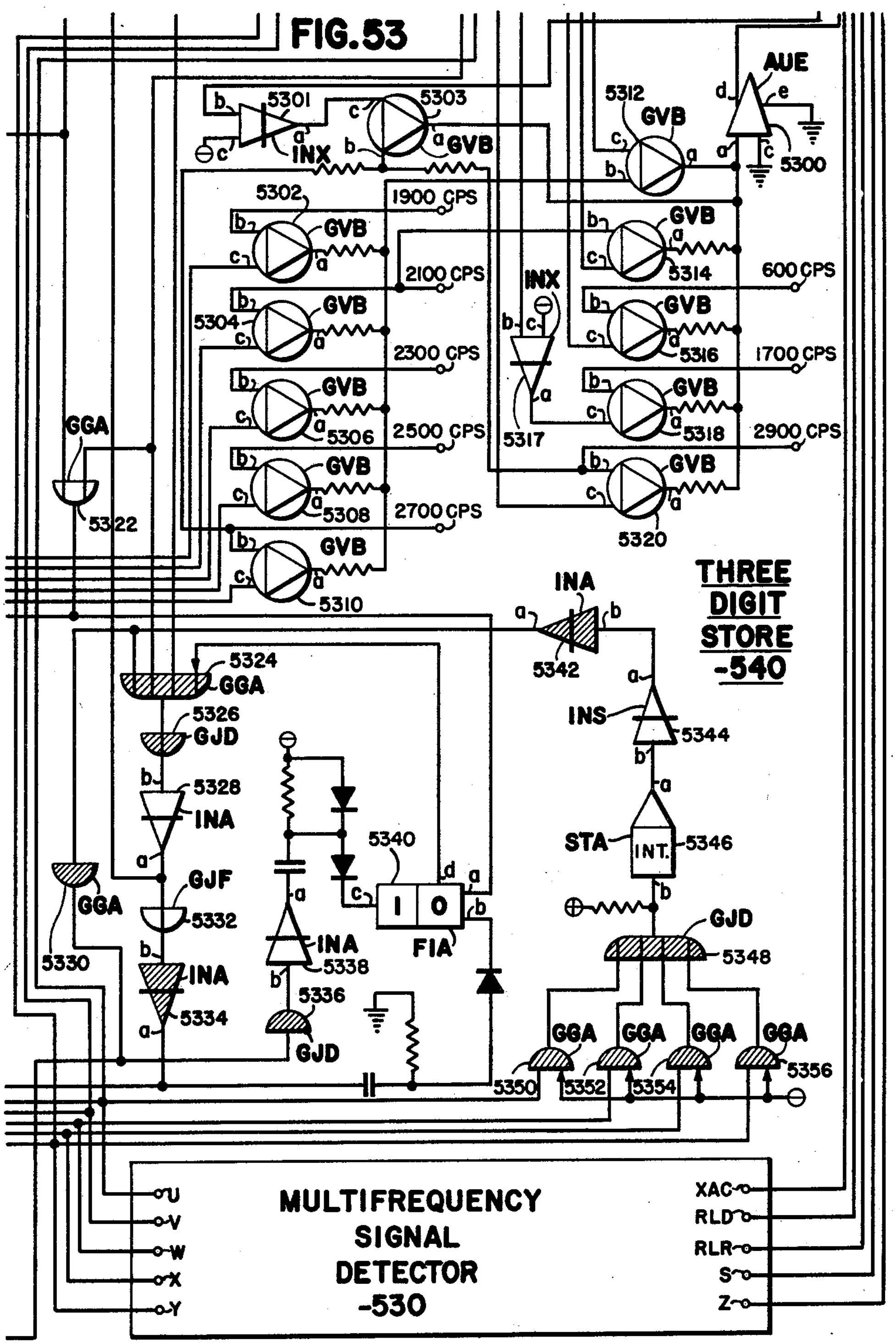

The subscriber register one 500 (FIGS. 47–53) as well as the subscriber register two 600 and the subscriber register three 610 each include a control connector 510 (FIG. 47), a calling time store (FIGS. 48–49), a three digit store 540 (FIGS. 50–53), and the multifrequency signal detector 530 (FIG. 53). When the seizure control unit 400 detects a seize tone from a line or trunk, a register demand signal is forwarded to the subscriber register allotter 620 so that an idle and preallotted one of the three subscriber registers 500, 600 and 610, such as the subscriber register one 500, is rendered effective. The calling time store 520 in the assigned subscriber register 500 stores the calling highway number and time position and, in response to the storage of this information, operates the control connector 510 so that the calling circuit is connected to the multifrequency detector 530.

When the calling time store 520 satisfactorily completes the storage of the calling highway and time slot, this circuit conditions the three digit store 540 to receive digital information. The controlling register or the subscriber then transmits the necessary digits identifying an operator position, an outgoing trunk, or a local subscriber to the detector 530. These digits or digit are registered in the store 540. At the completion of the storage of the necessary digits, the register finder 630 receives a demand signal from the subscriber register 500 and associates this subscriber register with the routing control unit 700. In response to this operative association, the information collected in the three digit store 540 is transferred to the routing control unit 700. When the unit 700 determines the availability of the selected circuit, the calling highway and time slot information from the calling store 520 and the called circuit designation from the routing control unit 700 are forwarded to an idle one of the links, such as the link 800.

In the normal condition of the calling time store 520 (FIGS. 48 and 49), a plurality of flip-flops 4905, 4910 and 4950 are in a reset or normal condition in which a negative potential is supplied to their output terminals "*e*." However, a flip-flip 4955 is in a set condition when the calling time store 520 in the subscriber one register 500 is in an idle condition. Thus, ground potential is applied to its output terminal "*e*" and a negative potential is supplied at its output terminal "*d*." This negative potential is forwarded through a resistance element 4956 to the BF terminal of the subscriber register allotter 620 (FIG. 49) to indicate the idle condition of the subscriber one register 500. The allotter 620 is illustrated and described in detail in the above identified Tubinis et al. application. Similarly, the negative potential at the terminal "*d*" of the flip-flip 4955 is forwarded through a resistor 4957 to the "*b*" terminal of an inverter 4960. However, the inverter 4960 is not placed in conduction inasmuch as the "*c*" terminal thereof is maintained at a negative potential through a resistor 4961.

As set forth in detail above in the description of the seizure control unit 400, the seize detector control 430 forwards a demand signal to the terminal ICD of the subscriber register allotter 620 when a seize tone is received from a calling line. If the subscriber register one 500 is marked as idle by the application of the negative potential to the BF terminal of the allotter 620 that is individual to this subscriber register and, if the subscriber register one has been prealloted by the subscriber register allotter 620, the application of the demand signal to the terminal ICD operates the allotter 620 to ground the RC terminal in the allotter 620 that is individual to the subscriber register one 500. This places the inverter 4960 in conduction so that the output thereof rises to ground. In addition, the subscriber register allotter 620 returns a signal to the seize detector control circuit 430 from the terminal DA to indicate that an idle subscriber register, such as the subscriber register 500, has been allotted to receive the calling highway and time slot information.

As described in detail above, the receipt of the signal from the terminal DA operates the seizure control unit 400 to transmit the calling highway and time slot information to the effective subscriber register one 500. In the illustrative example used in describing the operation of the seizure control unit 400, the call is placed from the subscriber station A which occupies the first time position on highway one. Thus, when this information is read out of the seize detector control 430 to the subscriber register one 500, ground is applied to the terminals CH0 and CH1 and the terminals CH2, CH4 and CH7 remain at a negative potential. Similarly, the time slot information is read out of the seize detector control 430 in the form of positive-going pulses of 15 microseconds duration which repetitively appear in the first time position and which are applied to a terminal CS (FIG. 49) of a calling time slot storage counter 4900. Thus, the allocation of the subscriber register 500 to receive the calling highway and time slot information from the seizure control unit 400 causes this unit to transmit this information.

As described above, when the subscriber register 500 is allotted for use by the subscriber register allotter 620, the inverter 4960 is placed in operation so its output terminal "*a*" rises to ground potential. This provides a positive-going signal which is coupled through a gate 4965 to be applied to the "*c*" terminal of the flip-flip 4950. This shifts the flip-flip 4950 to its set condition so that its "*d*" terminal drops to a negative potential and its "*e*" terminal rises to ground potential. The application of a negative potential to the "*d*" terminal of the flip-flip 4950 partially enables a gate 4945 so that a timing operation is initiated during which the proper operation of the calling time store 520 and the three digit store 540 is checked. The positive-going signal applied to the "*e*" terminal of the flip-flip 4950 triggers a monostable multivibrator 5115 in the three digit store 540 into an operative condition. The triggering of the monostable multivibrator 5115 places the three digit store 540 in operation.

The positive-going signal provided by placing the inverter 4960 in conduction is also effective through a pair of gates 4971 and 4972 to render an inverter 4970 nonconductive. This provides a negative-going signal which causes the calling time slot to be stored in the counter 4900 and the number of the calling highway to be stored in a static register in the calling time store 520 which includes a plurality of units 4830–4834. In order to store the calling highway number in the calling time store 520, the negative-going signal provided at the output of the inverter 4970 is effective through a pair of gates 4842 and 4841 in the static storage unit 4830 to reduce the potential applied to the "b" terminal of an inverter 4840. Since the terminal CH0 was placed at ground potential by the seizure control unit 400 as described above, the "c" terminal of the inverter 4840 is at ground, and this inverter is rendered conductive by the negative potential applied to the "b" terminal thereof. When the inverter 4840 is placed in conduction, a positive-going signal is applied to the "e" terminal of a flip-flip 4844, thereby to operate this flip-flip to its set condition. In this condition, the "d" terminal drops to a negative potential and the "e" terminal rises to ground potential. The ground potential at the "e" terminal conditions a readout inverter 4843 for operation also conditions an inverter 4820 in a highway one busy test unit 4801 for operation.

The static storage units 4831–4834 are identical to the units 4830 and receive input signals from the terminals CH1, CH2, CH4 and CH7. Since only the terminal CH1 is at ground potential, only the unit 4831 is operated in the manner described above in conjunction with the unit 4830 so that the terminal "e" of the flip-flip 4844 in the unit 4831 rises to ground potential and the "d" terminal of this flip-flip drops to a negative potential. This negative potential is forwarded through a resistor 4835 to the "b" terminal of the inverter 4820 in the unit 4801 to place this inverter in conduction.

The busy test unit 4801 and a plurality of identical busy test units 4802–4810 represent the highways one to ten, inclusive, and a selected one of these units is conditioned for operation under the control of the designation of the calling highway stored in the static storage units 4830–4834. The selective operation of any combination of two of the units 4830–4834 conditions a single one of the units 4801–4810 in operation in accordance with the designation of the calling highway. Since the calling substation A is on highway one, only the unit 4801 is conditioned for operation. More specifically, when the inverter 4820 is rendered conductive, the resistive input of a gate 4821 is elevated to ground potential so that the gate 4821 is enabled to pass negative-going pulses to the input of a high speed inverter 4822.

The ground potential provided at the output of the inverter 4820 is also forwarded to the control connector 510 (FIG. 47) to condition this control connector for connecting the multifrequency signal detector 530 and the three digits store 540 to the proper time slot on the calling highway. More specifically, this ground potential is forwarded to the "d" terminal of a blocking oscillator gate 4701 that is individual to the send path on highway one and to the "d" terminal of a blocking oscillator gate 4711 that is individual to the receive path on highway one. The blocking oscillating gate 4701 is one of ten such gates 4701–4710, each of which is individual to the send path on one of the ten highways. Similarly, the blocking oscillator gate 4711 is one of ten similar gates 4711–4720, each of which is individual to the receive path on one of the ten highways. Thus, the send gate 4701 for highway one and the receive gate 4711 for highway one are conditioned for operation by the storage of the highway one designation in the static registers 4830–4834.

The negative potential provided at the output of the inverter 4970 is used to control the entry of the calling time slot into the calling time slot storage counter 4900. This counter is of the type described in detail in the above identified Tubinis et al. application. Thus, when a negative potential is applied to the clamp B terminal, the set terminal of the storage counter 4900 is rendered responsive to the positive-going 15 microsecond time slot pulses applied to the CS. In response to the application of these pulses to the set terminal of the storage counter 4900, this counter operates to supply a 2.5 microsecond negative-going busy pulse to the busy pulse out terminal of the counter 4900 and a 1.25 microsecond slot negative-going pulse to the time pulse out terminal of the counter 4900. The time or slot pulse occurs during the latter portion of the negative-going busy pulse. The busy pulse is applied in common to all of the gates in the units 4801–4810 similar to the gate 4821 in the busy test unit 4801. Since only the gate 4821 has been enabled, the busy pulses occurring in the time position of the calling line or trunk are transmitted through only the gate 4821, the high speed inverter 4822, and a gate 4823 to be applied to the busy output terminal BT1 of the unit 4801. This terminal, as well as the output terminals of the remaining units 4802–4810, are connected to the common busy test conductors in the local board 150 to busy out the calling circuit.

The negative-going pulse applied to the time pulse out terminal is supplied in common to a plurality of gates 4725 connected to the "c" terminals of the ten blocking oscillator gates 4701–4710 associated with the send paths of the ten highways and to ten gates 4735 connected to the ten blocking oscillator gates 4711–4720 associated with the receive paths on the ten highways. As described above, only the blocking oscillator gates 4701 and 4711 associated with the send and receive paths on highway one are conditioned for operation by the application of ground to the "d" terminals thereof from the busy test unit 4801. Thus, the negative-going slot pulses in the first time position supplied by the calling time slot storage counter 4900 are effective to interconnect the send path of highway one with the multifrequency signal detector 530 and to associate the receive path of highway one with various signal sources in the three digit store 540.

More specifically, the send path of highway one is connected through the blocking oscillator gate 4701 and a low pass filter 4721 to the primary winding of a transformer 4730. The secondary winding of this transformer is connected to the input of an amplifier 4740, and the output of this amplifier is connected to the XAC input terminal of the multifrequency signal detector 530 (FIG. 53). Thus, single or multifrequency signals representing control or digital information which appear in the first time position on highway one are coupled to the input of the multifrequency signal detector 530. In a similar fashion, the output of an audio amplifier 5300 in the three digit store 540 is connected through a coupling transformer 4760 and a filter 4750 to the input of the blocking oscillator gate 4711. The blocking oscillator gate 4711 is opened in the first time position by the pulses supplied by the calling time slot storage counter 4900 so that the output of the amplifier 5300 is coupled to the receive path of highway one.

In addition, the time pulse supplied at the time pulse out terminal of the storage counter 4900 is forwarded to the diode input of a gate 4983 to provide a means for reading out the time position stored in the counter 4900. These negative-going pulses are not coupled through the gate 4983 inasmuch as the resistance input of this gate is held at a negative potential by a normally nonconductive inverter 4982.

Referring back to the above described operation of the calling time slot storage counter 4900 to store the time position of the calling line or trunk, this counter operates to supply a positive-going pulse to a monitor terminal in response to the storage of the incoming time pulse. This positive pulse is applied to the "a" terminal of the flip-flip 4955 so that this circuit is restored to its normal or reset condition in which the terminal "e" is supplied with a negative potential and the terminal "d" rises to ground potential. The negative potential at the terminal "e" provides another enabling potential for the timing alarm gate 4945 so that the open or closed condition of this gate is dependent upon the signal applied to a terminal MS. The ground potential applied to the terminal "d" is forwarded through the resistance 4956 to mark the subscriber register one 500 as being busy in the subscriber register allotter 620. This ground potential is also forwarded from the terminal "*d*" through the resistance 4957 to terminate the conduction of the inverter 4960. The output of this inverter then drops to a negative value. This drop in potential does not affect the flip-flip 4950 but operates to block the gates 4971 and 4972 so that the inverter 4970 is again placed in a conductive condition to reduce the potential at the output thereof to ground. This ground potential is effective at the clamp B terminal of the calling time slot storage counter 4900 to render this counter nonresponsive to pulses subsequently applied to the set terminal. Thus, the storage counter 4900 remains in a condition in which busy and time pulses are generated in the time position of the calling line or trunk. Similarly, the ground potential applied to the plurality of gates in the units 4830–4834 similar to the gates 4842 prevents the response of these static highway stores to additional signals provided at the input terminals CH0, CH1, CH2, CH4 and CH7. Thus, the calling highway designation and the calling time slot stored in the calling time store 520 can not be varied.

When the three digit store 540 receives and processes a sufficient amount of called circuit information and transfers this data to the routing control unit 700, the calling time store 520 and the unit 700 are operated to transfer the calling and called circuit designations to an idle one of the links, such as the link 800. To read the calling highway and time slot to the link, an inverter 5001 in the three digit store 540 is rendered conductive to apply ground to the diode input of a gate 4977. The output of this gate rises to ground and is effective through a gate 4976 to terminate conduction in an inverter 4975. The output of the inverter 4975 now drops to a negative value so that the output of a gate in each of the units 4830–4834, similar to a gate 4846, drops to a negative potential. This potential is effective through a gate 4845 in each of the units 4830–4834 to apply a negative potential to the "*b*" terminal of the inverter 4843. At this time, the "*c*" terminals of only two inverters 4843 in all of the units 4830–4834 are at ground potential, these two units being determined by the designation of the calling highway previously stored therein. In the illustrative example described above, the static highway storage units 4830 and 4831 are in an operative condition. Thus, the inverters 4843 in the units 4830 and 4831 are placed in conduction so that the terminals CH0 and CH1 are grounded to mark the designation of the calling highway on the common calling highway conductors. The selected link is enabled to store this designation.

The negative potential supplied at the output of the inverter 4975 is also used to control the retransmission of the calling time slot to the selected link. More specifically, when the output of the inverter 4975 drops to a negative potential, this potential is effective through a pair of gates 4980 and 4981 to place an inverter 4982 into conduction. When the inverter 4982 is placed in conduction, its output rises to ground to enable the gate 4983 to supply negative-going pulses from the time pulse out terminal of the storage counter 4900 to the input of a high speed inverter 4985. This inverter is periodically driven into conduction in the time position of the calling line or trunk circuit to provide positive-going pulses which are coupled through a gate circuit 4990, an emitter follower 4991, and a gate circuit 4995 to be applied to an output terminal CS as positive-going pulses of 1.25 microseconds duration. These pulses, which appear in the first time position in the illustrative example, are supplied to a time pulse regeneration circuit to provide a positive-going pulse of 15 microseconds duration which is applied to the selected link. Thus, the conduction of the inverter 5001 in the three digit store 540 causes the calling time store 520 to transmit a two out of five coded designation of the calling highway and the time position of the calling line or trunk on the highway to the selected link.

When the necessary information has been transferred from subscriber register one 500 to one of the links or at any other time at which the subscriber register 500 is to be restored to its normal or reset condition, a flip-flip 5120 in the three digit store 540 is operated to its set condition so that ground potential is applied to the "*a*" terminal of the flip-flip 4950 and the "*a*" terminals of the flip-flips 4844 in the static storage units 4830–4834. This restores the flip-flip 4950 to its reset condition to arrest the alarm timing operation. The restoration of the flip-flips in the static highway storage units 4830–4834 clears these storage units so that they are capable of receiving the designation of the next calling highway. This ground potential is also applied to the reset terminal of the calling time slot storage counter 4900 so that the calling time position previously stored therein is cleared and the counter 4900 is conditioned to receive and store the next calling time position.

In addition to providing this reset signal, the operation of the flip-flip 5120 in the three digit store 540 to its set condition, forwards a reset signal to the multifrequency signal detector 530 so that a self-checking operation is performed therein to determine the operability of the frequency responsive channels therein. At the satisfactory completion of this checking operation, a positive-going pulse is applied to the "*b*" terminal of the flip-flip 4905 and to the "*c*" terminal of the flip-flip 4955. The pulse applied to the "*b*" terminal of the flip-flip 4905 restores this flip-flip to its reset condition if this circuit has been operated to its set condition during the operation of the calling time store 520. The positive pulse supplied to the "*c*" terminal of the flip-flip 4955 operates this circuit to its set condition so that negative potential is applied to the "*b*" terminal of the inverter 4960 and to the BF terminal of the subscriber register allotter 620. The restoration of the negative potential to the BF terminal individual to the subscriber register one 500 advises the allotter 620 that this circuit component is idle and can be used in controlling the establishment of a subsequent call.

*Alarm Facilities in the Calling Time Store 520*

The calling time store 520 includes means for automatically establishing an alarm condition and resetting the subscriber register one 500 if the use of this circuit in establishing a connection is not completed within a predetermined period of time. As described above, the flip-flip 4950 is operated to a set condition when the subscriber register 500 is seized under the control of the allotter 620 and conditioned to receive information from the seizure control unit 400. When the flip-flip 4950 is operated to this condition, a negative potential is supplied from its terminal "*d*" to the resistance input of the gate 4945. When the calling time slot storage counter 4900 is subsequently actuated to store the time slot of the calling line or trunk, the flip-flip 4955 is operated to its reset condition so that a negative potential is supplied from its "*e*" terminal to one of the diode inputs to the gate 4945. Thus, the condition of the gate 4945 is now controlled by the potential applied to a terminal MS.

The terminal MS and another terminal MZ are connected to a conventional source of timing signals. This timing source provides a 5 millisecond negative-going pulse to the terminals MS and MZ at one minute intervals, the pulse supplied to the terminal MZ preceding the pulse to the terminal MS by several milliseconds. Thus, when the first negative-going pulse is applied to the terminal MS, the gate 4945 and a gate 4940 place an inverter 4935 in conduction. The inverter 4935 supplies ground to the "*e*" terminal of the flip-flip 4905 so that this circuit is operated to its set condition. In doing so, a negative potential is supplied from its "*d*" terminal to the resistance input of a gate 4930, the diode input of which is connected to the terminal MZ.

Since the negative-going pulse of the terminal MZ precedes the signal applied to the terminal MS, the MZ terminal does not supply a negative-going pulse until one minute has elapsed following the pulse supplied to the terminal MS. If the subscriber register one 500 is not released within a one minute interval, the negative-going pulse applied to the terminal MZ is effective through the enabled gate 4930 and another gate 4920 to place an inverter 4915 in conduction. When the inverter 4915 is placed in conduction, the alarm flip-flip 4910 is operated to its set condition to provide an operating signal to indicate the alarm condition in the subscriber register one 500. The positive potential supplied to the output of the inverter 4915 is also forwarded through a gate 4925 to the *"g"* terminal of the flip-flip 4955. This potential holds the flip-flip 4955 in its reset condition so that ground is forwarded through the resistance 4956 to advise the subscriber register allotter 620 that the subscriber register one 500 is in a busy condition. This prevents the seizure of this unit during the extension of subsequent connections. The ground potential supplied at the output of the inverter 4915 is also forwarded through a diode 5106 to the *"c"* terminal of the reset flip-flip 5120 in the three digit store 540. This pulse operates the flip-flip 5120 to its set conditions so that ground potential is again supplied to the reset conductor to restore the calling time store 520 and the three digit store 540 to their normal conditions. The operation of the flip-flip 5120 also triggers the self-checking of the multifrequency signal detector 530 so that, as described in detail above, a positive pulse is applied to the *"b"* terminal of the flip-flip 4905 and the *"c"* terminal of the flip-flip 4955. The reset pulse supplied to the flip-flip 4905 restores this circuit to its reset condition and thus closes the gate 4930 so that the inverter 4915 is rendered nonconductive. This removes the ground potential formerly supplied through the gate 4925 to the *"g"* terminal of the flip-flip 4955. However, this terminal is clamped to ground at the *"e"* terminal of the alarm flip-flip 4910. Thus, the positive pulse supplied to the *"c"* terminal of the flip-flip 4955 is not effective to operate this circuit to its set condition. Accordingly, ground potential remains on the BF terminal individual to the subscriber register one 500 in the allotter 620 to prevent the seizure of this subscriber register. The alarm flip-flip 4910 can be restored to a normal condition by automatically or manually closing a switch 4911 to apply ground to the *"a"* terminal thereof. When the flip-flip 4910 is restored to normal, the flip-flip 4955 can be operated to a set condition to mark the subscriber register one 500 as available for use.

*Operation of the Three Digit Store 540 on a Call Between Two Subscribers Served by the Local Board 150*

The three digit store 540 operates on a direct or noninterlocking basis for calls extended from one subscriber station, such as the station A, served by the local board 150 to another station, such as the unit B, that is also served by this local board. As described above, when the identity of the calling highway and the time slot thereon is stored in the calling time store 520, a start signal is forwarded to the three digit store 540 and the control connector 510 is placed in operation to connect the calling line or trunk to the input of the multifrequency signal detector 530. In response to the receipt of the start signal, the three digit store 540 checks to insure that the seize signal on the calling highway and time slot is valid and then returns dial tone through the control connector 510 to the calling line or trunk to advise the calling subscriber that the three digits designating the called substation served by the local board 150 are to be dialed.

The calling subscriber then dials a digit "1" or "2" followed by two other digits which are transmitted through the control connector 510 and received by the multifrequency signal detector 530. These three digits are then stored in three shift registers and the value of the first dialed digit, i.e., "1" or "2," is detected to condition the three digit store 540 for operating to extend only a local call. When the three digit store 540 determines that the necessary three digits have been stored, a demand signal is forwarded to the register finder 630 so that the routing control unit 700 is conditioned to receive the called party information from the subscriber register 500. When the routing control unit 700 is available, the register finder 630 returns a signal to the three digit store 540 which transfers the values of the three digits identifying the called line to the routing control unit. The unit 700 converts the three digits into information representing the highway and time slot of the called station, and the routing control unit 700 and the calling time store 520 then operate to supply this information to an idle one of the links 800 or 900. When this information has been stored in one of the links, the routing control unit 700 and the subscriber register 500 are released and restored to normal.

Referring now more specifically to the detailed operation of the three digit store 540, a positive-going pulse is supplied from the flip-flip 4950 to the *"d"* terminal of the monostable multivibrator 5115 when the calling time store 520 in the subscriber register 500 is conditioned to receive information from the seizure control unit 400 by the allotter 620. This positive-going pulse places the multivibrator 5115 in conduction so that a 20 millisecond negative pulse is applied to its output terminal *"a."* At the end of this delay interval, the terminal *"a"* returns to ground to drive a positive-going pulse into the *"b"* terminal of an inverter 5122 to render this inverter nonconductive so that a negative potential is supplied to the *"d"* terminal of an inverter 5107 through a gate 5119. The *"c"* terminal of this inverter is connected to the S output terminal of the multifrequency signal detector 530. If, during the 20 millisecond delay interval, a seize signal is not received at the input terminal XAC of the multifrequency signal detector 530 from the control connector 510, the response of the subscriber register 500 is assumed to be due to a spurious signal of the frequency of the seize signal, and the register 500 is returned to a reset condition. Since the multifrequency detector 530 fails to receive a seize tone, the terminal *"c"* of the inverter 5107 remains at ground potential and the negative signal supplied through the gate 5119 places this inverter in conduction. This drives a positive-going pulse through a diode 5103 to the *"c"* terminal of the reset flip-flip 5120. The operation of the flip-flip 5120 restores the calling time store 520 and the three digit store 540 to a normal condition.

However, assuming that the seize signal that originally placed the subscriber register 500 in operation is a valid one and persists so as to be detected by the multifrequency detector 530 on the calling highway and time slot stored in the calling time store 520, the S terminal of the detector 530 drops to a negative potential during the 20 millisecond delay period of the multivibrator 5115. This potential is applied to the *"c"* terminal of the inverter 5107 to prevent this inverter from being placed in conduction when the inverter 5122 is rendered nonconductive. The inverter 5122 returns to a conductive condition so that its output and that of the gate 5119 rises to ground after a delay interval of approximately 50 microseconds. Thus, the three digit store 540 is enabled to continue a normal cycle of operation only when a seize signal is received through the control connector 510 from the calling highway and time slot during the 20 millisecond test interval.

The positive pulse provided at the output terminal *"a"* of the component 5115 is also applied through a diode 5139 to the *"b"* input terminal of a monostable multivibrator 5138. This pulse places the monostable multivibrator 5138 in operation so that an output terminal *"a"* thereof drops to a negative potential for a delay interval of around 130 milliseconds and then returns to ground potential. This return to ground potential provides a positive pulse which is applied to the *"c"* terminal of a dial tone control flip-flip 5146. This pulse operates this component to its set position in which a negative potential is applied to its terminal "*d*." This potential provides one enabling input for a pair of gates 5136 and 5153 and is also forwarded to the "*c*" terminal of an audio gate 5316, the "*b*" terminal of which is connected to a 600 c.p.s. signal source. The application of the negative potential to the "*c*" terminal of the gate 5316 opens this gate so that a 600 c.p.s. signal is applied to the "*a*" terminal of the audio amplifier 5300. As described above, the "*d*" output terminal of this audio amplifier is connected through the control connector 510 to the calling highway and time slot. Thus, the setting of the dial tone control flip-flip 5146 causes the return of dial tone to the calling subscriber at the substation A to advise him that the three digits designating the local subscriber station B can be dialed.

Upon receipt of the dial tone, the subscriber at the calling substation A sequentially dials the three digits identifying the called substation B, for example, "145." As illustrated in FIG. 84 of the drawings, each of these digits comprise two code signals from the group including U, V, W, X and Y. These control signals each consists of a tone of a different frequency so that, when the first digit "1," for instance, is transmitted at the station A, 2100 c.p.s. and 2300 c.p.s. signals are applied to the calling highway in the calling time position and are applied through the control connector 510 to the input of the multifrequency signal detector 530. These signals appear at two of the five output terminals U, V, W, X and Y of the detector 530 as negative-going pulses having a duration of from 25 to 100 milliseconds. These signals are used to control the storage of the three transmitted digits in a first digit register comprising five identical storage units 5090–5094, a second digit register comprising five identical storage units 5200–5204, and a third digit register comprising five identical storage units 5220–5224. The incoming digits are stored in the third digit register under the control of the multifrequency signal detector 530 and then successively shifted to the other registers.

Because of fading or noise, it is possible that the signals supplied to the output terminals of the detector 530 may include short breaks which would be stored by the three digit store 540 as successive digits of like value. Further, because of the fact that control and speech information are carried on the same transmission path formed by the calling highway and time slot, it is possible that components of speech signals will coincide with the frequencies of the code signals and thus, inaccurate digits which would be stored in the three digit store 540. To prevent this type of improper operation, the three digit store 540 includes means for integrating the output signals from the detector 530 to insure that the received signals are of sufficient duration to be true control signals and to also bridge over short breaks in the output of the detector to prevent the inadvertent storage of successive digits of equal value. The three digit store 540 further includes a two out of five checking circuit that insures that a true code combination is received by the detector 530 before the received signals can be used to control the storage of a digit in the three digit store 540.

To provide the two out of five check, the terminals U, V, W, X and Y of the detector 530 are connected to ten "AND" gates 5241–5250 in accordance with the code illustrated in the table in FIG. 84 so that each one of these gates is enabled by one of the ten digits representing codes. In the illustrative example, the first transmitted digit is "1" so that negative-going pulses are applied to the terminals V and W. When the negative-going pulses at these two terminals coincide, the output of only the "AND" gate 5241 drops to a negative potential which is applied through an "OR" gate 5252 to a gate 5336. However, the input to the gate 5336 is held at ground potential through a gate 5330, the input of which is controlled by a normally conductive inverter 5342. Thus, one of the inputs to the gate 5336 is enabled only when signals of both of the frequencies in the code representing a given digit are concurrently applied to the output of the signal detector 530.

To provide means for insuring that the signals are of sufficient duration and to provide means for bridging short breaks in the output from the detector 530, the terminals U, W, X and Y are connected to four "AND" gates 5350, 5352, 5354 and 5356. Whenever negative-going pulses appear at one of these terminals, one of the gates 5350, 5352, 5354 and 5356 provides negative-going pulses at its output which are effective through an "OR" gate 5348 to control the input to an integrator trigger 5346. After a suitable delay interval and if the input signals persist, the output of the integrator trigger 5346 drops to a more negative potential so that an inverter 5344 is cut off. At this time, the output of this inverter rises to ground so that an inverter 5342 is rendered nonconductive. This is effective through the gate 5330 to drop the second input to the gate 5336 to a negative potential so that an inverter 5338 is rendered conductive to indicate that a proper two out of five code has been received and that the signals have persisted for a sufficient period of time. When the inverter 5338 is placed in conduction, a positive-going pulse is applied to the "*c*" terminal of a flip-flip 5340 to operate this circuit to its set condition.

The operation of the flip-flip 5340 causes the storage of the first transmitted digit in the third digit register including the identical units 5220–5224. The input to each of these units is controlled by one of a plurality of "AND" gates 5230. One of the inputs to each of these gates is tied to one of the output terminals U, V, W, X and Y of the signal detector 530 so that the units 5220–5224 are adapted to be operated to a pattern of set conditions by the negative-going pulses applied to the terminals Y, X, W, V and U, respectively. The other input to each of the "AND" gates 5230 is a common lead that extends to the output of a normally conductive inverter 5334. Thus, the outputs of the plurality of gates 5230 are normally clamped to ground.

When the two out of five and duration checks have been completed, as indicated by the setting of the flip-flip 5340, the gates 5230 are enabled so that the value of the first transmitted digit "1" is stored in the third digit register by operating two of the units 5220–5224 therein to a set condition. More specifically, when the flip-flip 5340 is operated to a set condition, the "*d*" terminal drops to a negative potential which is forwarded to the resistive input to an "OR" gate 5324. As described above, the inverter 5342 has been operated to a nonconductive condition so that a negative potential supplied to one of the inputs of the gate 5324. Thus, when the resistive input drops to a negative potential, this negative potential is forwarded through a gate 5326 to the input of an inverter 5328. This places the inverter 5328 in conduction so that the output thereof rises to ground and is effective through a gate 5332 to render the inverter 5334 nonconductive. Thus, the output of this inverter drops to a negative potential and enables the five gates 5230. The gates associated with the units 5222 and 5223 are provided with negative pulses from the terminals V and W and thus, these two units are actuated to a set condition to store the VW code representing the first dialed digit "1."

More specifically, when the leading edge of one of the negative-going pulses is applied to the two gates 5230, the outputs of these two gates drop to a negative potential. When the trailing edge of the pulses are applied to the gates, the outputs thereof rise to a positive potential and supply positive-going pulses to the "*c*" terminals of a pair of flip-flips 5226 in the units 5222 and 5223. This operates these two flip-flips to their set condition in which ground potential is applied to the "*e*" terminals thereof and a negative potential is applied to the "*d*" terminals thereof. The operation of the flip-flips 5226 in the units 5222 and 5223 stores the first transmitted digit "1" in the third digit register. The repeated application of positive pulses to these flip-flips under the control of the detector 530 does not vary the settings of these registers after they have been operated to their set condition.

When one of the "c" terminals of the flip-flips 5226 rises to ground potential, a gate 5228 is opened so that the negative potential normally supplied to an "OR" gate 5158 through a resistor 5160 is elevated to ground. This provides a positive-going pulse that is coupled to the "b" terminal of the dial tone flip-flip 5146 to operate this flip-flip to its reset condition. When the flip-flip 5146 is reset, ground is returned to the "d" terminal so that the output of the gate 5158 is clamped at ground potential. The ground potential at the "d" terminal of the flip-flip 5146 is also forwarded to the "c" terminal of the audio gate 5316 so as to close this gate. This terminates the application of the 600 c.p.s. dial tone to the calling highway and time slot and thus removes dial tone from the calling substation A.

The digit stored in the third digit register is now transferred or shifted to the second digit register comprising the units 5200–5204 and is then shifted to the first digit register including the units 5090–5094. When the "d" terminals of the flip-flips 5226 in the units 5222 and 5223 drop to a negative potential, this potential is forwarded to the resistive inputs of two "AND" gates 5208 which are connected to the inputs of the storage units 5202 and 5203 in the second digit register, which storage units correspond to the units 5222 and 5223 in the first digit register. However, these gates are only partially enabled by the application of negative potential thereto inasmuch as the diode inputs to all of the gates 5208 remain at ground potential at the output of an "OR" gate 5064. The digit "1" is transferred from the third digit register to the second digit register by the application of a negative-going pulse through the "OR" gate 5064 to the five gates 5208.

The termination of the transmission of the two different frequency tones from the calling substation A representing the digit "1" operates the three digit store 540 to provide two shift pulses for shifting the stored digit "1" from the third digit register through the second digit register to the first digit register. More specifically, when the inverter 5328 is rendered conductive, the ground signal at its output terminal "a" is also forwarded through an "OR" gate 5011 and a gate 5010 to the input of an inverter 5008. This signal renders the inverter 5008 nonconductive so that its output drops to a negative potential. This prepares an inverter 5007 for being placed in a nonconductive condition.

When the signals representing the digit "1" are removed, the negative-going pulses disappear from the terminals V and W in the detector 530 so that input signals no longer are applied to the gates 5230, 5241–5250, 5350, 5352, 5354, and 5356. After a time delay sufficiently long to bridge inadvertent breaks in the output signals provided by the detector 530, the components 5346, 5344, 5342, 5330, 5336 and 5338 restore to a normal condition. This also removes the negative potential forwarded through the gates 5324 and 5326 so that the inverter 5328 is rendered nonconductive and the output thereof drops to a negative potential. This is effective through the gate 5332 to place the inverter 5334 in conduction so that the output thereof drops toward ground potential. This ground potential disables the input gates 5330 to the third digit register and prevents the storage of additional information in the three digit store 540 at this time. This elevation in the output potential of the inverter 5334 also provides a positive-going pulse that is coupled to the "b" terminal of the flip-flip 5340 so that this unit is restored to its normal condition in which the output potential at its "d" terminal is at ground. This clamps the input of the inverter 5328 at ground to prevent its reoperation until such time as the signal duration and two out of five checks are again satisfactorily completed when the next digit to be stored is received.

When the output of the inverter 5328 drops to a negative potential, this potential is effective through the gates 5010 and 5011 to place the inverter 5008 in conduction. This drives a positive pulse into the "b" terminal of the inverter 5007 so that a 100 microsecond negative-going pulse appears at the output of this inverter. This negative pulse is applied through the gates 5064 to the diode input of the gate 5205, thereby enabling these gates to be controlled by the settings of the flip-flips in the units 5220–5224. As described above, the units 5222 and 5223 have been set so that a negative potential is applied to the resistance input of the gates 5208 associated with the units 5202 and 5203. Thus, the outputs of these two gates 5208 drop to a negative potential.

At the end of the 100 microsecond delay interval, the inverter 5007 returns to a conductive condition so that the output thereof rises to ground potential. This positive-going pulse places an inverter 5068 in conduction so that its output terminal "a" provides a 100 microsecond negative-going pulse. The positive-going pulse provided the output of the inverter 5007 is transmitted through the gate 5064 to the five gates 5208 associated with the input to the second digit register. At this time, the outputs of the gates 5208 conected to the units 5202 and 5203 rise to ground potential and provide a positive-going pulse which operates the flip-flips 5206 in these two units to their set condition. Further, the positive-going pulse provided the output of these two gates is returned to the "b" terminals of the two operated flip-flips 5226 in the units 5222 and 5223 in the third digit register. The application of a positive pulse of the "b" terminals of these flip-flips restores them to their reset condition. In doing so, the negative potential is removed from the resistane inputs of the two gates 5208 connected to the units 5202 and 5203 in the second digit register.

When the flip-flips 5206 in the units 5202 and 5203 are operated, the negative potential applied to their "d" terminals is forwarded to the resistance inputs of a pair of gates 5096 connected to the units 5092 and 5093 in the first digit register. This conditions these units for being set when ground is applied to the diode inputs thereto from the output of an inverter 5076. The negative potential from the "d" terminals of the flip-flips 5206 in the units 5202 and 5203 is also forwarded to the input of an "OR" gate 5080 to place an inverter 5066 in conduction. The output of the inverter 5066 drops to ground and clamps the diode inputs to the gates 5208 in the second digit register at ground.

To provide a second shift pulse for transferring the stored digit "1" from the second digit register to the first digit register and for resetting the second digit register, the inverter 5068 returns to a conductive condition at the end of the 100 microsecond delay period and drives a positive-going pulse into the input of an inverter 5070. This renders the inverter 5070 nonconductive so that the output thereof drops to a negative potential. This potential is effective through a gate circuit 5074 to place the inverter 5076 in conduction so that the output thereof rises to ground potential. This sends positive-going pulses through the gates 5096 associated with the units 5092 and 5093 to reset the flip-flips 5206 in the units 5202 and 5203 in the second digit register. These positive pulses are also effective to set the flip-flips 5095 in the units 5092 and 5093. At this time, the second and third digit registers have been reset to a normal condition and the first digit register has been operated to store the digit "1" by the setting of the flip-flips 5095 in the units 5092 and 5093. When the units 5202 and 5203 in the second digit register are restored, the negative potentials forwarded to the gate 5080 are removed and the inverter 5066 returns to a nonconductive condition so that the ground clamp is removed from the gate 5064.

To provide means for reading the stored digit "1" out of the first digit register in the three digit store 540, the negative potentials at the "*d*" terminals of the set flip-flips 5095 in the units 5092 and 5093 are extended to the resistance inputs of two of five output gates 5086 in accordance with the code representing the stored digit. The output of the gates 5086 are connected to five gates 5084 and the outputs of these gates are connected to five terminals 1DU, 1DV, 1DW, 1DX and 1DY which are connected to the routing control unit 700 and the position register 1000. However, the two gates 5086 representing the V and W code signals are only partially enabled inasmuch as the diode inputs thereof are maintained at ground at the output of an inverter 5034.

The negative potentials at the "*d*" terminals of the set flip-flips 5095 in the units 5092 and 5093 are also extended through an "OR" gate 5082 and the gate 5074 to the input of the inverter 5076. This holds the inverter in a conductive condition so that the output thereof remains at ground. Thus, the five gates 5096 forming the input to the first digit register are clamped at ground potential to prevent the entrance of digital information. Thus, when the inverter 5070 returns to a conductive condition so that its output rises to ground, the removal of the negative potential from one of the inputs to the gate 5074 does not permit the inverter 5076 to restore to a nonconductive condition. The restoration of conduction in the inverter 5070 applies a positive-going pulse to the input of an inverter 5072 so that its output provides a negative-going pulse of 50 microseconds duration. This pulse is used to sample the valve of the digit stored in the first digit register, but it does not produce any useful results when the value of the digit stored therein is "1" or "2."

The three digit store 540 now operates to sample the value of the digit stored in the first digit register so as to determine the nature of the call that is to be extended. As described above, the present illustrative call is to be extended to a substation B that is also served by the local board 150. Thus, the value of the first dialed digit that is now stored in the first digit register is either "1" or "2." In order to initiate the test operation, the "*d*" terminal of the flip-flip 5095 in the unit 5093 which represents the V component of the digit "1" is connected to one input of an "OR" gate 5058, and the ground applied to the "*e*" terminal of the operated flip-flip in the unit 5092, which corresponds to the W component of the stored digit "1," is connected to the "*c*" terminal of an inverter 5054. The negative potential supplied through the "OR" gate 5058 is forwarded to the "*b*" terminal of the inverter 5054. Since the "*c*" terminal is connected to ground, the inverter 5054 is placed in conduction to represent the fact that the value of the digit stored in the first digit register is "1." When the digit "2" is stored in the first digit register, the units 5091 and 5092 are set. The negative potential from the "*d*" terminal of the flip-flip 5095 in the unit 5091 places a negative potential on the "*b*" terminal of the inverter 5054, and the ground potential from the "*c*" terminal of the flip-flip 5095 in the unit 5092 is again applied to the "*c*" terminal of the inverter 5054. Thus, the inverter 5054 is placed in conduction when the value of the digit stored in the first digit register is either "1" or "2." When the inverter 5054 is placed in conduction, the output of a gate 5042 is clamped at ground.

The subscriber at the calling substation A now transmits the second digit "4" of the designation of the called substation B, and this information is first stored in the third digit register by setting the flip-flips 5226 in the units 5223 and 5224 in the manner described above. This digit is then transferred into the second digit register by operating the flip-flips 5206 in the units 5203 and 5204. However, when the inverter 5070 is rendered nonconductive to supply an operating pulse to the inverter 5076 through the gate 5074, the digit "4" stored in the second digit register is not transferred to the first digit register inasmuch as the inverter 5076 has been maintained in a conductive condition by the first digit register through the "OR" gate 5082. When the flip-flips 5206 in the units 5203 and 5204 are operated, the two of five pairs of gates 5210 and 5212 are partially enabled in accordance with the code representing the stored digit. The outputs of the gates 5210 are connected to the routing control unit 700 and the position register 1000 by a plurality of terminals 2DU, 2DV, 2DW, 2DX and 2DY.

The negative potentials provided at the "*d*" terminals of the operated flip-flips 5206 in the units 5203 and 5204 is forwarded through the "OR" gate 5080 to place the inverter 5066 in operation. This clamps the output of the "OR" gate 5064 at ground so that the outputs of the input gates 5208 to the second digit register are clamped to ground to prevent the setting of this register from being inadvertently changed. The negative potential from the gate 5080 is also forwarded to the resistive input of an "AND" gate 5062.

The subscriber at the calling substation A then transmits the plural frequency signal representing the third digit "5" that is to be stored in the register. The multifrequency signal detector 530 operates to store this digit in the third digit register by setting the flip-flips 5226 in the units 5220 and 5221. The negative potentials at the "*d*" terminals of the set flip-flips 5226 are extended to the lowermost two of five pairs of gates 5232 and 5234 in accordance with the code for the stored digit "5." This provides means for transferring the value of the digits stored in the third digit register to the routing control 700 over a plurality of terminals 3DU, 3DV, 3DW, 3DX and 3DY. When the flip-flips 5226 in the units 5220 and 5221 are set, the gates 5228 in these units forward ground potential to the "*c*" terminal of an inverter 5048 to condition this inverter or subsequent operation.

When the transmission of the two tones representing the third digit "5" are removed from the detector 530, the inverters 5007, 5068 and 5070 are again momentarily actuated to supply a series of negative-going pulses of 100 microseconds in duration. However, these signals are not effective to transfer the stored digit from the third digit register because the inverters 5066 and 5076 are held in a conductive condition to block the gates 5096 and 5208. When the inverter 5070 returns to a conductive condition, a positive pulse is applied to the input of the inverter 5072 so that the output thereof drops to a negative potential. This negative potential drops the output of the gate 5062 to a negative potential so that the inverter 5048, which was previously conditioned for operation by the completion of the storage of a digit in the third digit register, is rendered conductive. When the inverter 5048 is placed in conduction, the "*c*" terminal of an inverter 5016 is connected to ground.

The negative-going signal at the output of the inverter 5072 is also forwarded to one of the diode inputs of an "AND" gate 5042 so that the output of this gate drops to a negative potential and is effective through a gate 5040 to place the conditioned inverter 5016 in conduction. The output of the inverter 5016 rises to ground potential and is effective through an "OR" gate 5018 to provide a positive pulse for driving a flip-flip 5024 into its set condition. When the flip-flip 5024 is operated to its set condition, the "*e*" terminal drops to and remains at ground potential after the inverters 5072, 5048 and 5016 are restored to their normal conditions. The ground potential at the terminal "*e* is "forwarded to one of the diode inputs of the gate 5324 to clamp the output thereof at ground so that additional information can not be entered into any of the three digit registers in the three digit store 540.

When the flip-flip 5024 is operated to its set condition, its "*d*" terminal drops to a negative potential to indicate that the necessary digits have been stored in the three digit store 540 and to initiate a demand for the use of the routing control unit 700. More specifically, this negative potential is extended to the FCD terminal of the register finder 630 and is also extended to the resistive input of an "AND" gate 5026. When the routing control circuit 700 has been assigned for use with the subscriber register 500, the terminal FDA of the register finder 630 individual to this register drops to a negative potential and is effective through the gate 5026 and a gate 5028 to place an inverter 5030 in conduction. The output of the inverter 5030 rises toward ground and is effective through a gate 5036 to terminate conduction in the inverter 5034. This removes a shunt around the negative potential supplied through a resistance 5032 so that the diode inputs of the three groups of "AND" gates 5086, 5212 and 5234 drop to a negative potential. The two enabled gates in each of these groups supply negative potential through the gates 5084, 5210 and 5232 to transfer the values of the three digits stored in the unit 540 to the routing control unit 700 to control the selection of the terminating station B. The termination of conduction through the inverter 5034 also partially enables a gate 5003.

When the highway and time slot of the called substation has been determined, a negative-going pulse of approximately 160 microseconds in duration is supplied by the routing control unit 700 to the WR terminal of the register finder 630 and to the other diode input of the "AND" gate 5003. This drops the output potential of this gate to a negative value, and this potential is effective through a gate 5002 to place the inverter 5001 in conduction. As described above, the ground signal at the output of the inverter 5001 operates the calling time store 520 to transmit the designation of the calling highway and the identity of the calling time slot to the allotted link circuit. When the link to which the information was transferred has stored this information and the called station information, the register finder 630 is operated by the link allotter to return the terminal FDA to ground potential. This terminates the conduction in the inverter 5030 and returns the inverter 5034 to a conductive condition so that the resistor 5032 is again shunted to ground to clamp the plurality of gates 5086, 5212 and 5234 at ground. This ground potential also terminates the conduction in the inverter 5001 so that the readout signal is removed from the calling time store 520.

In addition, the operation of the inverter 5034 to a conductive condition also initiates the resetting of the calling time store 520 and the three digit store 540. More specifically, when the output of the inverter 5034 rises to ground potential, a positive-going pulse is coupled through a diode 5102 to set the reset flip-flip 5120. When the flip-flip 5120 is set, the "*d*" terminal thereof drops to a negative potential to place an inverter 5132 in conduction. When the inverter 5132 is placed in conduction, the ground at the output thereof is applied to the "*a*" terminals of all of the flip-flips in the three digit store 540 and to most of the flip-flips in the calling time store 520 so as to restore these units to their normal reset condition. This ground is also forwarded through a gate 5142 to prevent the setting of the dial tone flip-flip 5146 until the unit 540 has been reset.

When the reset flip-flip 5120 is operated to its set condition, the potential at its "*e*" terminal rises to ground and is forwarded to the RLD terminal of the multifrequency signal detector 530. As described in detail in the above identified Schmidt application, a signal applied to the RLD terminal initiates a checking operation during which the operability of the frequency responsive components in the detector 530 is checked. In response to the satisfactory completion of this check, a ground signal is applied to the RLR terminal of the detector 530. This signal is forwarded to the "*b*" terminal of the reset flip-flip 5120 to restore this component to its reset condition. This positive-going signal is also forwarded to the calling time store 520 to reset the flip-flip 4905 and to set the flip-flip 4955. Accordingly, at this time, the subscriber register one 500 has been restored to its normal condition.

*Operation of the Three Digit Store 540 on a Call From the Substation A to an Operator in the local Office 150*

If a call is to be extended to an operator in the local board 150, the subscriber at the station A, for instance, dials "0" which consists of the control tones U and X. When the subscriber station A goes "off-hook," a seize tone is transmitted to actuate the three digit store 540 to perform the seize check operation described above, and this circuit then operates under the control of the negative-going pulses provided at the output terminals U and X of the multifrequency signal detector 530 to store the digit "0" in the third digit register and to shift this digit through the second digit register to the first digit register. The digit "0" is stored in the first digit register by operating the flip-flips 5095 in the units 5091 and 5094 to their set condition.

When the units 5091 and 5094 are operated, the negative potential from the "*d*" terminal of the flip-flip 5095 in the unit 5094 is forwarded to the diode input of a gate 5060 and is effective to cause the application of a negative potential to the "*b*" terminal of an inverter 5050. The ground potential at the "*e*" terminal of the flip-flip 5095 in the unit 5091 is forwarded to the "*c*" terminal of the inverter 5050 so that this inverter is placed in conduction. When the inverter 5050 is placed in conduction, ground is forwarded to the resistive input of the gate 5042 to clamp the output of this gate at ground potential. The ground provided at the output of the inverter 5050 is also forwarded to the "*c*" terminal of an inverter 5016 to condition this inverter for conduction.

When the inverter 5072 is rendered nonconductive so that the output thereof drops to a negative potential, this negative potential is forwarded through a pair of gates 5012 and 5014 to be applied to the "*b*" terminal of the inverter 5016. This places this inverter in conduction so that a ground signal is forwarded through the gate 5018 to the "*c*" terminal of the demand flip-flip 5024. This operates the flip-flip to forward a demand condition to the register finder 630 so that the routing control unit is associated with the subscriber register 500, as described in detail above. The three digit store 540 now transfers the called party information stored therein to the routing control unit 700. However, since only a single digit has been stored in the three digit store 540 representing the called operator, only the gates 5084 and 5086 are effective to supply digital information to the unit 700. The calling line indentification is then forwarded to an idle link 800. After this information has been supplied, the control connector 510, the multifrequency detector 530, the calling time store 520, and the three digit store 540 are restored to a normal idle condition in which they are capable of being used in extending subsequent calls.

*Operation of the Three Digit Store 540 on a Call From a Subscriber D in the Remote Local Board 195 Through the Local Board 150 to the Subscriber C in the Remote Local Board 190*

The subscriber registers can also be used as an intermediate link in calls extended through successive local boards from a station, such as station D in a local board 195, to a station served by another local board, such as the station C connected to the local board 190. The three digit store 540 also operates in the same manner when one of the local substations A or B extends a call to a substation served by another local board, such as the stations C and D served by the local boards 190 and 195. In this type of operation, the three digit store 540 receives only a single routing digit that is used to select a trunk extending to the remote local board. In the system illustrated in the drawings, the digits "3"–"9" are used as routing digits.

When the subscriber register 500 is placed in operation by the detection of a seize tone derived either from a local station A or B or over an incoming trunk circuit from a link in one of the remote local boards 190 or 195, the three digit store 540 is placed in operation in the same manner described above in the extension of a local call from the substation A. However, when the monostable multivibrator 5138 is triggered to its unstable position by the positive-going pulse supplied through the diode 5139, the ground potential provided as its "*d*" terminal is forwarded to the "*b*" terminal of an inverter 5317 so that this inverter is placed in conduction. When the inverter 5317 is placed in conduction, a negative potential is supplied to the "*c*" terminal of an audio gate 5318. This opens the gate 5318 so that a 1700 c.p.s. seize signal supplied to its "*b*" terminal is forwarded through the audio amplifier 5300 to the control connector 510. This seize tone is returned over the calling highway and time slot to the incoming line or trunk circuit. The returned seize tone provides no useful function in the event that the call is placed at a local station A. However, in the event that the call arrives at the local board 150 from one of the local boards 190 or 195, the returned seize tone operates the link in the remote local board to remove the incoming seize tone that caused the seizure of the subscriber register 500 and also operates the link to complete the audio path therethrough to permit the multifrequency signal detector 530 in the three digit store 540 to receive transmitted tones respresenting the routing digit.

The seize tone provided under the control of the inverter 5317 and the audio gate 5318 is removed when the monostable multivibrator 5138 restores to its normal condition to provide the positive-going pulse for setting the dial tone flip-flip 5146. Thus, the seize tone is removed from the calling highway and time slot and dial tone is then returned to advise the calling subscriber that the routing digit is to be dialed.

A routing digit, i.e., one of the digits "3"–"9," is then transmitted from the calling stations and is received and detected by the multifrequency signal detector 530 to provide negative-going pulses on two of the output terminals U, V, W, X and Y. These signals cause the storage of a digit in the third digit register and the subsequent transmission of the stored digit through the second digit register to the first digit register. As described above, this digit is stored in the first digit register by the selective operation of the flip-flips 5095 in two of the storage units 5090–5094. Since the received digit is not one of the digits "1" or "2," the inverter 5054 remains in a nonconductive condition. Further, since the received digit is not "0," the inverter 5050 remains in a nonconductive condition. Thus, when the inverter 5072 is rendered nonconductive at the end of the series of shift pulses, the negative potential at its output is forwarded through the gate 5042 and a gate 5040 to the "*b*" terminal of an inverter 5038. The "*c*" terminal of this inverter is connected to ground at the output of the inverter 5076. Thus, the inverter 5038 is placed in conduction to supply ground potential through the gate 5018 to the "*e*" terminal of the demand flip-flip 5024. This operates the flip-flip 5024 to forward a demand condition to the register finder 630 so that the routing control unit 700 is conditioned to receive information from the subscriber register 500. The three digit store 540 then operates in the manner described above to transfer the routing digit to the routing control unit 700 and to transfer the information stored in the calling time store 520 to the link. At the conclusion of these operations, the control connector 510, the calling time store 520, the multifrequency signal detector 530, and the three digit store 540 are restored to their normal condition in the manner described in detail above.

*Operation of the Three Digit Store 540 on a Call Extended to an Operator at the Local Board 150 From a Remote Local Board*

When a call is to be extended from a remote local board such as the local board 190 and 195 to the operator serving the local board 150, the three digit store 540 operates in the same manner described above under the subtitle "Operation of the Three Digit Store 540 on a Call From the Substation A to an Operator in the Local Office 150." However, this operation is slightly modified. When the monostable multivibrator 5138 is operated, the positive signal provided at its "*d*" terminal again causes the return of the seize tone to the link in the remote local board 190 or 195 so as to remove the seize tone applied to the calling highway and time slot and so as to operate the link to complete an audio path from the remote local board 190 or 195 to the local board 150. Thereafter, the storage of "0" and the remaining operation performed by the three digit store 540 take place in the same manner described above.

*Operation of the Three Digit Store 540 When a Call Extended by a Remote Local Board is To Be Terminated at a Substation Served by the Local Board 150*

When a call extended from one of the local boards 190 and 195 is to be terminated in the local board 150, the three digit store 540 operates in the same manner described under the subtitle "Operation of the Three Digit Store 540 on a Call Between Two Subscribers Served by the Local Board 150." However, as in the extension of a call from a remote local board to the operator serving the local board 150, the operation of the monostable multivibrator 5138 causes the inverter 5317 and the audio gate 5318 to supply a timed burst of seize tone to the local board terminating the trunk to which the three digit store 540 is connected. As described above, this burst of seize tone removes the seize tone which is supplied by the link in the adjacent local board and also operates this link to extend an audio path so that the multifrequency signal detector 530 can receive the three digits necessary to terminate the call at one of the stations, such as the station A, served by the local board 150. With this exception, the three digit store 540 operates in the same manner as described above.

*Interlocked Operation of the Three Digit Store 540 on an Incoming Call To Be Terminated at a Substation Served by the Local Board 150*

When a call that is originated at a position register in a local or long distance board or a direct dialing register in a long distance board is to be terminated in the local board 150 by the extension of a connection to one of the substations A or B, the three digit store 540 operates on an interlocking basis with the originating register and operates in a manner that, in many respects, is different from that described in detail above when the three digit store 540 is operated under the direct control of a substation in a local board. The selection between these two modes of operation, i.e., either direct or interlocking, is determined by the first signal received by the multifrequency signal detector 530 following the completion of the seize tone check. As described above, when the three digit store 540 is controlled by signals received from a station served by a local board, the first item of information received following the seize tone is a digit representing signal. When the three digit store 540 is to be operated on an interlocking basis, the first signal received after the seize tone is a VZ signal which is an interlock request signal (see FIG. 84).

When the incoming calls to the local board 150 are to be terminated at a station served by this board, the three digits necessary to complete this connection, including a first digit having a value of "1" or "2" and two other digits, are stored in the originating register and a seize tone is transmitted to one of the trunk circuits in the board 150. The appearance of this seize tone places the seize control unit 400 in operation to perform the functions described above and also actuates the subscriber register allotter 620 so that one of the subscriber registers, such as the register 500, is alloted to control the extension of the call. The calling time store 520 registers the designation of the incoming trunk and operates the control connector 510 to connect the incoming trunk to the signal detector 530. The three digit store 540 then operates in the manner described above to perform the seize tone check and to return a seize tone to the controlling register to indicate that the three digit store 540 is ready to receive control data. This causes the removal of the incoming seize tone and, if the call has been extended through a link, operates this link to extend the audio path to the local board 150. The three digit store 540 then removes the acknowledging seize tone and returns dial tone. In response to the receipt of dial tone, the originating register transmits a VZ tone comprising an interlock or acknowledge request to the three digit store 540. These operations of the controlling register are described in detail in the Tubinis et al application.

This VZ tone is supplied through the control connector 510 to the multifrequency signal detector 530 and results in the application of a steady negative potential to the Z terminal thereof and a series of negative-going pulses to the V terminal thereof. Since the VZ code combination does not enable any of the gates 5241–5250 and since neither the V terminal nor the Z terminal of the detector 530 is connected to the input of the integrator trigger 5346, this code combination is not stored in the third digit register comprising the units 5220–5224.

However, the negative potential provided at the Z terminal is forwarded to one of the diode inputs of an "AND" gate 5136. The resistive input to this gate is returned to a negative potential at the "*d*" terminal of the set flip-flip 5146 which is controlling the provision of dial tone. Another one of the diode inputs to this gate is connected to a negative potential at the output of the reset inverter 5132, and the third diode input is provided with negative-going pulses from the V terminal of the multifrequency signal detector 530. Thus, the trailing edge of one of the negative pulses supplied to the V terminal drives a positive pulse into the "*c*" terminal of a flip-flip 5144 to operate this flip-flip to its set condition. The operation of the flip-flip 5144 indicates that the three digit store 540 is to be operated on an interlocking basis.

When the flip-flip 5144 is operated, the negative potential applied to the "*d*" terminal thereof prepares a number of circuit components for subsequent operation. In a like manner, the ground potential applied to the "*e*" terminal provides ground clamps for a number of circuits. This ground is forwarded to one of the inputs of the "OR" gate 5011 so that this gate and the gate 5010 clamp the input to the inverter 5008 at a ground potential. Thus, the input to the inverter 5007 drops to a negative potential. The ground potential provided at the "*e*" terminal at the set flip-flip 5144 also clamps the gate 5012 at ground, so that the inverter 5016 can not be placed in operation to set the demand flip-flip 5024. This is necessary because the call is to be terminated in the local office 150 and will require the presence of three digits in the store 540. In addition, when the "*e*" terminal drops to ground potential, a positive pulse is coupled through a diode 5153 to the "*c*" terminal of a flip-flip 5154. This pulse operates the flip-flip 5154 to its set condition in which ground potential is applied to its "*e*" terminal. This ground is forwarded to the gate 5158 to apply a positive pulse to the "*b*" terminal of the dial tone flip-flip 5146. This positive pulse resets the flip-flip 5146 and removes dial tone from the calling path. When the flip-flip 5154 is operated to its set condition, the negative potential at its "*d*" terminal is forwarded to the "*c*" terminal of an audio gate 5320. This opens the gate 5320 so that a VZ acknowledging Z tone is returned through the audio amplifier 5300 and the control connector 510 to the calling path. This Z tone persists until such time as the first digit is received from the call originating register.

When the first digit "1" or "2" for a call terminating in the local board 150 is received by the multifrequency signal detector 530, this digit is stored in the third digit register in the manner described above. When the flip-flips 5226 in two of the units 5220–5224 are operated, ground potential is forwarded through a pair of gates 5228 to a gate 5156 to provide a positive pulse which is applied to the "*b*" terminal of the flip-flip 5154. This operates this flip-flip to its reset condition. When the flip-flip 5154 is reset, negative potential is removed from the "*c*" terminal of the audio gate 5320 so that the Z tone is no longer returned over the calling path. Further, when the "*e*" terminal of the flip-flip 5154 drops to a negative potential, the three digit store 540 operates to return an acknowledgement code to the call originating register consisting of a signal identical to that of the digit received.

More specifically, when the "*e*" terminal of the flip-flip 5154 drops to a negative potential, this potential is applied to the diode input of a gate 5162. The resistive input of this gate is connected to a negative potential at the "*d*" terminal of the set flip-flip 5144. Thus, the output of the gate 5162 drops to a negative potential and places an inverter 5166 in conduction. The output of the inverter 5166 drops to a ground potential so that an inverter 5168 is placed in conduction. When the inverter 5168 is rendered conductive, its output drops to a negative potential which is forwarded to the "*c*" terminal of an audio gate 5312. When the audio gate 5312 is opened, the input of the audio amplifier 5300 is connected to the outputs of five audio gates 5302, 5304, 5306, 5308 and 5310. The input terminals to these gates are connected to sources of signals of 1900 c.p.s., 2100 c.p.s., 2300 c.p.s., 2500 c.p.s. and 2700 c.p.s., respectively Assuming that the value of the first received digit is "1," the units 5222 and 5223 have been operated to their set condition. Thus, the "*d*" terminals thereof provide negative potentials which are forwarded to the "*c*" terminals of the audio gates 5304 and 5306. This opens these two audio gates so that a composite tone including the 2100 and 2300 c.p.s. frequencies is applied through the audio gate 5312 to the input of the audio amplifier 5300. This signal is then forwarded through the control connector 510 and over the calling path to the call originating register to acknowledge the correct receipt of the transmitted digit "1."

The three digit store 540 is now operated in two different manners depending upon whether the acknowledging digit returned to the originating register by the three digit store 540 corresponds to the digit previously transmitted by the originating register. Assuming for the moment that a digit other than "1" has been transmitted by the originating register to the three digit store 540, the receipt of the 2100 c.p.s. and 2300 c.p.s. signals transmitted from the three digit store 540 indicates to the originating register that the transmitted digit has been improperly received. In response to the receipt of the digit acknowledgment from the three digit store 540, the call originating register returns a cancel signal comprising a UZ code. When this signal is received by the multifrequency signal detector 530, a series of negative-going pulses are provided at the terminal U and a steady negative potential is applied to the terminal Z. These two signals are applied to the diode inputs of a gate 5124.

The resistive input to this gate is connected to the "*d*" terminal of the set flip-flip 5144 and is at a negative potential. Accordingly, when the trailing edge of one of the pulses provided at the U terminal is applied to the input of the gate 5124, a positive pulse is coupled to the "*d*" terminal of a monostable multivibrator 5126. A ground pulse of 30 milliseconds is provided at the "*d*"

terminal of the monostable multivibrator 5126 which is forwarded through an "OR" gate 5322 to reset all of the flip-flips 5226 in the units 5220–5224 forming the third digit register. Thus, the first digit received is cancelled. This ground signal is also effective through the gates 5324 and 5326 to cut off the inverter 5328 so that the inverter 5334 is placed in conduction to clamp the input gates 5230 for the third digit register at ground. This prevents the entrance of any additional information into the third digit register. The termination of conduction in the inverter 5328 does not trigger the inverters for providing shift pulses inasmuch as the output of the gate 5011 is clamped with ground at the "*e*" terminal of the operated flip-flip 5144. After the completion of the 30 millisecond delay period, the monostable multivibrator 5126 restores to its normal condition to permit a digit to be stored in the third digit register.

Assuming that the digit "1" is correctly transmitted and received, the receipt of the correct acknowledging signal by the controlling register operates this register to arrest the transmission of the first digit and to transmit a seize signal to the multifrequency signal detector 530 which results in the application of a steady negative potential to the S terminal. This negative potential is forwarded to the diode input of a gate 5004. The resistive input of this gate is connected to a negative potential at the operated flip-flip 5144. Thus, the S signal is effective to apply a negative potential through a gate 5005 to the input of an inverter 5006. The inverter 5006 is placed in conduction to couple a positive-going signal to the input of the inverter 5007, the inverter 5008 being clamped in a nonconductive condition by the operated flip-flip 5144. The operation of the inverter 5007 and of the inverters 5068, 5070, 5072 and 5076 controlled thereby causes the digit "1" stored in the third digit register to be shifted through the second digit register and into the first digit register in the manner described above under the title "Operation of the Three Digit Store 540 on a Call Between Two Subscribers Served by the Local Board 150." When this digit is shifted out of the third digit register, the audio gates 5302, 5304, 5306, 5308 and 5310 are closed to interrupt the transmission of the digit acknowledging code.

Since the value of the first digit is "1" or "2," indicating that the call is to be terminated in a station served by the local board 150, the inverter 5054 is placed in conduction so that the output of the gate 5042 is clamped at ground. In addition, when the inverter 5054 is placed in conduction, the "*c*" terminal of an inverter 5052 is elevated to ground potential to condition this inverter for operation. When the inverter 5072 is rendered nonconductive, the negative potential at the output thereof is forwarded through a pair of gates 5046 and 5044 to the "*b*" terminal of the inverter 5052. This places this inverter in conduction so that its output rises to ground potential. This ground potential is supplied to one of the inputs of an "OR" gate 5152 to provide a positive pulse which is supplied to the "*c*" terminal of the Z tone flip-flip 5154. This pulse again operates the flip-flip 5154 to its set condition. When the flip-flip 5154 is set, the gate 5312 is closed and the negative potential appearing at its "*d*" terminal is forwarded to the "*c*" terminal of the audio gate 5320 so that the Z tone is again returned to the controlling register as an acknowledgment that the seize signal for shifting the digit from the third digit register to the first digit register has been successfully received.

The transmission of the Z tone to the controlling register arrests the transmission of the seize tone and thus, the negative signal is removed from the gates 5004 and 5005 so that the inverter 5006 is restored to a nonconductive condition. This does not effect the operation of the inverter 5007 inasmuch as this circuit requires a positive-going signal for conduction. Further, when the inverter 5072 returns to a conductive state, the output of the gates 5046 and 5044 rises to ground potential so that the inverter 5052 is cut off.

The controlling register now transmits the second digit which is stored in the first digit register. The storage of the digit in the third digit register resets the flip-flip 5154 to its normal condition so that the Z tone is removed from the calling path and so that the inverters 5166 and 5168 are again placed in conduction so that the value of the digit stored in the third digit register controls the audio gates 5302, 5304, 5306, 5308 and 5310 to return a digit acknowledgment signal to the controlling register. When the correct digit acknowledgment signal is received, the controlling register terminates the transmission of the second digit and transmits a seize signal. This seize signal is effective through the gates 5004 and 5005 and the inverter 5006 to trigger another sequence of operation of the inverters 5007, 5068, 5070 and 5072 during which the digit stored in the third digit register is transferred into the second digit register and the inverter 5052 is again operated to set the flip-flip 5154 to return a Z tone as an acknowledgment of the satisfactory reception of the seize tone used to shift the second transmitted digit into the second digit register. The returned Z tone arrests the incoming seize signal and resets the above described components controlled thereby.

The controlling register now transmits the third digit which is stored in the third digit register as described above. The storage of this digit again operates the flip-flip 5154 to its reset condition so that the audio gate 5320 is closed to arrest the transmission of the Z tone and so that the converters 5166 and 5168 are again rendered conductive to open the gate 5312. This permits the audio gates 5302, 5304, 5306, 5308 and 5310 to transmit two tones corresponding to the stored digit. The receipt of the correct digit acknowledgment code by the controlling register terminates the application of the digit representing signals to the multifrequency signal detector 530 and initiates the transmission of the seize tone. The receipt of this seize tone by the detector 530 again causes the sequential operation of the inverters 5006, 5007, 5068, 5070 and 5072. When the output of the inverter 5072 drops to a negative value, the inverter 5052 is again operated to supply a positive pulse to the "*c*" terminal of the flip-flip 5154 to operate this component to its set condition. In shifting to a set condition, the flip-flip 5154 closes the gate 5312 so that the digit acknowledging signal is no longer transmitted to the control register and opens the gate 5320 so that the Z tone is returned to the controlling register. In addition, the negative output from the inverter 5072 is effective through the gate 5062 to apply a negative bias to the "*b*" terminal of the inverter 5048. The "*c*" terminal of this inverter is connected to ground through the gates 5228 in the operated ones of the storage units 5220–5224 in the third digit register. Thus, the inverter 5048 is placed in conduction.

The ground potential at the output of the inverter 5048 is forwarded through the gate 5152 to provide a second positive pulse for operating the flip-flip 5154 to its set condition. However, this positive-going pulse is effective through a gate 5150 to provide an operating signal for a flip-flip 5148. When the flip-flip 5148 is operated to its set condition, the negative potential appearing at the "*d*" terminal thereof is forwarded to the "*c*" terminal of an inverter 5164. The "*b*" terminal of this inverter is connected to ground at the "*e*" terminal of the set flip-flip 5154. Thus, the inverter 5164 is placed in conduction so that a negative potential appearing at its output is forwarded to the "*c*" terminal of an audio gate 5314 The "*b*" terminal of this gate is connected to the 2100 c.p.s. signal. Since the gate 5320 is also open at this time, a VZ signal consisting of combined 2100 c.p.s. and 2900 c.p.s. tones is applied through the audio amplifier 5300 to the call originating register. This VZ signal forms an end-of-selection code to advise the controlling register that the three digit store 540 has received all of the necesary digital information.

The negative potential at the "*d*" terminal of the set flip-flip 5148 is also forwarded to the resistive input of a gate 5020, the diode input of which is supplied with a negative potential due to the seize signal transmitted from the controlling register. When the seize signal from the controlling register disappears, the diode input of the gate 5020 drops to ground potential and couples a positive pulse to the "*c*" terminal of the connect demand flip-flip 5024, thereby operating this circuit component to its set condition.

As described above, under the subtitle "Operation of the Three Digit Store 540 on a Call Between Two Subscribers Served by the Local Board 150," the operation of the flip-flip 5024 to its set condition forwards a connect demand to the register finder 630 so that the data stored in the three digit store 540 is forwarded to the routing control unit 700 and used therein to select the highway and slot designation of the terminating station in the local board 150. When this operation is completed, the called station designation and the calling trunk designation from the calling time store 520 are transferred to an idle link. At the completion of these operations, the control connector 510, the calling time store 520, the multifrequency signal detector 530, and the three digit store 540 are restored to a normal condition. In addition, during this reset operation, the acknowledge control flip-flip 5144, the Z control flip-flip 5154 and the V control flip-flip 5148 are also restored to normal by the application of ground potential to the "*a*" terminals thereof. This terminates the application of the VZ tone to the call originating register.

*Interlocking Operation of the Three Digit Store 540 on a Call To Be Terminated in Another Office*

The subscriber register one 500 can be used as an intermediate switch point in the extension of a connection involving one or more long distance boards and local boards. When the subscriber register 500 is used in this manner, only a single routing digit having a value between "3" and "9" is stored in the register.

When the subscriber register 500 is seized during the extension of this type of call, the three digit store 540 operates in the manner described in detail above until such time as the routing digit is received by the three digit store 540 and transferred to the first digit register. When the inverter 5072 is rendered nonconductive, its negative output potential is effective through a pair of gates 5040 and 5042 to apply a negative potential to the "*b*" terminal of the inverter 5038. The "*c*" terminal of this inverter is connected to ground through the inverter 5076 which is held in a conductive condition as soon as any digit is stored in the first digit register. When the inverter 5038 is placed in conduction, the connect demand flip-flip 5024 is operated to its set condition so that the routing control unit 700 is associated with the subscriber register 500, and the routing digit is transferred to the unit 700. At the completion of the selection of an idle outgoing trunk, this information and the incoming trunk designation are transferred to a link. The subscriber register 500 is then reset to a normal condition.

It should be noted that the demand condition is established in the three digit store 540 directly under the control of the seize signal that is received from the controlling register as a result of correct routing digit acknowledgment. Since this returned seize tone is not effective to operate the flip-flips 5148 and 5154, the Z tone and the VZ tone are not returned to the originating register, and the seize tone from this register continues to be transmitted. Thus, when the link controlled by the routing control unit 700 makes a selection in accordance with the routing digit stored in the first digit register, the seize tone from the controlling register is forwarded through the link associated with the routing control unit 700 to provide a seize signal at the local board selected by the routing digit.

*Interlocking Operation of the Three Digit Store 540 on Calls Extended to the Operator Serving the Local Board 150*

When the call is to be extended, on an interlocking basis, to the operator serving the local board 150, the three digit control 540 operates in the manner described above under subtitle "Interlocked Operation of the Three Digit Store 540 on an Incoming Call to be Terminated at a Substation Served by the Local Board 150" until such time as the first received digit, which is "0," has been shifted into the first digit register. At this time, the inverter 5050 is placed in conduction, as described above, so that a ground clamp is supplied for the gate 5042. This ground is also forwarded to the inputs of the gates 5150 and 5152 so that the flip-flips 5148 and 5154 are set. The operation of these two flip-flips causes a VZ code to be returned to the controlling register to indicate that all of the digits necessary to terminate the call have been transmitted and received. When the seize tone is removed by the controlling register, the Z terminal of the detector 530 rises to ground to supply a positive pulse through the gate 5020 to again operate the connect demand flip-flip 5024 to its set condition. As described above, this causes the transfer of the "0" stored in the first digit register to the routing control unit 700 and following the subsequent utilization of this digit and the calling trunk designation in the store 520 to establish a connection to the keyboard circuit 1220, the subscriber register 500 is released in the manner described above.

*Release of the Three Digit Store 540 in Response to Received Signals*

If during the extension of a connection, the calling path applies a release code comprising Y and Z signals to the multifrequency signal detector 530, this detector supplies a negative potential to the Z terminal and a series of negative-going pulses to the Y terminal. These signals are applied to two of the diode inputs of a gate 5128. The other diode input to this gate is connected to the output of the inverter 5132 and is maintained at a negative potential except when the three digit store 540 is being reset. Accordingly, when these three signals are applied to the gate 5128, the output thereof drops to a negative potential. However, when the trailing edge of one of the negative-going pulses provided at the Y terminal of the detector 530 is applied to the gate 5128, a positive pulse is driven through a diode 5101 to the "*c*" terminal of the reset flip-flip 5120. This operates the flip-flip 5120 to reset the three digit store 540, to reset the calling time store 520, to cause the signal detector 530 to perform a check operation, and to release the control connector 510. Thus, the subscriber register 500 can be released in response to the receipt of a release code by the multifrequency signal detector 530.

*Alarm Facilities in the Three Digit Store 540*

The three digit store 540 includes detecting means for establishing an alarm condition and for releasing the subscriber register one 500 in the event that digits are not received either from a subscriber or from a controlling register within a specified period following the seizure of the three digit store 540 or following the receipt of a preceding digit. This feature prevents the subscriber register 500 from being held out of service in the event that the subscriber fails to dial a complete number.

More specifically, when the flip-flip 5146 is operated to a set condition as an incident to the seizure of the three digit store 540, the ground potential applied to its "*e*" terminal is forwarded to one input of an "OR" gate 5110. This ground potential is effective through a gate 5112 to render an inverter 5114 nonconductive. When the inverter 5114 is rendered nonconductive, the operation of a flip-flip 5140 is placed under the control of an "AND" gate 5118. The diode input to the gate 5118 is connected to a terminal 5117 which provide a negative-going pulse of approximately 5 milliseconds duration at, for instance, ten second intervals. When the first negative-going pulse is applied to the diode input of the gate 5118, the trailing edge thereof drives a positive-going pulse into the "c" terminal of the flip-flip 5140, thereby operating this component to its set condition in which a negative potential at its "d" terminal is forwarded to the resistive input of an "AND" gate 5116. If the flip-flip 5140 is not restored to its normal condition within the next ten second interval, the trailing edge of this next timing pulse at the terminal 5117 provides a positive-going pulse which is coupled to the "d" terminal of a monostable multivibrator 5141.

This operates the unit 5141 to its unstable state for a 1.3 second period during which ground is applied to its "d" terminal. This ground renders an inverter 5301 conductive so that an audio gate 5303 is opened to supply a release signal consisting of 2700 c.p.s. and 2900 c.p.s. tones to the calling path to cause the release thereof. At the end of its delay period, the multivibrator 5341 returns to normal so that a gate 5143 connected to its "a" terminal supplies a positive-going pulse through a diode 5105 to operate the reset flip-flip 5120 to its set condition. This causes the resetting of the register 500 in the manner described above. When the reset inverter 5132 is rendered conductive, the flip-flip 5140 is reset with the other flip-flips in the circuit 540. Thus, the subscriber register 500 will be reset and released unless the timeout flip-flip 5140 is restored to its reset condition within a ten second interval following its operation to a set condition.

As described above, the flip-flip 5140 is first operated to its set condition in response to the seizure of the three digit store 540. Accordingly, the store 540 will be reset unless a digit is received from a subscriber within ten seconds following the setting of this flip-flip. As described above, the storage of the digit in the third digit register biases a pair of gates 5228 in a forward direction so that ground is applied to the gate 5158 to reset the flip-flip 5146 when the first digit is received. This positive-going pulse is also forwarded to the "b" terminal of the flip-flip 5140 to reset this circuit when the first digit is received by the third digit register. Accordingly, the timing operation is arrested by resetting the flip-flip 5140 to remove the enabling potential from the resistive input of the gate 5116 when a digit is received by the three digit store 540. The resetting of the flip-flip 5146 also removes the ground potential from the "OR" gate 5110 so that the inverter 5114 is again placed in conduction to clamp the input to the "c" terminal of the flip-flip 5140 at ground potential. This prevents its operation under the control of the ten second pulses supplied from the terminal 5117. However, the timeout alarm is also rendered effective to check the receipt of the second and third digits from the subscriber required for calls terminated in the local office 150. As described in detail above, the inverter 5076 is placed in conduction in response to the storage of a digit in the first digit register. Thus, when the first digit received is transferred from the third digit register to the first digit register, the inverter 5076 is maintained in conduction and forwards a ground potential to one of the inputs of the "OR" gate 5110. Thus, the inverter 5114 is again rendered nonconductive so that the flip-flip 5140 can be operated under the control of the ten second pulses supplied from the terminal 5117. Thus, if the flip-flip 5140, after having been operated by one of the ten second pulses, is not reset by the reception of the second or third digits, the register 500 is restored to normal as described above.

In addition, the three digit store 540 includes means for timing the reception of digital information within the prescribed period when the three digit store 540 is operated on an interlocking basis. More specifically, the acknowledge flip-flip 5144 is operated to its set condition in response to the receipt of a VZ signal and remains in this condition until reset at the completion of the operation of the three digit store 540. The "e" terminal of this flip-flip rises to ground potential, and this potential is forwarded to one of the diode inputs of the gate 5110. Thus, the inverter 5114 remains off during the entire period that the three digit store 540 is used during interlocking operation. Accordingly, the flip-flip 5140 must be reset in response to the receipt of the necessary digits in the prescribed period during the entire period of interlocking operation.

ROUTING CONTROL UNIT 700

Figure 54:
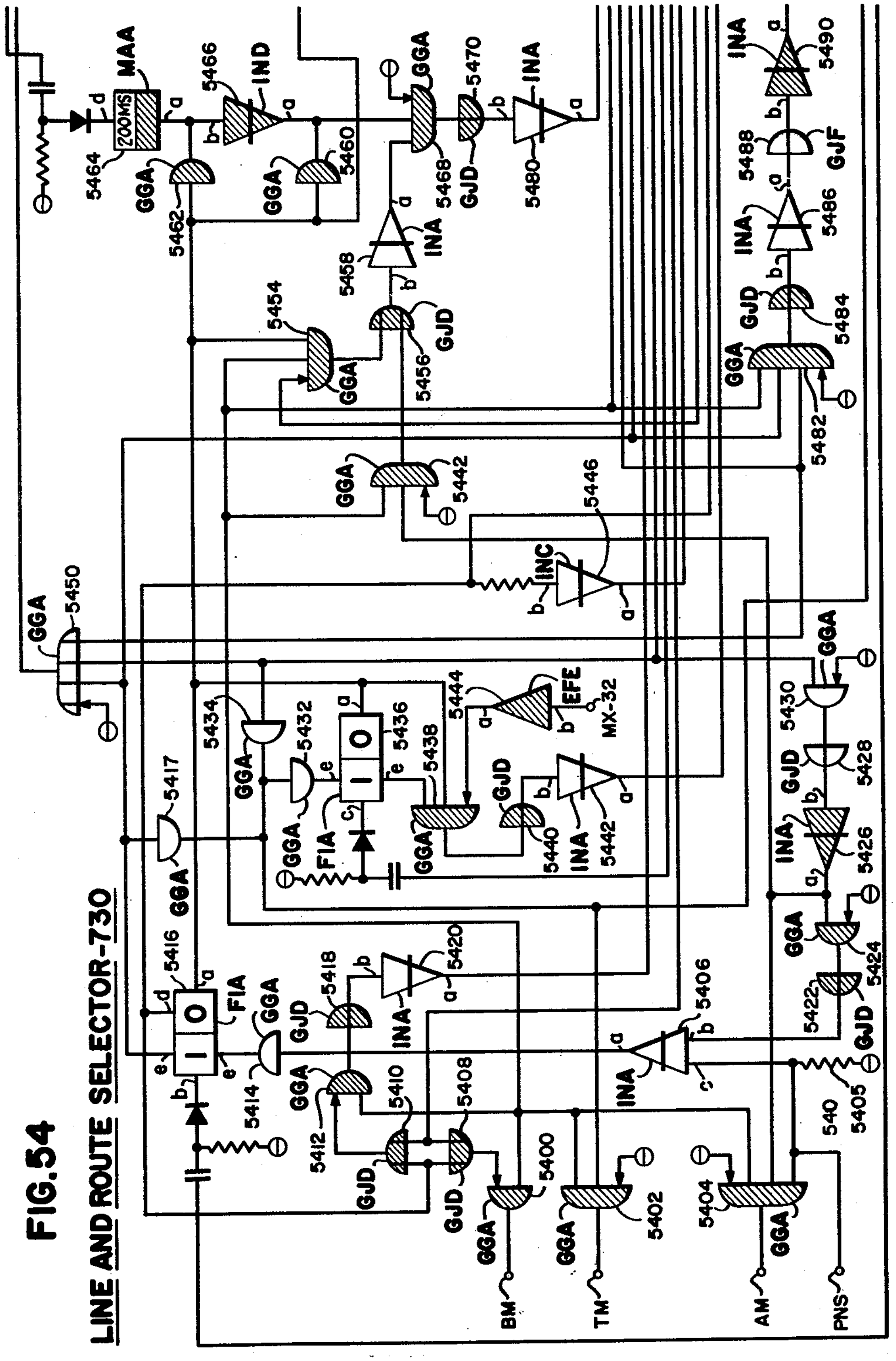
Figure 55:
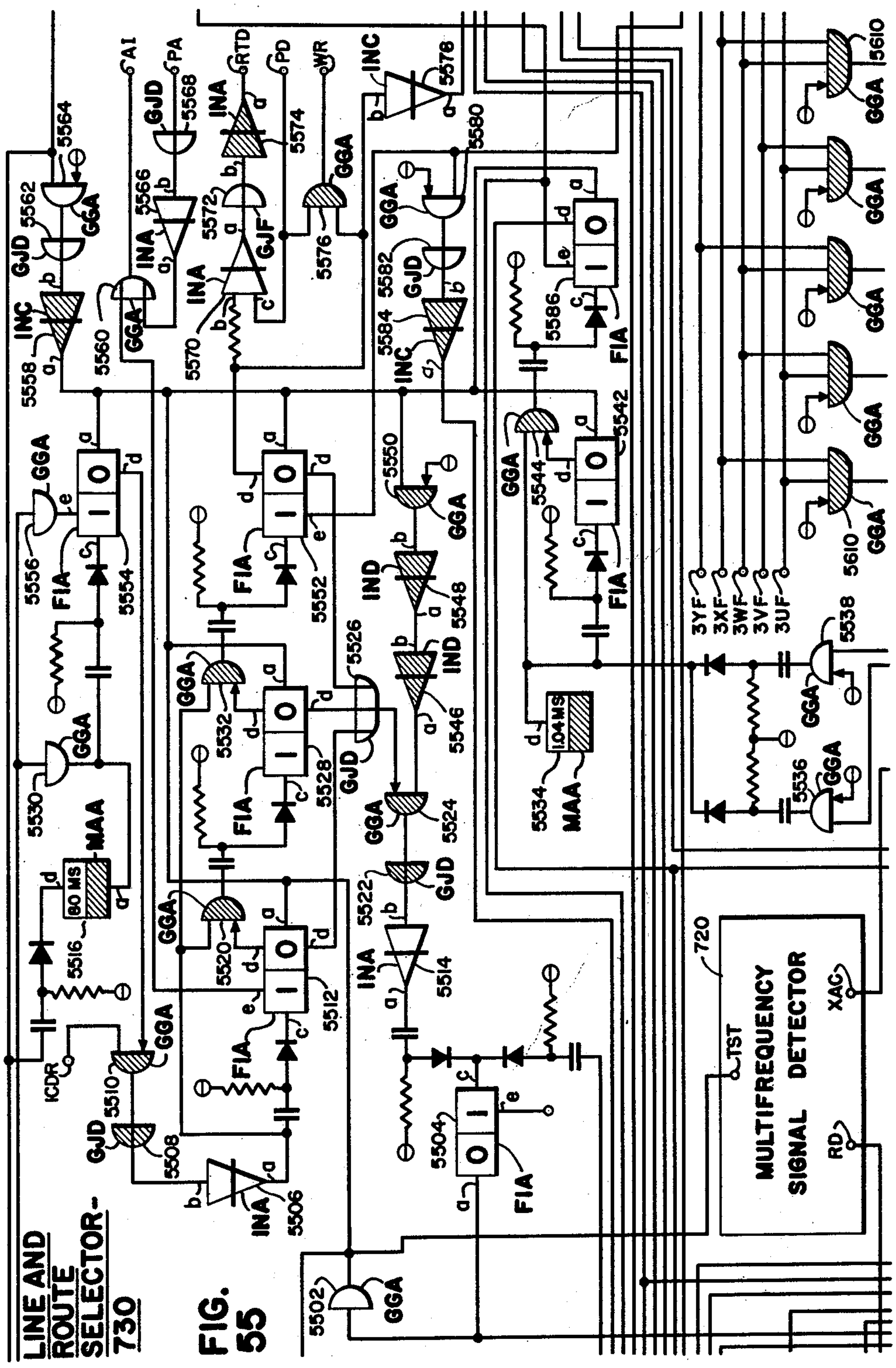

The routing control unit 700 (FIGS. 54–61) includes the line and route selector 730, the control connector 710 (FIG. 58), and the multifrequency signal detector 720 (FIG. 55). The routing control unit 700 is common to the plurality of subscriber registers 500, 600 and 610 and is individually assigned to each of these registers under the control of the register finder 630 to receive digital data identifying the called circuit, either a local subscriber, the local attendant, or an outgoing trunk. When all of the necessary digital information is stored in one of the subscriber registers 500, 600 or 610, this register forwards a connect demand signal to the register finder 630, and this circuit returns a demand answer signal to the subscriber register when the routing control unit 700 is idle to cause the transfer of the digital data from the subscriber register to the line and route selector 730. The line and route selector 730 then examines the stored digital information and selects marking signals identifying the called circuit. If the call is to be terminated locally, the circuit 730 converts the three received digits into signals identifying the highway and time slot of the local station and determines the idle or busy condition of this station. If the call is to be extended to another local board, the circuit 730 selects the highway and time slot of an idle trunk in the trunk group represented by the single routing digit. If the call is to be extended to the attendant's keyboard circuit, the circuit 730 converts the received "0" into a marking condition representing an operator call.

When the called circuit selecting operation is completed, the routing control unit reads out the called circuit designating signals to an idle link that has previously been assigned to handle this call by the link allotter 1100. The routing control unit 700 also returns a readout signal to the calling time store 520 in the associated subscriber register 500 so that the calling line or trunk designation is transferred to the link. When this information is read into the link, the link allotter releases the routing control unit 700, the register finder 630, and the subscriber register 500 and also assigns another idle link for use by the unit 700. If the called local station is busy or if all of the trunks in the selected group are busy, the routing control unit 700 supplies the link with the highway and slot designation of the line circuits to which line busy tone or trunk busy tone is continuously applied.

The routing control unit 700 can also be controlled by the attendant's keyboard circuit 1220 through the local position register 1000. When called party information has been keyed into the register 1000, this register is associated with the unit 700 by the register finder 630. The register 1000 then transfers either a routing digit or a local station designation to the unit 700. When a routing digit is supplied, the unit 700 returns the designation to the idle outgoing trunk to the register 1000 so that this register controls the extension of the connection and returns the highway and time slot of the outgoing trunk to the link after the connection has been completed. If the operator sets up a local termination, the position register transfers the three digits to the unit 700 and this unit then returns the highway and time slot of the local station directly to the link.

*Operation of the Routing Control Unit 700 When the Local Board Unit 150 Forms an Intermediate Point in an Extended Connection*

When the local board 150 is used as one switching point in extended communication path, a single routing digit having a value in the range of "3"–"9" is stored in the related subscriber register 500, 600 or 610 and is transferred to a first digit storage unit in the line and route selector 730. In response to the storage of this digit, the line and route selector 730 performs a trunk hunting operation to locate an outgoing trunk in the trunk group designated by the value of the stored digit. This trunk hunting operation takes place in a matrix, indicated generally as 6000, which comprises a plurality of gating units, each of which is individual to a given time position on a given highway. As described above, the local board 150 includes eighty trunks provided by the time positions TP21–TP28 on the highways one to ten. As an example and as shown in the table in FIG. 86, the first trunk is assigned to the twenty-first time slot on highway one, whereas the eightieth trunk is assigned to the twenty-eighth time slot on highway ten. In the matrix 6000, trunk "1" is represented by a crosspoint including an "AND" gate 6048 and an "OR" gate 6046. Trunk "10," which is the twenty-first time slot on highway ten, is represented by a crosspoint including a pair of gates 6052 and 6054. A pair of gates 6072 and 6074 form a crosspoint in the matrix 6000 representing trunk "71" which occupies time slot twenty-eight on highway one, and a pair of gates 6056 and 6058 form a crosspoint representing trunk "80" which is the twenty-eighth time slot on the highway ten.

The gate units in the matrix 6000 are individually enabled in a fixed sequence under the control of a dual highway counter 5800 and a dual slot counter 6010 so that a primary busy test can be made to detrmine the idle or busy condition of any one of the trunk circuits. One of the inputs to all of the gates representing trunks on a given highway are enabled in sequence during a single cycle of operation of the dual slot counter 6100, and the dual highway counter 5800 is advanced a single step to enable the inputs to all of the gates representing the trunks on the next highway in response to each cycle of operation of the slot counter 6100. In this manner, each of the gates individual to a trunk in the local board 150 is enabled in a fixed sequence. In order to perform the primary busy test, the matrix 6000 is connected to the common busy conductors in the local board 150. Thus, if a particular gate is enabled by a voltage representing a particular highway and by another voltage representing a particular time slot on the highway, this gate is placed in an enabled or in a blocked or closed condition in dependence upon the presence or absence of a busy pulse on the busy test conductor on the same highway and in the same time position.

Referring now more specifically to the highway busy test and trunk hunting matrix 6000, the resistive inputs to the plurality of gates in this matrix such as the gates 6048, 6054, 6058 and 6074 are enabled in sequence by ten identical input units 6031–6038 which are rendered effective in sequence under the control of six related and identical units 6111–6118 that are rendered effective in sequence under the control of the dual slot counter 6100. Each of the units 6031–6038 includes a pulse amplifier 6040, the output of which is connected to the resistive input of each of the gates representing trunks designated by identical time positions on the ten different highways. The "*b*" terminal of all of the amplifiers 6040 are connected to the output of an individual emitter follower 6042, the "*b*" input terminals of which are connected to different terminals TP21–TP28 of the time pulse generator. Thus, each of the emitter followers 6042 is provided with a negative-going pulse in a different time position. The emitter follower 6042 couples the negative-going pulse to the "*d*" terminal of the associated pulse amplifier 6040. However, only one of the pulse amplifiers 6040 is effective during any given cycle of operation of the time pulse generator.

The effectiveness of one of the units 6031–6038 is controlled by the eight identical units 6111–6118. Each of these units includes an inverter 6120, the output of which is connected to the "*c*" terminal of the associated pulse amplifier 6040. The input to the inverter 6120 is connected to an "AND" gate 6124 through an "OR" gate 6122. The dual slot counter 6100 operates step-by-step so that all of the inputs to only one of the gates 6124 are returned to a negative potential at any given time. This negative potential is effective through the gate 6122 to place the associated inverter 6120 in conduction. When the inverter 6120 is placed in conduction, the "*c*" terminal of the associated pulse amplifier 6040 is connected to ground so that this amplifier is responsive to the negative-going slot pulse supplied by the connected emitter follower 6042. Thus, when a negative-going pulse is applied to the terminal TP21, for instance, the output of the inverter 6040 falls to a negative potential and provides an enabling potential to all of the resistive inputs of the ten gates, such as the gate 6048 and 6054, representing the ten trunk circuits assigned the twenty-first time slot on the ten highways. The dual slot counter 6100 is operated by the negative-going pulse appearing in the thirty-second time position so that a different one of the units 6111–6118 and the connected units 6031–6038 is rendered effective during each successive cycle of operation of the time pulse generator.

The dual highway counter 5800 provides a second enabling voltage to each of the crosspoints or gates in the matrix 6000 and is operated a single step in response to each cycle of operation of the dual slot counter 6100. The diode inputs of each of the eight gates representing the eight different time slots on a given highway are connected to one of ten identical units 6001–6010 representing the highways one to ten, inclusive. The inputs to these units are connected to ten identical output units 5840–5844 and 5901–5905 which are enabled in sequence by the dual highway counter 5800.

As an example, when the highway counter 5800 is operated to a setting representing the highway one, all of the inputs to a gate 5910 in the unit 5905 are dropped to a negative potential. This potential is effective through a gate 5908 to place an inverter 5906 in conduction. The ground at the output terminal "*a*" of this inverter is forwarded to the input of an "AND" gate 6016, the output of which rises to ground potential. This ground potential is effective through a gate 6014 to render an inverter 6012 nonconductive. When the output of the inverter 6012 drops to a negative potential, an enabling potential is applied to the diode inputs of all of the eight gates in the matrix 6000 representing trunks on highway one. Thus, if the dual slot counter 6100 is in a setting representing time position twenty-one and the dual highway counter 5800 is in a setting representing highway one, both of the inputs to the gate 6048 drop to a negative potential when a negative-going pulse in the twenty-first time position is applied to the input of the emitter 6042. This produces a negative potential at the output of the gate 6048 which is effective through the gate 6046 to apply a negative-going pulse to an input terminal of a frame 5642 representing the fact that trunk "1," which occupies the time slot twenty-one on highway one, is in an idle condition.

In order to perform the busy test operation, the diode input of the gates representing trunks on highway one are also connected to the output of an inverter 6061, the input of which is connected to the common highway one busy conductor in the local board 150. Thus, if trunk "1" is busy, a negative-going pulse in time position twenty-one is supplied to input terminal "*b*" of the inverter 6061. This places the inverter 6061 in conduction so that the diode input of the gate 6048 is held at ground during the negative-going pulse. This prevents the output of the gate 6048 from dropping to a negative potential and thus, prevents the application of a negative-going pulse to the connected terminal of the frame 5642. This provides an indication that trunk "1" is in a busy condition.

As described above, the dual slot counter 6100 provides means for rendering the units 6111–6118 effective in sequence. The dual slot counter 6100 comprises two identical halves 6101 and 6102, the outputs of which are connected to alternate ones of the units 6111–6118. The unit 6101 includes four flip-flips 6130–6133, the "*d*" terminals of which are connected to the resistive inputs of the gates 6124 in the units 6111, 6113, 6115 and 6117. The second half 6102 of the dual slot counter 6100 includes four identical flip-flips, the "*d*" terminals of which are connected to the resistive inputs of the gates 6124 in the units 6112, 6114, 6116 and 6118. One diode input of each of the gates 6124 in all of the units 6111–6118 is normally connected to a negative potential at the output of an inverter 5678. The remaining diode inputs to the gates 6124 in the units 6111, 6113, 6115 and 6117 are connected to the output of an inverter 6170 associated with the first half 6101 of the dual slot counter 6100. The remaining diode inputs of the gates 6124 in the units 6112, 6114, 6116 and 6118 are connected to the output of an inverter 6176 associated with the second half 6102 of the dual slot counter 6100. Only a single one of the flip-flips in the two halves of the counter 6100 is in a conductive state at any given time and only one of the two inverters 6170 and 6176 is in a conductive condition at this time. Thus, all of the inputs to the gate 6124 in only one of the units 6111–6118 are at a negative potential at the same time so that only one of the units 6111–6118 is enabled at any given time.

Referring now more specifically to the operation of the dual slot counter 6100, this counter is operated to a reset condition by the application of ground potential to a terminal RS. This ground potential operates at an input flip-flop 6182 to the normal condition illustrated in FIG. 61 and is also forwarded to the "*a*" terminal of a pair of flip-flips 6150 and 6154 to operate these components to their reset condition. This potential is further forwarded through a gate 6148 to set a monostable multivibrator 6146 to its set condition in which ground is applied to its "*d*" terminal for a period of 100 microseconds. This ground is forwarded to the "*a*" terminals of the flip-flips 6131–6133 and through a gate 6142 to the "*e*" terminal of the flip-flip 6130. The ground potential applied to the flip-flips 6131–6133 operates these components to the reset condition illustrated in FIG. 61. The ground potential applied to the "*e*" terminal of the flip-flip 6130 operates this component to its set condition in which a negative potential is applied to its "*d*" terminal. The potential applied to the "*d*" terminal of the flip-flip 6130 is forwarded to the resistive input of the gate 6124 in the unit 6111 representing the slot pulse in the twenty-first time position. This negative potential is also forwarded to the resistive input of a gate 6140, the output of which is connected through a pair of coupling circuits to the "*b*" terminal of the flip-flip 6130 and the "*c*" terminal of the flip-flip 6131.

When the control flip-flop 6182 is set to its normal condition, the ground potential at its "*c*" terminal is forwarded to an "AND" gate 6174 so that the output thereof rises to a ground potential. This ground potential is effective through an "OR" gate 6172 to render the inverter 6170 nonconductive. Thus, the output thereof drops to a negative potential which is supplied to one of the diode inputs of the gates 6124 in the units 6111, 6113, 6115 and 6117. This negative potential is also connected to the diode input of the gates 6140 between the successive flip-flips 6130–6133. Since the resistive input of the gate 6140 connected to the set flip-flip 6130 is at a negative potential, the coupling circuits connected thereto are conditioned for supplying a positive pulse to the previously described terminals of the flip-flips 6130 and 6131. Thus, when the first half 6101 of the dual slot counter 6100 is adjusted to its reset condition, all of the inputs to the gate 6124 in the unit 6111 drop to a negative potential, and the inverter 6120 is rendered conductive to apply ground to the "*c*" terminal of the pulse amplifier 6040 in the unit 6031. The input gates 6124 to the units 6113, 6115 and 6117 are not enabled inasmuch as the resistive inputs thereof are connected to ground in the reset flip-flips 6131–6133.

The second half 6102 of the dual slot counter 6100 is adjusted to its reset condition in exactly the same manner as described above for the first half 6101. However, when the control flip-flop 6182 is adjusted to its set condition, negative potential at the "*d*" terminal thereof is forwarded through a pair of gates 6180 and 6178 to render the inverter 6176 conductive. Thus, one of the diode inputs in each of the gates 6124 in the units 6112, 6114, 6116 and 6118 is connected to ground. The ground potential provided at the output of the inverter 6176 also clamps all of the coupling gates 6140 between the successive flip-flip stages in the second half 6102 of the dual slot counter 6100 at ground potential.

The counter 6100 is operated by the slot pulse appearing in the thirty-second time position. Thus, the counter 6100 is operated a single step at the conclusion of each cycle of operation of the time pulse source. The coupling networks connected to the "*a*" and "*b*" terminals of the control flip-flop 6182 are connected to the output of a normally nonconductive inverter 5442. When the inverter 5442 is momentarily placed in conduction by a negative-going pulse in the thirty-second time position, a positive pulse is applied to the "*a*" and "*b*" terminals of the flip-flop 6182. The first such pulse applied following the resetting operation actuates the flip-flop 6182 to its set condition in which ground potential is applied to one of the inputs of the gate 6180 and negative potential is applied to one of the inputs of the gate 6174. This renders the inverter 6170 conductive and renders the inverter 6176 nonconductive. When the inverter 6170 is rendered conductive, one of the inputs to the gate 6124 in the unit 6111 rises to ground potential and disables the units 6111 and 6031. Further, when the output of the inverter 6170 rises to ground potential, a positive pulse is coupled through the gate 6140 connected to the flip-flips 6130 and 6131. This sets the flip-flip 6130 to its reset condition and operates the flip-flip 6131 to its set condition so that a negative potential is applied from the "*d*" terminal of this flip-flip to the resistive input of the gate 6124 in the unit 6113 and to the resistive input of the coupling gate 6140, the output of which is connected to the "*b*" and "*c*" terminals of the flip-flips 6131 and 6132. The negative potential applied to the input of the gate 6113 does not produce any effect inasmuch as one of the diode inputs thereof is connected to ground at the inverter 6170.

When the inverter 6176 is rendered nonconductive, a negative potential is applied to one of the inputs of the gate 6124 in the unit 6112, the other input of which is connected to the negative potential at the "*d*" terminal of the set flip-flip 6130 in the second half 6102 of the dual slot counter 6100. Thus, the gate 6112 is now enabled so that the pulse amplifier 6040 in the unit 6032 is rendered conductive to apply negative-going pulses to the ten gates representing trunks in the twenty-second time position on the highways one to ten. The transition from ground to negative potential at the output of the inverter 6176 does not provide an operating pulse to any of the coupling gates 6140 associated with the flip-flips in the second half 6102 of the dual slot counter 6100. Thus, these flip-flips remain in the condition in which they are set by the application of the resetting ground potential to the RS terminal.

During the next cycle of operation of the time pulse generator, the unit 6032 provides an enabling potential to all of the gates represented trunks in the twenty-second time position on the highways one to ten. However, only one of these gates is enabled in accordance with the setting of the dual highway counter 5800. At the end of this cycle of operation and in the thirty-second time position, another operating signal is applied to the flip-flop 6182 which restores this component to the position illustrated in FIG. 61. At this time, the inverter 6170 is rendered nonconductive and the inverter 6176 is rendered conductive. When the inverter 6176 is rendered conductive, the units 6112, 6114, 6116 and 6118 are disabled and an operating signal is supplied for resetting the flip-flip 6130 in the half 6102 and for setting the unit 6131 therein. This provides a negative potential which is forwarded to the unit 6114. When the inverter 6170 is rendered nonconductive, the last input to the gate 6124 in the unit 6113 drops to a negative potential so that the connected unit 6033 is rendered effective to supply a negative-going pulse in the twenty-third time position during the next cycle of operation of the time pulse generator.

This operation continues as long as operating signals are applied from the inverter 5442 to the "*a*" and "*b*" terminals of the flip-flop 6182. The output of the last flip-flip 6133 is returned to the input of the flip-flip 6130 so that the four flip-flips in the two halves of the counter 6100 operate as ring counters. Further, it can be seen that if, for any reason, either one of the halves 6101 or 6102 of the counter 6100 becomes inoperative, the remaining half of the counter will operate to sequentially render the connected ones of the units 6111–6118 effective to control the scanning of the matrix 6000. Thus, if the eighty trunks in the local office 150 are assigned to different trunk groups or levels in such a manner that the trunks within a given group, such as the ninth level, include trunks occupying both even and odd numbered ones of the time positions TP21–TP28, the inoperability of either half of the counter 6100 only affects the availability of one-half of the trunks serving a given level. This is true because the trunks scanned by the operative half of the counter 6100 remain available for use.

The dual slot counter 6100 includes means for providing an operating signal for the dual highway counter 5800 in response to each cycle of operation. More specifically, the dual highway counter 5800 is substantially identical in operating technique to the dual slot counter 6100 and includes a control or input flip-flop 5856, the "*a*" and "*b*" terminals of which are connected through coupling networks to the output terminal "*d*" of a monostable multivibrator 6022. This terminal is also connected through a pair of coupling networks to the outputs of a pair of "AND" gates 6024 and 6026. The diode input of the gate 6024 is connected to the output of the inverter 6120 in the unit 6111, and the diode input of the gate 6026 is connected to the output of the inverter 6120 in the unit 6112. Thus, if either half of the dual slot counter 6100 is in an operative state, the act of rendering the inverter 6120 in either of the units 6111 or 6112 conductive in the thirty-second time position supplies a positive pulse through the gate 6024 or 6062 for operating the monostable multivibrator 6022. When operated, the potential at the "*d*" terminal of this circuit component rises to ground and applies a positive-going pulse to the "*a*" and "*b*" terminals of the flip-flop 5856 to operate this circuit. The delay interval of the monostable multivibrator 6022 is greater than the time elapsed between the operation of the units 6111 and 6112 to prevent two separate operating signals from being applied to the control flip-flop 5856 when both halves of the slot counter 6100 are in an operative condition. Accordingly, the dual slot counter 6100 supplies an operating signal to the dual highway counter 5800 in response to each cycle of its operation, and this operating signal occurs in the thirty-second time position.

The dual slot counter 6100 includes self-checking means for determining the proper operation of each of the halves of the counter and for both establishing an alarm condition and rendering the inoperative half of the counter ineffective. More specifically, if all of the flip-flips 6130-6133 in the first half 6101 of the dual counter 6100 are placed in a reset condition, all of the diode inputs of an "AND" gate 6162 drop to a negative potential. When the inverter 6170 is rendered non-conductive so that the output thereof drops to a negative potential, the negative output of the gate 6162 is forwarded through a gate 6164 to render an inverter 6166 conductive. This supplies a positive-going pulse to the "*d*" terminal of the monostable multivibrator 6146 so that this component is operated. The "*d*" terminal of the multivibrator 6146 drops to ground potential and resets the counter in the manner described above. The operation of the component 6146 also supplies a positive-going pulse to the "*c*" terminal of the first alarm flip-flip 6150 so that this circuit is operated to its set condition in which a negative potential is supplied to its "*d*" terminal. This negative potential is supplied to the resistive input of an "AND" gate 6152. The diode input of this gate drops to a negative potential when the monostable multivibrator 6146 restores to its normal condition. When the first half 6101 of the counter 6100 is restored to its normal condition, the negative potential at the output of the "AND" gate 6162 is removed, and the inverter 6166 returns to a nonconductive condition. If the fault occurs again so that the inverter 6166 is again operated to drive the monostable multivibrator 6146 to its operated condition, the first half 6101 of the counter 6100 is again restored to its reset condition in the manner described above. However, when the "*d*" terminal of the component 6146 rises to ground potential, a positive-going pulse is supplied through the gate 6152 and a coupling network to the "*c*" terminal of the second alarm flip-flip 6154. When this flip-flip is operated to its set condition, ground potential is supplied to its "*e*" terminal to provide a suitable alarm indication. The negative potential applied to its "*d*" terminal is forwarded through the "OR" gate 6172 to hold the inverter 6170 in a conductive condition. The ground potential supplied at the output of the inverter 6170 prevents the operation of the units 6111, 6113, 6115 and 6117. Thus, during further operation of the counter 6100, only the second half 6102 thereof is operative to actuate the units 6112, 6114, 6116 and 6118. The first half 6101 of the counter 6100 can be restored to a normal condition by the application of ground potential to the reset terminal RS.

The first half 6101 of the dual counter 6100 includes a second means for actuating the alarm flip-flips 6150 and 6154 in the event that more than one of the flip-flips 6130–6133 are simultaneously operated to their set conditions so as to prevent "double running." This check is made at the time that the flip-flip 6133 is operated to its set condition so that its "*e*" terminal rises to ground potential. This ground potential is forwarded to the "*c*" terminal of an inverter 6144 to condition this inverter for operation. If, at the same time, any one of the flip-flips 6130–6132 is in a set condition so that negative potential is applied to the "*d*" terminal thereof, this potential is forwarded through an "OR" gate 6160 and a pair of gates 6158 and 6156 to place the inverter in operation. The operation of the inverter 6144 again operates the monostable multivibrator 6146 so that the first half 6101 of the counter 6100 is reset and the first alarm flip-flip 6150 is operated. If the alarm condition is again established, the second alarm flip-flip 6154 is operated in the manner described above. The second half 6102 of the dual slot counter 6100 includes similar checking and alarm means.

The dual highway counter 5800, as described above, operates to render the ten highway enabling units 6001–6010 effective in sequence so that the gates in the matrix 6000 representing the trunks on each of the ten highways are enabled in succession. The dual highway counter includes a first half 5960 and a second half 5860. These two portions of the counter 5800 are identical to each other and are both similar to the corresponding halves of the dual slot counter 6100. Each of the halves of the dual highway counter 5800 include five flip-flips 5915–5919, the "*d*" terminals of which are connected to five of the units 5840–5844 and 5901–5905. The flip-flips in the first half 5960 of the counter 5800 are connected to the units 5901–5905 representing the highways nine, seven, five, three and one, respectively. The outputs of the five flip-flips in the second half 5850 of the dual counter 5800 are connected to the five units 5840–5844 representing the highways ten, eight, six, four and two, respectively. Thus, by the alternate operation of the two halves 5860 and 5960 of the counter 5800 in the manner described above, the units 5840–5844 and 5901–5905 are enabled in sequence.

As an example, the unit 5905 representing highway one includes an input "AND" gate 5910, the resistive input of which is connected to the "*d*" terminal of the flip-flip 5919. One of the diode inputs of this gate is connected to the negative potential normally supplied at the output of the inverter 5678. The other diode input to this gate is connected to the terminal "*a*" of an inverter 5928 which is associated with the first half 5960 of the dual counter 5800. Thus, when the flip-flip 5919 is operated and the inverter 5928 is in a nonconductive condition, a negative potential appears at the output of the gate 5910 and is forwarded through an "OR" gate 5908 to the input of an inverter 5906. When this inverter is placed in conduction, a ground potential is forwarded to the diode input of the gate 6016 in the unit 6001 associated with the highway one scanning means in the matrix 6000.

When an operating pulse is received from the monostable multivibrator 6022 at the end of a cycle of operation of the dual slot counter 6100, the setting of the input flip-flop 5856 is shifted so that the "*d*" terminal rises to ground potential and the "*c*" terminal drops to a negative potential. This negative potential is effective to render the inverter 5928 conductive so that the units 5901–5905 are rendered ineffective and so that the counter 5800 is advanced a single step. The ground potential provided at the terminal "*b*" of the input flip-flop 5856 is forwarded to the input of an inverter 5850 to render the gate 5910 in the unit 5844 representing highway two effective. Thus, the dual highway counter 5800 operates in the same manner as the dual slot counter 6100.

The two halves 5860 and 5960 of the counter 5800 includes checking means controlled by a pair of inverters 5938 and 5948 and a monostable multivibrator 5956 for controlling the operation of a pair of alarm flip-flips 5954 and 5942 which operate in the same manner as described above in conjunction with the dual slot counter 6100. Further, as in the case of the counter 6100, the proper allocation of the highways to the trunks in different groups maintains the operability of the line and route selector 730 to perform a trunk hunting or finding operation when one or the other of the halves of the dual counter 5800 is rendered ineffective.

To illustrate a typical operation of the routing control unit 700 when a routing digit is stored in an associated subscriber register, it is assumed that the digit "9" is stored in the first digit register in the associated subscriber register and that trunk "1," which occupies time slot twenty-one on highway one, (FIG. 86) is in the trunk group reached by the routing digit "9." Thus, the input terminal on the frame 5642 to which the output of the gate 6046 in the matrix cross-point representing the twenty-first time position on highway one is connected is strapped to an output terminal identified as "9" on the frame 5642. This terminal is connected to the "*b*" terminal of a pulse amplifier 5649 in a group of similar amplifiers 5643–5649 representing the routing digits "3"–"9." If trunk "1" had been assigned to the group of trunks reached by the routing digit "5," for instance, the output of the gate 6046 would be strapped through the frame 5642 to the terminal designated as "5," as indicated by the dashed line in FIG. 56. In this manner, any one of the eighty trunks provided by the time slots TP21–TP28 on the highways one to ten can be selected by any one of the routing digits "3"–"9." Further, by the allocation of trunks to different highways and different time slots, the availability of trunks reached by any one of the routing digits can be maintained even though one of the halves of the dual highway counter 6800 or the dual slot counter 6100 is placed in an inoperative condition.

Figure 56:
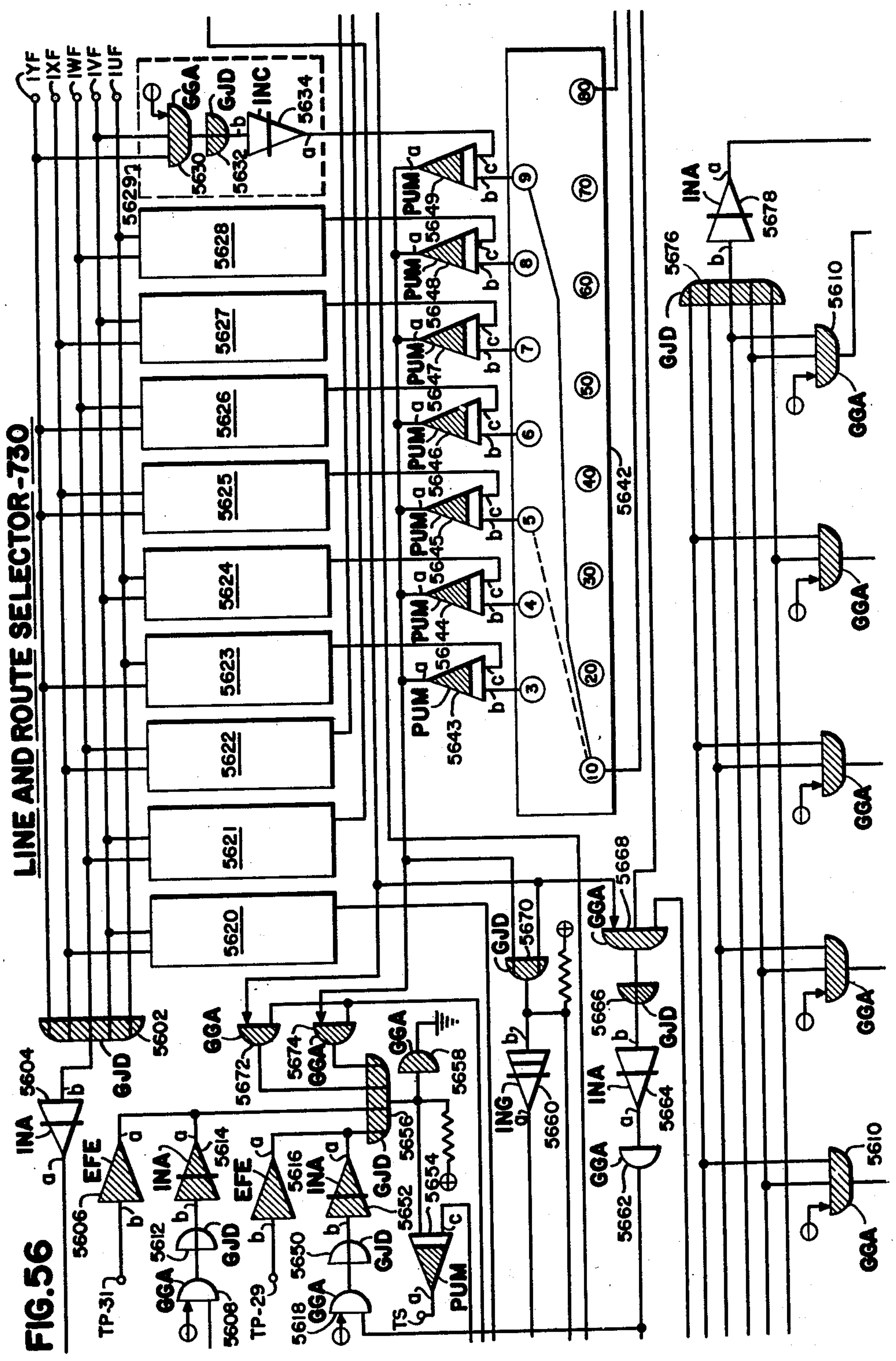
Figure 57:
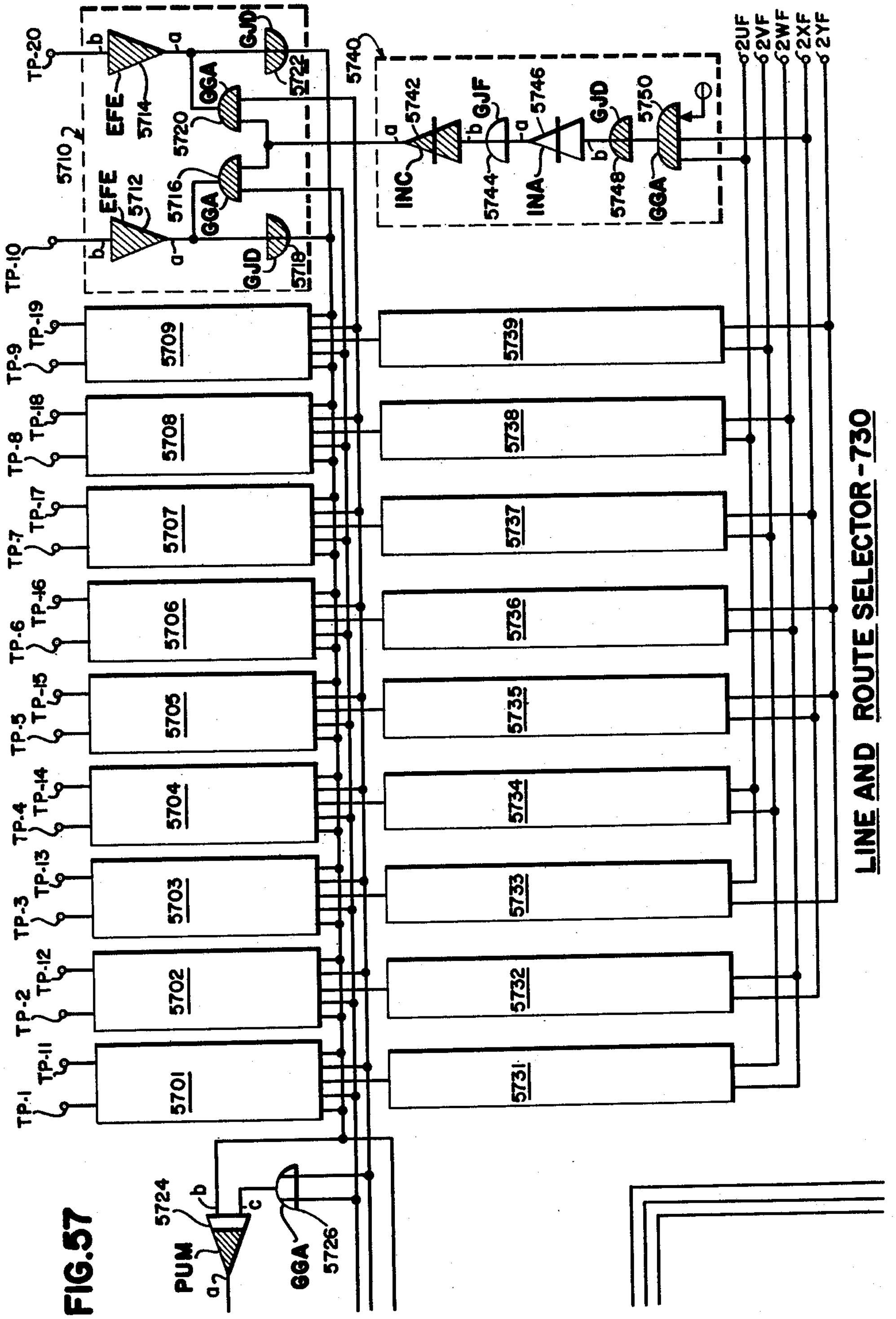
Figure 58:
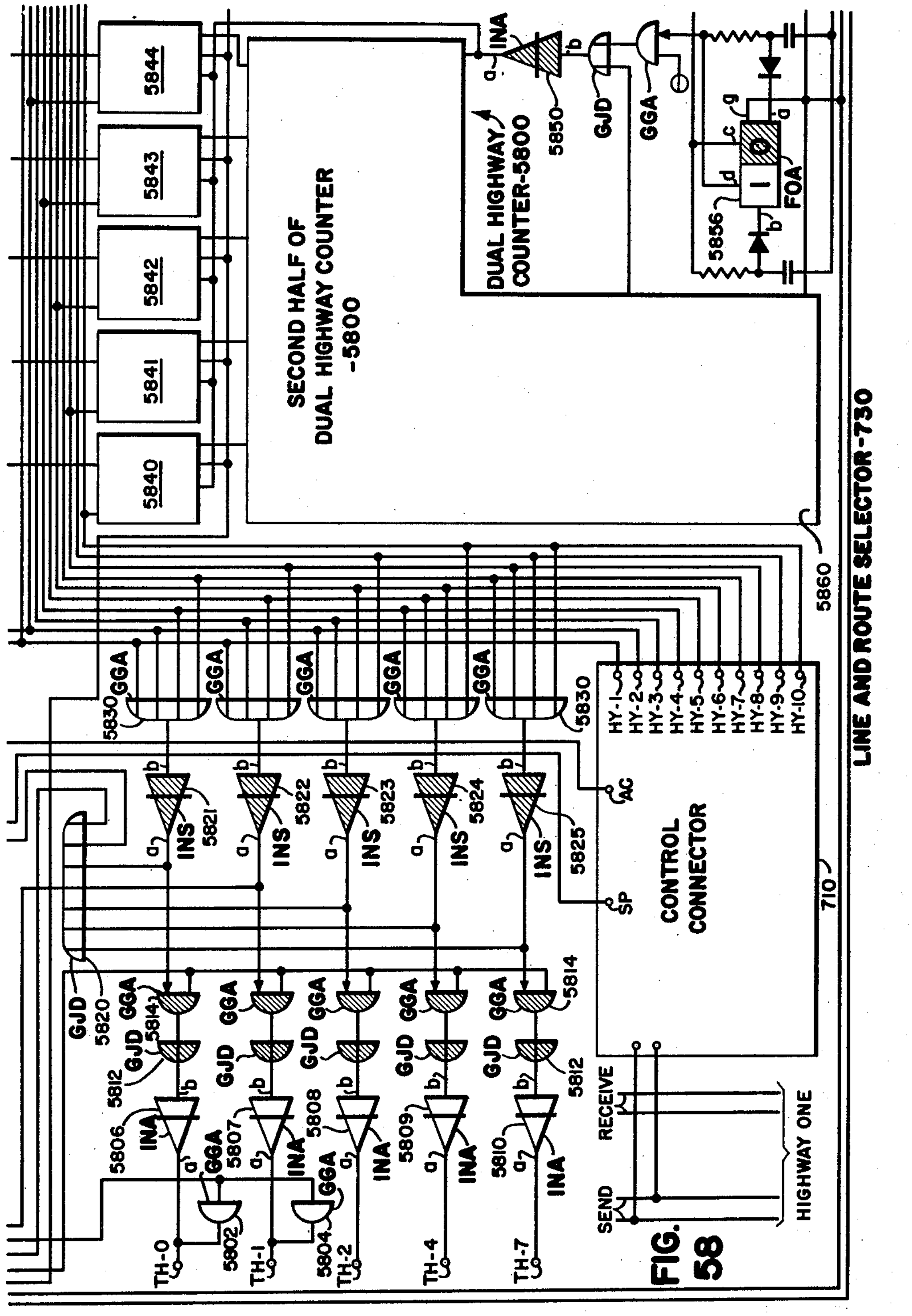
Figure 59:
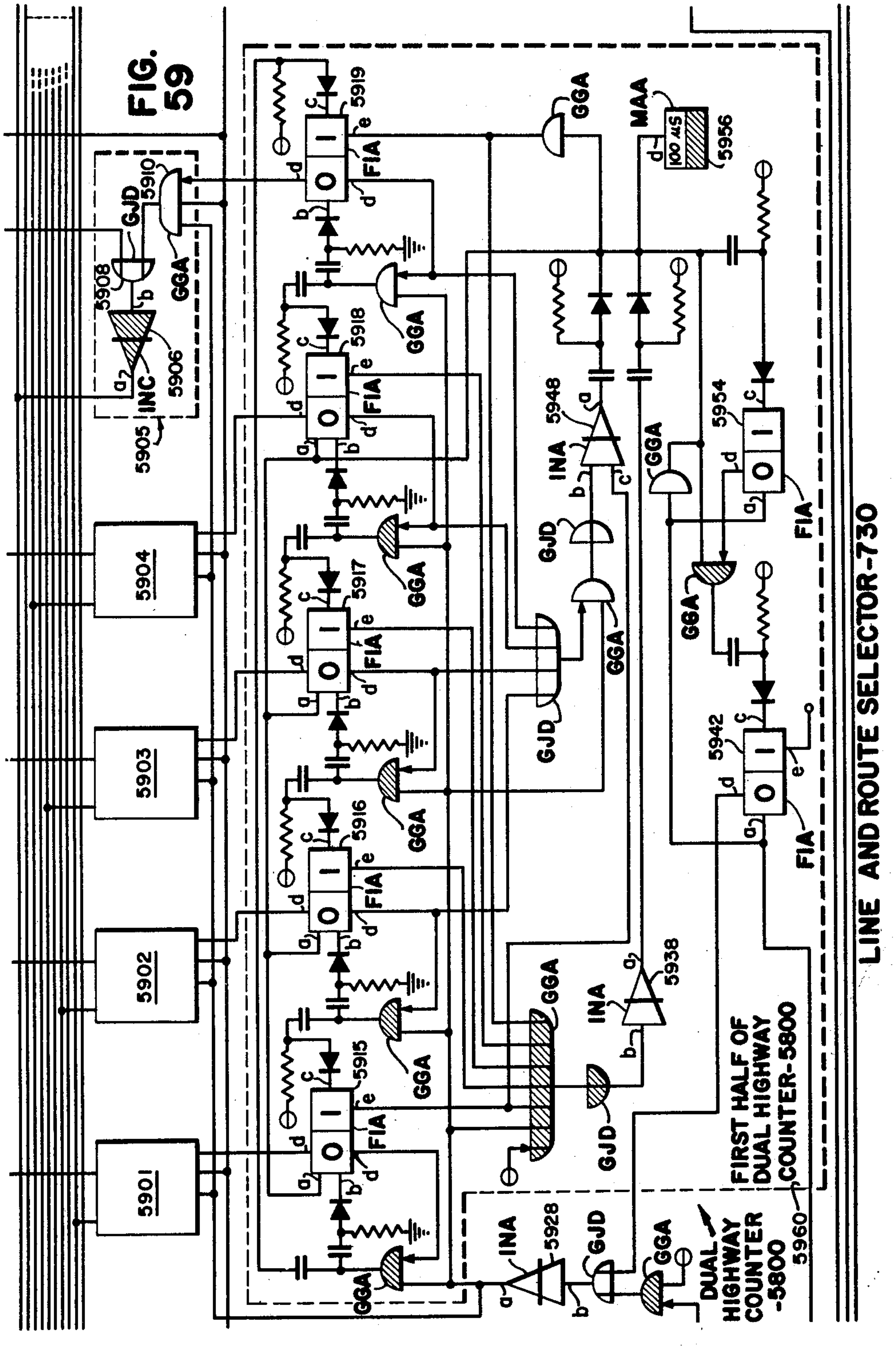
Figure 60:
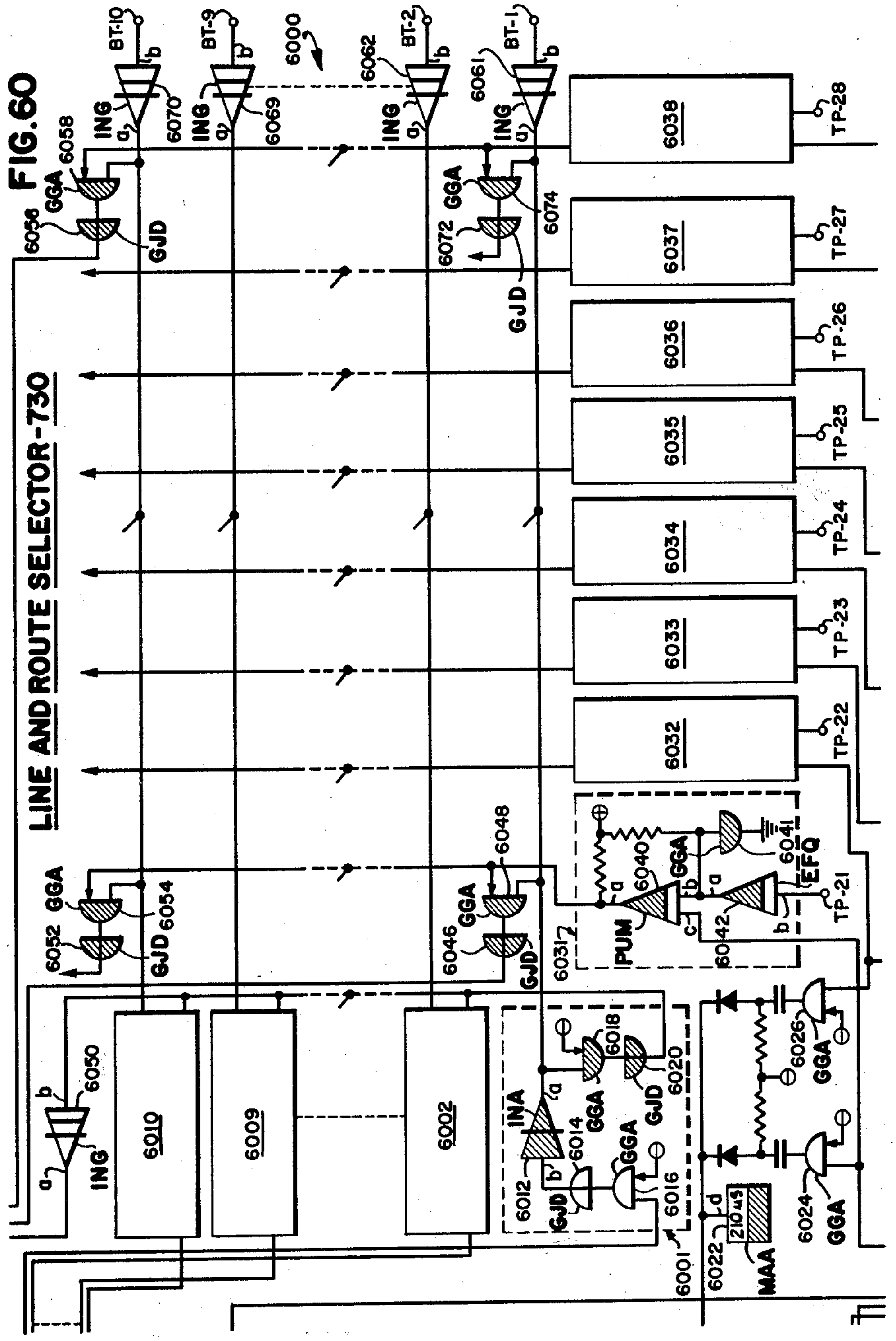

In the illustrative call, when the digit "9" is stored in the subscriber register 500 and the register finder 630 ascertains that the routing control unit 700 is idle and is capable of receiving information from one of the subscriber registers, this register is rendered effective to readout a coded representation of the value of the stored routing digit "9" by selectively applying a negative potential to two out of five terminals 1UF–1YF (FIG. 56). Since the value of the stored routing digit is "9" a negative potential is applied to the terminals 1YF and 1VF so that the negative output of an "AND" gate 6330 is effective through a gate 5632 to place an inverter 5634 in conduction. When this inverter is placed in conduction, its ground output potential is forwarded to the "*c*" terminal of the pulse amplifier 5649 representing the routing digit "9." Thus, this inverter is conditioned for operation. The gates 5630 and 5632 and the inverter 5634 form a unit 5629 which is one of ten identical units 5620–5629 representing "0" and "1"–"9." The inputs to the units 5620–5628 are connected to the input terminals 1UF–1YF in the combinations illustrated in FIG. 56 so that different ones of these units are rendered effective in accordance with the value of the digit stored in the first digit register in the associated subscriber or position register. Since only the input gate 5630 in the unit 5629 is enabled by the application of negative potentials to the terminals 1YF and 1DF, the inverters in the unit 5620–5628 remain in a nonconductive condition so that the outputs thereof remain at a negative potential. Thus, the pulse amplifiers 5643–5648 representing the routing digits "3"–"8" are not conditioned for operation.

The negative potential applied to one of the terminals 1UF–1YF is also forwarded through an "OR" gate 5602 to the input of an inverter 5604 which is placed in conduction so that the output thereof rises to ground. This ground potential is effective through a pair of gates 5564 and 5562 to render an inverter 5558 nonconductive. The output of the inverter 5558 is used to reset a plurality of flip-flips in the line and route selector 730 by selectively applying ground to the "*a*" terminals thereof when the line and route selector 730 is restored to a normal condition. In addition, when the inverter 5558 is rendered nonconductive, the negative potential at the output is used to enable a plurality of gates 5550, 5460, 5462, 5454 and 5438. One of the diode inputs of the gate 5438 is connected to a negative potential at the "*e*" terminal of a reset flip-flip 5436. The resistive input to the "AND" gate 5438 is connected to the output of an emitter follower 5444. The input to this emitter follower is connected to the TP32 terminal of the time pulse generator. Thus, the emitter follower 5444 is rendered nonconductive to supply a negative-going signal to the gate 5438 each time that a complete cycle of operation of the time pulse generator is completed. When the resistive input of the gate 5438 drops to a negative potential, the output of the gate 5438 drops to a negative potential which is effective through a gate 5440 to render the inverter 5442 conductive. This operation of the inverter 5442 supplies a drive pulse to the control or input flip-flop 6182 in the dual slot counter 6100. Thus, when the inverter 5558 is rendered nonconductive in response to the receipt of a digit from the first digit register in the associated subscriber or position register, the time pulse source is rendered effective to supply operating signals to the dual slot counter 6100.

As described above, it is assumed that the dual highway counter 5800 has been operated to its setting representing highway one so that the output of the gate 5910 in the unit 5905 drops to a negative potential. This is forwarded through the "OR" gate 5908 to place the inverter 5906 in conduction. When the inverter 5906 is placed in conduction, the ground potential at the output thereof is forwarded through the gates 6014 and 6016 to render the inverter 6012 nonconductive. This permits the potential at one input of all of the gates in the matrix 6000 designating trunks on highway one to drop to a negative potential. Thus, the diode input to the gate 6048 representing trunk "1" drops to a negative potential.

The negative potential at the output of the inverter 5096 is also forwarded to the inputs of the uppermost two of five "OR" gates 5830 to be applied to the "*b*" terminals of a pair of inverters 5821 and 5822. This renders these inverters nonconductive so that the output thereof drops to a negative potential. This negative potential is forwarded to the resistance inputs of the uppermost two of five "AND" gates 5814. The diode inputs to these gates are connected to ground at the output of a normally conductive inverter 5940 so that these two gates are only partially enabled at this time. The two inverters 5821 and 5822, together with three additional inverters 5823–5825, are controlled by the gates 5830 in accordance with the setting of the dual highway counter 5800 to provide two out of five coded representations of the designation of the highway to which the dual highway counter 5800 has been set. The negative potentials provided at the outputs of the inverters 5821 and 5822 representing the coded designation of highway one are forwarded through an "AND" gate 5820 to the resistive input of the "AND" gate 5454.

Referring back to the trunk finding martix 6000, the diode input of the "AND" gate 6048 is dropped to a negative potential at the output of the inverter 6012 as described above. In the illustrative condition assumed above, the dual slot counter 6100 is in a setting in which the inverter 6170 is nonconductive and the flip-flop 6130 is operated to its set condition so that all of the inputs to the gate 6124 in the unit 6111 representing the twenty-first time position are at a negative potential. This negative potential is forwarded through the gate 6122 to place the inverter 6120 in conduction. The ground potential at the output of the inverter 6120 is forwarded to the "*c*" terminal of the pulse amplifier 6020 to enable this amplifier for operation. Thus, when the time pulse generator next reaches the twenty-first time position, a negative-going pulse is coupled through the emitter follower 6042 to momentarily place the pulse amplier 6040 in conduction so that a negative-going pulse is applied to the resistive inputs of all of the gates representing the trunk circuits in the local board 150 assigned to the twenty-first time position.

A primary busy test is now performed to determine the idle or busy condition of trunk "1." In the event that this trunk is busy, a negative-going pulse of twice the duration of the slot pulse and having a trailing edge corresponding to the trailing edge of the slot pulse in time position twenty-one is applied to the input of the inverter 6061 from the busy test conductor in the local board 150. This negative-going pulse places the inverter 6061 in conduction so that the output thereof drops to ground. This shunts the negative potential provided at the output of the inverter 6012 and removes the enabling potential from the diode input to the gate 6048. This busy pulse, although raising the potential on all of the gates on highway one, is effective on only the gate 6048 inasmuch as this is the only trunk gate on highway one that is also enabled in the twenty-first time position. Thus, the gates 6048 and 6046 can not provide an output signal in the event that a trunk is in a busy condition.

Assuming that trunk "1" is idle, the output of the gate 6048 provides a negative-going pulse which is forwarded through the gate 6046 to the proper terminal of the frame 5642. This negative-going pulse, as indicated by the strapping shown in FIG. 56, is forwarded to the "*b*" terminal of the pulse amplifier 5649. This amplifier is conditioned for operation by the ground potential applied to the "*c*" terminal thereof through the amplifier 5634 in the unit 5629 representing the stored routing digit "9." Thus, the pulse in the twenty-first time position momentarily renders the pulse amplifier 5649 conductive so that the output thereof momentarily drops to a negative potential. This negative-going pulse is forwarded through an "AND" gate 5674 and an "OR" gate 5656 to the "*b*" terminal of a pulse amplifier 5654. The amplifier 5654 is not operated by the negative pulse supplied to its "*b*" terminal inasmuch as its "*c*" terminal is held at a negative potential at the output of an inverter 5578. The output of the inverter 5654 is connected to the terminal TS and is used to supply periodic negative-going pulses in the twenty-first time position representing the time position of the selected trunk. The pulse amplifier 5654 is subsequently enabled to permit the application of pulses to the terminal TS when the line and route selector 730 is actuated to read this information out to the associated link or position register. The negative-going pulses provided at the output of the amplifier 5649 are also supplied through an "OR" gate 5670 to the input of an inverter 5660. These pulses momentarily render this inverter conductive so that the output thereof supplies positive-going pulses through a coupling network to the "*c*" terminal of the flip-flip 5436. These positive-going pulses operate the flip-flip to its set condition so that ground is applied to its "*e*" terminal. This ground clamps the output of the gate 5438 at ground so that drive pulses in the thirty-second time position are not supplied from the emitter 5444 to the inverter 5442. Thus, the source of drive pulses for the dual slot counter 6100 are removed and the counters 5800 and 6100 remain in the settings described above. Accordingly, during each subsequent cycle of operation of the time pulse generator the gates 6048 and 6046 continue to supply an operating signal through the frame 5642 to the input of the routing digit "9" pulse amplifier 5649. Thus, as soon as an idle trunk in the proper trunk group has been located, the trunk finding operation is terminated by arresting further operation of the dual highway counter 5800 and the dual slot counter 6100. The matrix 6000 remains in a condition in which the crosspoint corresponding to the idle trunk is the only crosspoint effective to supply an operating signal to the frame 5642.

Now that trunk one has been determined to be in an idle condition by the primary busy test performed in the matrix 6000, the line and route selector 730 next performs a secondary busy test on the selected trunk to search for the presence of seize or release tones since it is possible for the trunk to be engaged in initiating or releasing a call without a busy pulse appearing in the proper time position on highway one. As described above, the setting of the dual highway counter 5800 is maintained in the highway one position represented by the ground at the output of the inverter 5906 in the unit 5905. This ground is forwarded not only to the matrix 6000 and the gates 5830 controlling the coded marking of the designation of the highway but also to a terminal HY1 of the control connector 710. Thus, this connector is provided with information representing the highway on which the selected trunk is located.

When the negative-going slot pulses are applied to the gate 5670 from the digit "9" amplifier 5649, these pulses are also forwarded to the SP terminal of the control connector 710. Since these negative-going signals appear in the time position of the selected trunk on highway one, the control connector 710 is provided with all the necessary information for connecting the send path on highway one to the input XAG of the multifrequency signal detector 720 in the twenty-first time position. In the event that a seize or a release tone is detected in this time position, thus indicating that the selected trunk is either engaged in releasing a connection or establishing a connection, a positive potential is applied to a terminal RD. If the secondary busy test is satisfactorily completed, the normal extension of the call can continue.

Referring back to the above described operation of the inverter 5604 in response to the transfer of the routing digit "9" to the line and route selector 730, this inverter supplies a positive-going pulse through a coupling network to the "*d*" terminal of a monostable multivibrator 5516. The delay period of this component is approximately 80 milliseconds during which the trunk finding operation described above takes place. At the end of the delay interval, the "*a*" terminal of the multivibrator 5516, which was dropped to a negative potential, rises to ground to forward a positive-going pulse through a coupling network to the "*c*" terminal of a flip-flip 5554. When the flip-flip 5554 is set, the negative potential at its "*d*" terminal is forwarded to the resistive input of an "AND" gate 5510. The diode input of this gate is connected to a source of negative-going pulses at a terminal ICDR. When the first such pulse is supplied, the output of the gate 5510 drops to a negative potential which is forwarded through a gate 5508 to the input of an inverter 5506. This pulse momentarily places the inverter 5506 in conduction so that a positive-going pulse is supplied through a coupling network to the "*c*" terminal of a flip-flip 5512. This operates the flip-flip 5512 to a set condition so that its "*d*" terminal drops to a negative potential to enable a gate 5520, the diode input of which is returned to a negative potential at the output of the inverter 5506.

The ground potential at the "*e*" terminal of the flip-flip 5512 is forwarded through an "OR" gate 5560 to the terminal AI. This ground is forwarded to the subscriber register allotter 620 and the register finder 630 to inhibit the operation of these components so that the only information that can be applied to the common highway and time slot conductors in the local office 150 is that pertaining to the call being established at this time under the control of the line and route selector 730. It should be noted that the output of the gate 5560 can also be clamped at ground when the called circuit information is to be transferred from the position register 1000 to an idle link. At this time, the register 1000 applies a negative signal to a terminal PA which is forwarded through a gate 5568 to render an inverter 5566 conductive. This clamps the terminal AI at ground through the gate 5560.

When the next negative-going drive pulse is supplied by the terminal ICDR, the inverter 5506 is again momentarily rendered conductive to forward a positive-going pulse through the enabled gate 5520 to the "*c*" terminal of a flip-flip 5528. This operates this flip-flip to its set condition in which the negative potential at its "*d*" terminal is applied to the resistive input of a gate 5532. Thus, when the next drive pulse is applied to the inverter 5506, a positive-going pulse is supplied through the enabled gate 5532 to the "*c*" terminal of a flip-flip 5552. This pulse operates this flip-flop to its set condition so that a negative potential is applied to its "*d*" terminal.

If the call is originated in the position register 1000, ground potential is applied to a terminal PD by the register 1000 to ground the "*c*" terminal of an inverter 5570. Thus, when a negative potential is applied to the "*d*" terminal of the flip-flip 5552, the inverter 5570 is placed in conduction so that ground is applied to an inverter 5574 through a gate 5572. This renders the inverter 5574 nonconductive so that a negative signal is applied to a terminal RTD. This terminal is connected to the position register 1000 and renders this component effective to receive the identity of the selected outgoing trunk which is now stored in the line and route selector 730. However, if the call originates in a subscriber register, such as the subscriber register 500, the terminal PD remains at a negative potential and the inverter 5570 can not be rendered conductive. However, the negative potential supplied at the "*d*" terminal of the flip-flip 5552 is forwarded through a gate 5576 so that a negative potential is applied to the terminal WR. This terminal is connected to the link associated with the unit 700, to the register finder 630, and to the effective subscriber register, such as the register 500. The application of the negative potential to the terminal WR conditions the link to receive the highway and time slot designations of the calling line or trunk and the outgoing trunk, i.e., the trunk "1" in the twenty-first time position on highway one. This negative signal also operates the subscriber register 500 to transfer the stored calling highway and time slot information to the link.

When the call is originated at either the position register 1000 or one of the subscriber registers 500, 600 or 610, the negative potential provided at the "*d*" terminal of the flip-flip 5552 is also forwarded to the input of an inverter 5578 so that this inverter is rendered conductive. The output of the inverter 5578 rises to ground and renders the pulse amplifier 5654 responsive to control by the negative-going pulses supplied to its "*b*" terminal. As described above, the pulse amplifier 5654 is provided with negative-going pulses in the twenty-first time position representing the time slot of the selected outgoing trunk. Thus, the terminal TS is provided with the negative-going pulses in the twenty-first time position. The terminal TS is connected to a slot pulse regeneration circuit, and the output of this circuit is supplied to either the position register 1000 or one of the links.

When the flip-flip 5552 is operated to its set condition, the ground potential supplied at its "*e*" terminal is forwarded to the input of a gate 5508 so that the output thereof rises to ground and is effective through a gate 5582 to render an inverter 5584 nonconductive. When the output of the inverter 5584 drops to a negative potential, all of the inputs to an "AND" gate 5482 are at a negative potential so that the output of this gate is effective through a gate 5484 to place an inverter 5486 in conduction. When the output of the inverter 5486 rises to ground potential, this potential is effective through a gate 5488 to render an inverter 5490 nonconductive. The negative output of the inverter 5490 is applied to the diode inputs of the plurality of gates 5814 so that these gates are enabled for operation. As described above, since the selected trunk is on highway one, the inverters 5821 and 5822 are in a nonconductive condition so that both of the inputs to the uppermost two gates 5814 are at a negative potential. These negative potentials are forwarded through the uppermost two of the gates 5812 to render the inverters 5806 and 5807 conductive. When these two inverters are rendered conductive, ground is applied to the terminals TH0 and TH1 to transmit a two out of five coded designation of the highway one to either the position register 1000 or the effective one of the links. In addition, the negative potential at the output of the inverter 5584 is forwarded to one input of a gate 5402. The other diode input of this gate is connected to a negative potential at the output of the inverter 5678. Accordingly, a terminal TM is marked with a negative potential by the gate 5402 to advise the link that the call is going out over a trunk so that ringing will not be required in the link.

When the necessary calling and called highway and time slot information has been transferred to the position register 1000 or the link, the subscriber register 500 or the position register 1000 removes the negative marking signals from the terminals 1UF–1YF so that the inverter 5634 is again rendered nonconductive to block the output of the pulse amplifier 5649. This terminates the transmission of the calling slot information to the link or position register and releases the control connector 710 so that the multifrequency signal detector 720 is no longer connected to the selected trunk. This removal of the negative marking signals also renders the inverter 5604 nonconductive so that the inverter 5558 is rendered nonconductive to supply a positive-going pulse to the terminal TST of the multifrequency signal detector 720. As described in detail in the above identified copending Schmidt application, this operates the signal detector 720 to perform a checking operation during which the operability of the frequency responsive components therein is determined.

Further, when the inverter 5558 is rendered conductive, ground is forwarded to the "*a*" terminals of all of the flip-flips in the line and route selector 730 with the exception of those in the dual highway counter 5800 and the dual slot counter 6100. This resets these flip-flips to their normal condition and restores all of the components controlled thereby to their normal condition. This removes the ground marking from the terminals TH0 and TH1 representing the designation of the highway on which the selected trunk is located. Although the resetting of the flip-flip 5436 again returns negative potential to one of the diode inputs of the gate 5438, the ground potential at the output of the inverter 5558 blocks this gate to prevent the dual slot counter 6100 from being advanced by the time pulses. Thus, the dual highway counter 5800 and the dual slot counter 6100 remain in the setting of the selected trunk until such time as the line and route selector 730 is again placed in operation.

*Operation of the Routing Control Unit 700 on a Call Requiring Routing When an All-Trunks-Busy Condition Is Established*

The line and route selector 730 includes means for returning all-trunks-busy tone to the calling subscriber, when all of the trunks that can be reached by the routing digit are in a busy condition, as determined by the primary busy test performed in the matrix 6000. As described in detail above, the dual slot counter 6100 is operated by the time slot pulse appearing in the thirty-second time position, which pulse is forwarded through the gate 5438 following the storage of a routing digit in the line and route selector 730. At the end of each cycle of operation of the dual slot counter 6100, the dual highway counter 5800 is advanced a single step. When an idle trunk is selected, the flip-flip 5436 is operated to its set position so that the output of the gate 5438 is clamped at ground. Thus, the counters 5800 and 6100 continuously scan the matrix 6000 for an idle trunk in the selected group represented by the stored routing digit. The first time that the units 5905 and 5844 representing highways one and two are operated, the inverters 5906 in these two units supply positive pulses through a pair of gates 5536 and 5538 to the "*d*" terminal of a monostable multivibrator 5534. These positive pulses operate the multivibrator 5534 to its unstable state so that ground is applied to its "*d*" terminal. The delay interval of the multivibrator 5534 is greater than the time required to operate the units 5905 and 5844 in succession so as to prevent the application of two successive operating pulses to a first flip-flip 5542.

The provision of the two gates 5536 and 5534 controlled by the units 5905 and 5844, respectively, provides means for operating the multivibrator 5534 when only one of the two halves 5860 and 5960 of the dual highway counter 5900 is in an operative condition. When the "*d*" terminal of the monostable multivibrator 5534 rises to ground potential, a positive-going pulse is transmitted through a coupling network to the "*c*" terminal of the flip-flip 5542 to operate this component to its set condition in which a negative potential is applied from its "*d*" terminal to the resistive input to an "AND" gate 5544.

If the dual highway counter 5800 is operated through another complete cycle of operation during which the matrix 6000 fails to locate an idle trunk in the selected group, one or both of the gates 5536 and 5538 again supply an operating signal to the multivibrator 5534 so that the "*d*" terminal thereof again rises to ground potential. When the "*d*" terminal of the multivibrator 5534 rises to ground potential, a positive-going pulse is coupled through the gate 5544 to the "*c*" terminal of a flip-flip 5586, thereby operating this component to its set condition in which ground is applied to its "*d*" terminal and a negative potential is applied to its "*d*" terminal. The ground potential applied to the "*e*" terminal is forwarded to the diode input of a gate 5605 so that the output of this gate drops to ground. This ground potential is effective through a gate 5612 to render an inverter 5614 nonconductive. This removes the ground clamp from the output of an emitter follower 5606, the input of which is connected to a terminal TP 31 to receive negative-going pulses in the thirty-first time position. Thus, when these pulses are supplied to the input of the emitter follower 5606, corresponding negative-going pulses are applied to the "*b*" terminal of the pulse amplifier 5654.

The negative potential at the "*d*" terminal of the flip-flip 5586 is forwarded to one of the diode inputs of a pair of "OR" gates 5410 and 5408 so that the resistive inputs to a pair of gates 5400 and 5412 drop to a negative potential. The ground potential supplied to the "*e*" terminal of the flip-flip 5586 is also forwarded to one of the diode inputs to the "AND" gate 5482 to clamp the output of this gate at ground so that the gates 5014 for reading out the value of the highway designation represented by the setting of the highway counter 5800 are disabled. This ground potential is also forwarded through an "OR" gate 5450 and a gate 5556 to the "*e*" terminal of the flip-flip 5554. This operates this flip-flip to its set condition in which a negative potential is applied to its "*d*" terminal. The ground supplied through the "OR" gate 5450 is also forwarded through a gate 5530 to clamp the input to the coupling network for the flip-flip 5554 at ground. The ground at the "*e*" terminal of the flip-flip 5586 also disables the outputs of the counters 5800 and 6100, sets the flip-flip 5436 to interrupt the drive pulses for these counters, and clamps the output of the gate 5402 at ground to prevent a negative marking potential from being applied to the terminal TM.

When the "*d*" terminal of the flip-flip 5554 drops to a negative potential, the flip-flips 5512, 5528 and 5522 are operated in the manner described above. The operation of the flip-flip 5552 to its set condition again supplies a negative signal to the terminal WR, if the call is placed from one of the subscriber registers 500, 600 or 610, and applies a negative potential to the terminal RTD, if the call is placed from the position register 1000. The operation of the flip-flip 5512 to its set condition also forwards a negative potential to the inhibit terminal AI through the gate 5560. The negative potential supplied to the terminal "*d*" of the flip-flip 5552 is also forwarded to the input of the inverter 5578 to render this inverter conductive so that the pulse amplifier 5654 is operative to supply negative-going pulses in the thirty-first time position to the terminal TS. These pulses are supplied through the slot pulse regeneration circuit to either the position register or the seized link.

When the flip-flip 5552 is operated to its set condition, the ground potential at its "*d*" terminal is forwarded through the gates 5580 and 5582 to again render the inverter 5584 nonconductive so that the output thereof drops to a negative potential. This negative potential is not effective through the gate 5482 to render the inverter 5590 nonconductive because the output of the gates 5482 is clamped at ground at the "*e*" terminal of the set flip-flip 5586. However, this negative potential is forwarded to one of the diode inputs of each of the gates 5400 and 5412. The gate 5400 has previously been enabled through the "OR" gate 5408 from the set flip-flip 5586 so that the application of a negative potential to the diode input thereof causes a negative potential to be supplied to the terminal BM. The negative signal at the terminal BM is forwarded to the link as an indication that an all-trunks-busy condition has been established in the line and route selector 730 and that an outgoing trunk in the group represented by the stored routing digit can not be selected.

The negative potential applied to the diode input of the gate 5412 is effective through a gate 5418 to place an inverter 5420 in conduction so that the output thereof rises to ground. This ground potential clamps the outputs of the gates 5672 and 5674 at ground to prevent these gates from supplying pulses to the input of the pulse amplifier 5654. This ground potential is also forwarded through a pair of gates 5802 and 5804 to mark the terminals TH0 and TH1 with ground potential. This causes the position register 1000 or the link to store highway one. Since these components are also being supplied with slot pulses in the thirty-first time position from the pulse amplifier 5654, the highway one and time slot thirty-one designation is stored in the link or the position register circuit. As indicated in the table in FIG. 86, in the thirty-first time position on highway one is provided with trunk busy tone. Thus, the storage of this information causes trunk busy tone to be returned to the calling station. When the marking signals are removed from the terminals 1UF—1YF, the routing control unit 700 is restored to a normal condition in the manner described above.

*Operation of the Line and Route Selector 730 on a Call Requiring Routing When Seize or Release Tones are Detected on the Selected Trunk*

As described above, in the event that an idle trunk in the group selected by the stored routing digit is found by the matrix 6000, the control connector 710 is operated to interconnect the selected trunk with the multifrequency signal detector 720. Since a trunk or line circuit can be engaged in initiating or releasing a call, as indicated by the presence of seize or release tones on the trunk, without the trunk being marked as busy on the common busy test conductors in the local board 150, it is necessary to perform a secondary busy test following the selection of an apparently idle trunk. In the event that seize or release tones are detected in the multifrequency detector 720, a positive potential is applied to the terminal RD to supply a positive pulse through a coupling network of the "*b*" terminal of a flip-flip 5416. This pulse operates the flip-flip 5416 to its set condition so as to cause line busy tone to be returned.

More specifically, when the flip-flip 5416 is operated to its set condition, ground is applied from its "*e*" terminal to one of the diode inputs to the gate 5482, thereby to clamp the output of this gate at ground to prevent the normal readout of the highway information provided by the dual highway counter 5800. This ground is also forwarded through a gate 5417 to interrupt the drive pulses for the counter 5800 and 6100, to disable the outputs of these counters, and to again clamp the terminal TM at ground through the gate 5402. The removal of the output from the counters releases the control connector 710, but this does not change the setting of the flip-flip even though the detector 720 is removed from the calling path.

This ground potential is also forwarded to the diode input of a gate 5618 so that the output of this gate rises to ground potential and is effective through a gate 5650 to render an inverter 5652 nonconductive. This removes the ground shunt around the output of an emitter follower 5616, the input of which is connected to a terminal TP 29. This terminal supplies a negative-going pulse in the twenty-ninth time position, which is forwarded to the "*b*" terminal of the output pulse amplifier 5654. These pulses are not applied to the terminal TS at this time inasmuch as the terminal "*c*" of the amplifier 5614 is held at a negative potential by the inverter 5578. The negative potential provided at the "*d*" terminal of the operated flip-flip 5416 is forwarded to the gates 5410 and 5408 to condition the gates 5400 and 5412, as described above.

When the "*e*" terminal of the flip-flip 5416 rises to ground potential, this potential is effective through the "OR" gate 5450 to again operate the flip-flip 5554 to its set condition so that the flip-flips 5512, 5528 and 5552 are again set in sequence under the control of the drive pulses supplied at the terminal ICDR. The sequential operation of these flip-flips again supplies an inhibit signal to the terminal AI and a negative signal to one of the terminals RTD or WR, as described above. When the flip-flip 5552 is set, the inverter 5578 is again rendered conductive so that the output pulse amplifier 5654 supplies negative-going pulses in the twenty-ninth position to either the position register or the link. Further, when the flip-flip 5552 is set, the inverter 5584 is again rendered nonconductive so that a negative signal is supplied to the gates 5400 and 5412. The gate 5400 again forwards a negative signal to terminal BM to advise the link or position register of the existence of the busy condition on the selected trunk. The "AND" gate 5412 again causes the inverter 5420 to be rendered conductive so that the gates 5802 and 5804 provide ground marking signals on the terminals TH0 and TH1 representing the two out of five coded designation of highway one. As illustrated in detail in FIG. 86, the line circuit assigned to twenty-ninth time slot on highway one is provided with line busy tone. Thus, the determination of a busy condition during the performance of the secondary busy test in the line and route selector 730 causes line busy tone to be returned. When digit marking is removed from the terminals 1UF–1YF, the line and route selector 730 is restored to a normal condition in the manner described above.

*Operation of the Routing Control Unit 700 on a Call Terminating in a Station Served by the Local Board 150*

The line and route selector 730 is capable of controlling the termination of a connection in one of the two hundred local line circuits served by the local board 150 which are designated by the digital designations "100–299" and which are assigned time slots one to twenty on highways one to ten. The line and route selector 730 is operated to provide information to the link circuit for selecting one of the local line circuits when three digits are forwarded to the line and route selector 730 and when the value of the first digit is either "1" or "2." The routing control unit 700 operates to terminate the call in the local board in the same manner when the call is originated in the local board 150, in one of the remote local boards, such as the boards 190 or 195, in a long distance board, such as the board 160, or in the position register 1000 in the local board 150. To illustrate a typical operation of the routing control unit 700 during the extension of a call to a local subscriber, it is assumed that the call is to be extended to the line designated as "101" in the local board 150. This line, as indicated in the table in FIG. 86, is assigned time slot ten on highway one.

When the line and route selector 730 is operated to control the extension of a connection to one of the line circuits in the local office, the trunk hunting facilities used in calls requiring routing are rendered ineffective, and the line and route selector 730 translates the values of the three digits supplied by the controlling register into signals representing the time slot and highway of the selected line. However, the line and route selector 730 performs both a primary and secondary busy test on the selected local line circuit to first determine its idle or busy condition and to then determine the presence or absence of seize and release tones.

When the values of the three digits "101" designating the desired local lines are transferred to the line and route selector 730 from the controlling register, two of each of the three groups of terminals 1UF–1YF (FIG. 56), 2UF–2YF (FIG. 57) and 3UF–3YF (FIG. 55) are marked with negative potential in accordance with the values of these three digits. The third or units digit "1" is represented by the application of negative potential to the terminals 3WF and 3YF (FIG. 55). The negative potential on either one of these two terminals is forwarded through an "OR" gate 5676 to render the inverter 5678 conductive. This elevates the output potential of this inverter to ground so that the outputs of all of the units 5840–5844, 5901–5905, and 6111–6118 are clamped at ground potential. This arrests the trunk hunting operation of the matrix 6000. The ground clamping potential supplied to the gates 5910 in the units 5840–5844 and 5901–5905 prevents the dual highway counter 5800 from controlling the application of marking potential to the control connector 710, the highway marking gates 5830 or the highway input units 6001–6010 associated with the scanning matrix 6000.

The ground potential output of the inverter 5678 is also forwarded to one of the diode inputs of the gate 5402 to clamp the output of this gate at ground. The output of the inverter 5678 is also forwarded through the gate 5432 to the "*e*" terminal of the flip-flip 5436. This operates this flip-flip to its set condition so that the ground at its "*e*" terminal clamps the output of the gate 5438 at ground to arrest the application of drive pulses to the counter 6100.

The negative marking potential supplied to the terminals 3WF and 3YF cause the output of the gate 5610 shown to the right in FIG. 56 to drop to a negative potential. This negative potential is effective through the "OR" gate 5908 to place the inverter 5906 in conduction. When the inverter 5906 is rendered conductive, the ground potential at the output thereof is forwarded to the uppermost two gates 5830 to render the inverters 5821 and 5822 nonconductive. This conditions the selector 730 to supply marking signals representing the highway on which the called line "101" is located. The ground potential at the output of the inverter 5906 is also forwarded to the HY1 terminal of the control connector 710 to condition this connector for subsequent operation to establish a connection between the called line circuit and the multifrequency signal detector 720.

When the inverter 5906 is placed in conduction, the ground potential at the output thereof is also forwarded through the gates 6016 and 6014 to render the inverter 6012 in the unit 6001 nonconductive, which inverter corresponds to highway one. When the inverter 6012 is rendered nonconductive, the output of a gate 6018 drops to a negative potential which is forwarded through a gate 6020 to render an inverter 6050 conductive. When this inverter is rendered conductive, one of the diode inputs of a gate 5668 is held at ground. It should be noted that the diode input of the "AND" gate 6018 is also connected to the output of the inverter 6061, to the input of which negative-going pulses are applied in the busy time positions on highway one. Thus, the inverter 6050 is controlled to supply a negative-going pulse to one of the diode inputs of the gate 5068 in all of the time positions on highway one that are in a busy condition. This diode input to the gate 5668 remains at ground potential for all of the time positions on highway one that are in an idle condition.

The value of the first and second or hundreds and tens digits of the designation of the called line circuit are used to select the time position occupied by the called line circuit on the highway selected by the third or units digit of the calling line designation. As indicated in the table at FIG. 86, the lines designated by the first or hundreds digit "1" are assigned time positions TP1–TP10 and the one hundred line designated by a first or hundreds digit "2" are assigned time positions TP11–TY20. Similarly, this table indicates that the lines having a second or tens digit "0" are assigned to time positions TP10 or TP20 and that the lines having a second or tens digit "1" are assigned one of the time positions TP1 or TP11, the intervening tens digit occupying one of the two groups of mutiplex time positions TP2–TP9 and TP12–TP19.

To translate the values of the first and second or hundreds and tens digits into the selection of a particular time slot, the line and route selector 730 includes ten identical units 5701–5710, each of which is coupled to two terminals of the time pulse source to receive slot pulses that are displaced from each other by ten time positions. Thus, the unit 5710 is coupled to the terminals TP10 and TP20 of the pulse source. The line and route selector 730 also includes ten identical control units 5731–5740 which representing "1–9" and "0," respectively, and which are selectively operated in accordance with the value of the second or tens digits to condition one of the units 5701–5710 for operation. In the illustrative example, negative marking potentials are applied to the terminals 2UF and 2XF representing the tens digit "0." This combination of marking potentials is effective to operate only the "0" control unit 5740 by dropping the output potential of an "AND" gate 5750 to a negative value. This potential is forwarded through a gate 5748 to render an inverter 5746 conductive. When the output of the inverter 5746 rises to ground, this potential is effective through a gate 5744 to render an inverter 5742 nonconductive. When the output of the inverter 5742 drops to a negative value, a pair of "AND" gates 5718 and 5720 in the control unit 5710 are enabled for conduction. The two gates 5716 and 5720 normally clamp the outputs of a pair of emitter followers 5712 and 5714 to ground so that the negative-going pulses continuously applied to the inputs thereof in the tenth and twenties time slots are not effective. However, when the tens digit "0" is transmitted to the line and route selector 730 from the controlling register, the unit 5710 is conditioned for operation so that the time slot representing the selected local line circuit will be a slot pulse in either the tenth or twentieth time position in accordance with the value of the first or hundreds digit.

As indicated above, the determination of whether a time pulse representing the selected line is to be supplied in the first tens group or the second tens group of slot pulses is determined by the value of the hundreds digit transmitted to the line and route selector 730 from the controlling register. In the illustrative example, the value of the hundreds digit is assumed to be "1" and this digital value is represented by the application of negative marking potential to the terminals 1WF and 1VF. The application of a negative potential to these two terminals is effective to render the "AND" gate 5630 in the unit 5621 effective to supply a negative potential through the gate 5632 to the input of the inverter 5634 in the unit 5621. This renders this inverter conductive so that ground is forwarded to the diode input of the gate 5720 in each of the units 5701–5710. This potential is effective only in the unit 5710 inasmuch as this is the unit previously enabled under the control of the units 5731–5740. The application of ground potential to the gate 5720 clamps the output of the emitter follower 5714 at ground potential. This emitter is supplied with negative-going pulses from the time pulse terminal TP20 and thus, this time pulse source is rendered ineffective. Since the inverter 5634 in the unit 5622 representing the hundreds digit "2" remains in a nonconductive condition, the output of the gate 5616 remains at a negative potential to permit the emitter follower 5712 to supply negative-going pulses in the tenth time position through the gate 5718 to the "*b*" terminal of a pulse amplifier 5742. Thus, the storage of the hundreds digit "1" in the line and route selector 730 selects the slot pulse in the first tens group in accordance with the time pulse distribution of the local lines illustrated in the table in FIG. 86.

The ground provided at the output of the conductive inverter 5634 in the unit 5621 is also forwarded through an "OR" gate 5726 to the "*c*" terminal of the pulse amplifier 5724. This enables this amplifier so that negative-going pulses in the tenth time position are forwarded to the resistive inputs of the gates 5668 and 5672 and to one of the diode inputs of the gate 5670. If the selected line circuit is in an idle condition, as represented by the absence of negative-going pulses at the input of the inverter 6061 in the tenth time slot, the inverter 6050 clamps the output of the gate 5668 at ground so that the negative-going pulses applied to this gate from the pulse amplifier 5624 produce no effect. The negative-going pulses applied to the resistive input of the gate 5672 are forwarded through the "OR" gate 5656 to the "*b*" terminal of the pulse amplifier 5654. These pulses are not effective to operate the amplifier 5654 inasmuch as its "*c*" terminal is connected to a negative potential at the inverter 5578.

The negative-going pulses applied to the input of the "OR" gate 5670 are forwarded through this gate to the SP terminal of the control connector 710. Since the control connector 710 is provided with ground at the terminal HY1 and since the terminal SP is provided with negative-going pulses in the tenth time position, the control connector 710 connects the local line designated as "101" with the input of the multifrequency signal detector 720 over the conductor extended between the terminals AC and XAC. The multifrequency signal detector 720 now performs a secondary busy test in the manner described above to check for the presence of seize or release tones on the selected line circuit. If seize and release tones are not detected, the multifrequency signal detector 720 does not exert any controlling influence on the line and route selector 730.

However, if seize or release tones are detected, a ground signal is applied to the terminal RD so that the flip-flip 5416 is again operated to its set condition to apply a negative signal to the terminal BM. A negative signal is not applied to the terminal TM inasmuch as one of the diode inputs to this gate is clamped to ground at the output of the conductive inverter 5678. The operation of the flip-flip 5416 causes the application of marking ground to the terminals TH0 and TH1 representing highway one and the application of negative-going pulses in the twenty-ninth time position to the input of the amplifier 5654. The input of the gate 5672 is blocked by the ground potential at the output of the inverter 5420. The transmission of this highway and time slot information to the link or position register causes the return of line busy tone in the manner described in detail above when the flip-flips 5512, 5528, and 5552 are operated in sequence.

Assuming that the secondary busy test is satisfactorily completed, the monostable multivibrator 5516 is operated under the control of the marking signals applied to the terminals 1UF–1YF in the manner described above. The operation of this component and the subsequent restoration thereof causes the sequential operation of the flip-flops 5554, 5512, 5528 and 5522. The operation of the flip-flip 5512 again forwards an inhibit signal to the terminal AI and the operation of the flip-flip 5552 provides a negative signal at either of the terminals RTD or WR in accordance with the nature of the call originating register. However, it should be noted that on all local calls, the unit 700 forwards the called station designation to a link. Even though marking is supplied to the terminal RTD on calls from the position register 1000, the terminal WPD in this circuit prevents the storage of the called station designation in the register 1000 and causes the marking of the KWR terminal to enable the link to store this information. Thus, the operation of the flip-flip 5552 renders the inverters 5806–5810 effective to supply the designation of the highway on which the called line is located directly to the link and renders the pulse amplifier 5654 effective to supply time pulses in the tenth time position. When marking conditions are removed from the terminals 1UF–1YF, 2UF–2YF and 3UF–3YF. the line and route selector 730 is restored to its normal condition.

*Operation of the Routing Control Unit 700 When the Selected Line Circuit Is Marked as Busy*

As described in detail above, the gates 6018 and 6020 normally supply a continuous negative potential to the input of the inverter 6050 so that one diode input of the "AND" gate 5668 is clamped at a ground potential. However, when a busy pulse is applied to the input of a highway one inverter 6061, the gates 6018 and 6020 supply positive-going pulses to the input of the inverter 6050 so that corresponding negative-going pulses are applied to the diode input of the "AND" gate 5668. The resistive input of the gate 5668 is supplied with negative-going pulses in the time position of the selected line. Thus, if a negative-going pulse at the output of the inverter 6050 corresponds with a negative-going pulse identifying the selected line, thus indicating that the selected line is in a busy condition, the output of the gate 5668 drops to a negative potential, and this potential is forwarded through the gate 5666 to place an inverter 5664 in conduction.

When the inverter 5664 is placed in conducition, ground is forwarded through a gate 5662 to set the flip-flip 5416. The operation of this flip-flip returns ground from its "*e*" terminal to the diode input of the gate 5618. This clamps the output of the fiate 5618 at ground so that the inverter 5652 is rendered nonconductive. This removes the ground clamp around the output of the emitter 5616 so that negative-going pulses in the twenty-ninth time slot are forwarded through the "AND" gate to the "*b*" terminal of the pulse amplifier 5654. This conditions the line and route selector 730 to supply a time slot to the related link circuit or position register in the time position assigned to line busy tone.

The ground potential supplied by the "*e*" terminal of the flip-flip 5416 is also forwarded through the "OR" gate 5450 to set the flip-flip 5554. The setting of the flip-flips 5416 and 5554 causes the sequential operation of the flip-flips 5512, 5528 and 5522 during which the highway and slot desigation representing the line circuit to which line busy tone is supplied is transmitted to the link in the manner described in detail above.

*Operation of the Routing Control Unit 700 on a Call to a Local Operator*

The routing control unit 700 controls the extension of a connection from the controlling register to the local operator in response to the transmission of "0" to the line and route selector 730 from the controlling register. The operation of the unit 700 is the same when the call originates at a local subscriber, a subscriber served by one of the local boards 190 and 195, or at the long distance board 160. In general, when "0" is transmitted to the selector 730, this selector 730 detects the value of the digit, forwards a marking condition to a link circuit representing an operator call, and forwards a transfer signal so that the time slot and highway designation of the calling line or trunk circuit is read into the link.

More specifically, when the negative marking signals are applied to the terminals 1XF and 1UF representing "0," the inverter 5634 in the unit 5620 is rendered conductive to forward ground through a gate 5434 and the gate 5432 to operate the flip-flip 5436 to its set condition. In this condition, ground from its "*e*" terminal clamps the output of the gate 5438 at ground potential so that the dual slot counter 6100 and the dual highway counter 5800 can not be operated. The ground at the output of the gate also applies a ground clamp to the terminal TM and to the outputs of the counters 5800 and 6100.

The ground at the output of the inverter 5634 in the unit 5620 is also forwarded to the diode input of an "AND" gate 5430 so that the output thereof rises to ground. This ground potential is forwarded through a gate 5428 to render an inverter 5426 nonconductive. When the inverter 5426 is rendered nonconductive, a negative enabling potential is supplied to one diode input of an "AND" gate 5404.

The output of the inverter 5634 in the unit 5620 is also forwarded through the "OR" gate 5450 and the gate 5556 to operate the flip-flip 5554 to its set condition. This causes the sequential operation of the flip-flips 5512, 5520 and 5552 under the control of the negative pulses applied to the ICDR terminals in the manner described above. When the flip-flip 5512 is operated to its set condition, an inhibit signal is applied to the terminal AI. When the flip-flip 5552 is operated, the gate 5576 supplies a negative signal to the terminal WR to readout the highway and slot designation of the calling line or trunk circuit in the local board 150. The operation of the flip-flip 5552 also supplies ground potential to the "*c*" terminal of the pulse amplifier 5654, but the "*b*" terminal thereof is not provided with time pulses. Thus, a terminating time slot pulse is not supplied.

When the inverter 5584 is rendered nonconductive in response to setting the flip-flip 5552, a negative potential is forwarded to another diode input of the "AND" gate 5404. Since the lowermost input to this gate is connected to a negative biasing potential through a resistor 5405, the output of the gate 5404 drops to a negative potential which is supplied to a terminal AM. This terminal is connected to the link and provides an indication that this call is to be extended to the attendant's keyboard circuit 1220. When the identification of the calling line or trunk is transferred to the link, digit marking is removed from the terminal 1XF and 1UF so that the line and route selector 730 and the routing control unit 700 are restored to normal in the manner described in detail above.

In the event that a call is extended to the keyboard circuit 1220 during a period in which the position is not staffed, a key in the keyboard circuit 1220 is locked closed to apply ground to a terminal PNS (FIG. 54). The line and route selector 730 now operates to return line busy tone when a call requiring the operator is forwarded to the routing control unit 700.

More specifically, the transmission of "0" to the selector 730 causes the inverter 5426 to be rendered non-conductive, as described above. The output of this inverter drops to a negative potential which is forwarded through an "AND" gate 5424 and a gate 5422 to the "*b*" terminal of an inverter 5406. The "*c*" terminal of this inverter is normally connected to a negative potential through the resistor 5405. However, when the keyboard circuit 1220 is not staffed, ground is applied to the terminal PNS. The input terminal "*c*" of the inverter 5406 is held at ground potential, and the inverter 5406 is rendered conductive to forward ground through a gate 5414 to operate the flip-flip 5416 to its set condition. The operation of the flip-flip 5416 together with the sequential operation of the flip-flops 5512, 5528 and 5552 in the manner described above operates the line and route selector 730 so that the link is supplied with slot pulses in the twenty-ninth time position and with marking conditions representing highway one. This causes line busy tone to be returned as an indication that the connection to the operator in the local board 150 can not be completed.

*Alarm Facilities in the Routing Control Unit 700*

The routing control unit 700 includes means for establishing an alarm condition if the operation of the line and route selector 730 is not completed within a predetermined period of time or if the flip-flips 5512, 5528 and 5552 are not reset within a predetermined time interval following the release of the line and route selector 730.

More specifically, if any first digit is stored in the selector 730 by the application of a negative potential to a pair of terminals 1UF–1YF, the inverter 5604 is rendered conductive so that a positive-going pulse is supplied through a coupling network to the "*d*" terminal of a monostable multivibrator 5464 having a delay period of approximately 200 milliseconds. When the multivibrator 5464 is operated to its set or unstable condition, its "*a*" terminal drops to a negative potential, and, when the delay period is terminated, its "*a*" terminal again rises to ground potential. This renders an inverter 5566 momentarily nonconductive so that its output provides a negative-going pulse. This pulse is forwarded through an "AND" gate 5468 and a gate 5470 to render an inverter 5480 momentarily conductive. This causes the inverter 5480 to supply a positive-going pulse through a coupling network to the "*c*" terminal of an alarm flip-flip 5504. This pulse operates the flip-flip 5504 to a set condition in which ground potential is applied to its "*e*" terminal. This ground potential can be used to actuate a suitable alarm. Thus, the alarm flip-flip 5504 will be operated to establish an alarm condition for the routing control unit 700 at the end of the 200 millisecond delay period unless the route selector 730 satisfactorily completes its operations within this time interval.

The operation of the alarm flip-flip 5504 is normally arrested by the release of the routing control unit 700 after the satisfactory completion of its operation. At this time, the inverter 5558 returns to a conductive condition so that the output thereof rises to ground potential. This ground potential is forwarded through a pair of gates 5462 and 5460 to clamp both the input and output of the inverter 5466 at ground potential. Thus, the input to the "AND" gate 5468 can not drop to a negative potential to cause the operation of the alarm flip-flip 5504.

However, the satisfactory completion of the operation of the line and route selector 730 may, at times, require a time interval of greater than 200 milliseconds even though this circuit component is operating satisfactorily. To provide means for arresting the operation of the alarm flip-flip 5504 when the line and route selector 730 satisfactorily completes the selection of either a trunk or a line circuit in the local board 150, the output of the inverters 5821–5825 are connected through the "AND" gate 5820 to the resistive input of an "AND" gate 5454. Thus, if highway marking is present, a negative enabling potential is supplied to the resistive input of the gate 5454. When the inverter 5584 is rendered nonconductive under the control of the flip-flip 5552, the output of the gate 5454 drops to a negative potential and this is forwarded through an "OR" gate 5456 to render the inverter 5458 conductive. When the inverter 5458 is rendered conductive, the output of the gate 5468 is clamped to ground to prevent an alarm condition.

Similarly, when the line and route selector 730 functions properly to establish an all-trunks-busy condition by the operation of the flip-flip 5586 to its set condition, a negative potential is applied from the "*d*" terminal of this flip-flip to one of the inputs of the "OR" gate 5820. Thus, the inverter 5458 is again operated to clamp the output of the gate 5468 at ground. In a like manner, when a line busy condition is satisfactorily established by the line and route selector 730, the operation of the flip-flip 5416 to its set condition forwards negative potential from its "*d*" terminal to another of the inputs of the "OR" gate 5820 so as to clamp the output of the gate 5468 at ground.

On calls to the operator, the inverter 5426 is rendered nonconductive so that the output thereof drops to a negative potential. This potential is forwarded to one of the diode inputs of an "AND" gate 5452, the other diode input of which is connected to the output of the inverter 5584. Thus, when this inverter is rendered nonconductive, the output of the gate 5452 drops to a negative potential which is effective through the "OR" gate 5456 to again render the inverter 5458 conductive so that the output gate 5468 is clamped at ground potential. Accordingly, if the line and route selector 730 satisfactorily performs its necessary functions, the operation of the alarm flip-flip 5504 at the termination of the 200 millisecond delay period is prevented.

Figure 61:
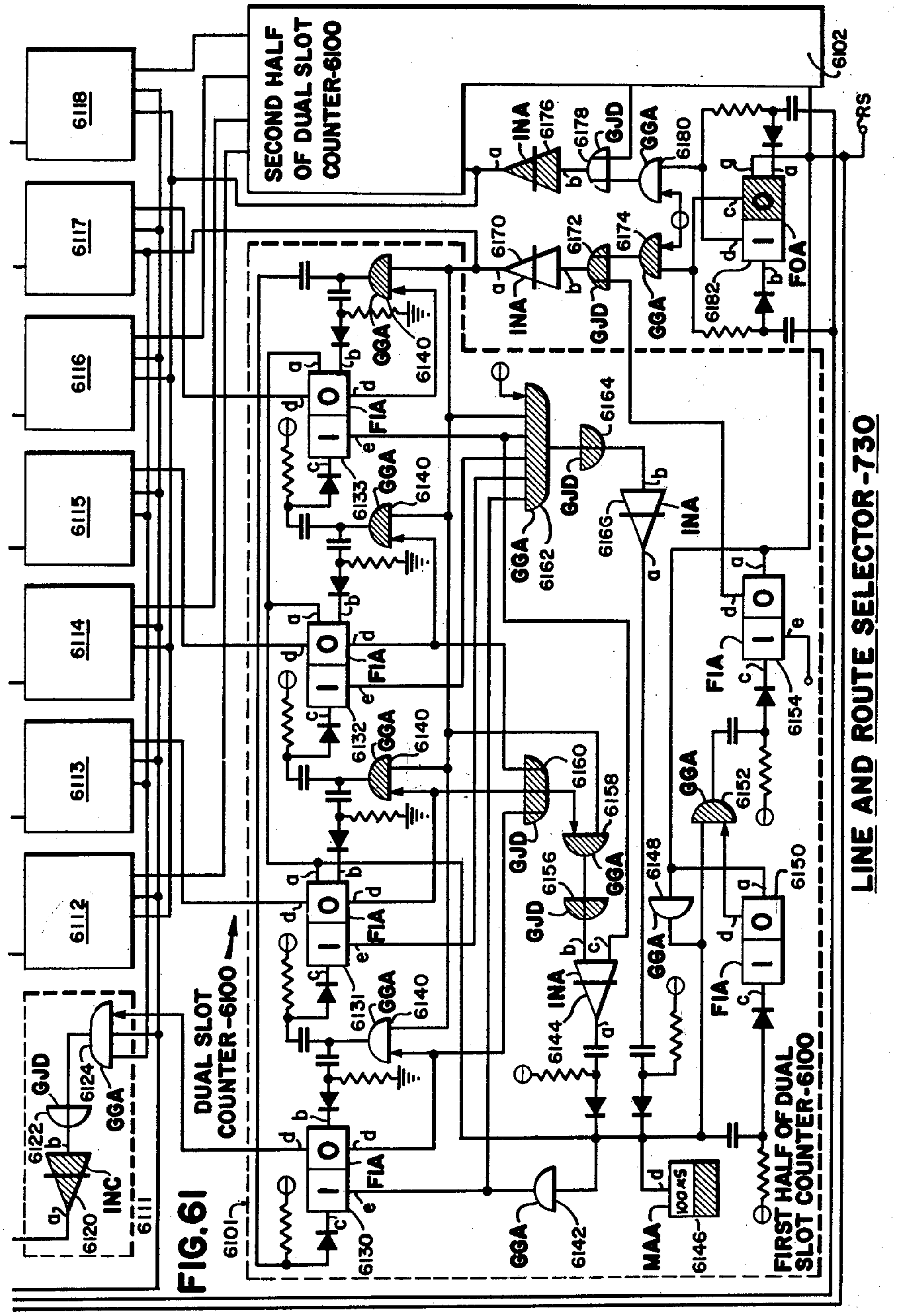
Figure 62:
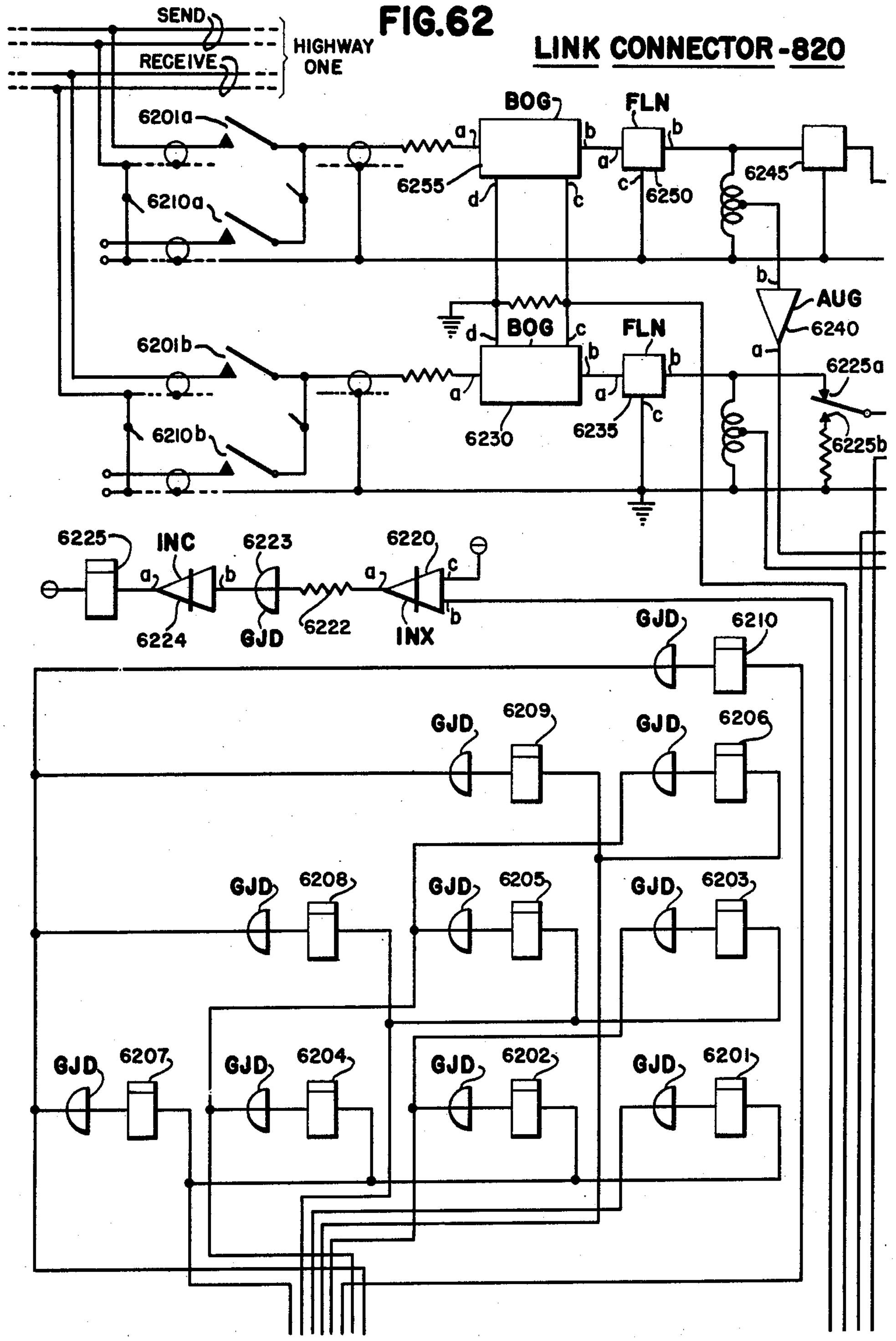
Figure 63:
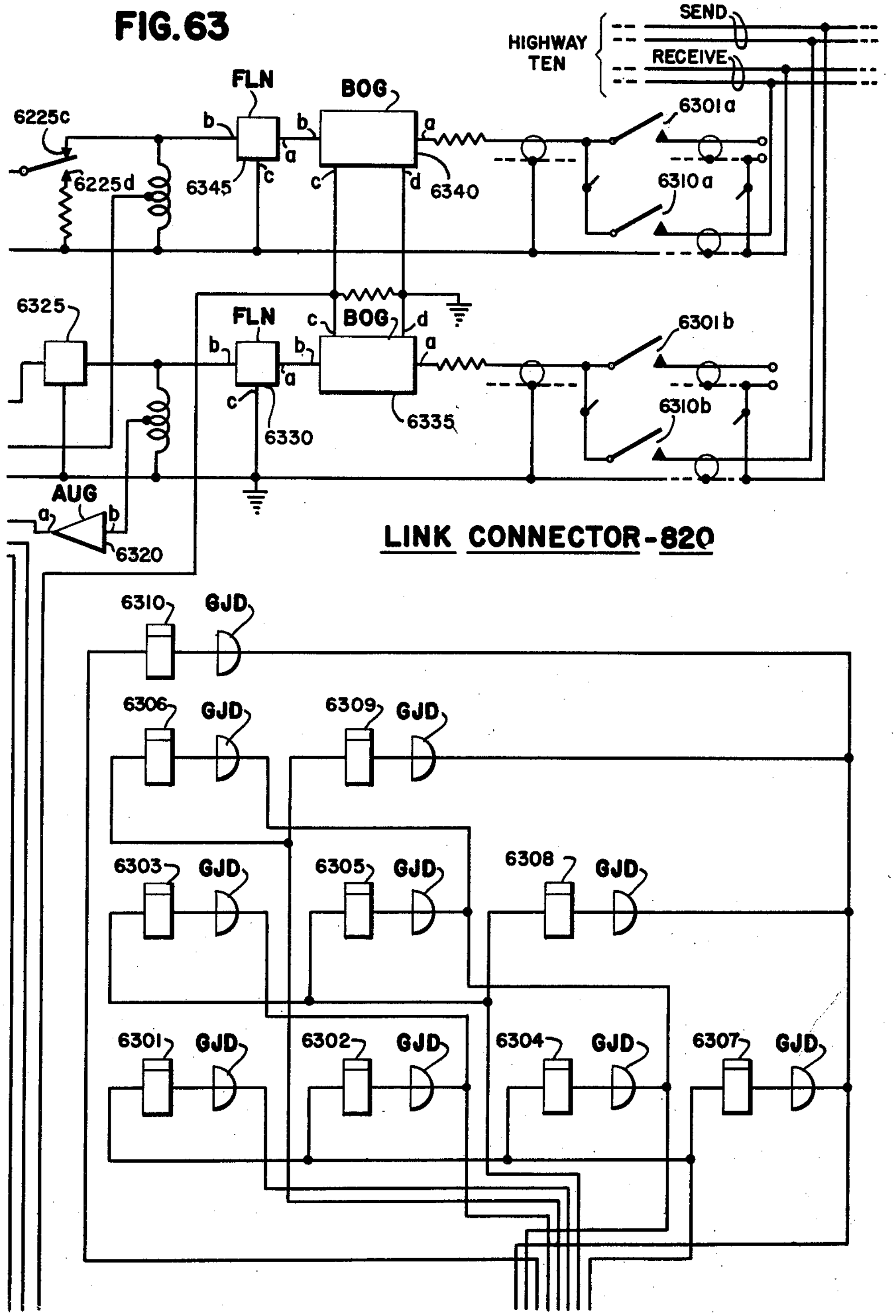
Figure 64:
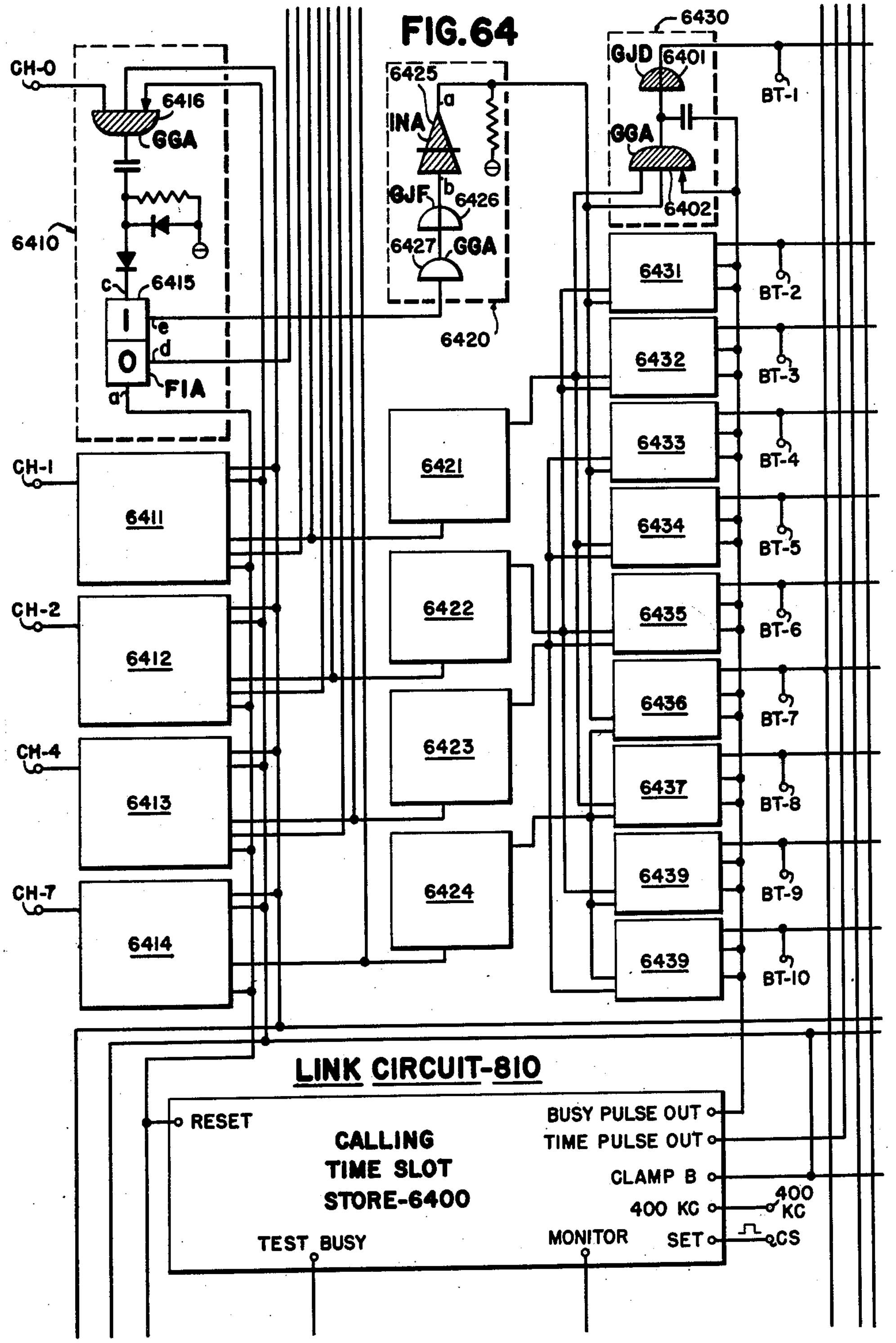
Figure 65:
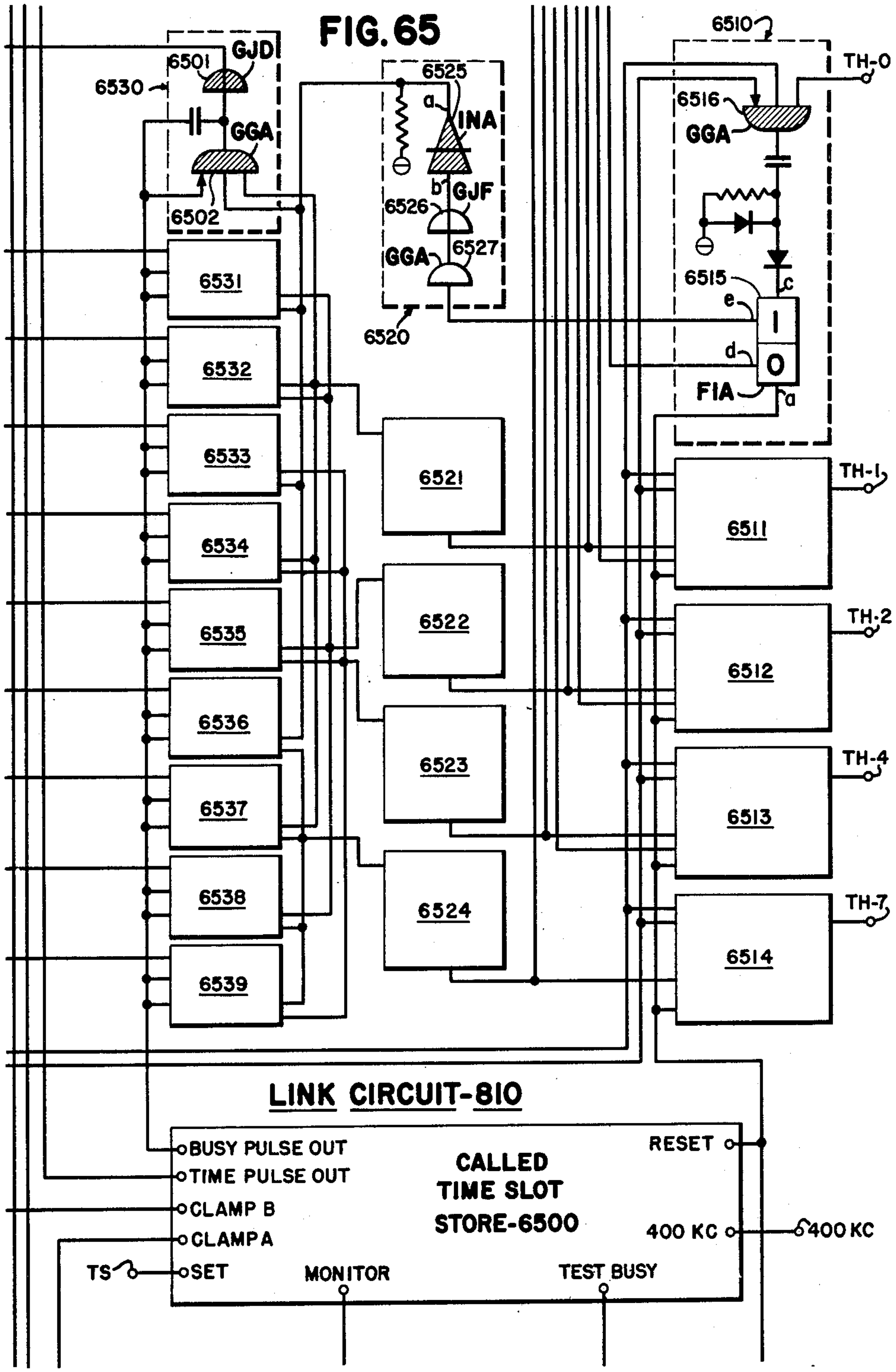

As described above, the inverter 5558 is restored to a conductive condition when the line and route selector 730 is released so that the output of this inverter rises to ground potential. This ground potential is used to reset flip-flips in the routing control unit 700, included in which are the flip-flips 5512, 5528 and 5552. If one of these flip-flips is not reset, its "*d*" terminal remains at a negative potential which is forwarded through an "OR" gate 5526 to the resistive input to an "AND" gate 5524. When the output of the inverter 5558 rises to ground, a gate 5550 supplies a positive-going pulse to the input of an inverter 5548. After a delay interval, the inverter 5548 restores to render a similar inverter 5546 nonconductive so that its output drops to a negative potential. If the flip-flips 5512, 5528 and 5552 have not been restored at this time, the output of the gate 5524 drops to a negative potential which is effective through a gate 5522 to render an inverter 5514 conductive. When the delay interval of the inverter 5546 expires, a positive-going pulse is supplied through a coupling network to the "*c*" terminal of the alarm flip-flip 5504. This operates this flip-flip to its set condition to establish an alarm indication. The flip-flip 5504 is restored to its normal or reset condition by the application of ground to the reset terminal RS (FIG. 61).

LINKS 800 AND 900 AND KEYBOARD CIRCUIT 1220

The links 800 and 900 (FIGS. 62–77) and the keyboard circuit 1220 (FIGS. 78–80) are used in conjunction with the position register 1000 and the routing control unit 700 to establish communication paths between the call originating and terminating circuits in the board 150. On calls that are automatically extended, the links 800 and 900 receive the necessary calling and called line and trunk designations from the routing control unit 700 and operate to establish an audio communication path between the designated substations without manual intervention. This connection is maintained until released by the calling or called party. The links 800 and 900 also operate under the control of the keyboard circuit 1220 and the routing control unit 700 to provide for operator controlled extension of local and toll calls through the use of the position register 1000. The links 800 and 900 can also be operated under the control of the keyboard circuit 1220 and the position register 1000 when a recall signal is received to permit the operator to release the connection to either the calling or terminating line and to extend the connection to any new called party that either the original called or calling subscriber may request.

As indicated above, a large number of links 800 and 900 are provided in the local board 150 which are common to and individually controlled by the routing control unit 700 and the keyboard circuit 1220. These links are individually rendered effective for use in extending a connection under the control of the link allotter 1100. The link allotter is disclosed and described in detail in the above identified Tubinis et al. application. In general, this allotter (FIG. 70) includes a plurality of X and Y marking leads which are sequentially provided with negative biasing potentials in predetermined combinations to allot an idle one of the links for operation. The link circuit 810, which forms a part of the link 800 and which is illustrated in FIGS. 64–73 of the drawings, includes an idle-busy control flip-flip 7085 which is operated to its reset condition when the link 800 is in an idle condition. The negative potential at the "*e*" terminal of the reset flip-flip 7085 is forwarded through an "AND" gate 7080 to provide one negative input for an "AND" gate 7060. When the link alloter 1100 is advanced to a condition in which the X and Y marking leads individual to the link 800 are provided with a negative potential, all of the inputs to the gate 7060 are enabled so that a negative potential is applied to the input of an inverter 7070 through a gate 7065. This places the inverter in conduction so that ground is forwarded through a gate 7075 to the LF terminal of the link allotter 1100. This advises the link allotter 1100 that the link 800 is in an idle condition and has been conditioned for use in extending the next call. The ground potential applied to the LF terminal arrests operation of this allotter with the negative potentials maintained on the X and Y leads individual to this link. Thus, the gate 7060 remains enabled. Further, when the inverter 7070 is placed in conduction, an inverter 7055 is also placed in conduction to provide a negative enabling potential or a gate 7030. This conditions the link circuit 810 for operation under the control of the routing control unit 700. Thus, the link 800 is now in a "stand-by" condition in which it is capable of being placed in operation to extend the next connection to be established through the local board 150.

*Operation of the Link 800 During the Extension of a Call Between Two Lines in the Local Board 150*

When a call is to be extended between two line circuits served by the local board 150, the routing control unit 700 supplies the highway and time slot designations of the calling and called lines to the link circuit 810, and this circuit operates the link connector 820 (FIGS. 62 and 63) to establish a connection over the highways in the local board between the calling and called lines. In establishing this connection, ring tone is transmitted to the called line and ring-back tone is transmitted to the calling line. When the called subscriber answers, seize tone is returned to the link to arrest further transmission of the ringing and ring-back tones. This seize tone is detected in the link 800 by the ring trip detector 1120 which is common to a group of links in the local board 150, and which operates step-by-step to scan each of the links in a fixed sequence. The detection of a seize signal from the called station operates the link 800 so that the link circuit 810 returns a burst of dial tone to the called line to arrest further transmission of the seize signal. The release, recall and voice monitor multifrequency signal detector 1110, which is common to the same group of links, scans the established connection for the presence of any of these control tones. If audio signals are not provided on the established connection within a predetermined time interval, the connection is released. Further, when release tone is detected by the unit 1110, the link circuit 810 is operated to transmit the release tone in both directions over the extended connection to insure the release of all of the components used in the connection.

As described in detail above, when the routing control unit 700 has been supplied with sufficient information for controlling the extension of a connection between two line circuits served by the local board 150, a negative-going pulse is applied to a terminal WR (FIG. 70) by the routing control unit 700. This negative pulse enables the gate 7030 to forward a negative potential through a gate 7045 to place an inverter 7040 in conduction. When the inverter 7040 is placed in conduction, an inverter 7035 is rendered conductive so that the output thereof drops to a negative potential. This negative potential is forwarded to a plurality of gates in the link circuit 810 to enable the link 800 for operation. In addition, this negative potential is used to enable the storage in the link circuit 810 of the calling and called highway and time slot information that is supplied by the routing control unit 700.

More specifically, at the time that the pulse is received at the terminal WR, the routing control unit 700 also applies negative potentials to two of five terminals CH0, CH1, CH2, CH4 and CH7 representing the designation of the highway of the calling line and also supplies negative potential to two of five input terminals TH0, TH1, TH2, TH4 and TH7 providing a coded representation of the number of the called highway. The calling highway terminals CH are connected to five identical storage units 6410–6414, and the five terminating highway terminals TH are connected to five identical storage units 6510–6514. Each of the units 6410–6414 and 6510–6514 includes a flip-flop 6414 or 6515 and an input "AND" gate 6616 or 6516. The input terminals are connected to one of the diode inputs of each of the gates 6416 and 6516, and the resistive inputs of all of these gates are connected to the output of the conductive inverter 7035. The remaining diode inputs of all of these gates are connected to the output of a normally nonconductive inverter 6655. Thus, the gates 6416 and 6516 in two of the units 6410–6414 and 6510–6514 are completely enabled so that the capacitor in the coupling circuits connected to the "*c*" terminals of the flip-flips 6415 and 6515 are charged in a negative direction or discharged.

To provide means for selectively operating the flip-flips in the units 6410–6414 and 6510–6514 in a proper timed relationship, the synchronization of the signal applied to the terminal WR with the drive pulse applied to a terminal ICDR (FIG. 66) is utilized. More specifically, the leading edge of the negative-going pulse supplied to the terminal WR coincides with a positive-going pulse applied to the terminal ICDR. Thus, the gate 6645, although enabled by the conductive inverter 7035, provides a ground potential output which prevents the conduction of the inverter 6655. This permits the capacitors in the coupling networks connected to two flip-flips 6415 and 6515 in each of the groups of storage units 6410–6414 and 6510–6514 to charge in a negative direction, as described above. After a delay of approximately 80 microseconds, the potential applied to the ICDR terminal returns to a negative value so that a negative potential is forwarded through the gate 6645 and a gate 6650 to render the inverter 6655 conductive. When this inverter is rendered conductive, the output thereof rises toward ground potential so that one diode input in each of the gates 6416 and 6516 rises to ground potential. This elevates the output potential of the gates so that a positive-going differentiated pulse is coupled to the "*c*" terminals of the two flip-flips 6415 and the two flip-flips 6515 that represent the coded designations of the calling and called highways, respectively. This operates these four flip-flips to a set condition and is effective to store the designations of the calling and called highways in the link circuit 810.

The selective operation of the storage units 6410–6414 and 6510–6514 operates the link connector 820 (FIGS. 62 and 63) to select a proper calling and called highway and also conditions means for supplying busy pulses to the common busy conductors in the local board 150 representing the time slots of the calling and called stations. More specifically, the "*d*" and "*e*" terminals of certain of the flip-flips 6415 in the units 6410–6414 are connected to a plurality of electromechanical relays 6201–6210 in the link connector 820 representing the highways one to ten, respectively, so that a single one of these relays is operated. In a similar manner, selected groups of the "*d*" and "*e*" terminals of the flip-flips 6515 in the units 6510–6514 are connected to the operating windings of ten relays 6301–6310 representing the called highways one to ten, respectively. For example, if the calling line occupies a time slot on highway one, the flip-flips 6415 in the units 6410 and 6411 are operated to a set condition so that the output of a gate connected to one terminal of the winding of the highway one relay 6201 is connected to ground at the "*e*" terminal of the flip-flip 6415 in the unit 6411. The other terminal of the winding of the relay 6201 is connected to a negative potential at the "*d*" terminal at the set flip-flip 6415 in the unit 6410. These potentials bias the gate connected to the winding of the relay 6201 in its forward direction so that current flows through the winding of this relay to operate it. In operating, the relay 6201 closes a plurality of contacts **6201*a* and 6201*b*. The closure of the contacts 6201*a* connects the send path of highway one to the input of a blocking oscillator gate 6255, and the closure of the contact 6201*b* connects the receive path on highway one to the input of a blocking oscillator gate 6230. The output of the units 6410–6414 is so connected with the operating windings of the relays 6201–6210 that only a single one of these relays is operated in response to the operation of any pair of the units 6410–6414. Thus, the blocking oscillator gates 6230 and 6255 in the link connector 820** are connected to the calling highway.

In a similar manner, and assuming that the called line occupies a time slot on highway ten, the flip-flips 6515 in the units 6513 and 6514 are operated to a set condition so that the relay 6310 representing highway ten is operated over a circuit including the ground potential supplied at the "*e*" terminal of the operated flip-flip 6515 in the unit 6514 and the negative potential supplied at the "*d*" terminal of the flip-flip 6515 in the unit 6513. The operation of the relay 6310 closes a plurality of contacts **6310*a* and 6310*b*. The closure of the contacts 6310*a* connects the receive path on highway ten with the output of a blocking oscillator gate 6340, while the closure of the contacts 6310*b* connects the input of a blocking oscillator gate 6335 with the send path on highway ten. Thus, the calling and called highways are connected to the blocking oscillator gates in the link connector 820**.

To provide means for conditioning the link circuit 810 for supplying busy signals representing the calling and called highways and time slots, the selective operation of the two flip-flips 6415 in the units 6410 and 6411 conditions two of five identical units 6420–6424 for supplying a marking potential to one of ten identical output gates 6430–6439 representing the designation of the calling highway. More specifically, when these two flip-flips are operated, a pair of gates 6426 and 6427 in the units 6420 and 6421 forward ground potential to a normally conductive inverter 6425 so that this inverter is rendered nonconductive. When the inverter 6425 is rendered nonconductive, a negative potential is supplied to an "AND" gate 6402 in a predetermined group of the units 6430–6439. Similarly, the unit 6421 provides a negative enabling potential to the inputs of the gates 6402 in a selected group of the units 6430–6439. The cross-connection between the units 6420–6424 and the units 6430–6439 is such that, when any two of the units 6420–6424 are operated, only a single one of the units 6430–6439 is conditioned for operation. More specifically, when the units 6420 and 6421 are operated, both of the diode inputs to the gate 6402 in the unit 6430 representing highway one are provided with a negative enabling potential. This conditions this gate for operation in accordance with the time slot of the calling line. The outputs of the units 6430–6439 are connected to a plurality of busy terminals BT1–BT10.

In a like manner, the units 6410–6414 control the operation of ten units 6530–6539 representing the highways one to ten inclusive through five units 6520–6524. Since the storage units 6513 and 6514 are operated to a set condition representing the terminating highway ten, a plurality of gates and transistors 6525, 6526 and 6527 in the units 6523 and 6524 provide enabling potentials to the two diode inputs of a gate 6502 in the unit 6539 which represents the highway ten. The outputs of the units 6530–6539 are connected to the same busy terminals as the units 6430–6439.

Referring back to the above described operation of the inverter 7035, the negative potential at the output thereof is also supplied to the clamp B terminal of a calling time slot store 6400 and a called time slot store 6500. The application of a negative potential to the clamp B terminals of these two stores operates these units to store the time slots of the calling line and the called line. The stores 6400 and 6500 are identical to the time stores described in the Tubinis et al. application. The set terminal of the store 6400 is connected to the terminal CS, while the set terminal of the store 6500 is connected to the terminal TS. Thus, when the negative enabling potential is applied to the clamp B terminals of these two stores, the time slot of the calling line is stored in the store 6400 and the time slot of the called line is stored in the time slot store 6500 in the manner described above. When the time storing operation has been completed, the time pulse out terminal of the calling time store 6400 provides a negative-going pulse in hte time position individual to the calling line. This negative-going pulse is supplied to the "*c*" terminals of the blocking oscillator gates 6230 and 6255, the "*d*" terminals of which are connected to ground. Accordingly, this negative-going pulse opens the gates 6230 and 6255 in the time slot individual to the calling line. Since the input and output terminals of these gates are connected through the closed contacts 6201*a* and 6201*b* to highway one, the gates 6230 and 6255 complete an operative connection between the link connector 820 and the calling line circuit. In a similar manner, the negative-going pulses supplied at the time pulse out terminal of the called time slot store 6500 are forwarded to the "*c*" terminals of the blocking oscillator gates 6335 and 6340 so that these two gates are operated to establish a connection between a called line circuit and the link connector 820.

To provide means for supplying busy pulses in the time positions on the highways occupied by the calling and called line, the busy pulse out terminals of the time stores 6400 and 6500 are connected to the units 6430–6439 and 6530–6539. As described above, the diode inputs to only the gate 6402 in the unit 6430 representing the calling highway one is provided with the negative enabling potential. Thus, when a negative-going pulse is applied to the busy pulse output terminal of the calling time slot store 6400, a negative-going pulse in the time position in the calling line is supplied through a gate 6401 to the terminal BT1. Thus, a negative-going busy pulse is applied to the highway one terminal in the time position individual to the calling line circuit. In a similar manner, the negative-going pulses supplied at the busy pulse out terminal of the called time slot store 6500 are forwarded through the unit 6539 to the terminal BT10 so that a busy pulse is provided on the highway ten conductor in the time position individual to the called line circuit. At this time, an operative connection has been established between the calling and called line circuits and the line connector 820, and busy pulses representing the calling and called lines have been applied to the busy pulse conductors in the local board 150.

When the calling and called line information has been transferred to and stored in the link 800, this link is marked as busy and the transmisison of control tones to the calling and called lines is initiated. More specifically, when the calling and called time slot information is registered in the stores 6400 and 6500, the test busy terminals of these two stores supply negative marking potentials which are forwarded to two of the diode inputs of an "AND" gate 6685. The resistive input of this gate is connected to a negative potential at the output of the conductive inverter 7035. The remaining diode input of this gate is connected to the terminal ICDR. As described above, the time slot information is stored in the stores 6400 and 6500 in direct response to the conduction of the inverter 7035. Thus, when the trailing edge of the positive-going pulse applied to the terminal ICDR is supplied to the gate 6685, the output of this gate drops to a negative potential concurrently with the output of the gate 6645. The negative output of th egate 6685 is forwarded through a gate 6690 to place an inverter 6680 in conduction so that the output thereof rises to ground potential. This potential is forwarded through an "OR" gate 7090 to the "*e*" terminal of the idle-busy flip-flip 7085 and operates this flip-flip to its set condition.

Figure 11:
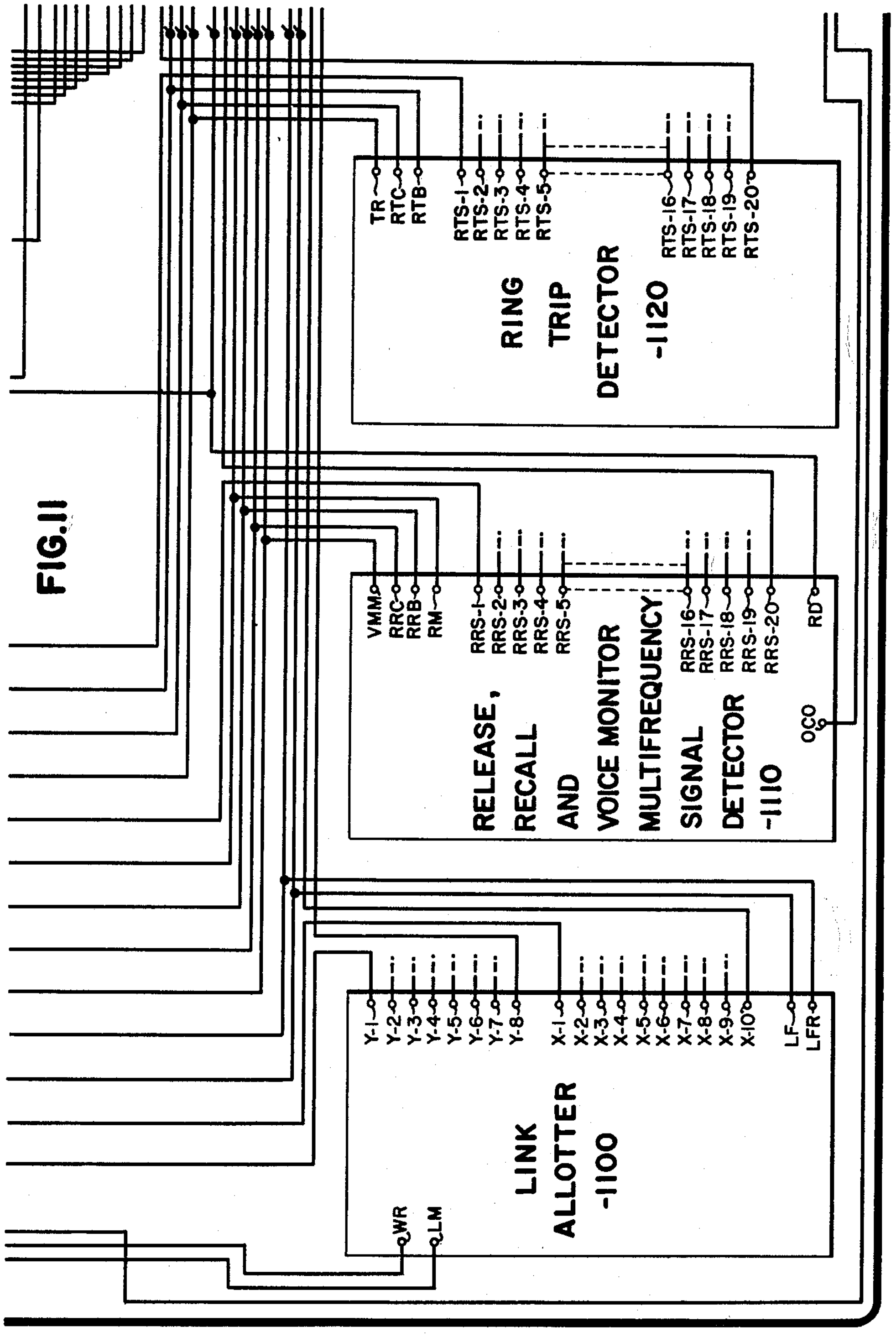
Figure 12:
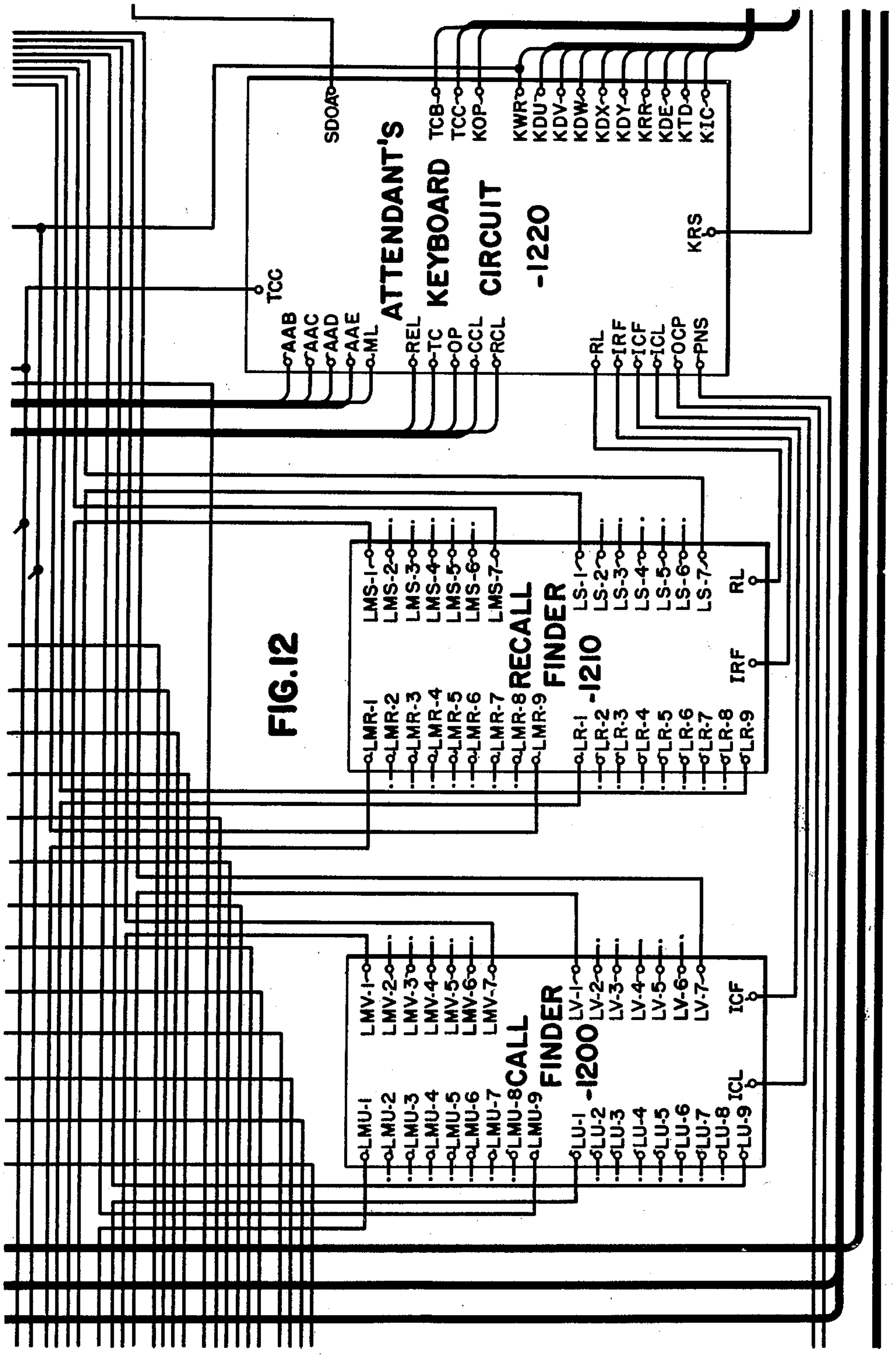
Figure 13:
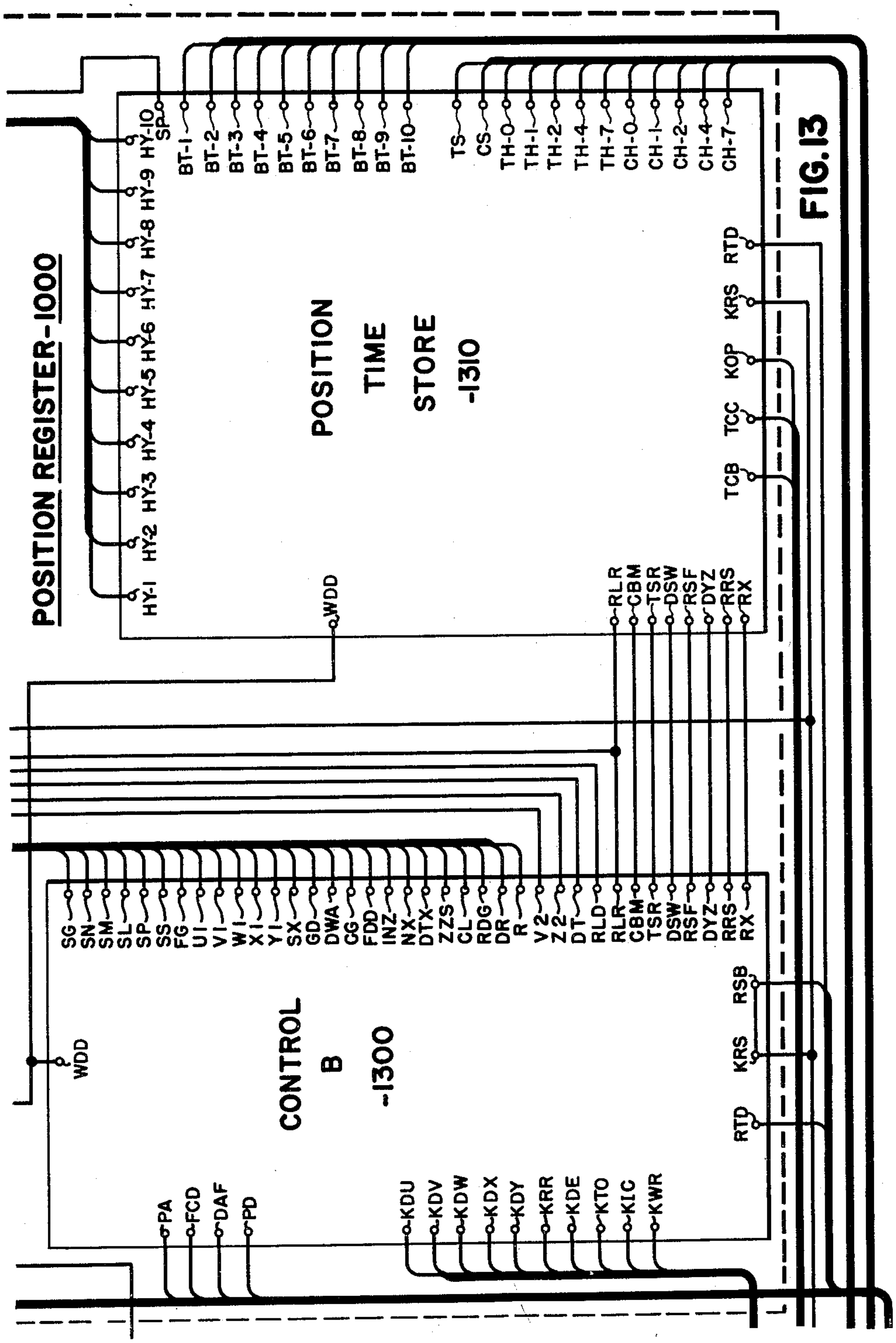

When the flip-flip 7085 is operated to its set condition, the potential at its "*d*" terminal drops to a negative value to partially enable a number of gates in the circuit 810 and the potential at its "*e*" terminal rises toward ground so that the output of the gate 7080 rises to ground. This ground potential blocks the gate 7060 so that the inverter 7070 is rendered nonconductive. When the inverter 7070 is rendered nonconductive, the negative potential at its output is effective to block a gate 7075 so that clamping ground is moved from the LF terminal of the link allotter 1100. The link allotter is thus placed in operation to search for and seize the next idle link, such as the link 900, and to apply a reset signal to the terminal LM (FIG. 11). In so operating, the negative marking potential is removed from at least one of the X and Y terminals connected to the input of the gate 7060 to hold the output of this gate at ground. When the inverter 7070 is rendered nonconductive, the inverter 7035 is also rendered nonconductive so that the enabling potential is removed from the input of the gate 7030. This causes the output of the gate 7030 to rise to ground potential so that the inverters 7040 and 7035 are rendered nonconductive. When the inverter 7035 is rendered nonconductive, the enabling potentials for designation marking input gates in the link circuit 810 are removed to insure that no spurious information is transmitted to and stored in this circuit. The removal of this enabling potential prevents conduction of the inverters 6655 and 6680, among others.

Referring back to the above described operation of the inverter 6680 to a conductive condition prior to its restoration to a normal condition when the inverter 7035 is restored, the ground pulse provided at the output thereof is also forwarded through a gate 7010 and a coupling circuit to the "*c*" terminal of a ring control flip-flip 6804. This operates the flip-flip 6804 to its set condition so that the ground applied to its "*e*" terminal causes the output of an "AND" gate 6810 to rise to ground to place an inverter 6220 in the link connector 820 in conduction. When the inverter 6220 is placed in conduction, the output potential thereof drops in a negative direction, and this potential is effective through a gate 6223 and a resistor 6222 to place an inverter 6224 in conduction. When the inverter 6224 is rendered conductive, a link split relay 6225 is operated to open a plurality of contacts 6225*a* and 6225*c* and to close a plurality of contacts 6225*b* and 6225*d*. The opening of the contacts 6225*a* and 6225*c* disconnects an equalizer 6245 at the output of the gate 6255 from a filter 6345 connected to the input of the gate 6340 and also disconnects an equalizer 6325 connected to the output of the gate 6335 from a filter 6235 connected to the input of the gate 6230. Thus, the signaling path between the calling and called lines is interrupted during the period in which ringing signals are supplied thereto to prevent "ringing" in the connector 820.

The ground potential provided at the "*e*" terminal of the set flip-flip 6804 is also forwarded to one terminal of a relay 7320, the other terminal of which is connected to negative battery. Accordingly, the relay 7320 is operated at this time to close a plurality of contacts 7321 and 7323. The operation of the relay 7320 returns ring tone to the calling and called party. The ring tone, which comprises a 600 c.p.s. signal that is on for one second and off for two seconds and is modulated at 20 c.p.s. (see table in FIG. 85), is forwarded to the calling line circuit as a ringing signal and is returned to the calling party as a ring-back tone.

More specifically, when the contacts 7321 are closed, the ring tone supplied at a terminal RT is forwarded through the closed contacts 7321, a pair of normally closed contacts 7312, and the filter 6235 to the input of the blocking oscillator gate 6230. This signal is passed through the gate 6230 in the time position assigned to the calling line and is forwarded through the closed contact 6201 to the send path of highway one. This signal is utilized at the calling substation to provide an audible indication that the called substation is being rung. The closure of the contacts 7323 forwards the ring tone applied at the terminal RT through a pair of closed contacts 7352 and a filter 6345 to the input of the blocking oscillator gate 6340. This gate supplies the ringing signal through the closed contacts 6310*a* to the called substation in the selected time slot on highway ten. This ringing signal provides an audible indication at the called station in the usual manner. The link 800 remains in this condition until a signal is received indicating that the called station has answered.

When the called station answers, a seize tone is returned to the link circuit 810 from the called line to cause the transmission of ring tone to be terminated and to cause the transmission of a signal to the called station to arrest the transmission of the returned seize tone. The send path of the terminating highway is connected through the closed contact 6310*b* to the input of the blocking oscillator gate 6335, which gate is opened in the time position individual to the called line circuit to transmit tones to an audio amplifier 6320. The output of the audio amplifier 6320 is connected to the input of a phase splitter 7234. The output of the phase splitter 7234 is connected through a resistive hybrid network to the primary windings of a pair of coupling transformers 7233 and 7235. Thus, when the called party answers, the subset connected to the called line circuit transmits seize tone through the audio amplifier 6320 and the phase splitter 7234 to the primary windings of the transformers 7233 and 7235. The secondary winding of the transformer 7233 is connected to two of the terminals of an audio gate 7236, the control terminal of which is connected to the output of an inverter 7224 which is normally maintained in a nonconductive state so that a somewhat positive bias is applied to the "*c*" terminal of the gate 7236. This maintains the gate in a closed condition so that an open circuit exists in the secondary winding of the transformer 7233. A gate 7238 connected into the secondary winding of the transformer 7235 is also maintained in a closed condition so that an output signal is not derived from the transformer 7235.

To provide means for detecting the return of the seize tone from a called station, the common ring trip detector 1120 is provided which is common to all of the links in a given group and which is rendered sequentially effective to sample each of these links to check for the presence of a seize tone. An input transformer in the ring trip detector 1120 is connected in common to the secondary winding of all of the transformers 7233 in the group of links. To provide means for sequentially rendering different ones of the links effective to supply signals to the ring trip detector 1120, a ring trip scan generator 7200 is provided. This scan generator is disclosed and described in detail in the Tubinis et al. application. In general, the generator 7200 includes a continuously operative counting circuit 7205 having a plurality of output marking leads which are selectively provided with negative potentials in predetermined combinations. The marking conductors are connected to the inputs of a plurality of "AND" gates 7210 and 7211. Assuming that the "AND" gate 7210 is individual to the link 800 and assuming that the counting circuit 7205 is operated to a condition in which all of the diode inputs of the gate 7210 are provided with a negative potential, the output of this gate drops to a negative potential which persists for approximately 25 milliseconds.

The negative potential at the output of the gate 7210 is forwarded to the diode input of an "AND" gate 7218. The resistive input of this gate is provided with a negative enabling potential from the "*d*" terminal of the set flip-flip 7085. Accordingly, the output of the gate 7218 drops to a negative potential which is effective through a gate 7220 to render an inverter 7222 conductive. When this inverter is rendered conductive, the inverter 7224 is also rendered conductive so that a negative potential is supplied to the "*c*" terminal of the audio gate 7236. This opens the audio gate 7236 to connect the two halves of the secondary winding of the transformer 7233. When a seize tone is returned from the called station, the seize tone is coupled through the transformer 7233 to the input transformer of the ring trip detector 1120. This signal is coupled through an audio amplifier 7440 and a transformer to the input of an equalizer 7445. The output of the equalizer 7445 is connected to ground through a filter 7455 and to the input of a converter 7450. When seize tone is applied to the input of the audio amplifier 7440, the converter 7450 provides time spaced negative-going pulses during the interval in which the seize tone is applied to the ring trip detector 1120 from the effective link circuit.

These negative-going pulses are applied to one of the diode inputs of an "AND" gate 6808, the remaining inputs of which are at a negative potential. Thus, the output of the gate 6808 drops to a negative potential which is effective through an "OR" gate 6814 to render an inverter 6816 conductive. When the inverter 6816 is rendered conductive, the ground signal provided at the output thereof is forwarded through an "AND" gate 6806 to the "*g*" terminal of the ring control flip-flip 6804. This ground signal operates this flip-flip to its reset condition so that the "*e*" terminal drops to a negative potential. This interrupts the above described operating circuit for the relay 7320 so that this relay releases to interrupt the application of the ring tone to the calling and called stations. The removal of ground potential from the gate 6810 by operating the flip-flip 6804 to its set condition also interrupts the above described operating circuit for the link split relay 6225. However, an operating circuit for this relay is completed in the manner described below. Thus, the receipt of the seize signal from the called line circuit arrests the transmission of ring tone to the calling and called line circuits.

The operation of the inverter 6816 also operates a monostable multivibrator 6820 to its set condition so that a continuous ground is applied to the "*g*" terminal of the flip-flip 6804 and so that a negative potential is applied to its "*a*" terminal. This negative potential enables a gate 6936 so that a negative potential is forwarded through a gate 6938 to place an inverter 6940 in conduction. When the inverter 6940 is rendered conductive, ground is again applied to the gate 6810 so that the link split relay 6225 in the link connector 820 is operated to interrupt the connection between the calling and called subscribers. The ground signal at the output of the inverter 6940 is also forwarded through the winding of a relay 7330 so that this relay is operated to close a plurality of contacts 7331 and 7333 and to open a plurality of contacts 7332 and 7334. The closure of the contacts 7331 connects dial tone to the receive path of the calling highway, and the closure of the contacts 7333 applies dial tone to the receive path of the called highway. The dial tone applied to the call terminating or called party highway is applied to the subset at the called station to arrest further transmission of the seize tone that was supplied as an answering supervisory signal. Thus, the transmission of seize tone to the input of the ring trip detector 1120 is terminated so that the converter 7450 therein no longer supplies negative-going pulses to the input of the gate 6808.

This permits the inverter 6816 to restore to a nonconductive condition. However, the enabling potential for the gate 6936 is maintained for a period of 1380 microseconds by the monostable multivibrator 6820 to provide an adequate period for the response of the tripping circuitry in the subset at the called station. The operation of the link relay 6225 during the return of the dial tone to the calling and called substations again prevents "ringing" in the link connector 820. When the monostable multivibrator 6820 returns to its normal or reset condition, the inverter 6940 is restored to a nonconductive condition so that the link split relay 6225 and the relay 7330 are restored to their normal conditions. This arrests the transmission of the dial tone to the calling and called lines and permits these lines to be interconnected through the link connector 820. The connection is now used for normal telephonic communication by utilizing the resonant energy transfer technique described in the above identified Conference Paper.

The link 800 remains in this condition until such time as the connection is interrupted by either the calling or called party replacing the telephone hand set. When a station goes "on-hook," the subset returns a release tone to the link 800 which is used to restore this link to a normal idle condition in which it is capable of being seized and used in extending other connections. To provide a means for detecting this release tone, the release, recall, and voice monitor multifrequency signal detector 1110 is provided. The unit 1110 is common to the same group of links as the unit 1120 and is selectively rendered effective to sample the signals supplied to the connection established through each of the links on a periodic basis under the control of a release and recall scan generator 7100. The unit 1110 includes an input unit 7425, the input of which is connected to the secondary winding of the transformer 7335. The primary winding of the transformer 7335 is connected to the resistive hybrid network associated with the phase splitter 7234 and a phase splitter 7232 which is supplied with signals from the calling line. The phase splitter 7234 is connected to the send path of the call originating highway through the gate 6255 and an audio amplifier 6240. Thus, the transformer 7235 is supplied with all voice signals and control tones in the audio range that are applied to the connection established through the link connector 820 from either the calling or called line. However, these signals are not forwarded to the input of the multifrequency detector 1110 because of the open circuit in the secondary winding of the transformer 7235 due to the nonconductive state of the audio gate 7238.

The release and recall scan generator 7100 is similar to the ring trip scanner generator 7200 and is similar to the like identified scan generator disclosed and described in detail in the Tubinis et al. application. The generator 7100 includes a counting circuit 7105 that is continuously operable to apply negative marking potentials to different combinations of output leads. The marking leads from the counting circuit 7105 are connected to a plurality of "AND" gates 7110 and 7111, each of which is individual to one of the links. Assuming that the gate 7110 is individual to the link 800 and that all of the diode inputs thereof are supplied with a negative potential from the circuit 7105, the output of the gate 7110 drops to a negative potential which is forwarded to the diode input of an "AND" gate 7132. The resistive input of this gate is connected to a negative potential at the "*d*" terminal of the flip-flip 7085. Accordingly, the negative potential at the output of the gate 7132 is forwarded through a gate 7134 to render an inverter 7136 conductive. When the inverter 7136 is rendered conductive, an inverter 7138 is rendered conductive so that the output thereof drops to a negative potential. This negative potential provides enabling voltages for a group of gates in the link circuit 810 and is also forwarded to the "*c*" terminal of the audio gate 7238. This negative potential renders this gate conductive so that the transformer 7235 is effective to supply signals to the input unit 7425 in the multifrequency signal detector 1110. Assuming that one of the calling or called lines is applying a release signal of 2700 c.p.s. and 2900 c.p.s. tones to the connection at this time, this release signal is applied to the input unit 7425. This unit, which includes suitable amplifying and voice guard means, supplies an output signal to a plurality of band pass filters 7409, 7414 and 7419. The filters 7414 and 7419 are tuned to 2900 c.p.s. and 2700 c.p.s. respectively. Accordingly, a pair of converters 7415 and 7420 are placed in operation to supply negative-going signals. When the converter 7415 provides a negative-going pulse, a gate 7435 is biased in a reverse direction so that the negative-going pulses provided by the converter 7420 are forwarded to one of the diode inputs of an "AND" gate 7146. The resistive input of the gate 7146 is supplied with a negative potential with the output of the conductive inverter 7138, and the remaining inputs of this gate are also provided negative potentials. Accordingly, the output of the gate 7146 drops to a negative potential which is effective through an "OR" gate 7148 to render an inverter 7150 conductive.

When the inverter 7150 is rendered conductive, the ground signal provided at its output is forwarded to the "*d*" terminal of the first timing flip-flop 6706. This signal operates the flip-flop 6706 to its set condition in which a negative potential is applied to its "*c*" terminal. This negative potential is forwarded to one diode input of each of a pair of gates 6734 and 6728. Both of these gates are enabled by this negative potential so that the negative output potentials from these two gates are forwarded through a pair of gates 6730 and 6736 to render a pair of inverters 6732 and 6738 conductive. When the outputs of these two inverters rise to ground, the ground potentials are effective through an "AND" gate 7112 to again apply ground to the circuit for operating the link split relay 6225 in the link connector 820. Thus, the operative connection between the calling and called subscribers is interrupted.

The ground potentials provided by the conductive inverters 6732 and 6738 are also forwarded to complete the operating circuit for a pair of relays 7310 and 7350. The operation of the relay 7310 closes a pair of contacts 7311 and opens a pair of contacts 7312. The operation of the relay 7350 closes a pair of contacts 7351 and opens the contacts 7352. The closure of the contacts 7311 supplies release tone (see table in FIG. 84) from a terminal RL to the receive path of the call originating highway. The closure of the contacts 7351 applies release tone to the receive path of the call terminating highway, both over the paths described above. Thus, release tone is extended to the calling subscriber and to the called subscriber to insure the release of the connection. The transmission of the release tone is maintained for a time interval of between two to four seconds to insure the proper release of the connection. This time interval is determined by the selective operation of the flip-flop 6706 and a flip-flop 6722 under the control of positive-going pulses that are applied to a terminal 2SP at two second intervals.

When the flip-flop 6706 is operated to its set condition, as described above, its "*c*" terminal drops to a negative potential which is supplied to the diode input of an "AND" gate 6716. This removes the ground clamping potential applied to the input of three gates 6704, 6718 and 6720 and enables these gates for operation under the control of a gate 6702 which is connected to the terminal 2SP. This terminal is supplied with positive-going pulses at two second intervals and is used to time the application of the release tone to the connection. Accordingly, when the first positive-going pulse is applied to the input of the gate 6702, the outputs of all the gates 6704, 6718 and 6720 attempt to rise to ground potential. However, the outputs of the gates 6704 and 6718 are held at ground potential at the "*c*" terminal of the timing flip-flop 6722. When the output of the gate 6720 rises to ground, the fully charged capacitor in the coupling network connected to the "*b*" terminal of the flip-flop 6722 supplies a positive-going pulse so that the flip-flop 6722 is operated to its set condition. When the flip-flop 6722 is operated to its set condition, the ground potential at its "*d*" terminal inhibits the output of the gate 6720 and the negative potential supplied at its "*c*" terminal enables the coupling circuits connected to the "*a*" terminals of the flip-flops 6706 and 6722.

Accordingly, following the expiration of a two second interval, the second positive-going pulse applied from the terminal 2SP to the gates 6702, 6704 and 6718 supplies positive-going differentiated pulses to the "*a*" terminals of the flip-flops 6706 and 6722 to operate these flip-flops to their reset condition.

When the flip-flop 6706 is restored to its reset condition, the ground potential applied to its "*c*" terminal clamps the output of the gate 6716 at ground so that the pulses applied to the terminal 2SP are no longer effective to control the operation of the flip-flops 6706 and 6722. Further, this ground potential also renders the inverters 6738 and 6732 nonconductive so that the relays 7310 and 7350 are released to remove the release tone from the connection. This operation of the inverters 6732 and 6738 also removes the operating ground extended to the connector 820 so that the link split relay 6225 is released.

Further, the ground to negative transition applied to the input of an inverter 6714 renders this inverter momentarily conductive so that a negative-going pulse is supplied at the output thereof. This negative-going pulse enables a pair of gates 6740 and 6746 so that a negative potential is forwarded through a pair of gates 6742 and 6748 to momentarily place a pair of inverters 6744 and 6750 in conduction. When the inverter 6744 is rendered conductive, a positive-going pulse is applied to the reset terminal of the called time store 6500 and the "*a*" terminals of all of the flip-flips 6515 in the unit 6510–6514. This reset signal clears the called time slot store 6500 and operates any set ones of the flip-flips 6515 to their reset condition. Accordingly, the operated one of the relays, such as the relay 6310, in the link connector 820 used to extend the connection to the terminating line is released. Similarly, the conduction of the inverter 6715 supplies a positive-going pulse to the reset terminal of the calling time slot store 6400 and to the "*a*" terminals of the flip-flips 6415 in the units 6410–6414. This releases the operated one of the switching relays, such as the relay 6201, in the link connector 820 which is used to extend the connection to the calling line. Accordingly, the link connector 820 is restored to a normal condition at this time, and the calling and called slot and highway designations are cleared from the link circuit 810.

Referring back to the reset of the flip-flop 6706, when the "*c*" terminal thereof returns to ground potential from a negative potential, an "AND" gate 7095 supplies a positive-going signal to the "*b*" terminal of the idle-busy flip-flip 7085. This operates this flip-flip to its reset condition so that ground potential is again supplied to its "*d*" terminal and negative potential is supplied to its "*c*" terminal. The provision of ground potential at the "*d*" terminal of the flip-flip 7085 removes the enabling potential forwarded to a plurality of gates in the link circuit 810 so that these circuits are no longer conditioned for operation. The negative potential at the "*e*" terminal of the flip-flip 7085 is forwarded through the gate 7080 to the "AND" gate 7060, thereby enabling this gate so that, when the X and Y terminals of the link allotter 1100 are next provided with negative marking potentials, the gate 7060 is effective to cause the operation of the inverters 7070 and 7055 in the manner described above to mark the link 800 as idle and available for use in extending a connection.

*Operation of the Link 800 When the Call Is To Be Extended From the Local Board 150 Over an Outgoing Trunk to One of the Boards 160, 190 or 195*

When the connection to be established by the link 800 is to an outgoing trunk, this link operates in substantially the same manner as when a call is extended between a pair of lines served by the local board 150, with the exceptions noted below. In general, the primary difference arises out of the fact that, when the connection is extended over an outgoing trunk to a remote board, this remote board requires the transmission of a seizure tone or signal from the local board 150 in place of the ringing tone and there is no need for ring-back tone to be returned to the originating or incoming circuit. As described above, when the routing control circuit 700 receives information indicating that the call is to be extended to an outgoing trunk, a negative potential is applied to a terminal TM which is connected to a diode input of a gate 7226 in the link circuit 810.

The link circuit 810 and the link connector 820 operate in the manner described above so that the application of a negative-going pulse to the terminal WR places the inverter 7035 in conduction to cause the storage of the calling and called highway and time slot information in the link circuit 810 and the link connector 820. However, when the inverter 7035 is placed in conduction, the negative potential at its output is forwarded to the diode input of the gate 7226. The output of this gate drops to a negative potential which is forwarded through a gate 7228 to the input of an inverter 7230. This places the inverter in conduction so that a positive-going pulse is supplied to the "*e*" terminal of a flip-flip 6800. This operates this flip-flip to its set condition in which ground is supplied to its "*e*" terminal. This ground is forwarded through the gate 6810 to again operate the link split relay 6225 in the link connector 820. This prevents the connection of the call originating and call terminating circuits. The ground provided at the "*e*" terminal of the set flip-flip 6800 is also forwarded through a gate 6806 to clamp the ring control flip-flip 6804 in its reset condition to prevent the application of ring tone to the connection. This ground also clamps the output of the gate 6808 at ground so that the inverter 6816 can not be rendered conductive in the manner described above.

The ground potential provided at the "*e*" terminal of the set flip-flip 6800 is also forwarded to one terminal of the operating winding of the relay 7360. This relay operates to open a pair of contacts 7362 and to close a pair of contacts 7361. The closure of the contacts 7361 forwards the 1700 c.p.s. seize tone through a plurality of contacts 7334, 7324 and 7352 and the filter 6345 in the link connector 820 so that seize tone is forwarded over the called highway in the proper time position to be applied to the controlling register in the remote exchange. The receipt and detection of this signal in the remote board or exchange causes the return of an acknowledging seize signal to the local board 150. This tone is detected by the ring trip detector 1120 under the control of the ring trip scan generator 7200 in the manner described above. The detection of this tone causes the application of a series of negative-going pulses to the output terminal "*a*" of the converter 7450. These negative-going pulses are applied to the input of the gate 6808 and a gate 7212. The output of the gate 6808 is clamped to ground potential.

However the gate 7212 is enabled at this time so that the negative-going pulses supplied by the converter 7450 provide negative-going pulses that are forwarded through a gate 7214 to render an inverter 7216 conductive. When this inverter is rendered conductive, the ground potential at its output is forwarded through a gate 6802 to the "*g*" terminal of the set flip-flip 6800. This operates the flip-flip 6800 to its reset condition and thus removes the ground potential applied at its "*e*" terminal. The removal of ground potential from the "*e*" terminal of the reset flip-flip 6800 releases the link split relay 6225 in the link connector 820, removes the clamping ground from the gates 6806, 6810 and 6808, and also releases the relay 7360 so that seize tone is no longer applied to the called highway.

In addition, when the connection from the local board 150 is extended over a trunk circuit to another board, there is no need to supply the 600 c.p.s. dial tone to insure that the acknowledge seizure tone returned by this remote board is removed. When the ring tone is supplied to the called line, it is necessary to return dial tone to this line upon receipt of the seizure tone indicating answering at the called station inasmuch as this answering may occur during a blank or "off" period in the ring tone. Since the seizure tone forwarded on calls through outgoing trunks is continuous, there is no need to provide the return transmission of dial tones on these calls when seizure tone is returned from the remote exchange. As described above, the output of the gate 6808 is clamped by the set flip-flip 6800 so that the inverters 6816 and 6940 can not be rendered conductive. By blocking the operation of the inverter 6940, the circuit for operating the relay 7330 is maintained in an inoperative state.

The link 800, other than the exceptions noted above, operates in the manner described above to extend and maintain a connection between the local board 150 and the remote board over the selected trunk circuit. This connection is maintained until such time as release tone is received by the unit 1110 under the control of the release and recall scan generator 7100. At this time, the link circuit 810 again forwards a release tone to the call originating and terminating circuits and the link circuit 810 and the link connector 820 are restored to normal so that the link 800 is placed in an idle condition which it can be allotted by the allotter 1100.

*Operation of the Link 800 and the Keyboard Circuit 1220 To Extend a Local Call*

When a call is to be extended from one of the lines served by the local board 150 to another one of the local lines served by the board 150 through the operator position, the link circuit 810 operates the link connector 820 to extend a connection from the calling line to the operator's position and actuates the position coupling circuit 830 to provide an indication to the operator through the keyboard circuit 1220 that an incoming call is waiting. The operator then receives the information concerning the desired local call and, by the use of the position register 1000 and the routing control unit, supplies the link circuit 810 with the information designating the called line. The link circuit 810 then controls the operation of the link connector 820 to establish the connection between the calling line and the called line in the same general manner described above. As described above, the routing control unit 700 supplies a negative marking potential to a terminal AM (FIG. 66) when the call is to be extended to the operator position or keyboard circuit 1220, and also supplies marking signals representing only the highway designation and time slot of the calling line.

The link circuit is placed in operation in the manner described above so that the inverter 7035 is rendered conductive to provide a negative enabling potential for the reading gates in the link circuit 810. This negative potential if forwarded to the diode input of the gate 6660 which is now enabled by the negative potential applied to the terminal AM. Thus, while the calling time slot and highway information is being stored in the link circuit 810 and used to control the operation of the link connector 820 to extend a connection to the calling line, the gates 6660 and 6665 place an inverter 6670 in conduction so that ground is forwarded to the clamp A terminal of the called time slot store 6500. This prevents the inadvertent storage of the time position "0" in this store when the inverter 7035 is subsequently rendered nonconductive.

When the calling time slot is stored in the unit 6400, as described above, a negative-going signal is returned from the test busy terminal to the inputs of the gates 6685 and 7000. The gate 6685 is not enabled because of the fact that the called time slot store 6500 is not operated to store a called time slot. However, the gate 7000 is now enabled under the control of the terminal ICDR because of the negative marking potential provided at the terminal AM. Thus, the output of the gate 7000 drops to a negative potential that is forwarded through a gate 7020 to place an inverter 7025 in conduction. The conduction of the inverter 7025 operates the idle-busy flip-flip 7085 to its set condition, as described above, so that the link allotter 1100 is freed and so that the routing control unit 700 is advised that the calling slot and highway information has been stored in the link 800. This results in the removal of negative potential at the terminal WR so that the inverter 7035 is restored to a nonconductive condition. The conduction of the inverter 7025 also forwards ground potential through a gate 7015 to operate the ring control flip-flip 6084 to its set condition. The operation of the flip-flip 6084 to its set condition causes the operation of the relay 7320 in the manner described above so that ring tone is returned to the call originating line. The operation of the flip-flip 6804 also operates the split relay 6225 in the link connector 820. The operation of the split relay 6225 and the fact that highway and time slot information relating to the called line has not been stored in the link circuit 810 insures that ring-back tone is returned to only the calling subscriber to advise him that the call is awaiting attention by the operator.

To advise the operator that the link 800 is associated with a call requiring attention, the conductive inverter 6670 also forwards a ground pulse through a gate 6675 to the "*e*" terminal of a flip-flip 6946 in the link circuit 810 and to the "*e*" terminal of a flip-flip 7524 in the position coupling circuit 830 individual to the link 800. This positive-going or ground pulse operates these two flip-flips to their set condition. When the flip-flip 6946 is operated to its set condition, a negative potential is applied to a plurality of gates 6948, 6942 and 6944. The negative potential at the gate 6944 marks the link in the call finder 1200. The negative potential forwarded through the gate 6942 enables a gate 7878 in the keyboard circuit 1220 so that a negative potential is forwarded through a gate 7880 to render an inverter 7882 conductive. The output of the inverter 7882 rises to ground and is effective through a gate 7884 to render an inverter 7886 nonconductive so that its output drops to a negative potential. This potential is effective through an "OR" gate 7888 to render an inverter 7890 conductive. When the inverter 7890 is placed in a conductive condition, a call control lamp 7892 is illuminated to provide a visible indication at the operator's position that there is a call awaiting attention.

When the flip-flip 7524 in the position coupling circuit 830 is rendered conductive, the "*d*" terminal thereof drops to a negative potential which is forwarded through a gate 7508 to provide another source of negative enabling potential for the gate 7878. Thus, when either of the flip-flips 6946 or 7524 is operated to a set condition, the control lamp 7892 is illuminated. The negative potential at the "*d*" terminal of the flip-flip 7524 also provides a partial enabling potential for a gate 7504 and is forwarded through a gate 7506 to the LU1 terminal a call finder 1200 which represents the location of the position coupling circuit 830 and the link 800 in a first scanning direction of the finder 1200.

The call finder 1200 comprises an allotting means that searches for links requiring the attention of the operator and enables the operator to seize the links in the order that the calling conditions are established therein. In general, the call finder 1200 is identical to the similarly designated component shown and described in detail in the Tubinis et al. application. In addition, the basic circuitry and operation of the call finder 1200 is disclosed in a copending application Ser. No. 716,948, filed February 24, 1958, which application is assigned to the same assignee as the present invention. The terminals LU and LMU, for instance, of the finder 1200 correspond to the terminals MK and SZ of the circuit shown in the latter application, as indicated in parentheses.

Basically, the call finder 1200 comprises a counting circuit 7600 and another counting circuit including a plurality of serially operative counting stages 7700 and 7701. These two circuits successively scan the circuits 810 and 830 in two coordinate directions to search for and seize a marked link. The counting circuit 7600 comprises an odd number of direct current amplifier stages connected in a closed ring and is free running in the absence of stop signals. Accordingly, when the keyboard circuit 1220 becomes idle at the completion of a preceding call requiring the operator's attention, the counting circuit 7600 is placed in operation. When this counting circuit advances to the setting individual to the terminals LU1 and LMU1, the stop potential applied to the gates 7506 and 6944 arrests further operation of this counting circuit in the coordinate position occupied by the position coupling circuit 830. The counter 7600 then applies a negative potential to the terminal LMU1 which is forwarded to a diode input of each of the gates 6925, 6948 and 7504. The outputs of the gates 7504 and 6948 drop to a negative value and are effective through a pair of gates 6950 and 7502 to place a pair of inverters 6952 and 7500 in conduction. When these inverters are rendered conductive, ground is forwarded to the "*c*" terminal of an inverter 7710 in the first stage 7700 of the second counter in the call finder 1200. Thus, the conduction of these inverters provides a marking or stop ground for the second counter in the call finder 1200 to mark the second coordinate position of the position coupling circuit 830 and the link 800.

The counting circuit including the stages 7700 and 7701, which are odd in number, is basically the same as the counting circuit 7600. To illustrate the operation of this counting circuit, assume that the inverter 7704 has just become nonconductive so that a negative potential is applied to one input of an "AND" gate 7706, the adjacent unit 7701 is then in a nonconductive state and the remaining stages of the counter are in alternate conductive and nonconductive states, respectively. Since an odd number of stages are provided in the counter, the last stage 7701 is in a conductive condition so that the inverter 7704 therein supplies ground potential to the resistive input of a gate 7702 in the unit 7700 and also to the other diode input of the gate 7706. When the inverter 7704 in the unit 7700 becomes nonconductive, a storage capacitor 7703 in the adjacent unit 7701 begins to charge in a negative direction through a gate corresponding to the gate 7702. Thus, after a predetermined interval, the inverter 7704 in the adjacent unit 7701 becomes conductive and the conductive conditions of the remaining stages of the counter shift. When the inverter 7704 in the last unit 7701 is shifted to a nonconductive state, the gate 7706 in the unit 7700 is enabled so that a negative potential is forwarded through a gate 7708 to the "*b*" terminal of the inverter 7710. The "*c*" terminal of this inverter is marked with a ground potential from the position coupling circuit 830 and the link circuit 811, as described above. Thus, the inverter 7710 is placed in conduction so that ground is returned to the diode input of the input gate 7702. This prevents the inverter 7704 from being rendered conductive by clamping its "*b*" terminal to ground. Accordingly, the free running step-by-step operation of this counter is arrested because of the stop marking potential forwarded by the position coupling circuit 830 and the link circuit 810.

To indicate the finding of the calling position coupling circuit 830 and link 800, the conduction of the inverter 7710 provides a ground signal which is forwarded through a pair of gates 7712 and 7714 to render an inverter 7718 nonconductive. When the inverter 7718 is rendered nonconductive, a negative potential is forwarded to another one of the diode inputs of the gate 6925 to partially enable this gate. When the inverter 7710 is rendered conductive, the ground potential of the output thereof is also forwarded through a gate 7716 to a gate 7830. The output potential of the gate 7730 rises toward ground and is effective through a gate 7732 to render an inverter 7834 nonconductive. When the inverter 7734 is rendered nonconductive, the output thereof drops to a negative potential to completely enable an "AND" gate 7836 so that its output drops to a negative potential. This is effective through a pair of gates 7838 and 7840 to render a pair of inverters 7844 and 7846 conductive. When the inverter 7846 is rendered conductive, an incoming call lamp 7848 is illuminated to indicate that the call finder 1200 has located the position coupling circuit 830 associated with the calling link 800. The inverter 7844 energizes a buzzer 7816 shunted by a gate 7814.

When the operator is advised by the buzzer 7816 and the incoming call lamp 7848 that a calling link has been associated with the keyboard circuit 1220 through the call finder 1200, the operator actuates a locking type call answer key so that a pair of contacts 7854, 7974 and 8042 are opened and a pair of contacts 7852 are closed. The opening of the contacts 7974 removes a ground shunt from the output of an inverter 7974, and the opening the contacts 8042 removes one source of ground from an end of digit terminal KDE. When the contacts 7852 are closed to supply positive-going pulse to the "*b*" terminal of a flip-flop 7842, this flip-flop is operated to its set condition in which ground is applied to its "*d*" terminal and a negative potential is applied to its "*c*" terminal. The ground potential supplied at its "*d*" terminal clamps the output of the gate 7836 at ground so that the audible and visible indications of the incoming call provided by the lamp 7848 and the buzzer 7816 are removed. The negative potential at the "*c*" terminal is forwarded to the gate 6925 and completes the enabling thereof so that the negative potential provided at the "*d*" terminal of the set flip-flip 7085 is forwarded through a pair of gates 6930 and 6932 to render an inverter 6934 conductive. When this inverter is rendered conductive, a positive-going pulse is forwarded through a coupling circuit to the "*b*" terminal of the ring control flip-flip 6804 so that this flip-flip is operated to its reset condition. When this flip-flip is operated to its reset condition, the relay 7320 is released to remove ring tone from the calling subscriber to indicate that the call has been accepted by the operator. This ground signal is also forwarded to one of the diode inputs of a gate 7112 so that the output thereof drops to ground. This ground is forwarded to the link connector 820 to hold the link split relay 6225 operated when the previous operating circuit therefor is interrupted by the resetting of the ring control flip-flip 6804. It is desirable to maintain the link split relay 6225 operated so that the operator can independently converse with either the calling or called subscriber.

When the inverter 6934 is placed in conduction, the positive-going signal at the output thereof is applied to the input of an inverter 6900 to render this inverter conductive. When the inverter 6900 is rendered conductive, a negative potential is forwarded through a pair of gates 6920 and 6926 to render a pair of inverters 6922 and 6928 conductive. The conduction of these two inverters completes the operating circuits for a pair of relays 7340 and 7370. The operation of the relay 7340 completes a circuit for extending the send and receive paths of the calling circuit to a hybrid network 8010 in the keyboard circuit 1220 to which an operator's headset including a receiver 8015 and a transmitter 8020 is connected. More specifically, the operation of the relay 7340 closes a plurality of contacts 7341 and 7342. The closure of the contacts 7341 connects the receive path of the calling highway through a plurality of closed contacts 7312, 7322, 7332, 7341 and 8061 to the output of an audio amplifier 8006. The closure of the contacts 7342 connects the send path of the calling highway through the audio amplifier 6340, the closed contacts 7342 and a pair of normally closed contacts 8001 to the input of an audio amplifier 8005. In a like manner, the closure of a plurality of contacts 7371 and 7372 when the relay 7370 is operated interconnects the send and receive paths of the called highway through a plurality of normally closed contacts 8071 and 8081 to the input of an audio amplifier 8007 and the output of an amplifier 8008. The audio amplifiers 8005–8008 are connected to the hybrid circuit 8010 so that the operator can converse with either or both of the calling or called parties. However, it should be noted that, at this time, the link connector 820 has not been operated to establish a connection to the called circuit.

The operator now converses with the calling subscriber to determine the number of the called local station. The digits forming the designation of the called local station are then keyed into the position register 1000 by selectively actuating a plurality of keys 8031–8040 which represent "1–9" and "0." The operation of one of these keys applies ground to two of five "OR" gates 8050–8054 so that two of five terminals KDU–KDY are grounded in accordance with the digit representing code (see table in FIG. 84). When one of the keys 8031–8040 is operated, ground is removed from the terminal KDE, and this ground is returned when the operated key is released. In this manner, the operator keys the three digits identifying the called local station into the position register 1000.

In the event that the operator keys information into the position register 1000 by the selective actuation of the keys 8030–8039 faster than the information can be stored and utilized by the register 1000, all of the inputs to a gate 7906 drop to ground which is effective through a gate 7908 to render an inverter 7910 nonconductive. When the output of this gate drops to a negative potential, an inverter 7914 is rendered conductive to illuminate a stop keying lamp 7916. This visible indication advises the operator that the keying of further digits of the designation of the called circuit must be arrested. When the illumination of the lamp 7916 is terminated, the operator can continue keying the designation of the called circuit into the position register 1000.

Further, in the event that the position register 1000 has timed out because of missing acknowledge signals on a call to a trunk, the position register 1000 causes the illumination of the stop keying lamp 7916, as described above and also applies a negative potential to a terminal KTO (FIG. 79) so that an inverter 7900 is rendered conductive. This illuminates an incomplete call lamp 7902 to provide a visible indication to the operator that the call cannot be completed. The operator must then actuate a release key and make a second attempt to extend the call.

The release key is a non-locking key and, when actuated, momentarily closes a plurality of contacts 7976 and 7898 and momentarily opens a pair of normally closed contacts 7899. The closure of the contacts 7976 clamps the output of a gate 7956 at ground potential, and the closure of the contacts 7898 applies ground to a terminal KRS to cause the resetting of the position register 1000. The opening of the contacts 7899 removes one source of ground from a release conductor extending to the link circuit 810. However, this does not produce any effect at this time because ground is maintained on this conductor through a plurality of normally closed contacts 7871 and 7873.

Assuming that the first or second keying operation is successfully completed so that the designation of the called local station is stored in the register 1000, this information is then transferred from the position register 1000 to the routing control unit 700. This unit operates in the manner described above to apply marking to the terminals TH0, TH1, TH2, TH4 and TH7 representing the designation of the called highway and to apply pulses to the set terminal of the called time slot store 6500 representing the time position of the called circuit on the called highway. However, this information is not stored in the link circuit 810 because the input gates are not enabled at this time. However, when an idle called circuit is selected by the routing control unit 700, this unit returns a signal to the position register 1000 which causes this register to apply a negative-going signal to a terminal KWR (FIG. 79) in the keyboard circuit 1220. This negative potential is forwarded through the "OR" gate 7956 to render an inverter 7958 conductive. The conduction of the inverter 7958 illuminates a call set-up lamp 7968 to provide a visible indication to the operator that an idle outgoing circuit has been selected. When the inverter 7958 is rendered conductive, a positive-going potential is forwarded through a pair of gates 7960 and 7970 to render an inverter 7972 nonconductive. Since the contacts 7974 and 7976 are opened at this time, the termination of conduction through the inverter 7972 forwards a negative potential through the "OR" gate 7956 to hold the inverter 7958 in a conductive condition.

The negative-going potential provided at the terminal KWR is also forwarded through a gate 7932 to render an inverter 7934 conductive. When this inverter is rendered conductive, a positive-going signal is forwarded through a gate 7936 to render an inverter 7938 nonconductive. When the inverter 7938 is rendered nonconductive, a negative potential is applied to one diode input of a gate 7050 in the link circuit 810.

Figure 66:
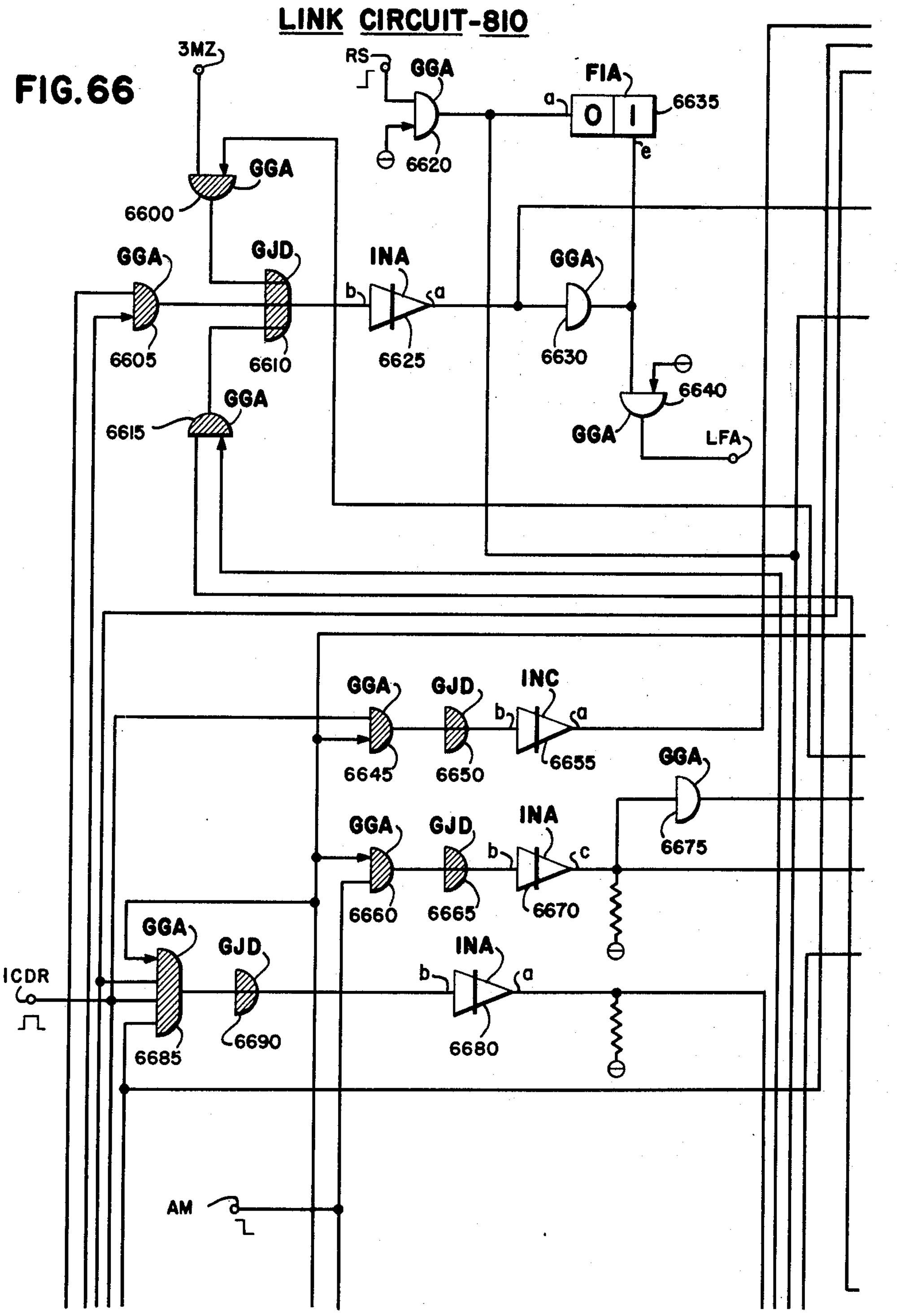
Figure 67:
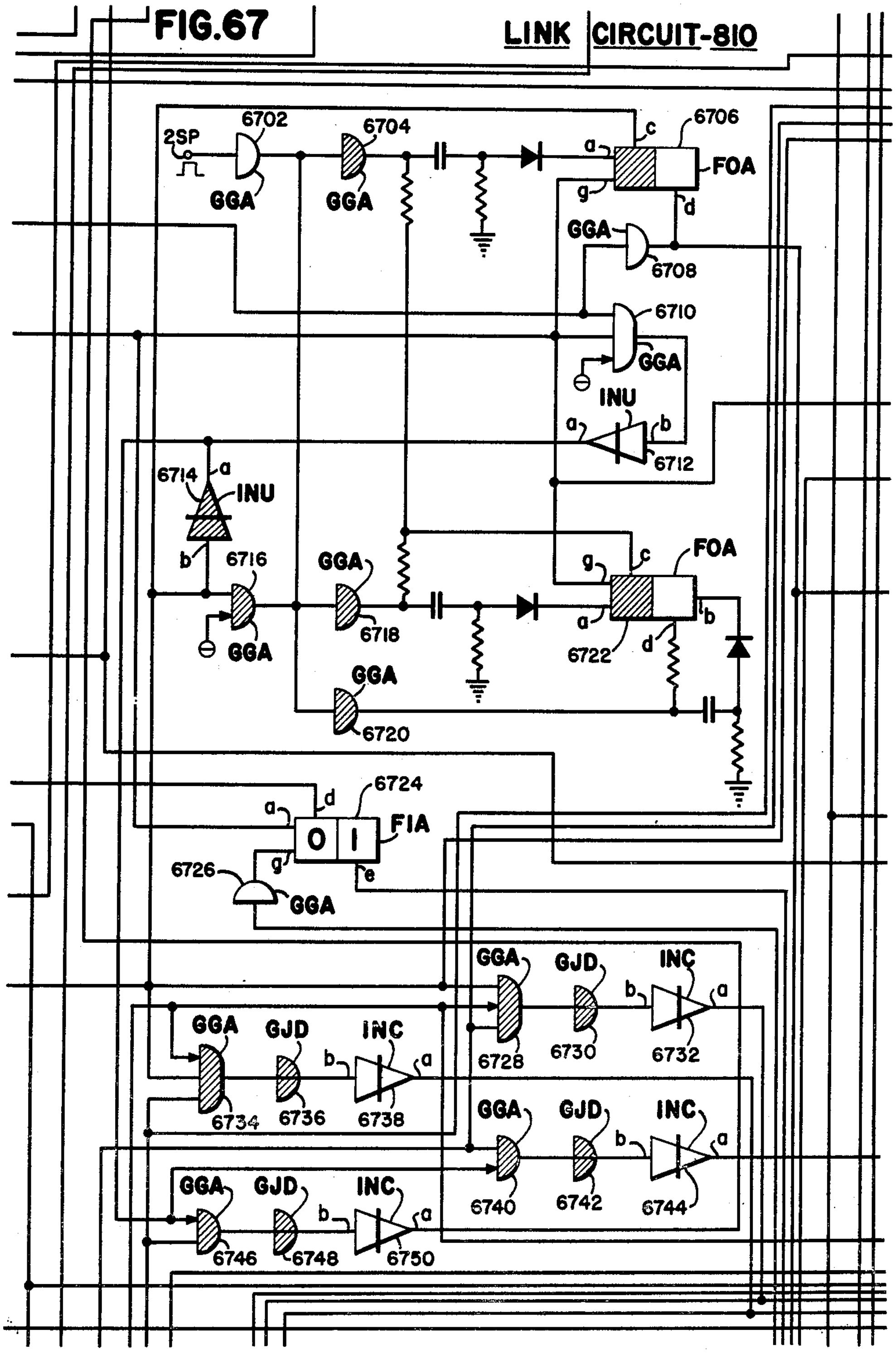
Figure 68:
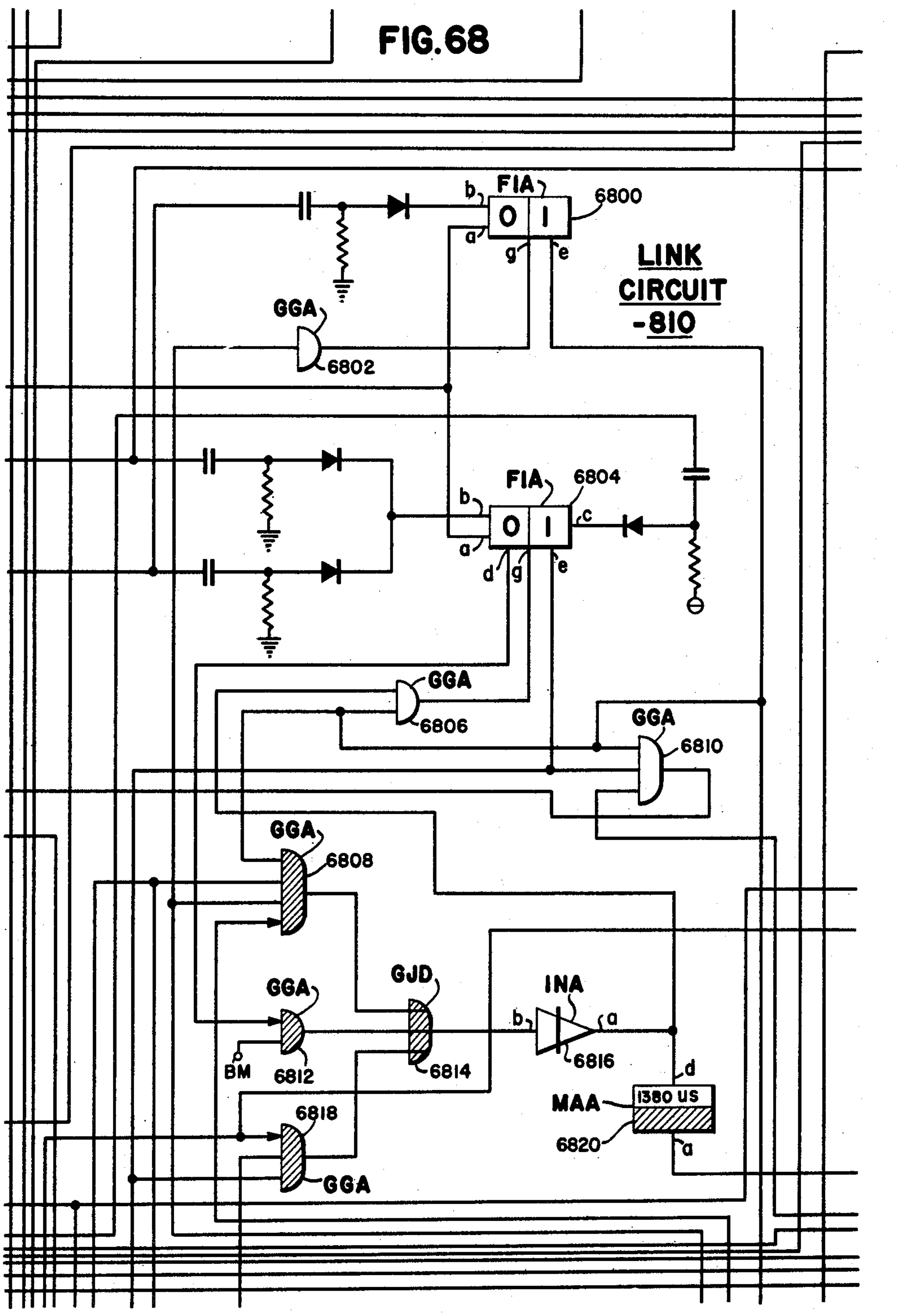
Figure 69:
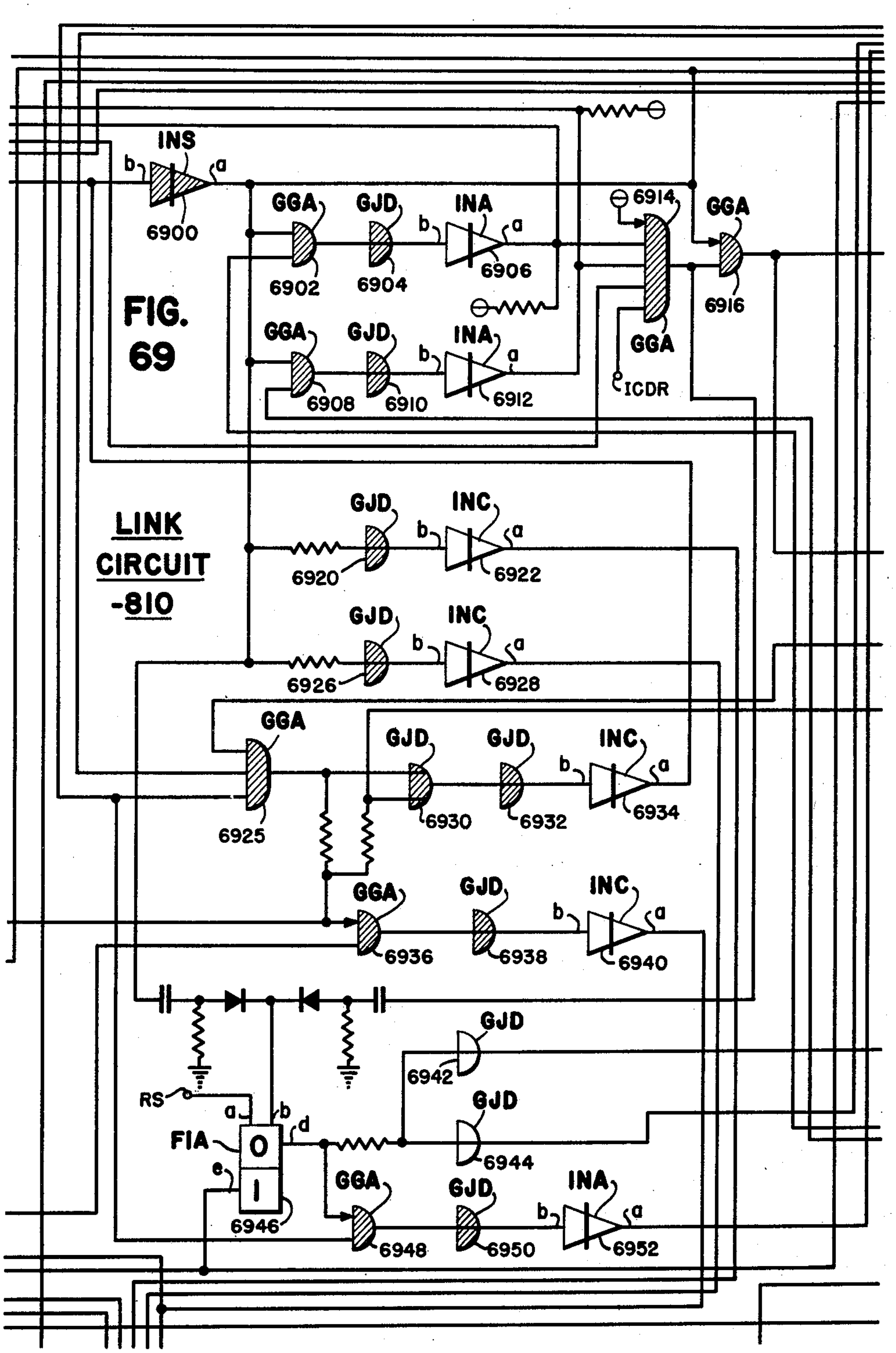
Figure 70:
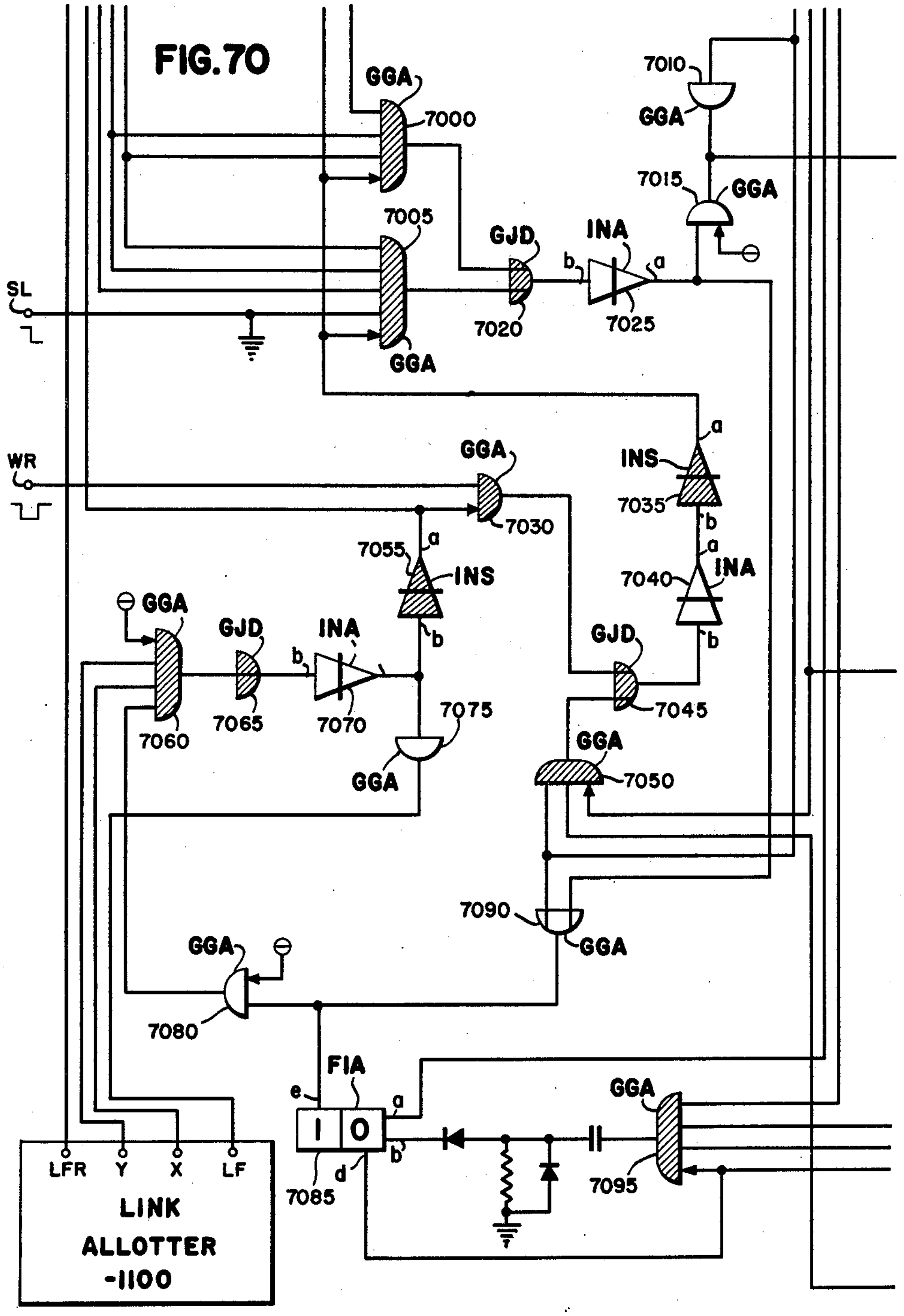

The other diode input of the gate 7050 is connected to a negative potential at the output of the inverter 6680, and the resistive input to the gate 7050 is connected to a negative-potential at the output of the conductive inverter 6900. Since the inverter 6900 in only the link circuit 810 is in a conductive condition at this time, only the gate 7050 in the link circuit 810 is enabled. When the output of the gate 7050 drops to a negative potential, this potential is forwarded through the "OR" gate 7045 to again render the inverters 7040 and 7035 conductive in sequence. When the inverter 7035 is rendered conductive, a negative enabling potential is provided for the input gates in the link circuit 810. As indicated above, the routing control unit 700 provides marking conditions representing only the called highway and the time slot thereon. Accordingly, the conduction of the inverter 7035 causes the storage of the called line designation in the storage unit 6510–6514 and in the called time slot store 6500. The previously stored information designating the calling line or trunk remains stored in the units 6410–6414 and the calling time slot store 6400. The operation of the inverter 7035 causes the ring control flip-flip 6804 to be set so that ring tone is forwarded to both the called and calling lines. It should be noted that ringing is forwarded to both the originating and terminating circuits because of the fact that the routing control unit 700 no longer supplies a negative potential to the terminal AM (FIG. 66). This is true because the called designation stored in the routing control unit at this time represents a local line. The link circuit 810 and the link connector 820 proceed to establish the connection to the local line in the same manner described above.

However, it should be noted that the calling and called circuits remain interconnected only through the hybrid circuit 8010 in the keyboard circuit 1220. Thus, the operator can monitor the connection and can converse with either the called or calling party. If the operator wishes to converse with only the called party, a locking type split key is actuated to open the contacts 8001 and 8061 and to close a plurality of contacts 8002 and 8062, among others. The opening of the contacts 8001 and 8061 disconnects the calling party from the circuit 8010 so that the operator's headset is effective to carry on communication with only the called party. Similarly, if the locking type split key is operated to an alternate position, the contacts 8071 and 8081 are opened and a plurality of contacts 8072 and 8082 are closed. The opening of the contacts 8071 and 8081 permits the operator to carry on a conversation with only the calling party.

When the call has been established to the satisfaction of the operator and the operator is to retire from the connection so that the calling and called parties can be interconnected through the link connector 820 rather than through the hybrid circuit 8010, the operator "throws off" the link 800 by restoring the call answer key to its normal position. In doing so, the contacts 7854 and 7974 are closed and the contacts 7852 are opened. The closure of the contacts 7974 shunts the output of the inverter 7972 to ground so that the inverters 7958 and 7972 are rendered nonconductive to terminate the illumination of the call set-up lamp 7968, the negative potential previously having been removed from the terminal KWR by the position register 1000. The closure of the contact 7854 supplies a positive-going signal through a coupling network to a terminal KOP which is connected to a position register 1000. This signal advises the position register that the operator has "thrown off" the call. The closure of the contacts 7854 also restores the flip-flop 7842 to its reset condition.

When this flip-flop restores to its normal condition, the gate 7836 is again partially enabled. Further when the "*c*" terminal of the flip-flop 7842 rises to ground potential, a more positive potential is forwarded through the gates 6925, 6930 and 6932 to render the inverter 6934 nonconductive. When this inverter is rendered nonconductive, the output of the gate 7112 drops to a negative potential so that the split link relay 6225 is released. This permits the calling and called parties to be interconnected directly through the link connector 820. Further, when the inverter 6934 is rendered nonconductive, the inverter 6900 is also rendered nonconductive so that its output potential rises to a positive value. This renders the inverters 6922 and 6928 nonconductive so that the relays 6340 and 7370 are released. This interrupts the connection between the keyboard circuit 1220 and the calling and called highways. Further, when the inverter 6900 is rendered nonconductive, the positive-going pulse provided at its output is coupled through a coupling network to the "*b*" terminal of the set flip-flip 6946 and through a coupling network to the "*b*" terminal of the set flip-flip 7524 in the position coupling circuit 830 so these two flip-flips are restored to their reset condition. The restoration of the flip-flips 6946 and 7524 to their reset condition removes the stop marking potential applied to the call finder 1200 so that the free-running counting circuits therein are placed in operation to search for and seize the next link circuit having a call requiring the attention of the operator. Thus, the call finder 1200 is now enabled to seize the next placed call and to associate the link with the keyboard circuit 1220 in the manner described above. The link 800 maintains the connection through the link connector 820 until either one of the parties goes "on-hook" to terminate the connection. At this time, the link 800 operates in the manner described above to detect the release signal, to forward the release signal in both incoming and outgoing directions, and to restore the link to an idle condition.

During the interval in which the operator is keying the information necessary for establishing the call into the position register 1000 it is possible for the calling station to go "on-hook." In this event, the release signal is detected by the release, recall, and voice monitor multi-frequency detector 1110 in the manner described above so that the flip-flop 6706 is operated to its set condition in which the negative potential is supplied to its "*c*" terminal. This negative potential is forwarded to one of the diode inputs of an "AND" gate 6914. The remaining inputs to this gate are connected to a negative potential with the exception of a single diode input which is connected to the terminal ICDR. This terminal is provided with positive-going pulses. Accordingly, when the ICDR terminal provides a pulse, the "AND" gate 6914 supplies a positive-going signal through a coupling network to the "*b*" terminal of the flip-flip 6946 to restore this flip-flip to its reset condition. Further, the pulse supplied at the output of the "AND" gates 6914 is forwarded through an "AND" gate 6916 to provide a positive-going pulse which is coupled through a network to the "*b*" terminal of the set flip-flip 7524 in the position coupling circuit 830 and the "*a*" terminal of the set flip-flop 7842 in the keyboard circuit 1220. Thus, these components are restored to their normal condition.

The restoration of the flip-flop 7842 to its reset condition causes the restoration of the link circuit 810 and the keyboard circuit 1220 to a normal condition. Thus, the link is automatically "thrown off" in response to receipt of release signals from the calling subscribed prior to the time at which the call is manually "thrown off" by the operator. It should be noted, however, that when the link 800 and the keyboard circuit 1220 are restored to a normal condition so that the call finder 1200 is placed in operation, the selection of another link awaiting service by the operator does not permit direct connection of the operator and the calling line without the operation of the answer key so that the contacts 7852 are again closed to operate the flip-flop 7842 to its set condition. This is desirable because it prevents any information previously transmitted to the position register 1000 for the "thrown off" call from being utilized erroneously in the next placed call.

*Operation of the Link 800 and the Keyboard Circuit 1220 When the Operator Extends a Call From the Local Board 150 to a Remote Local Board*

In general, the link circuit 810, the link connector 820, the position coupling circuit 830, the call finder 1200 and the keyboard circuit 1220 operate in the manner described above when the operator extends a call to a remote local board. However, a few differences in operation should be noted.

When a call is extended to a station served by a remote local board, ringing is provided in the remote office and is not required in the local board 150. In order to accomplish this, the keyboard circuit 1220 includes a terminal KIC which is connected to the position register 1000.

When the position register transfers the data pertaining to the outgoing trunk when the call to the remote board is established, a negative marking potential is applied to the terminal KIC which is forwarded through a gate 7922 to render an inverter 7924 conductive. When this inverter is rendered conductive, a positive-going potential is forwarded through a gate 7926 to render an inverter 7928 nonconductive. The negative potential at the output of the inverter 7928 is forwarded to one of the diode inputs of a gate 6818. The resistive input of this gate is enabled by the inverter 6900 which is rendered conductive on calls placed by the keyboard circuit 1220. The remaining diode input of this gate is provided with a negative potential from the "*e*" terminal of the reset flip-flip 6804. Accordingly, the gate 6818 is fully enabled so that a negative potential is forwarded through the "OR" gate 6814 to render the inverter 6816 conductive. When this inverter is rendered conductive, the unit 6820 is set and the ground potential at its "*d*" terminal is forwarded through the gate 6806 to inhibit operation of the ring control flip-flip 6804. Thus, the link circuit 810 is prevented from supplying ring tone to the call originating and terminating circuits when the call is placed by the operator to a remote station.

*Operation of the Link 800 and the Keyboard Circuit 1220 on a Recall*

As indicated above, a calling or called subscriber can automatically recall the closest operator after a connection has been completed so that the operator can reroute the connection from either the calling or the called party to another substation. To initiate this operation, the calling or called subscriber actuates a recall key on the subset that causes a recall signal including components of 2300 c.p.s. and 2900 c.p.s. signals to be applied to the link. As described above, the recall scan generator 7100 sequentially renders each of the link circuits in the group served thereby effective under the control of the counting circuit 7105. Assuming that this counting circuit is in a setting corresponding to the scanning position of the link circuit 810, the "AND" gate 7110 supplies a negative potential to the previously enabled gate 7132 so that the inverters 7136 and 7138 are again rendered conductive. The conduction of the inverter 7138 opens the audio gate 7238 so that the release tone applied to the link connector 820 from the calling or called subscriber is forwarded through the unit 7425 and through a bandpass filter 7409 and the bandpass filter 7414 to place the converters 7410 and 7415 in operation. These converters provide a series of negative-going pulses which are supplied to one of the diode inputs of the "AND" gate 7405. The other input of this gate is connected to an open circuit in the keyboard circuit 1220. Thus, the "AND" gate 7405 provides a series of negative-going pulses representing the recall condition on the connection extending through the link connector 820.

The negative-going pulses are forwarded to one of the diode inputs of an "AND" gate 7550 in the position coupling circuit 830 individual to the link 800. The other diode input of this gate is connected to a negative potential at the "*e*" terminal of the reset flip-flip 7524. The resistance input of the gate 7550 is connected to the negative potential provided at the output of the conductive inverter 7138. Accordingly, a negative-going signal is forwarded from the gate 7550 through a gate 7548 to render an inverter 7546 conductive. When this inverter is rendered conductive, a positive-going pulse is supplied through a coupling network to the "*b*" terminal of a monostable multivibrator 7544. This operates this multivibrator to its set condition in which ground is supplied to its "*d*" terminal and a negative potential is applied to its "*a*" terminal. The unit 7544 insures that only a single operating signal is supplied even though the inverter 7546 is pulsed by the detector 1110.

The negative potential at its "*a*" terminal permits the coupling capacitor in a network connected to the "*b*" terminal of a flip-flop 7586 to charge. Thus, at the end of the scan period the counting circuit 7105 removes the enabling potential for the "AND" gate 7110 so that the inverter 7138 is rendered nonconductive to block transmission through the gate 7238 to the unit 1110 and to also remove the negative potential from the resistive input of the "AND" gate 7550. This terminates the conduction of the inverter 7546 and also provides a positive going pulse which is coupled to the "*b*" terminal of a monostable multivibrator 7534 so that this unit is operated to its set condition in which a negative potential is supplied from its "*a*" terminal to one of the diode inputs of an "AND" gate 7532. However, the output of the gate 7532 is clamped at ground at the "*d*" terminal of the monostable multivibrator 7544 which has a longer time constant than the unit 7534. The release and recall scan generator 7100 now enables the remaining link circuits 810 in the group assigned thereto.

When the monostable multivibrator 7544 times out so that its "*a*" terminal returns to ground, a positive-going pulse is applied to the "*b*" terminal of the flip-flop 7586. This unit is operated to its set condition in which a negative potential is applied to its "*c*" terminal and ground potential is supplied to its "*d*" terminal. The operation of the flip-flop 7586 indicates to the position coupling circuit 830 that a recall signal was detected on the connection established through the associated link connector 820 during one scan period of its generator 7100. The position coupling circuit 830 includes means for requiring the presence of recall signals on the connection established through the connector 820 for three successive scanning cycles of the generator 7100 to insure not only the existence of a valid recall condition but also to insure that only the operator closest to the source of recall signals is associated with the connection requiring the recall operation.

To accomplish this, the ground potential provided at the "*d*" terminal of the flip-flop 7586 is forwarded to the "AND" gate 7112 so that a positive potential is forwarded to the link connector 820 to cause the operation of the link split relay 6225. Thus, the incoming and outgoing circuits associated with the link connector 820 are disconnected. The same operation takes place in any of the other local boards involved in the extended connection. Thus, if the recall tone originated from a called subscriber that is served by a board remote from the local board 150, the splitting of the link in the remote local board prevents the return of recall signals to the link circuit 810. Alternatively, if the recall signal originates from a substation that is closest to or directly served by the local board 150, the splitting of the link does not affect the receipt by the circuit 810 of the recall tone.

Accordingly, during the next cycle of operation of the scanning generator 7100, a series of negative-going pulses are again applied to the input of the inverter 7546. The conduction of the inverter 7546 again operates the monostable multivibrator 7544 to its set condition in which ground is applied to the terminal "*d*" and a negative potential is applied to the terminal "*a*." In view of the set condition of the flip-flop 7586, the provision of a negative potential at the terminal "*a*" of the unit 7544 completes the enabling of the "AND" gate 7538 so that an inverter 7542 is rendered conductive. The output of the inverter 7542 is connected through two coupling networks to the "*a*" and "*b*" terminals of a second counting flip-flop 7526. The capacitor in the network connected to the "*a*" terminal is in a discharged condition at this time because of the application of a negative potential to both plates thereof from the "*d*" terminal of the flip-flop 7526 and the normal output of the inverter 7542. However, the capacitor in the coupling network connected to the "*b*" terminal of the flip-flop 7526 is charged because one of the plates thereof is connected to ground at the "*c*" terminal of the flip-flop 7526 and the other plate was connected to a negative potential at the output of the inverter 7542. Thus, when the inverter 7542 is operated, a positive-going pulse is applied through the coupling network to the "*b*" terminal of the flip-flop 7526 to operate this circuit to its set condition in which negative potential is applied to its "*c*" terminal and ground is applied to its "*d*" terminal. Thus, the flip-flops 7536 and 7526 have been operated to set conditions to indicate that a second recall signal has been applied to the link.

When the generator 7100 moves to its next scanning position so that the negative potential is removed from the resistive input of the gate 7550, the inverter 7546 is again rendered nonconductive and the monostable multivibrator 7534 is operated to its set condition. After a ten millisecond delay period, the multivibrator 7534 restores to its normal condition and, following this, the multivibrator 7544 restores to a normal condition. This renders the inverter 7542 nonconductive.

When the link circuit 810 is enabled by the scan generator 7100 for the third time and if the recall signal persists for this interval of time, the inverter 7546 is again rendered conductive so that the monostable multivibrator 7544 is operated into its set condition. The negative potential at the "*a*" terminal thereof is again forwarded to the "AND" gate 7538 to render the inverter 7542 conductive. At this time, the capacitor in the coupling network connected to the "*b*" terminal of the set flip-flop 7526 is discharged because of the negative potential provided at the "*c*" terminal of this flip-flop. However, the capacitor in the coupling network connected to the "*a*" terminal of the flip-flop 7526 is charged because of the ground potential at the "*d*" terminal of this flip-flop. Accordingly, when the inverter 7542 is rendered conductive, a positive-going pulse is applied to the "*a*" terminal of the flip-flop 7526 to restore this component to its reset condition.

When this happens, its "*d*" terminal drops to the negative potential and its "c" terminal rises to ground. The capacitor in the coupling network connected to the "c" terminal of a recall flip-flip 7520 is in a charged condition at this time because of the prior application of negative potential to the "c" terminal of the flip-flop 7526. Accordingly, when this circuit is operated to its reset condition, the ground potential at the "c" terminal of flip-flop 7526 provides a positive-going pulse through the coupling network to the "c" terminal of the flip-flip 7520. This operates this flip-flip to a set condition in which a negative potential is applied to its "d" terminal. Thus, the recall flip-flip 7520 in the position coupling circuit 830 individual to the link 800 having a recall signal applied to the connection established therethrough is operated to a set condition to mark this link as requiring the attention of the operator.

At the end of the scan period of the generator 7100, the inverter 7546 is again rendered nonconductive. The multivibrator 7534 is operated to its set condition and restores, and the multivibrator 7544 then restores to render the inverter 7542 nonconductive. Accordingly, at this time, only the flip-flop 7536 and the recall flip-flip 7520 are in a set condition in the position coupling circuit 830. The flip-flop 7536 is reset during the next scan cycle of the generator 7100 in the manner described below.

It should be noted that, in the event that a recall signal is received by the link 800 during one scanning operation of the generator 7100 and not on a successive cycle, the position coupling circuit 830 is automatically restored to a normal condition. More specifically, when the scan generator 7100 arrives at a setting corresponding to the link circuit 810, a negative enabling potential is applied to the resistive input of the "AND" gate 7550 and also to the coupling network connected to the "b" terminal of the monostable multivibrator 7534. In the event that a recall signal is not present on any scanning cycle following the setting of the flip-flop 7536, the gate 7550 is not enabled and the inverter 7546 is not rendered conductive to set the monostable multivibrator 7544. Thus, at the completion of the scan period of the generator 7100, negative potential is removed from the coupling network connected to the "b" terminal of the unit 7534 so that this unit is operated to its set condition. The negative potential provided at the "d" terminal of the reset monostable multivibrator 7544 and the negative potential provided at the "a" terminal of the set monostable multivibrator 7534 enables an "AND" gate 7532 so that a negative potential is forwarded through a gate 7530 to render an inverter 7528 conductive. When this inverter is rendered conductive, a positive-going pulse is forwarded through a coupling network through the "a" terminal of the flip-flop 7526 to operate this flip-flop to its set condition. The ground potential provided at the output of the inverter 7528 is also forwarded through a gate 7540 to the "c" terminal of the flip-flop 7536. This restores the flip-flop 7536 to its normal condition. Accordingly, the position coupling circuit 830 is automatically reset to a normal condition in the event that the recall condition does not persist for three successive scanning cycles of the generator 7100.

Referring back to the normal recall operation and when the scan generator 7100 next provides a scan signal at the output thereof, the monostable multivibrator 7534 is operated to its set condition and is then released. In view of the fact that the recall signal is no longer present, the inverter 7528 is again rendered conductive in the manner described above so that the flip-flop 7536 is restored to a reset condition. This does not affect the setting of the operated flip-flip 7520. However, when the flip-flop 7536 is restored to a reset condition, ground is removed from its "d" terminal so that the split link relay 6225 in the link connector 820 remains operated only under the control of the keyboard circuit 1220 and the link circuit 810.

The establishment of a recall condition in any one of a plurality of position coupling circuits places a recall finder 1210, which is identical to the call finder 1200, in operation so that the link having a recall condition is directly connected to the keyboard circuit 1220 regardless of the number of normal operator calls marked in the call finder 1200. If the keyboard circuit 1220 is in an idle condition when the recall condition is established, the link having the recall condition is directly connected to the keyboard circuit 1220. However, if the attendant's keyboard circuit 1220 is engaged in controlling the extension of a normal call, the link in the recall condition is connected to the keyboard circuit 1220 in direct response to the restoration of the answer key to its normal condition. This operation is initiated by the setting of the recall flip-flip 7520 in the position coupling circuit 830.

More specifically, when the flip-flip 7520 is operated to its set condition, a negative potential is applied to the resistive input of an "AND" gate 7514 and to the diode inputs of a pair of gates 7516 and 7518. The negative potential applied to the gate 7518 is forwarded to the input of an inverter 7870 so that this inverter is rendered conductive to provide a positive-going signal which is forwarded through a gate 7872 to render an inverter 7874 nonconductive. When the inverter 7874 is rendered nonconductive, one diode input of an "AND" gate 7876 is provided with a negative enabling voltage. The other diode input of this gate is connected to a terminal FL which is provided with periodic negative-going pulses. Accordingly, the output of the gate 7876 comprises a series of negative-going pulses which are forwarded through the gate 7888 to render an inverter 7890 alternately conductive and nonconductive. The call control lamp 7892 is flashed to indicate the presence of a recall condition in one of the links served by the keyboard circuit 1220.

It should be noted that this flashing condition of the call control lamp 7892 over-rides the steady illumination of this lamp that is used to indicate the presence of a normal call requiring the operator's attention. More specifically, when the inverter 7870 is rendered conductive, the output of the gate 7878 is clamped to ground so that the inverters 7882 and 7886 can not be controlled by the presence of a signal indicating a normal call. Thus, if a normal call is waiting so that the call control lamp 7892 is continuously illuminated, the establishment of a recall condition terminates the steady illumination of the lamp 7892 and flashes this lamp to indicate the presence of a recall condition.

Referring back to the set flip-flip 7520 in the position coupling circuit 830, the negative potential forwarded through the gate 7516 is applied to the LR1 terminal of the recall finder 1210 representing the position of the coupling circuit 830 in the first scanning direction of the finder 1210. This negative signal is a stop signal which arrests the free-running scan operation of the generator in the finder 1210 that scans the position coupling circuits in a first coordinate direction. When the first counter arrives at a setting corresponding to the negative potential supplied through the gate 7516, the operation of the free-running counter is arrested and a negative signal is applied to the corresponding LMR1 terminal. This negative signal is forwarded to the diode input of an "AND" gate 7522 and also to the diode input of the gate 7514. The gate 7514 is now enabled so that a negative potential is forwarded through a gate 7512 to render an inverter 7510 conductive. The output of the inverter 7510 rises to ground potential and is forwarded to the LS1 terminal of the recall finder 1210 that marks the position of the coupling circuit 830 in a second coordinate scanning direction. This signal provides a second stop signal for arresting the scanning operation of a second generator that scans the coupling circuits in a second coordinate direction.

When this second counter has arrived at a setting corresponding to the position of the coupling circuit 830, the LMS1 terminal of the finder 1210 that represents this setting is provided with a negative marking potential. This potential is forwarded to one of the diode inputs of the "AND" gate 7522. If the answer key is in an off position and the flip-flop 7842 is in a reset condition, one of the diode inputs to the gate 7522 is clamped at ground potential. Further, when the scanning generator that operates in the second coordinate direction in the recall finder 1210 is stopped, ground is forwarded over a conductor to one of the diode inputs of the gate 7830 and also to a gate 7826. The ground applied to the gate 7830 clamps the output of this gate at ground so that the inverter 7834 is again rendered nonconductive to cause the conduction of the inverters 7844 and 7846. This illuminates the incoming call lamp 7848 and energizes the buzzer 7816 to provide both a visible and an audible indication of the existence of a call. It should be noted that, if the operator is engaged in processing a call at this time, the set flip-flip 7842 prevents the conduction of the inverters 7844 and 7846 by clamping the outputs of the gate 7836 to ground.

The ground applied to the gate 7826 renders an inverter 7828 nonconductive so that the output thereof drops to a negative potential. This enables one of the diode inputs to each of a pair of gates 7810 and 7818. The other diode inputs of these two gates are enabled at the output by the negative potential provided at the output of an inverter 7802. Accordingly, the gate 7810 and 7818 forward a negative potential through a pair of gates 7808 and 7820 to render a pair of inverters 7806 and 7822 conductive. The conduction of the inverter 7806 clamps the input to the inverter 7802 at ground so that this inverter remains in a nonconductive condition. The ground output of the inverter 7822 is applied through a plurality of gates 7720 in all of the stages 7700 and 7701 in the counting circuit in the call finder 1200 to clamp the outputs of all the inverters 7718 at ground. Thus, the operation of the call finder 1200 to associated position coupling circuits and associated links with the keyboard circuit 1220 is arrested.

The above description is predicated on the basis that the answer key in the attendant's keyboard circuit 1220 is in an off or normal position in which the contacts 7854 are closed at the time that the recall condition is established. However, in the event that the answer key is operated to its set condition, thus indicating that the operator is engaged in processing a call, the flip-flop 7842 is in a set condition and the contacts 7854 are open. This removes the ground shunt from the input to the inverter 7802 so that this inverter conducts to clamp one of the diode inputs to each of the gates 7810 and 7818 at ground. Further, this ground is forwarded over a conductor to a plurality of gates in the recall finder 1210, similar to the plurality of gates 7720 in the call finder 1200, so that the outputs of all of the stages for applying negative signals to the LSM terminals are clamped at ground. Accordingly, when the counting circuit in the finder 1210 that is operated to scan the position coupling circuits in the second coordinate direction is stopped at a setting corresponding to the calling position coupling circuit 830, the counting action of this circuit is arrested but the potential at terminal LSM1 is clamped at ground potential and is not permitted to drop in a negative direction.

Since the terminal LMS is not permitted to drop the negative potential, the gate 7522 in the position coupling circuit 830 is not enabled even though the diode input connected to the flip-flop 7842 is provided with a negative enabling potential. However, the recall finder 1210 provides the ground potential which is forwarded to the gates 7826 and 7830. The signal applied to the terminal 7830 does not exercise any effect on the lamp 7848 and the buzzer 7816 since the set flip-flop 7842 clamps the output of the gate 7836 to ground. However, the ground signal applied to the gate 7826 renders the inverter 7828 nonconductive so that one of the diode inputs of each of the gates 7810 and 7818 is provided with a negative enabling potential in the manner described above. However, the other inputs of these gates are clamped to ground at the output of the conductive inverter 7802. The keyboard circuit 1220 is operated to the condition described above when the recall condition is established in an interval when the answer key is in its "answer" position.

When this key is restored to "throw off" a link, the previously seized link is released and the ground clamp at the input of the inverter 7802 is removed so that this inverter is rendered nonconductive. When the inverter 7802 is rendered nonconductive, the LMS1 terminal of the recall finder 1210 is permitted to drop to a negative potential and the inverters 7806 and 7822 are rendered conductive to perform the functions described above. When the flip-flop 7842 is reset to a normal condition by the release of the answer key, the inverter 7834 is operative to render the buzzer 7816 and the lamp 7848 effective.

Since the establishment of a recall condition in a link takes preference over normal calls extended to the operator, there is a possibility that subscribers would attempt to avoid the delay sometimes inherent in normal operator calls and attempt to extend a call to an operator by placing a normal call on a recall basis. As described above, the flip-flip 7524 is operated to a set condition when a normal call is placed to the operator. In its set condition, the flip-flip 7524 returns ground potential from its "*e*" terminal to one of the diode inputs of the gate 7550. This clamps the output of the gate 7550 to ground so that the inverter 7546 can not subsequently be rendered conductive in response to the detection of a recall signal. Thus, the establishment of a recall condition in the position coupling circuit 830 on calls normally extended to the operator is prevented.

The operator is now alerted by the flashing call control lamp 7892 and by the illuminated incoming call lamp 7848 that a recall condition exists and that the link having the recall condition is associated with the keyboard circuit 1220. The operator answers this recall condition by actuating the answer key to its set or "answer" position in which the contacts 7854 and 7974 are opened and the contacts 7852 are closed. The closure of the contacts 7852 operates the flip-flop 7842 to its set condition to produce the results described above. The removal of ground from the gate 7824 does not produce any effect on the inverter 7802 since the input of this inverter is clamped to ground by the conductive inverter 7806. However, the setting of the flip-flop 7842 provides a negative potential to one of the diode inputs of the "AND" gate 7522, the other inputs of which are held at a negative potential. Thus, the output of the gate 7522 drops to a negative potential which is forwarded to one of the diode inputs of the "OR" gates 6930. This negative potential is effective through the gate 6932 to render the inverter 6934 conductive. The conduction of the inverter 6934 provides an alternative operating circuit for the link split relay in the link connector 820 to maintain this relay operated, renders the inverter 6900 conductive, and also operates the relays 7340 and 7370, as described above, so that the incoming and outgoing paths in the connector 820 are connected to the hybrid circuit 8010.

This permits the operator to converse with the calling and called parties. Assuming that the recall condition was established by the calling subscriber who requires connection to a different called party, the operator upon orally determining this fact operates the split link key to a "talk calling" position. In this position, the contacts 8071 and 8081 are opened to disconnect the operator's hybrid circuit 8010 from the called party. In addition, the operation of the link split key to this position opens a pair of contacts 7873 and operates a set of transfer springs so that a pair of contacts 7895 are closed prior to the opening of a pair of contacts 7894. The closure of the contacts 7895 and the opening of the contacts 7894 supplies a negative potential to the other diode input of an "AND" gate 6908 so that the output of this gate drops to a negative potential which is forwarded through a gate 6910 to render an inverter 6912 conductive. This clamps one of the inputs to an "AND" gate 6914 to ground and also removes an enabling potential from the gates 6734, 6746, 7146 and 7095. The disabling of these gates insures that only the connection to the called subscriber is released, thereby to permit the operator to establish a new connection from the calling subscriber to another selected called subscriber.

The operator next momentarily actuates a release key to its set condition so that a plurality of contacts 7898 and 7976 are closed and a pair of contacts 7899 are opened. The closure of the contacts 7898 forwards ground to the terminal KRS so that the position register 1000 is cleared to condition it for receiving information for controlling the extension of the connection to the new called party. The opening of the contacts 7899 applies a negative signal to a previously enabled "AND" gate 7144 so that the output thereof drops to a negative potential. This potential is forwarded through the "OR" gate 7148 to render the inverter 7150 conductive. The conduction of the inverter 7150 operates the flip-flop 6706 to its set condition in the manner described above. The operation of the flip-flop 6706 to its set condition initiates a release operation which is performed in a manner described in detail above. However, it should be noted that since the gates 7095, 6734 and 6914 are not enabled at this time, the idle-busy flip-flip 7085 is not restored, the recall flip-flip 6520 in the position coupling circuit 830 is not reset, and the release tone is extended through the split link connector 820 to only the outgoing circuit. This causes the release of all of the connection extended beyond the local board 150 but permits the incoming connection to the local board 150 to be maintained intact. Further, when the flip-flop 6706 is reset at the end of the two to four second interval, the removal of the enabling ground from the gate 6746 prevents the resetting of the calling highway and time slot stores and permits only the called time slot and highway stores to be cleared.

The operator then restores the link split key to its normal position so that the called path, as yet uncompleted, is extended from the link connector 820 to the hybrid circuit 8010. The closure of the contacts 7873 applies an additional ground to the release conductor, and the operation of the contacts 7894 and 7895 applies ground to the gate 6908 so that the inverter 6912 is rendered nonconductive. This restores the enabling potential to the call terminating control gates in the link circuit 8010 and also restores the enabling potential to the gate 6914.

Upon determining the designation of the new called subscriber, the operator actuates the keys 8031–8040 to supply the position register 1000 with the digital information necessary to control the extension of the connection to the new called subscriber. When this information has been stored, utilized by the routing control unit 700, and is to be transferred to the link circuit 810, a negative-going pulse is supplied to the terminal KWR (FIG. 79) in the keyboard circuit 1220 so that the gate 7050 again controls the storage of the new called party information in the link circuit 810. This information controls the operation of the link connector 820 to extend the connection to the called subscriber. The operator "throws off" the link 800 by restoring the answer key to its normal position. In doing so, the output of the gate 7522 is clamped at ground so that the inverter 7934 is rendered nonconductive. This causes the inverter 6900 to be rendered nonconductive to supply a reset pulse through a coupling network to the "*b*" terminal of the recall flip-flip 7520 to restore this circuit to its normal condition. The link 800 is released at the termination of this connection in the manner described above.

If upon conversing with the original calling and called subscribers, the operator determines that the new connection is to be extended from the original called subscriber to a new calling subscriber, the attendant operates the split link key to the "talk called" position. In this position, a plurality of contacts 7891 and 7897 are closed and the contacts 7893, 8001 and 8061 are opened. The opening of the contacts 8001 and 8061 disconnects the calling subscriber from the operator's hybrid circuit 8010 so that the operator can now communicate with only the called subscriber. The opening of the contacts 7893 and closure of the contacts 7891 forwards an enabling potential to a terminal TCC and to a gate 6902 so that a negative potential is forwarded through a gate 6904 to render an inverter 6906 conductive. The conduction of the inverter 6906 performs the same function as the conduction of the inverter 6912 except that the link circuit 810 is operated to clear the calling highway store and the calling time slot store 6400 and to maintain the connection to the called subscriber. Thus, when the operator operates the release key, the path through the link 800 to the calling subscriber is dropped off and the path to the called subscriber is maintained so that the position register 1000 can be manually controlled by the operator to store the information necessary to extend the connection to the new called subscriber. In this manner, the original called subscriber can be placed in communication with a new called subscriber.

In addition to conditioning the link 800 for this operation, the actuation of the link split key to the "talk called" position also closes the contacts 7897. This forwards ground to a terminal TCB which is connected to the position register 1000. The application of ground to this terminal operates the position register 1000 so that the time slot and highway information from this register is inhibited to the called slot and highway terminals of the link and is enabled to the calling time slot store 6400 and the calling highway storage means in the link 800. The connection is completed under the control of the position register 1000 and the keyboard circuit 1220 in the manner described above. However, the link split key must be maintained in the "talk called" position after release of the calling party has been completed because the ground provided at the closed contacts 7897 must be maintained to insure the proper read out of the information to the link. However, after the link connector 820 has been operated to store the new called highway and time slot information, the link split key can be restored and the link can be "thrown off" by the keyboard circuit 1220 by restoring the answer key to its normal position. The connection is then maintained until its release by the calling or called subscriber in the manner described above.

*Operation of the Link 800 When the Keyboard Circuit 1220 Is Not Staffed*

In the event that the keyboard circuit 1220 is not staffed, a normal call or recall condition requiring the attention of the operator can not be answered. Accordingly, when the position is not staffed, a position staff key of the locking type is operated to close a plurality of contacts 7860 and 7862. The closure of the contacts 7860 clamps the output of the gate 7405 in the multifrequency signal detector 1110 at ground so that recall signals can not be supplied to the plurality of position coupling circuits, such as the circuit 830, associated with the unit 1110. This prevents the establishment of a recall condition requiring the attention of the operator at the keyboard circuit 1220. It should be noted that, if a recall condition is established in a connection including more than one office, the office next closest to the source of the recall signal is rendered effective to permit the operator in this office to answer the recall condition.

The closure of the contacts 7862 forwards ground to a terminal PNS which is connected to the route selector 730 in the routing control unit 700. The presence of ground at the terminal PNS operates the line and route selector 730 to return busy tone to the calling subscriber to advise him that a call requiring the attention of the operator in the local board 150 can not be completed.

*Operation of the Link 800 When a Busy Condition Is Encountered in the Routing Control Unit 700*

As described above, when a busy condition is encountered by the routing control unit 700 during the extension of the connection, a negative potential is supplied to a terminal BM. This negative potential is forwarded to the terminal BM (FIG. 68) in the link circuit 810 to advise this circuit that the called highway and time slot information to be supplied represents the line circuits to which busy tone is connected. The link connector 820 is then controlled to connect the calling circuit to a source of either trunk or line busy tone. This marking potential is used in link circuit 810 to prevent the return of ring tone to the connector.

Accordingly, when a signal is applied to the terminal WR, the link circuit 810 reads in the calling slot and highway designation of the line or trunk busy generator in the called highway and time slot storage means and also operates the link connector 820 in the manner described above so that the connection is extended between the calling subscriber and the busy tone generator. As described above, the ring control flip-flip 6804 is operated to a set condition incident to this operation to cause the application of ring tone to the calling and called circuits. However, when the flip-flip 6804 is operated to a set condition, the negative potential provided at its "*d*" terminal is forwarded to the resistive input of the gate 6812, the diode input of which is connected to a negative potential at the terminal BM. This provides a negative potential which is forwarded through the gate 6814 to render the inverter 6816 conductive.

The conduction of the inverter 6816 actuates the monostable multivibrator 6820 to its set condition so that the "*g*" terminal of the flip-flip 6804 is connected to ground through the gate 6806. This immediately restores the flip-flip 6804 to its reset condition. Thus, ring tone is not returned to the calling subscriber. When the flip-flip 6804 is restored to its reset condition, the enabling potential for the gate 6812 is removed. However, the flip-flip 6804 is clamped in its reset condition by the ground provided at the "*d*" terminal of the multivibrator 6820 until its delay period has expired. Thus, the transmission of ring tone to the calling subscriber on busy calls is prevented. The link circuit 810 and the link connector 820 are restored to a normal condition in a manner described in detail above.

*Alarm Facilities Provided in the Link 800*

The link circuit 810 includes a pair of inverters 7124 and 7130 that are used to provide an alarm condition in the event that both of the calling and called circuit designations are not stored in the link circuit 810 on calls that require both of these items of information. Accordingly, the inverters 7124 and 7130 are rendered ineffective on calls requiring the attention of the operator in which a called slot and highway designation is not provided. The failure to store both calling and called circuit information could result from failure of one of the slot counters 6400 or 6500, the failure to read the information into the slot counters 6400 or 6500, or the accidental operation of the release key in the keyboard circuit 1220 by the operator.

The inverters 7124 and 7130 are controlled by a pair of "AND" gates 7120 and 7126 which are connected through a pair of gates 7122 and 7128 to the "*b*" terminals of the inverters 7130 and 7140, respectively. The "*c*" terminal of the inverter 7124 and one of the diode inputs of the gate 7120 are connected to the monitor terminal of the calling time slot store 6400, while the "*c*" terminal of the inverter 7130 and one of the diode inputs of the gate 7126 are connected to the monitor terminal of the called time slot store 6500. In the event, for instance, that only the calling time slot is registered in the store 6400 and no information is stored in the calling time slot store 6500, the monitor terminal of the store 6500 remains at a negative potential which is supplied to the "*c*" terminal of the inverter 7130 and one of the inputs to the gate 7126. When the calling slot is stored in the store 6400, one of the diode inputs to the gate 7120 rises to ground potential and the "*c*" terminal of the inverter 7124 is placed at ground to enable this inverter for conduction. The ground applied to the gate 7120 clamps the output of this gate at ground.

One of the diode inputs to the gate 7126 is connected to the reverse biased gate 6675, and the other diode input of the gate 7126 is connected to a negative potential at the output of the inverter 6934. The resistive input to this gate is connected to the "*d*" terminal of the idle-busy flip-flip 7085. When this flip-flip is set, the output of the gate 7126 drops to a negative potential which is effective through the gate 7128 to render the conditioned inverter 7124 conductive. When this inverter is rendered conductive, a positive-going pulse is coupled through a pair of networks to the "*b*" terminals of the flip-flips 6800 and 6804 so that these flip-flips, if operated, are restored to their reset condition to terminate the transmission of either ring tone or seize tone to the connection. The output of the inverter 7130 is also forwarded to the "*d*" terminal of the release control flip-flop 6706 to operate this flip-flop to its set condition. The operation of the flip-flop 6706 causes the release of the link 800 in the manner described above. Accordingly, the failure to store the called time slot information in the store 6500 causes the automatic release of the link 800.

In a similar manner, if only the terminating time slot is stored in the store 6500 the ground potential at the monitor terminal of the store 6500 enables the inverter 7130 and blocks the gate 7126, and the failure of the store 6400 provides an enabling negative potential for the gate 7120 and disables the inverter 7124. Thus, when the link busy flip-flip 7085 is operated to its set condition, the gates 7120 and 7122 render the inverter 7130 conductive to perform exactly the same functions described above.

The inverters 7124 and 7130 should not be rendered conductive when the call does not require the presence of both the calling and called time slots. Thus, the inverter 6670 is rendered conductive on calls placed to the operator. The conduction of the inverter 6670 forward biases the gate 6675 so that the outputs of the gates 7120 and 7126 are clamped to ground to prevent the conduction of the inverters 7124 and 7130. Similarly, one of the diode inputs of each of these two gates is connected to the output of the inverter 6934. This inverter is rendered conductive to clamp the outputs of the gates 7120 and 7126 to ground whenever a call is being processed by the operator at the keyboard circuit 1220.

A second check or alarm feature included in the link 800 is a check on the transmission through this link. For instance, in the event that one of the voice gates or time slot counters or the circuitry associated therewith fails after the establishment of a connection through the link, the link would not be able to receive release tone even though both of the calling and called parties have gone "on-hook." If release tone is not received, this link as well as other links in the extended connection may remain connected in tandem. In order to guard against this failure, each group of the links is provided with a voice monitor circuit in the unit 7425 in the multifrequency signal detector 1110.

The unit 1110 is enabled under the control of the scan generator 7100 in the manner described above. When enabled, the unit 7425 looks for the presence of audio signals. If audio signals are present, a series of negative-going pulses are provided at a terminal VMM and are forwarded to the diode input of a gate 7152. The resistive input of this gate is provided with a negative enabling potential at this time through the inverter 7138 which is rendered conductive under the control of the scan generator 7100. The gate 7152 provides negative-going output pulses which are forwarded through a gate 7142 to render an inverter 7140 conductive. Conduction of the inverter 7140 forwards ground through a gate 6726 to the "*g*" terminal of a flip-flip 6724 to actuate this flip-flip to its reset condition.

Figure 71:
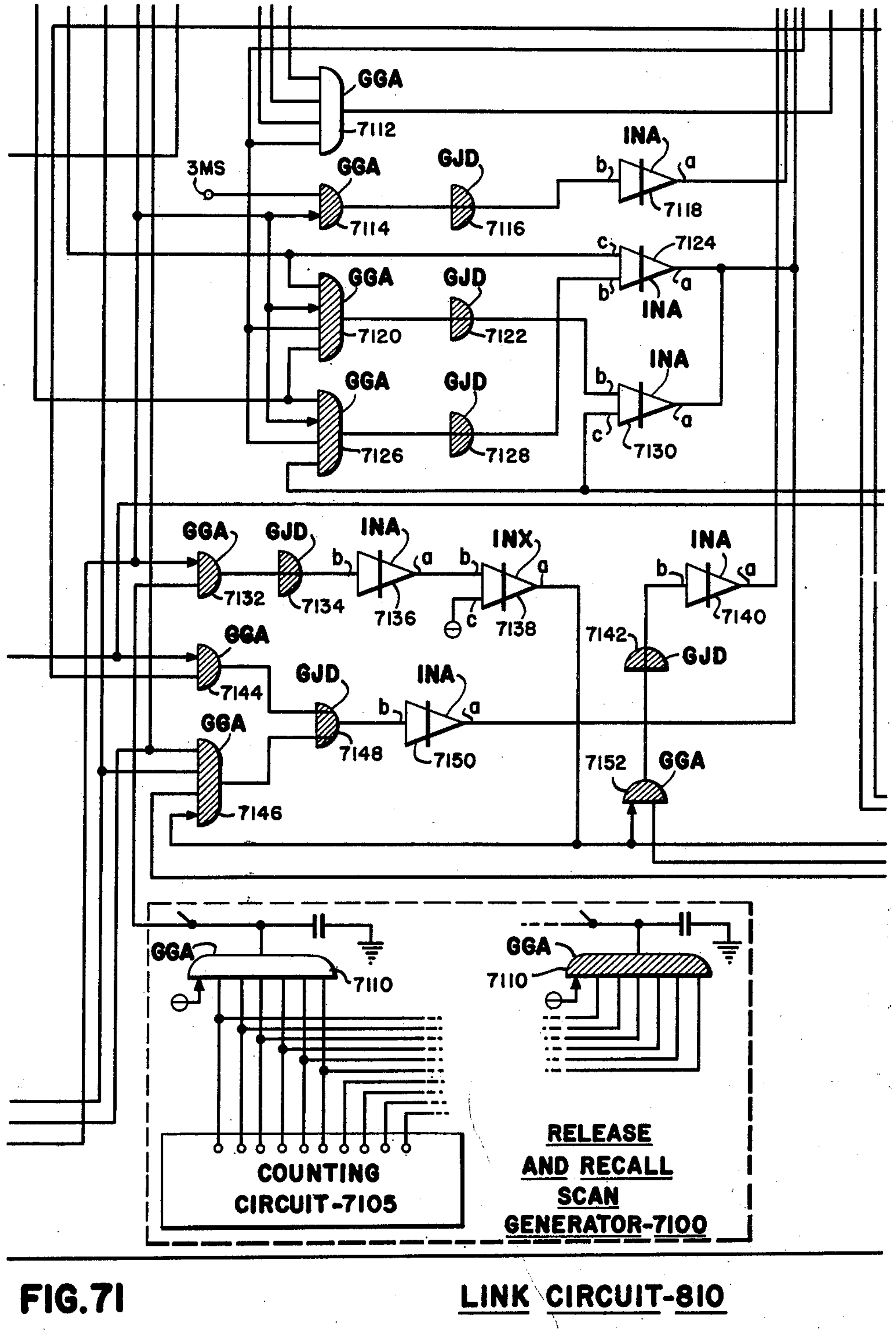
Figure 72:
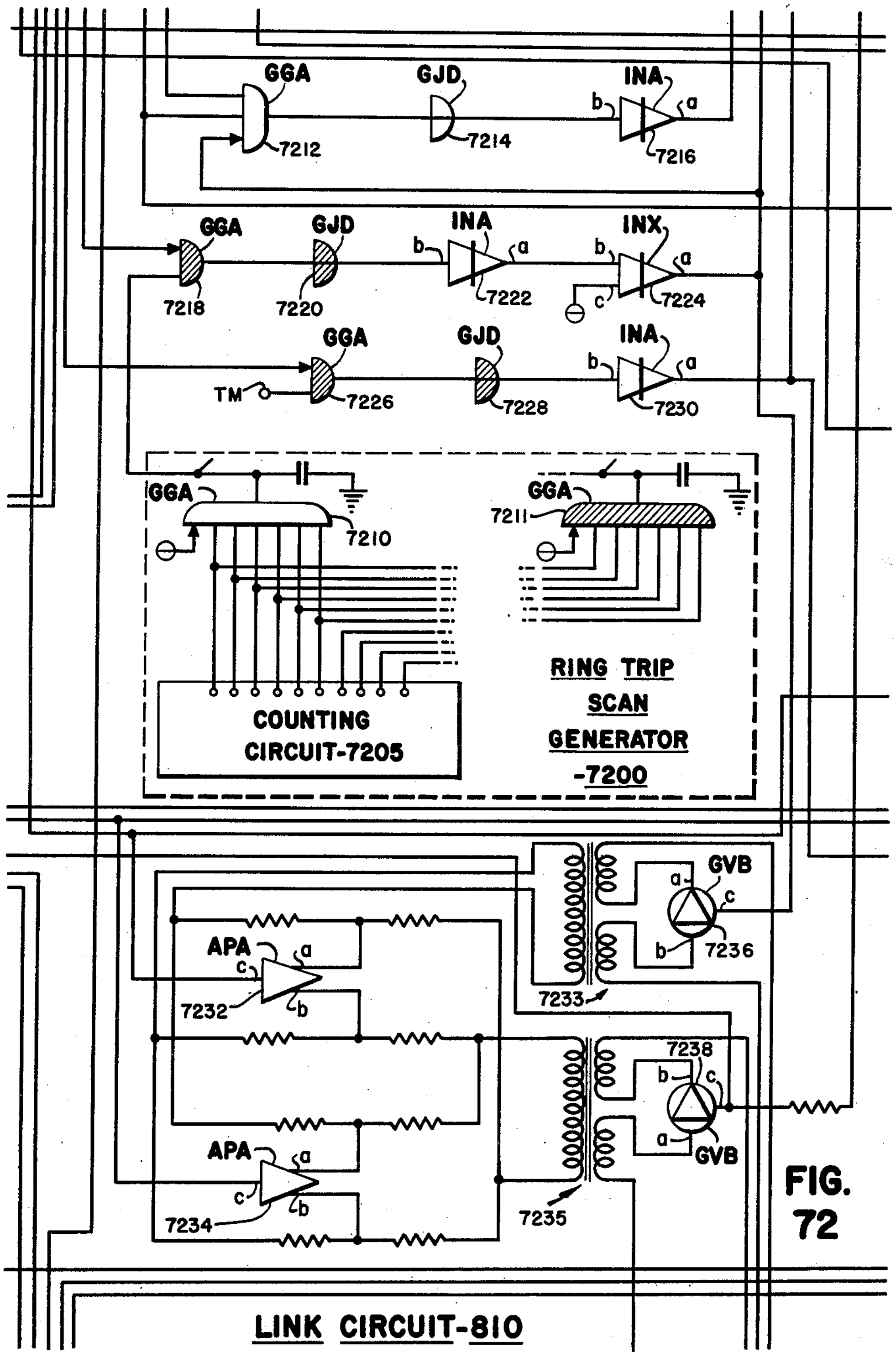
Figure 73:
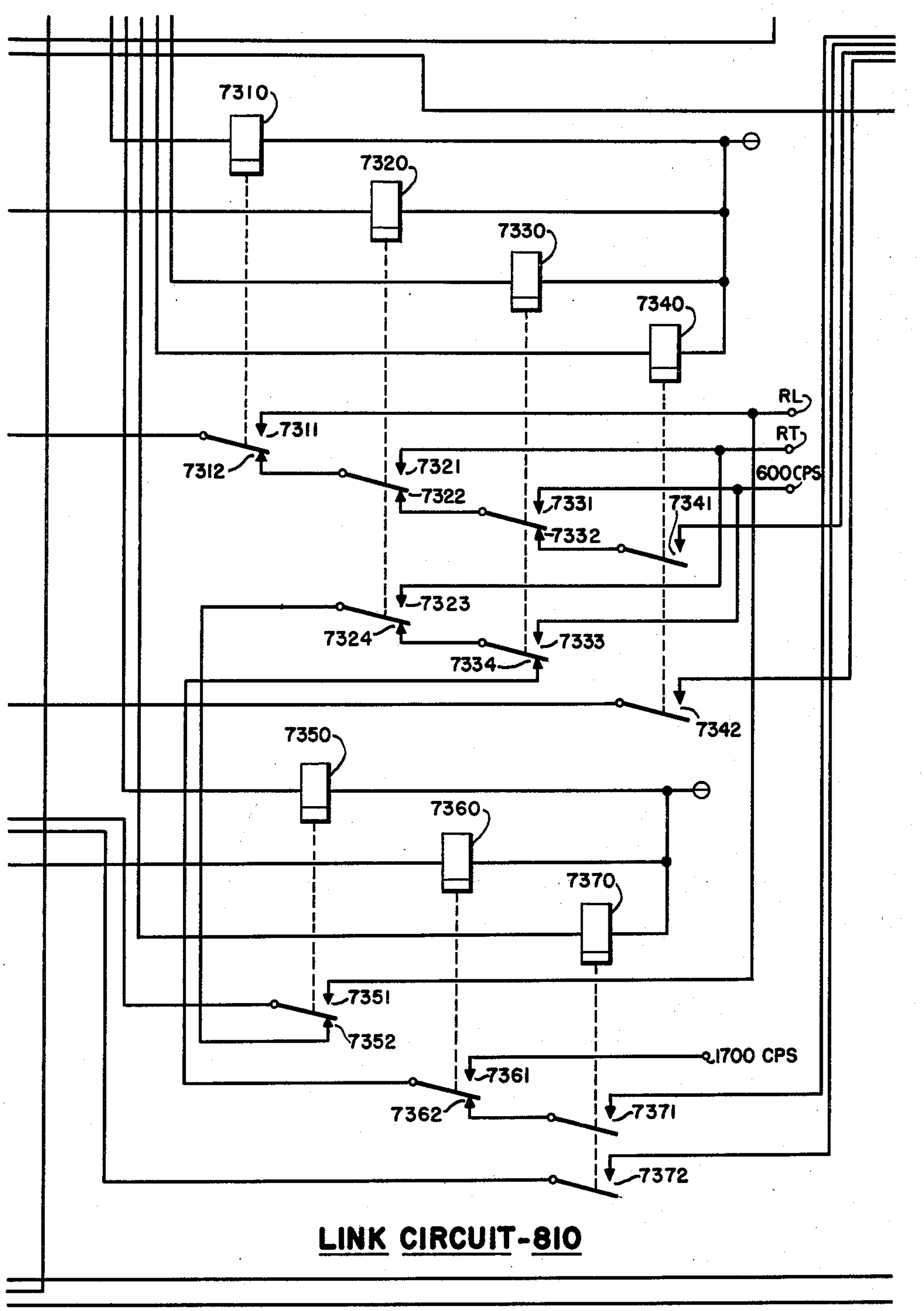
Figure 74:
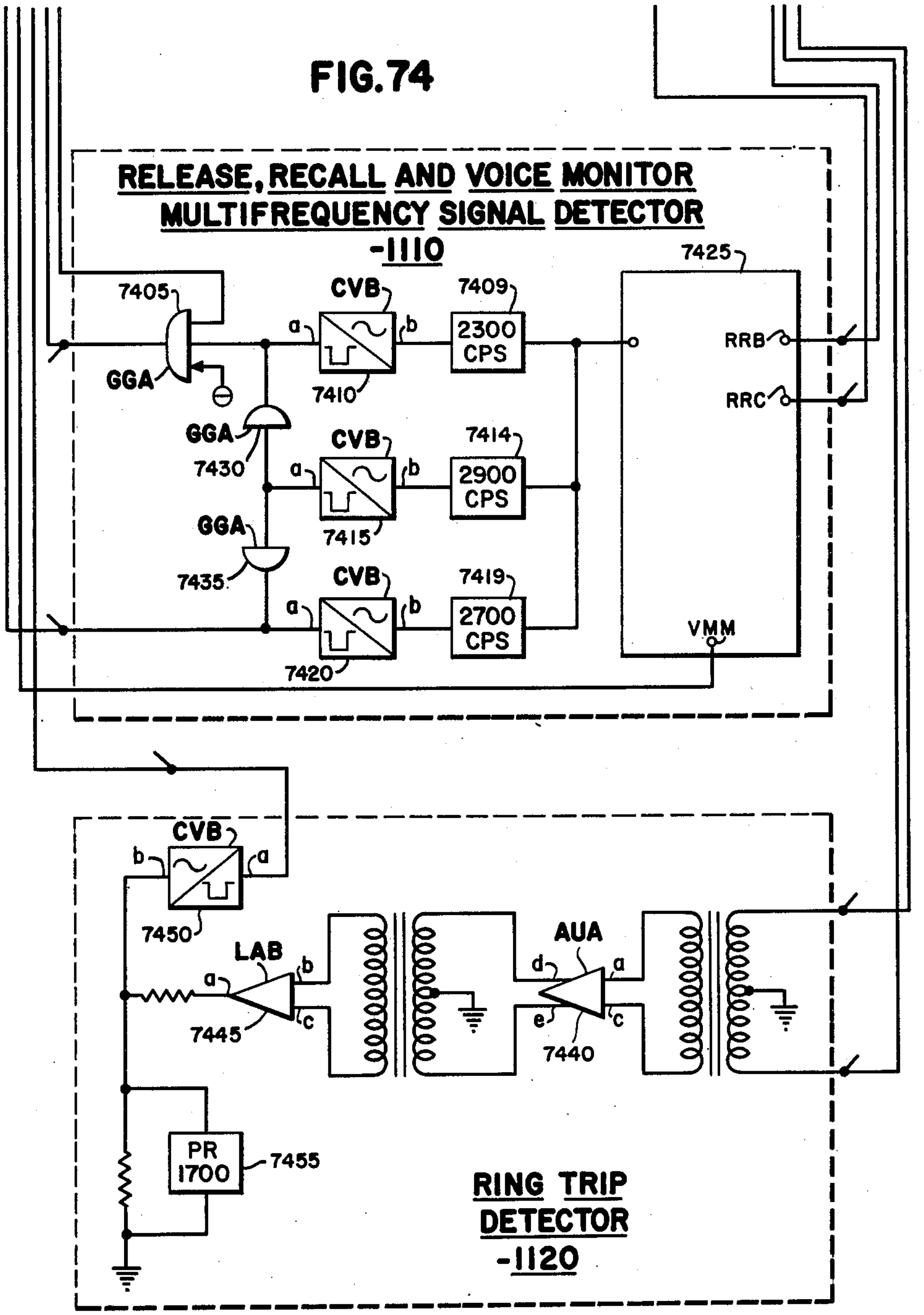
Figure 75:
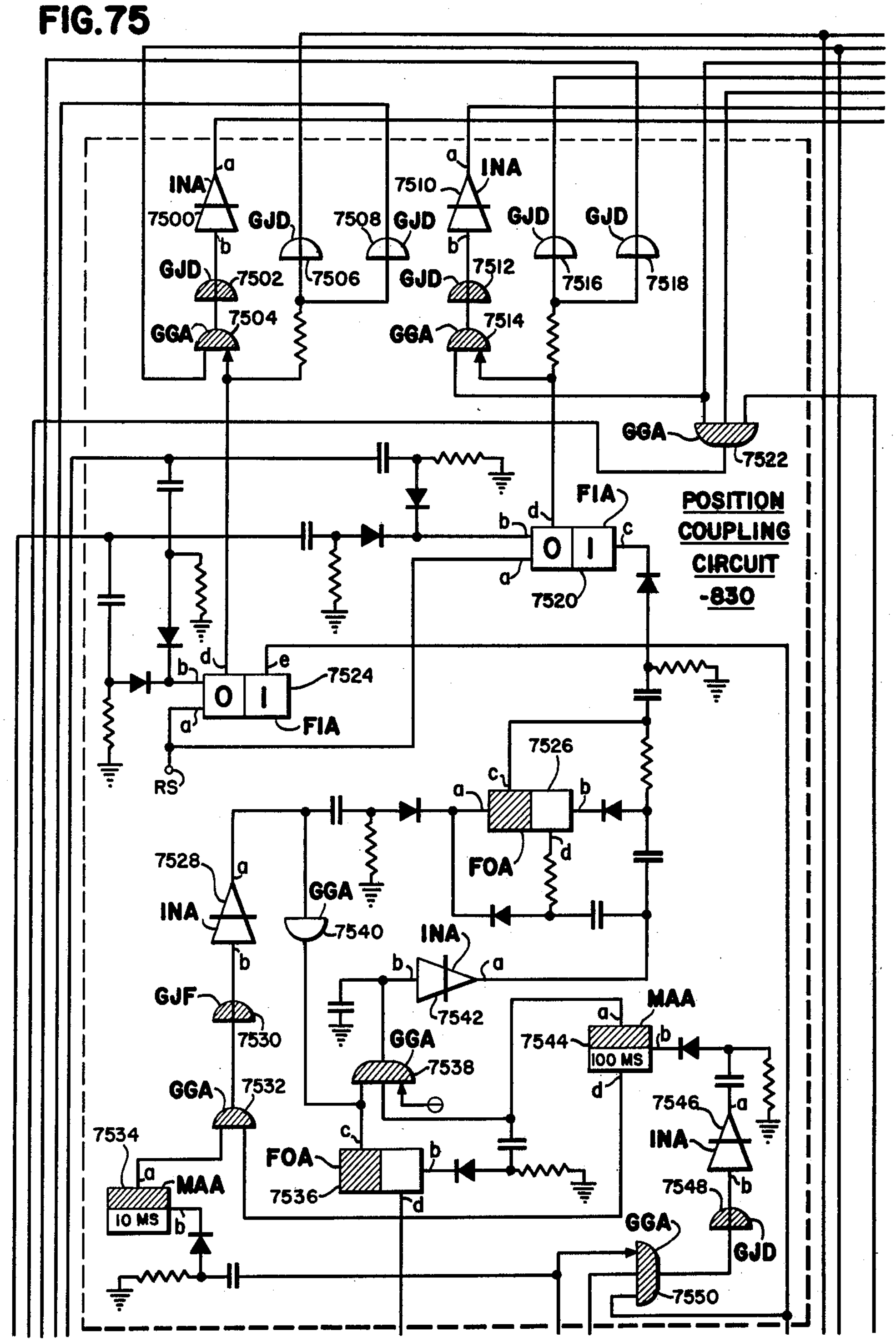
Figure 76:
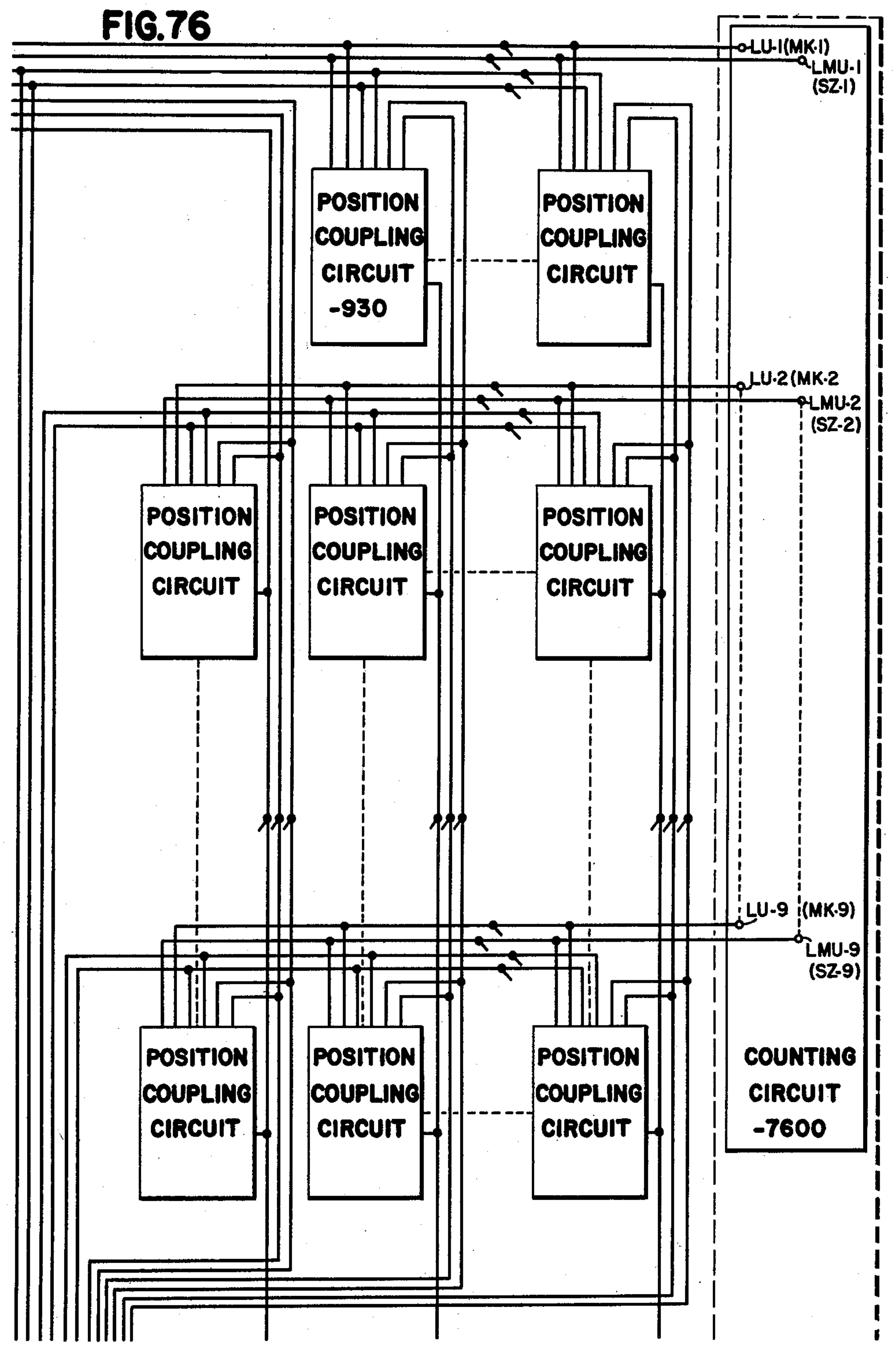
Figure 77:
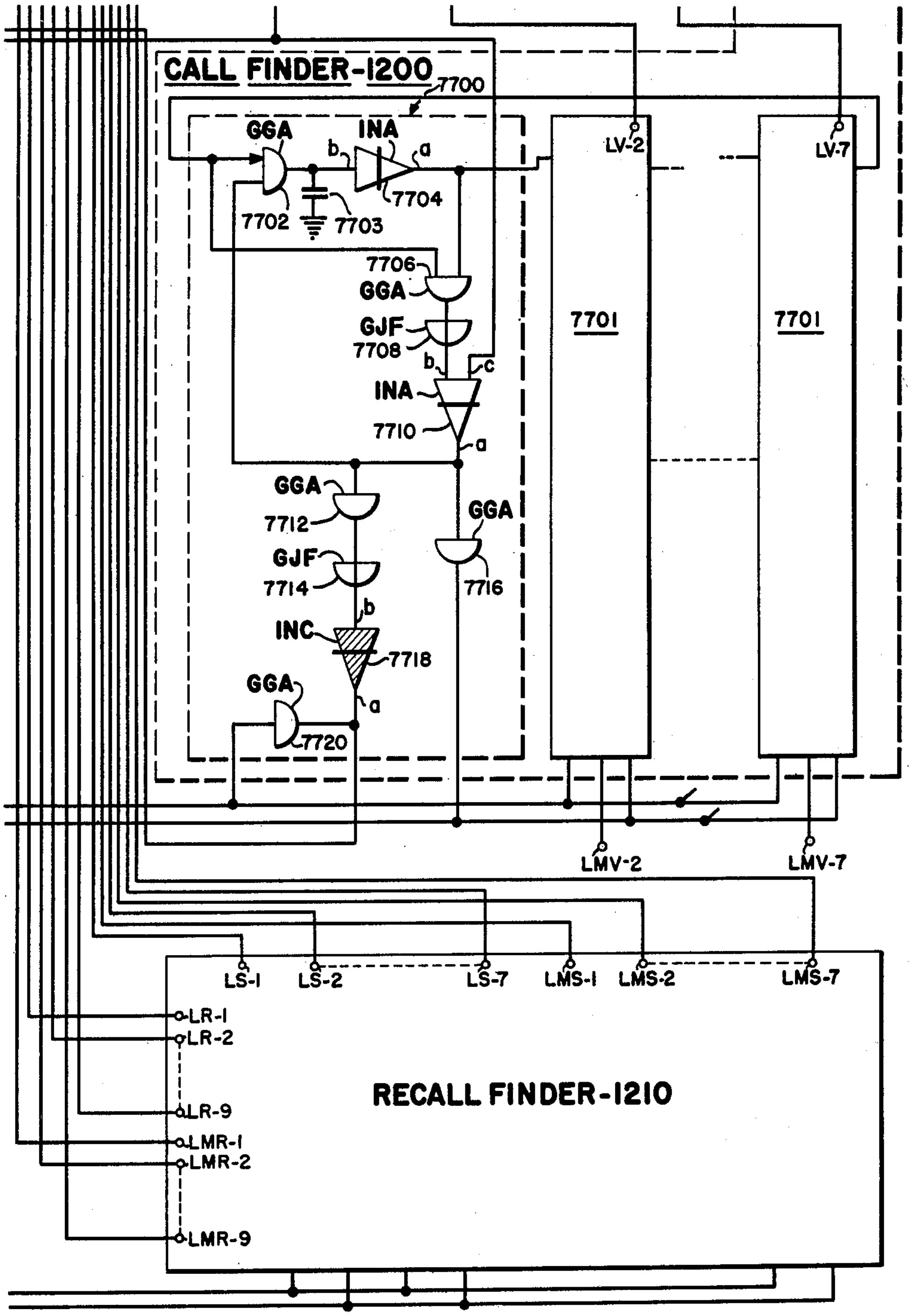
Figure 78:
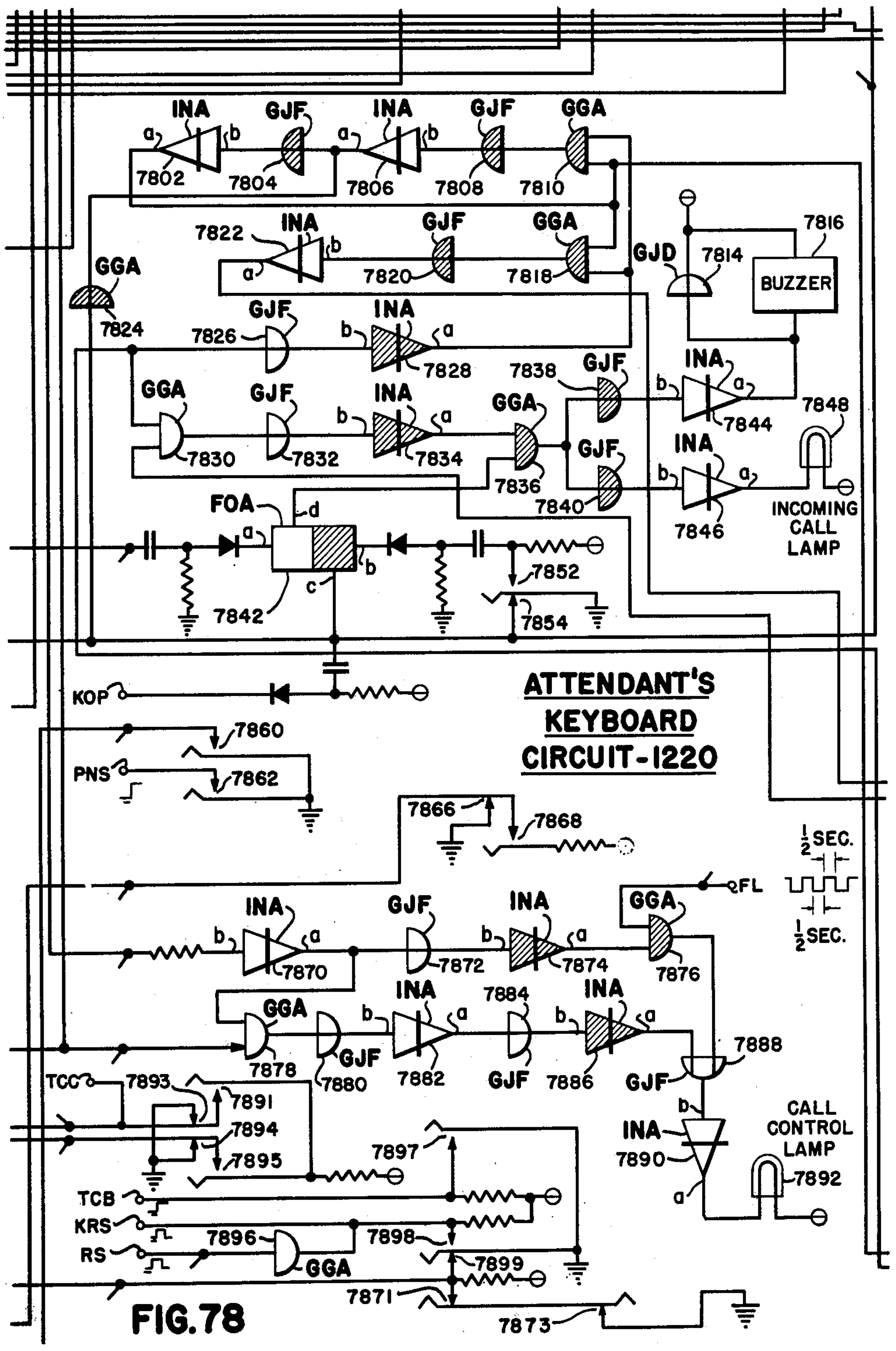
Figure 79:
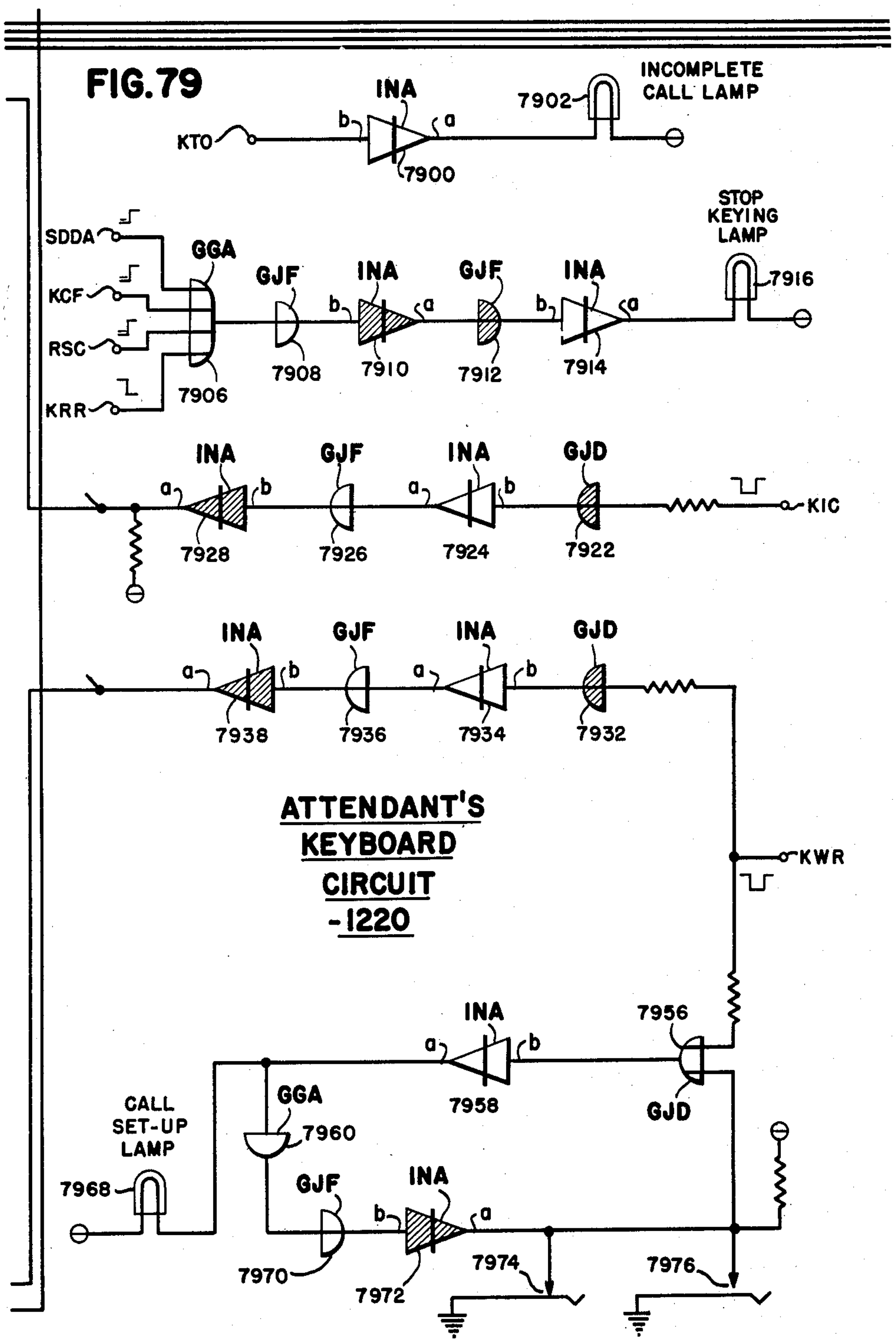
Figure 80:
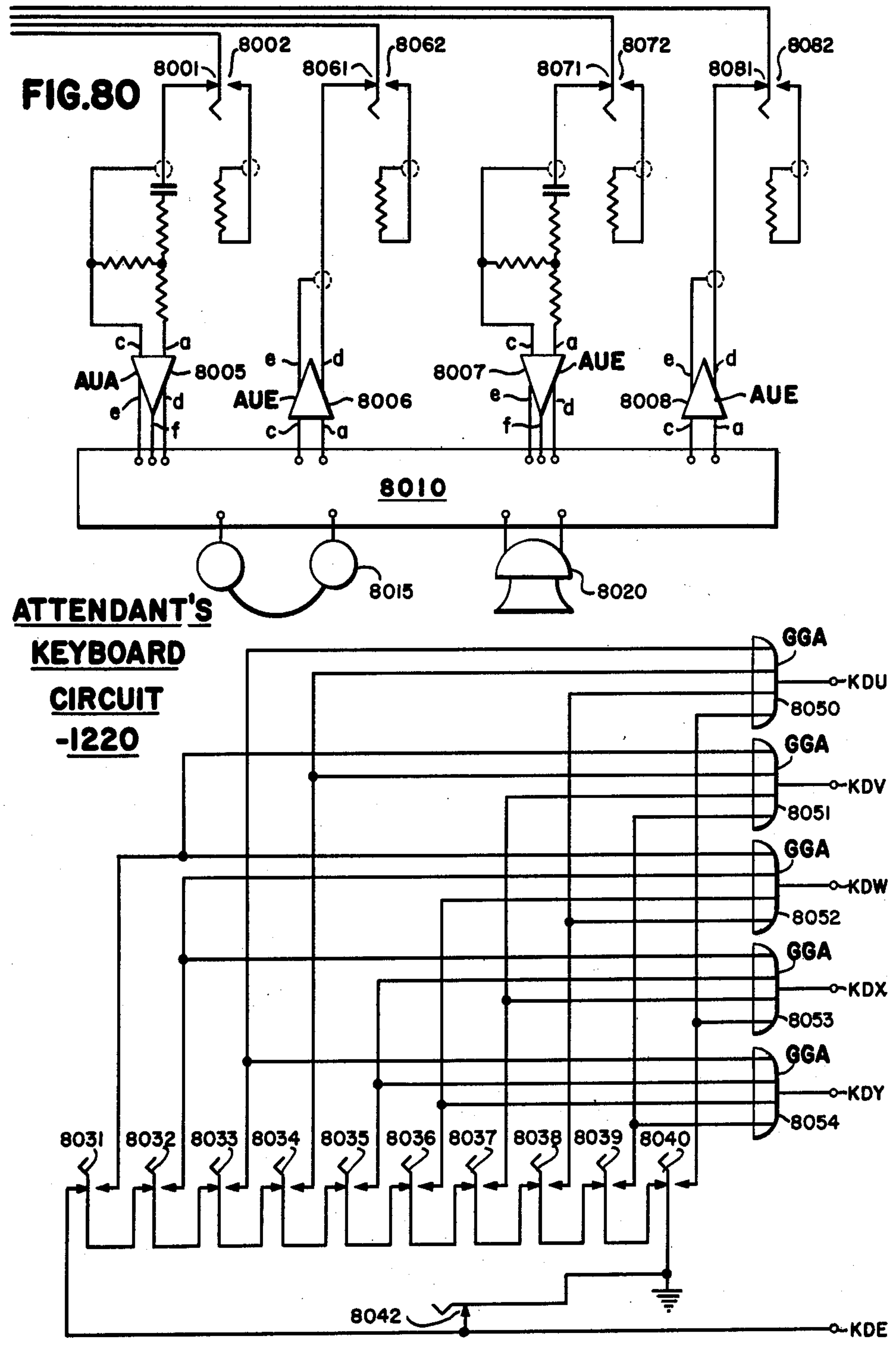
Figure 81:
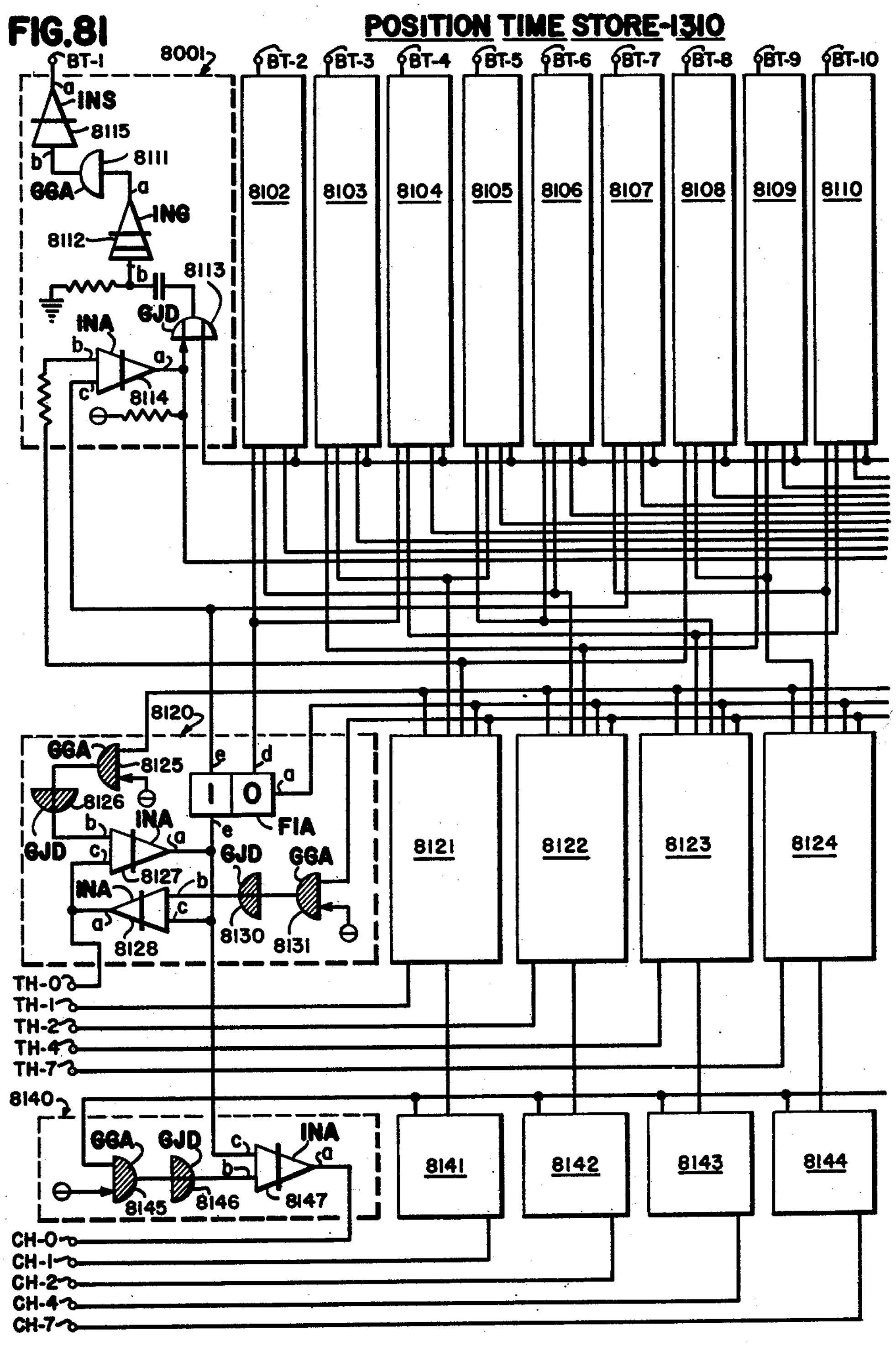
FIGS. 81–83 are disposed adjacent each other to form a complete logic diagram of the position time store.

This flip-flip is operated to its set condition at three second intervals under the control of negative-going pulses that are applied to a terminal 3MS (FIG. 71). More specifically, the resistive input of a gate 7114 is dropped to a negative potential when the idle busy flip-flip 7085 is operated in response to the seizure of the link circuit 810. At three second intervals thereafter, the negative-going pulses applied to the diode input of this gate are forwarded through a gate 7116 to render an inverter 7118 conductive. When this inverter is rendered conductive, ground is applied to the "*e*" terminal of the flip-flip 6724 to operate it to its set condition. Accordingly, the flip-flip 6724 is operated to its set condition at three second intervals and is restored to its reset condition under the control of the unit 7425 only when audio signals are present in the link.

Assuming that the flip-flip 6724 is operated to its set condition and, because of a failure of the link 800, audio signals are not provided for resetting this flip-flip. A negative potential is forwarded from its "*d*" terminal to the resistive input of a gate 6600. The diode input of this gate is connected to a terminal 3MZ (FIG. 66). This terminal receives a negative-going pulse three minutes after the pulse is applied to the terminal 3MS. Thus, if no signals are received for resetting the flip-flip 6724 for a three minute interval, the output of the gate 6600 drops to a negative potential which is forwarded through an "OR" gate 6610 to render an inverter 6625 conductive. When the inverter 6625 is rendered conductive, ground is forwarded through a gate 6630 to the "*e*" terminal of a link fail flip-flip 6635. This operates this flip-flip to its set condition so that ground is applied to the diode input of a gate 6640. The output of the gate 6640 drops to ground and is applied to a terminal LFA. This terminal is connected to an alarm scanner and serves to mark the link 800 as being in an inoperative condition.

When the inverter 6625 is placed in conduction, this ground is also forwarded through a gate 6708 to operate the release flip-flop 6706 to its set condition. The operation of the flip-flop 6706 initiates a release operation in the manner described above. The ground signal at the output of the conductive inverter 6625 also provides a positive-going pulse through an "AND" gate 6710 for placing an inverter 6712 in conduction. When the inverter 6712 is placed in conduction, a negative enabling potential is applied to the gates 6740 and 6746. The completion of the enabling of these two gates renders the inverters 6744 and 6750 conductive so that the calling time slot and highway and called time slot and highway information is cleared from the link circuit 810 and the link connector 820. The link now releases in the manner described above and permits the operated components described above to restore to their normal conditions.

The link 800 also includes additional means for indicating the failure of the link to store data. As described above, the inverter 7055 is rendered conductive to enable the gate 7030 for the receipt of a read signal on the terminal WR whenever the link 800 is in an idle preallotted condition. This negative potential is also forwarded to the resistive input of an "AND" gate 6605, the diode input of which is connected to the terminal LFR of the link allotter 1100. When a read signal is applied to the terminal WR, the link allotter 1100 initiates a 160 microsecond timing interval during which the information is to be read into the link 800. The completion of this reading in operation is indicated by the setting of the idle-busy flip-flip 7085 to its set condition so that ground is removed from the LF terminal of the link allotter 1100. If ground is not removed within this time interval, the link allotter 1100 provides a negative-going signal at the terminal LFR which causes the gate 6605 to forward a negative potential through the "OR" gate 6610 to render the inverter 6625 conductive. The conduction of the inverter 6625 restores the link 800 to a normal condition in the manner described above.

An alarm condition and the automatic release of the link 800 is also obtained if, on calls requiring the operator's attention, the operator is unable to obtain a connection through the link 800 to the keyboard circuit 1220. In this type of call, the inverter 6900 is rendered conductive, as described above, so that a negative enabling potential is applied to the resistive input of an "AND" gate 6615. The diode input of this gate is normally connected to ground through a pair of normally closed contacts 7866 in the keyboard circuit 1220. The contacts 7866 and a pair of normally open contacts 7868 comprise a mark link key of a non-locking type. If the operator is unable to obtain access to the link, the operator can place the link in an alarm condition so that the operability thereof can be determined by maintenance personnel. Accordingly, the operator actuates the mark link key to first close the contacts 7868 and to then open the contacts 7866. This completes the enabling of the gate 6615 so that a negative potential is forwarded through the "OR" gate 6610 to render the inverter 6625 conductive. The conduction of this inverter resets the link 800 in the manner described above.

The bistable switching components used in the link 800 can be restored to a reset condition by the actuation of a manual reset key which applies ground to a reset terminal RS (FIG. 66). When ground is applied to this terminal, the output of a gate 6620 rises to ground potential. The output of the gate is connected to the reset terminals of the plurality of bistable switching components in the link 800 and serves to restore them to a normal condition.

POSITION REGISTER 1000

The position register 1000 (FIGS. 81–83) includes the five digit store 1010, the control B1300, the plural frequency signal detector 1030, the control connector 1020, and the position time store 1310. In the drawings, only the details of the position time store 1310 are illustrated inasmuch as the remaining components of the position register are substantially the same as and operate in generally the same manner as described in detail in the Tubinis et al. application. In general, the position register 1000 is connected to and controlled by the keyboard circuit 1220 which stores the digital data for extending the connection in the five-digit store 1010. On local calls, the three digits that are necessary to extend the connection to a station served by the local board 150 are transferred from the five digit store to the routing control unit 700 which performs the line selection operation. This information is then forwarded to the proper link, such as the link 800, which extends the connection from the calling subscriber to the called subscriber. On long distance calls, the five digit store 1010 transfers the routing digit to the routing control unit 700 so that an idle trunk in the group designated by the transferred digit is selected. This information is transferred back to the position time store 1310 and is used to operate the control connector 1020 to connect the position register 1000 to the outgoing trunk. The five digit store 1010 and the control B1300 extend the connection through one or more local boards to the called subscriber. When the called subscriber answers, the position time store 1310 is operated to transfer the designation of the outgoing trunk to the proper link, such as the link 800. The position register 1000 is now free for use in the extension of other connections.

When a recall condition is established, the position register 1000 is used to selectively establish a connection from either the original calling or called party to the new called party. When the recall condition is established, the keyboard 1220 supplies signals for storage in the five digit store 1010 representing the new called party. In the event that the original calling subscriber requires connection to a new called party, the position register operates as described above. However, if the original called subscriber requires connection to a new called subscriber, the position time store 1310 includes means for transferring the designation of the outgoing trunk extending to the new called subscriber to the calling highway and time slot stores in the link circuit rather than to the called highway and time slot stores. This permits the previously extended connection to the called subscriber to be maintained and permit the extension of a connection to the new called subscriber.

*Operation of the Position Register 1000 on Calls to Stations in Remote Local Boards*

When a call is to be extended to a station served by a remote local board which is reached either directly from the local board 150 or through one or more intervening local boards, the operator at the keyboard circuit 1220 first keys the necessary digits identifying the trunk group to which the connection is to be extended and then keys the digits identifying the station in the final or terminating local board. These signals are applied to the terminals KDU–KDY and KDE of the control B1300 and are forwarded over the conductors connected to the terminals U1–Y1 to the five digit store 1010. These signals are stored in the five digit store 1010. As described above, the digits representing trunk circuits have the values "3"–"9."

At the time that the first digit supplied by the operator is stored in the five digit store 1010, a test is made to determine the value thereof. If the first stored digit has a value in the range from "3"–"9" indicating that a call is to be extended over a trunk in the local board 150, the control B1300 supplies a register finder connect demand signal to a terminal FCD which is forwarded to the register finder 630. This places this finder in operation so that the position register 1000 is enabled and the remaining registers, such as the subscriber registers 500, 600 and 610, are disabled. When the position register 1000 is found, the register finder 630 returns a signal to the terminal DAF of control B1300, and this circuit applies a negative potential to a terminal TSR.

This terminal is connected to one of the diode inputs of an "AND" gate 8202. One of the diode inputs to this gate is supplied with a negative potential from the WDD terminal of the five digit store 1010. The other diode input of this gate is connected to a terminal RTD which is connected to the line route selector 730. The receipt of the signal on the terminal DAF of control B1300 also operates the five digit store 1010 to supply marking signals over the terminals 1DU–1DY to the route selector 730 representing the value of the trunk group selecting digit. This places the line route selector 730 in operation to search for an idle trunk in the group thereof represented by the transferred digit. In addition, the control B1300 also forwards a signal to the route selector 730 from the terminal PD to advise the line route selector that the selected outgoing trunk designation is to be supplied to the position register 1000 and not to one of the links 800 and 900.

When an idle outgoing trunk in the proper group is selected by the line route selector 730, a negative potential is applied to the terminal RTD (FIG. 82) by this component so that the "AND" gate 8202 is completely enabled. The negative potential of the output of this gate is forwarded through a gate 8203 to render an inverter 8204 conductive. When this inverter is rendered conductive, the ground potential of the output thereof is forwarded through a gate 8205 to render an inverter 8206 nonconductive. When this inverter is rendered nonconductive, a negative potential is applied to the clamp B terminal of a time slot storage counter 8200 that is identical to the time slot storage counters described above and in the Tubinis et al. application. This enables the time slot storage counter 8200 to store the time slot of the outgoing trunk that has been selected by the line route selector. This signal is applied to the set terminal of the storage counter 8200 from the terminal TS and operates this component to store the time slot of the selected outgoing trunk circuit. The negative potential provided at the output of the inverter 8206 is also forwarded to five identical highway storing units 8120–8124 to condition these circuits for storing the highway designation of the selected outgoing trunk.

More specifically, when the output of the inverter 8206 drops to a negative potential, five "AND" gates 8125 in the five units 8120–8124 are enabled so that a negative potential is forwarded through a plurality of gates 8126 to "*b*" terminals of five inverters 8127. The line and route selector 730 applies a negative potential to two of five terminals TH0, TH1, TH2, TH4 and TH7 in accordance with the binary coded designation of the number of the highway on which the selected outgoing trunk circuit is located. Thus, the "*c*" terminals of two of the inverters 8127 in the units 8130–8124 are enabled, and these two inverters are rendered conductive to set two flip-flips 8129. When the two flip-flips 8129 are set, the ground potentials at their "*e*" terminals are forwarded to the "*c*" terminal of two inverters 8128 to condition these inverters for subsequent conduction to read out the stored highway information to a link. The ground and negative potentials provided at the "*d*" and "*e*" terminals of the two set flip-flips 8129 are also used to supply busy signals to the common busy conductors in the local board 150 so that the outgoing trunk is marked as busy in the board 150.

More specifically, and assuming that the outgoing trunk is located on a given time slot on highway one, the flip-flips 8129 in the units 8120 and 8121 are operated to a set condition. When the flip-flip 8129 in the unit 8120 is operated to a set condition, ground potential is forwarded to the "*c*" terminal of an inverter 8114 in a busy test storage unit 8101 which represents the highway one. This unit is identical to nine other units 8102–8110 representing highways two to ten, inclusive. The "*b*" terminal of the inverter 8114 in the unit 8101 is connected to the "*d*" terminal of the set flip-flip 8129 in the unit 8121. Thus, the inverter 8114 is rendered conductive to forward ground to the resistive input of an "OR" gate 8113. The diode inputs of all of the gates 8113 in the units 8101–8110 are connected to the busy pulse out terminal of the time slot storage counter 8200. As described above, this counter now stores the time position of the selected outgoing trunk so that negative-going pulses are applied to the diode input of the enabled gate 8113 in the unit 8101. This produces a series of negative-going pulses that are supplied to the input of an inverter 8112 so that this inverter is pulsed into a conductive condition in the time position of the selected outgoing trunk. This operation of the inverter 8112 forwards a series of positive-going pulses through a gate 8111 to an inverter 8115 so that this inverter is pulsed into conduction in the time position of the outgoing trunk. Therefore, the terminal BT1 is provided with negative-going busy pulses in the time slot assigned to the outgoing trunk.

The selective operation of the highway storage units 8120–8124 also operates the control connector 1020 so that the position register 1000 is connected to the highway of the outgoing trunk in the proper time position. More specifically, when the inverter 8114 is rendered conductive to represent the selection of highway one, ground potential is forwarded to one of the terminals TH1–TH10 of the control connector 1020 representing this highway. The TSP terminal of this connector is connected to the time pulse out terminal of the time slot storage counter 8200. Accordingly, the control connector 1020 operates in the manner described above to complete a connection between the selected highway and time position and the position register 1000. The outputs of the units 8120–8124 are connected to the units 8102–8110 so that only a single one of these units is rendered operative in accordance with highway designation supplied by the route selector 730.

When the time slot storage counter 8200 is set to store the time position of the outgoing trunk in the manner described above, the monitor terminal of this counter rises to ground which is effective through a gate 8221 to operate a flip-flip 8302 to its set condition so that ground is forwarded to the CBM terminal of control B1300. This advises the position register 1000 that the highway and time slot designation of the selected outgoing trunk has been stored. When ground is applied to the terminal CBM, the connect demand signal is removed from the terminal FCD and the negative marking potential is removed from the terminals TSR and RTD so that the register finder 630 and the line route selector 730 are released for operation with other calls. The position register 1000 now operates to extend the connection to the called subscriber in the manner set forth in detail in the Tubinis et al. application.

When the desired subscriber station is selected or if a busy condition is encountered in one of the local offices through which the connection is to be extended, the control B1300 again applies a negative signal to the terminal FCD which causes the register finder 630 to select the position register 1000 for operation. When this happens, a negative signal is returned to the terminal DAF and the control B applies a negative signal to a terminal PA which is forwarded to the route selector 730 to inhibit the various allotters in the system so the new calls can not be established during the following period in which the designation of the outgoing trunk is transferred from the position register 1000 to the link circuit. The outgoing trunk designation is to be transferred from the position register 1000 to the proper link so that the connection is maintained through one of the links rather than through the position register 1000.

More specifically, to initiate this operation, the control B1300 applies a negative signal to a terminal KWR for enabling the associated link and applies ground to a terminal DSW which is forwrded to a pair of "AND" gates 8211 and 8213. This causes the output of the gates 8211 and 8213 to rise to ground, and this potential is effective through a pair of gates 8212 and 8214 to render a pair of inverters 8210 and 8215 nonconductive. The output of the inverter 8215 is clamped at ground by the potential supplied over a terminal TCC from the keyboard circuit 1220. When the inverter 8210 is rendered nonconductive, a gate 8207 is enabled to provide a negative potential which is forwarded through a gate 8208 to render an inverter 8209 conductive. When this inverter is rendered conductive, the "*b*" terminal of a pulse amplifier 8220 is elevated to ground potential to enable this pulse amplifier for conduction under the control of the time slot pulses provided at the time pulse out terminal of the storage counter 8200. The negative-going pulses supplied by the amplifier 8220 are connected to a terminal TS. This terminal is connected to the link circuit and is effective to cause the storage of the time position of the outgoing trunk in the called time slot storage counter 6500 in the link 800. Further, it should be noted that although the terminal TS is connected to all of the links, only the single link associated with the keyboard circuit 1220 is enabled to store this information at this time.

When the inverter 8210 is rendered nonconductive, the negative potential provided at the output thereof is also forwarded to the diode of the input of five gates 8131 in the units 8120–8124. The outputs of all of these gates drop to a negative potential which is forwarded through five gates 8130 to the "*b*" terminals of the five inverters 8128. However, the "*c*" terminals of only two of these inverters have been enabled by the set flip-flips 8129. Accordingly, only two inverters are rendered conductive to provide ground to the terminals TH0, TH1, TH2, TH4 and TH7 in accordance with the binary coded representation of the highway on which the outgoing trunk is located. Thus, the time slot and highway designation of the outgoing trunk is transferred from the position register 1000 to the effective one of the links.

In order to reset the position register 1000 to a normal condition following the transfer of this information to the effective link, the control B1300 initiates a resetting operation for the register 1000 during which negative-going pulses are applied to a pair of terminals RLR and RX. These terminals are connected to an "AND" gate 8306 so that the output of this gate drops to a negative potential. When either one of these two negative-going pulses returns to ground potential, a positive-going pulse is coupled to the input of an inverter 8316 so that this inverter is rendered nonconductive for a predetermined period of around fifty microseconds. When the inverter 8316 is rendered nonconductive, a negative signal is forwarded through an "OR" gate 8318 to render an inverter 8320 conductive. The ground potential provided at the output of this inverter resets all of the operated flip-flips in the position time store 1310 to their normal conditions. Incident to this operation, the flip-flip 8302 is reset so that ground is removed from the terminal CBM of control B1300. At the expiration of the delay period of the inverter 8316, this inverter and the inverter 8320 are restored to their normal conditions. When the position register 1000 is restored to its normal condition, the inhibiting signal to the allotters and the register finder 630 is removed to permit normal operation of the local board 150.

*Operation of the Position Register 1000 on Calls Extended to Stations Served by the Local Board 150*

In order to permit the position register 1000 to be used in extending a call from a calling subscriber served by the local board to a called subscriber served by this local board, the five digit store 1010 shown in the Tubinis et al. application requires a minor modification. More specifically, as disclosed in this copending application, means are provided for selectively transferring one or two digit designations from the five digit store 1010 to the routing control unit 700 in dependence on the type of call that is to be placed. These signals are supplied over terminals corresponding to the terminals 1DU–1DY and 2DU–2DY. However, in the local board 150, it is necessary to provide three digit designations for selecting a local terminating station. Accordingly, the first three shift registers in the five digit store 1010 are provided with output leads and are connected to "AND" gates, the outputs of which are forwarded to three sets of terminals 1DU–1DY, 2DU–2DY and 3DU–3DY. These terminals represent the first, second and third digits supplied to the five digit store 1010. The store 1010 is also modified to provide an all-digits-in signal when three digits are stored.

Another modification in the five digit store 1010 disclosed in the Tubinis et al. application is also necessary. This application discloses an inverter "5902" which is rendered conductive when the first digit stored in the five digit store 1010 has a value of zero. The input of the corresponding inverter in the five digit store 1010 used in the position register 1000 is connected through an "OR" gate to the output leads of the first shift register in which the first digit is stored so that the inverter corresponding to the inverter "5902" is rendered conductive when the "VW" and "XW" codes representing the digits "1" and "2" are stored as the first digit in the five digit store 1010.

The extension of a call by the operator at the keyboard circuit 1220 to a called local subscriber is initiated in the same manner as a call to a subscriber served by a remote local board. In other words, the operator keys the three digits necessary to extend the connection into the five digit store 1010 through the control B1300. When the first digit is stored in the first shift register, the value thereof is checked to determine the type of call that is being extended. As indicated above, the stations served by the local board are designated by the initial or hundreds digits "1" and "2." Accordingly, the inverter corresponding to the inverter "5902" which is provided in the five digit store 1010 is rendered conductive. The conduction of this inverter applies ground to the terminal WDD which is forwarded to the like designated terminal in the control B1300 to prevent this circuit from establishing a connect demand signal in the register finder 630. It is necessary to delay the demand signal at this time because it is necessary to store all three of the digits required to extend the local connection in the five digit store 1010 before the routing control unit 700 can be placed in operation.

The ground applied to the terminal WDD is also forwarded to one of the diode inputs of the "AND" gate 8202 to clamp the output of this gate at ground. Since a link, such as the link 800, is to be directly controlled by the routing control unit 700 to establish the connection to the called subscriber served by the local board 150 even though the call is being established by the operator, the application of ground to the terminal WDD conditions the control B1300 to supply marking to the terminal KWR as soon as the routing control unit marks the terminal RTD. Thus, the selected highway and time slot of the local line are transferred directly to the selected link rather than returned to the position register 1000. This operation is performed in the manner described in detail in the Tubinis et al. application.

The clamping of the output of the gate 8202 at ground and the provision of the control signal on terminal WDD to the control B1300 prevents further use of the position register 1000 in controlling the extension of the connection to the called local subscriber. When the third digit has been dialed into the five digit store 1010, this information is transferred to the route selector 730, the line selecting and busy test operations are performed, and the called highway and time slot information is forwarded to one of the links, such as the link 800. Incident to this operation, the position register 1000 is restored to its normal condition.

*Operation of the Position Register 1000 on Recalls*

When a recall condition is established in one of the links, the operator seizes the link and determines the new called subscriber. If the call is to be extended from the original calling subscriber to a new called subscriber, the operator then keys the designation of the new called subscriber served by the remote local board after clearing the called highway and time slot stores in the seized link. The connection is then established under the control of the position register 1000 and the routing control unit 700 in the manner described above.

Figure 82:
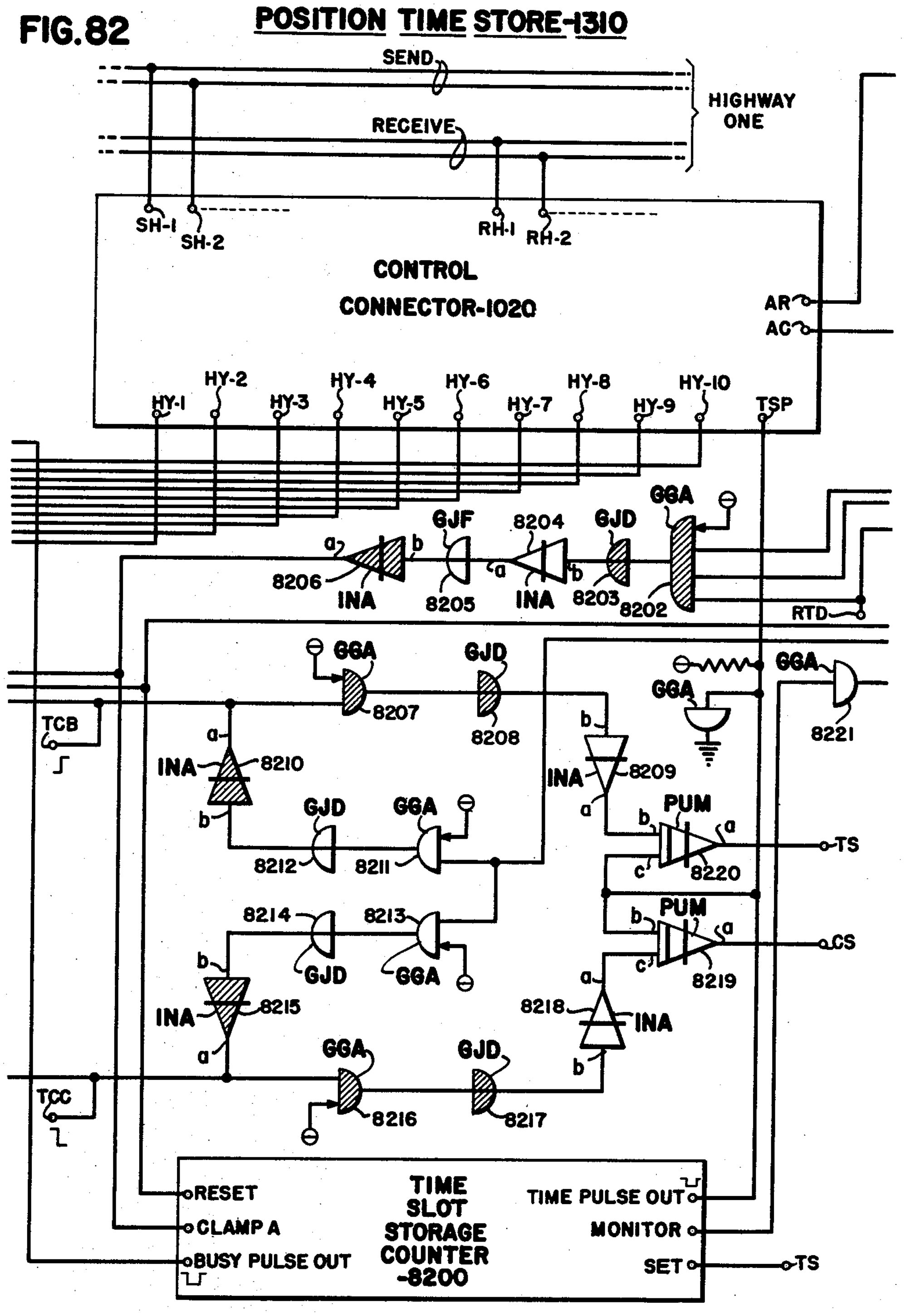

However, if the call is to be extended from the original called subscriber to a new called subscriber served by a remote local board, the operator actuates the split key to the "talk called" position. This operation of this key applies ground to the terminal TCB (FIG. 82) and a negative potential to the terminal TCC (FIG. 82). The application of ground to the terminal TCB clamps the output of the inverter 8210 at ground so that the called highway information can not be read out of the storage units 8120–8124 to the terminating highway terminals TH1, TH2, TH4 and TH7. This ground clamp also prevents the conduction of the pulse amplifier 8220 so that the time slot stored in the storage counter 8200 can not be supplied to the terminating time slot terminal TS. The application of a negative potential to the terminal TCC removes the ground clamp from the output of the inverter 8215. The removal of the ground clamp from the output of the inverter 8215 permits this inverter to control the transfer of the information stored in the position time store 1310 to the calling highway and time slot stores in the link 800.

More specifically, a plurality of units 8140–8144 are provided which are controlled by the highway storage units 8120–8124 to supply information to the calling highway storing means and the calling time slot storage means in the link. Each of the units 8140–8144 includes an inverter 8147, the "*c*" terminal of which is connected to the "*e*" terminal of the flip-flip 8129 in the related storage units 8120–8124. Thus, when any two of the flip-flips 8129 are operated to a set condition, ground enabling potentials are supplied to the "*c*" terminal of the two related inverters 8147. The "*b*" terminal of each of these inverters is connected through a pair of gates 8145 and 8146 to the output of the inverter 8215.

Thus, when the information necessary to control the establishment of a connection to a new called subscriber has been stored in the time store 1310 and the control B1300 supplies the link read-in signal to the terminal KWR and the position read-out signal to the terminal DSW, the negative potential applied to the terminal DSW renders both of the inverters 8210 and 8215 nonconductive. The output of the inverter 8210 is clamped at ground in the keyboard circuit 1220 so that the called highway and time slot information can not be read out to the called party stores in the link circuit.

However, when the inverter 8215 is rendered nonconductive, the output of the gates 8145 and 8146 in two of the units 8140–8144 drops to a negative potential so that two inverters 8147 are rendered conductive to supply ground marking signals to two of the terminals TH0, TH1, TH2, TH4 and TH7 representing the binary coded designation of the highway on which the new called party is located. Thus, this information is stored in the calling highway storage means in the link circuit. At the same time, the gates 8216 and 8217 render the inverter 8218 conductive so that the pulse amplifier 8219 is rendered conductive under the control of the negative-going signals supplied at the time pulse out terminal of the storage counter 8200 to supply signals to the terminal TS representing the time position of the new called party. The terminal TS is connected to the calling time slot storage counter 6400 in the effective link circuit. The position register 1000 can be restored to a normal condition in the manner described above.

Figure 83:
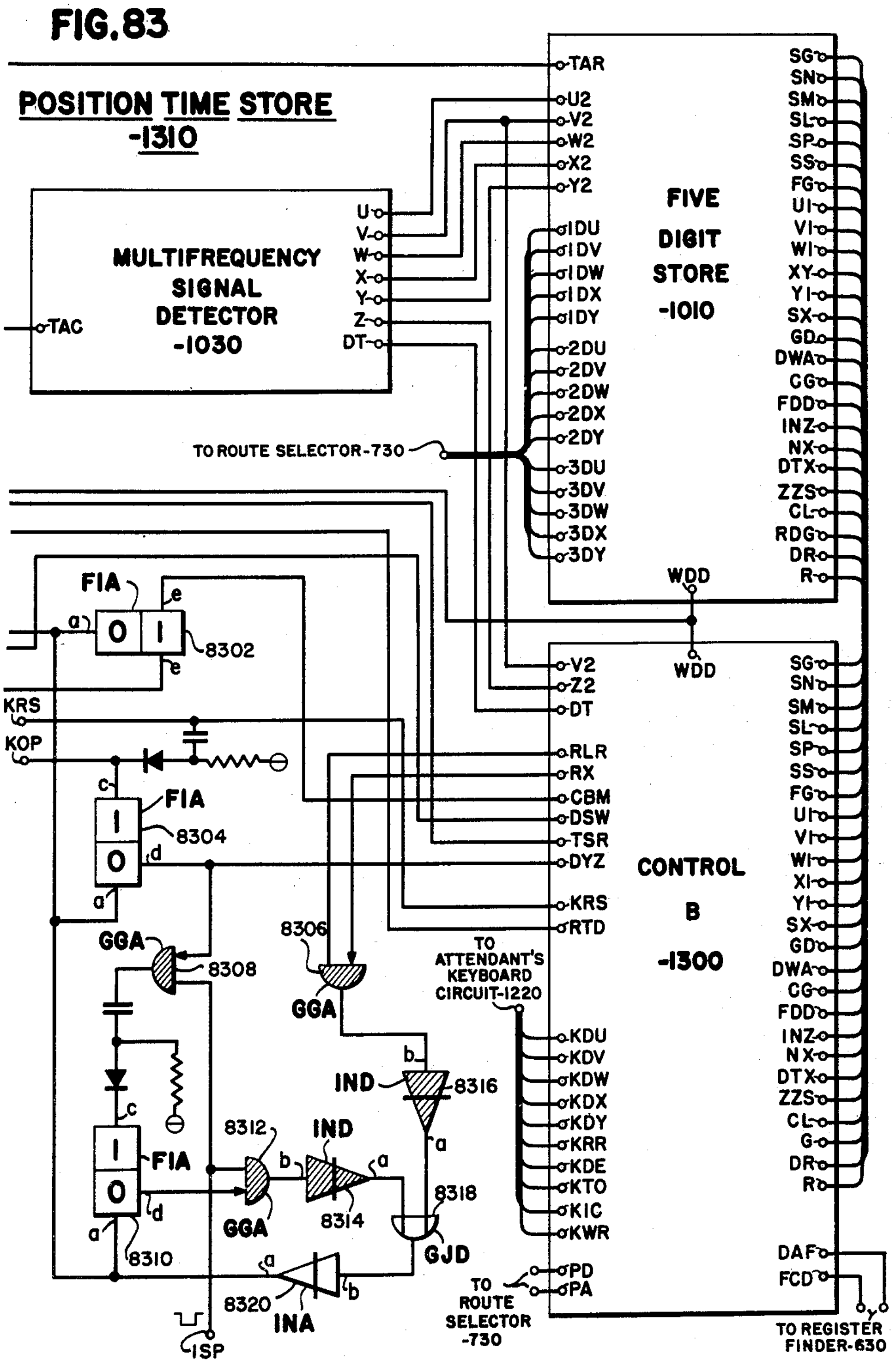

The position time store 1310 can be reset by the operator at the keyboard circuit 1220 by applying a positive-going pulse to a terminal KOP (FIG. 83) or by applying ground through a terminal KRS (FIG. 83). These provide positive-going pulses which are supplied to the "*c*" terminal of a flip-flip 8304. These pulses operate the flip-flip 8304 to its set condition so that a negative potential is applied to the resistive input of an "AND" gate 8308 and to the DYZ terminal of the control B1300. The application of a negative potential to the terminal DYZ causes the return of release tone to the extended connection and initiates the resetting of the position register 1000 to a normal condition. The negative potential is applied to the resistive input of the "AND" gate 8308 enables this gate so that, when a negative-going pulse is applied to a terminal 1SP, which pulse occurs at one second intervals, the gate 8308 drives a positive-going pulse into the "*c*" terminal of a flip-flip 8310.

This operates this flip-flip to its set condition so that a negative enabling potential is supplied from its "*d*" terminal to the resistive input of an "AND" gate 8312. Thus, when the next pulse appears at the terminal 1SP, the gate 8312 is completely enabled to drive a positive-going pulse into the input of an inverter 8314. This renders this inverter conductive for a predetermined period of time so that the inverter 8320 is again rendered conductive for a fixed period of time. When the output of the inverter 8320 drops to ground, all of the flip-flips in the position time store 1310 are reset to restore this circuit to its normal condition. At this time, the enabling for the gates 8308 and 8312 is removed so that the negative-going pulses at terminal 1SP are no longer effective. Further, when the flip-flip 8304 is reset, the negative potential is removed from the terminal DYZ of the control B1300.

What is claimed as new and desired by Letters Patent of the United States is:

1. In a communication system, a plurality of communication circuits, register means for storing a digital designation representing a group of circuits, a matrix including a plurality of controlled conduction devices forming crosspoints each representing one of said circuits, scanning means for enabling said devices in sequence, means for supplying signals to said matrix to prevent the enabling of the crosspoints representing busy ones of said circuits, said matrix sequentially supplying output signals representing idle ones of said circuits, means responsive to the storage of said digital designation in said register means for initiating operation of said scanning means, and means controlled by said stored digital designation for selecting an output signal from said matrix representing a circuit in said group of circuits and for then arresting operation of said scanning means.

2. The system set forth in claim 1 in which said communication circuits are permanently assigned an individual position on one of a plurality of transmission channels and in which said scanning means includes first means for enabling said crosspoints in accordance with the individual positions assigned to the circuits and second means for enabling the crosspoints in accordance with the transmission channels.

3. In an automatic communication system, a plurality of communication circuits each assigned an individual position on one of a plurality of transmission channels, register means for storing a digital designation representing a group of said circuits, counting means operable to successive settings each representing one of said channels, a source of different signals each representing one of said individual positions, first means connected to said counting means and said source for successively supplying signals representing circuits assigned different positions on different channels, means for supplying busy signals representing the positions on the channels that are in a busy condition, means controlled by said busy signals for preventing said first means from supplying signals representing busy ones of said circuits, and second means controlled by said register means and said first means for supplying signals representing the channel and the position on this channel of a communication circuit in the group of circuits represented by the digital designation stored in the register means.

4. The system set forth in claim 3 including switching means supplied with signals from said second means for extending a connection to said called circuit, and means connected to said switching means for performing a busy test on said called circuit.

5. In an automatic communication system, a plurality of communication circuits each assigned an individual position on one of a plurality of transmission channels, register means for storing a digital designation representing a group of said circuits, counting means operable to successive settings each representing one of said channels, signaling means for successively supplying signals representing different ones of said individual positions, a matrix connected to said counting means and said signaling means and including a plurality of crosspoints each representing one of the individual positions on one of the channels, said crosspoints being enabled in succession by said counting means and said signaling means, a plurality of output gates each connected to a group of crosspoints in said matrix, and means controlled by said register means for opening one of said output gates in accordance with the stored digital designation so that said opened output gate supplies signals representing one of the circuits in said group.

6. In an automatic communication system, a plurality of communication circuits each assigned an individual position on one of a plurality of transmission channels, register means for storing a digital designation representing a group of said circuits, counting means operable to successive settings each representing one of said channels, signaling means for successively supplying signals representing different ones of said individual positions, a matrix connected to said counting means and said signaling means and including a plurality of components each representing one of the individual positions on one of the channels, said component being enabled in succession by said counting means and said signaling means, a plurality of output gates each connected to a group of crosspoints in said matrix, means controlled by said register means for opening one of said output gates in accordance with the stored digital designation so that said opened output gate supplies signals representing one of the circuits in said group, and switching means connected to said counting means and said output gates and operable to extend a connection to the circuit represented by the setting of the counting means and the signals supplied by the opened output gate.

7. In an automatic communication system, a plurality of communication circuits, register means for storing a digital designation representing a group of said circuits, a matrix including a plurality of controlled conduction crosspoints each representing one of said circuits, each of said crosspoints including a pair of inputs, first scanning means including two independently operable counting means for successively enabling a first one of the inputs to each of said crosspoints, second scanning means for successively enabling the second of the inputs to each of the crosspoints, means connecting one portion of the first inputs to one of the two counting means in said first scanning means and another portion of the first inputs to the other of the two counting means so that at least a portion of said crosspoints can be enabled if either one of said counting means is rendered inoperative, and means connected to said matrix and controlled by said register means for supplying signals representing one circuit in said group.

8. The system set forth in claim 7 including means for supplying busy signals representing busy ones of said circuits, and means for applying said busy signals to one of the inputs of the crosspoints so as to disable the crosspoints representing busy circuits.

9. In an automatic communication system, a plurality of communication circuits, switching means responsive to applied signals for extending a connection to one of said circuits, a matrix for sequentially supplying signals each representing a different one of said circuits, scanning means for operating said matrix to supply said signals, translating means for converting a digital designation into signals representing a called circuit, register means for storing a digital designation representing a called circuit, first means for determining the value of the digital designation stored in said register means, and second means controlled by said first means for rendering said translating means effective or for placing said scanning means in operation in accordance with the value of the stored digital designation.

10. The system set forth in claim 9 including third means controlled by said first means when the stored digital designation is of a particular value for preventing the operation of both of said translating means and scanning means.

11. In a communication system, a plurality of line and trunk circuits each identified by a selected one of a plurality of distinctive time positions on a selected one of a plurality of communication channels, a matrix of controlled conduction devices, means for supplying the devices in said matrix with signals marking the time positions and channels of line and trunk circuits that are in a busy condition, translating means for converting a digital designation into signals representing the channel and time position of a called line circuit, an incoming communication circuit, connecting means for connecting said incoming communication circuit to an idle one of said trunk circuits or to a called line circuit, first control means for assigning an idle one of said trunk circuits for connection to said incoming communication circuit, said first control means comprising means including at least one of said controlled conduction devices in said matrix for supplying signals representing the channel and time position of an idle trunk circuit to said connecting means, second control means for rendering said translating means effective to supply signals for controlling said connecting means, register means for storing a digital designation received from said incoming circuit, and means controlled by said register means for rendering said first or second control means effective.

References Cited in the file of this patent

UNITED STATES PATENTS

| | | |
|---|---|---|
| 2,717,372 | Anderson | Sept. 6, 1955 |
| 2,785,390 | Rajchman | Mar. 12, 1957 |
| 2,839,738 | Wolfe | June 17, 1958 |
| 2,848,549 | Trousdale et al. | Aug. 19, 1958 |
| 2,872,518 | Trousdale | Feb. 3, 1959 |
| 2,882,341 | Trousdale | Apr. 14, 1959 |
| 2,884,488 | Trousdale | Apr. 28, 1959 |
| 2,892,035 | Trousdale | June 23, 1959 |
| 2,910,540 | Van Mierlo | Oct. 27, 1959 |
| 2,968,696 | Trousdale | Jan. 17, 1961 |
| 3,041,400 | Faulkner | June 26, 1962 |
| 3,061,685 | Peach | Oct. 30, 1962 |